United States Patent [19]

Hamaki et al.

[11] Patent Number: 5,600,635
[45] Date of Patent: Feb. 4, 1997

[54] CALLER PERSONAL STATION EQUIPPED WITH SIMULTANEOUS CALL FUNCTION AND MULTICAST COMMUNICATION FUNCTION AND CORRESPONDING RECEIVER PERSONAL STATION, AND CELL STATION AND CORRESPONDING RECEIVER PERSONAL STATION

[75] Inventors: Takayuki Hamaki, Hirakata; Mitsuhiro Suzuki, Moriguchi; Akinori Tatsumi, Yokohama; Mikio Shimazu, Iizuka; Jun Yamaguchi, Takatsuki; Hiroaki Iwamoto, Hirakata; Masahide Morozumi, Yokohama; Takuya Kobayashi, Osaka; Seiji Horii, Kashihara; Takako Hirose, Katano, all of Japan

[73] Assignee: Matsushita Electric Industrial Co., Ltd., Osaka, Japan

[21] Appl. No.: 418,422

[22] Filed: Apr. 6, 1995

[30] Foreign Application Priority Data

Apr. 7, 1994 [JP] Japan .................................. 6-069589
May 23, 1994 [JP] Japan .................................. 6-108705

[51] Int. Cl.⁶ .................................. H04L 5/14; H04J 3/00
[52] U.S. Cl. .......................... 370/280; 370/312; 370/346; 370/347
[58] Field of Search .............................. 370/29, 95.3, 50, 370/58.1, 60, 59, 95.1, 93; 379/58, 63, 60; 455/33.1, 54.1, 34.1

[56] References Cited

U.S. PATENT DOCUMENTS 5,081,704  1/1992  Umeda et al. .................... 455/33.1

FOREIGN PATENT DOCUMENTS 63-281529  11/1988  Japan .

Primary Examiner—Wellington Chin
Assistant Examiner—Melissa Kay Carman
Attorney, Agent, or Firm—Price, Gess & Ubell

[57] ABSTRACT

The caller personal station of the present invention includes the following units: a channel search unit for scanning the plurality of communication channels to search for an unoccupied channel and regarding the unoccupied channel as a multicast channel; and a simultaneous call unit for repeatedly transmitting a simultaneous call frame on the multicast channel for a first predetermined time period, the simultaneous call frame indicating a simultaneous call to the other personal stations; a multicast unit for transmitting multicast frames on the multicast channel when a second predetermined time period has passed, the multicast frames containing data to be multicast. On receiving the simultaneous call frame by sequentially sensing the plurality of communication channels, the other personal stations enter a receiving state of multicast frames on the multicast channel. The simultaneous call unit includes the following units: a simultaneous call frame generation unit for generating the simultaneous call frame; a transmission timer for counting the first predetermined time period and generating a time-out; and a simultaneous call frame transmission unit for repeatedly transmitting the simultaneous call frame on the multicast channel from a start of counting the predetermined time period until the time-out is generated.

101 Claims, 67 Drawing Sheets

FIGURE 4 B

GROUP MANAGEMENT TABLE

| GROUP NUMBER | NO OF UNITS | PERSONAL STATION IDENTIFICATION NUMBER |
|---|---|---|
| G11 | 2 | PS112   PS113 |
| G12 | 2 | PS114   PS115 |
| G13 | 1 | PS111 |

FIGURE 4 A

NUMBER MANAGEMENT TABLE

| CALL CODE | | BIT COMPOSITION |
|---|---|---|
| GLOBAL NUMBER (ALL STATIONS) | | 11000000 |
| GROUP NUMBER | G11 | 10000001 |
| | G12 | 10000010 |
| | G13 | 10000011 |
| PERSONAL STATION IDENTIFICATION NUMBER (PSID) | PS111 | 01000001 |
| | PS112 | 01000010 |
| | PS113 | 01000011 |
| | PS114 | 01000100 |
| | PS115 | 01000101 |

FLOWCHART : SIMULTANEOUS CALL (FOR PERSONAL STATION REQUESTING SIMULTANEOUS CALL)

SIMULTANEOUS CALL SIGNAL

CONTROL CLASSIFICATION

| b7 | b6 | b5 | b4 | b3 | b2 | b1 | b0 | CONTROL CLASSIFICATION |
|---|---|---|---|---|---|---|---|---|
| 0 | 0 | 0 | 0 | 0 | 0 | 0 | 1 | SIMULTANEOUS CALL |
| 0 | 0 | 0 | 0 | 0 | 0 | 1 | 0 | CHANNEL SETTING INDICATION |
| 0 | 0 | 0 | 0 | 0 | 0 | 1 | 1 | CARRIER SENSING REQUEST |
| OTHERS | | | | | | | | RESERVATION |

CONTROL INFORMATION

| INFORMATION ELEMENT | DIRECTION |
|---|---|
| CALL CODE | DOWN |
| COMMUNICATION CHANNEL | DOWN |

FLOWCHART : MULTICAST COMMUNICATION
(FOR PERSONAL STATION REQUESTING SIMULTANEOUS CALL)

FLOWCHART : MULTICAST COMMUNICATION
(FOR RECEIVER PERSONAL STATION)

FIGURE 9

SG2 MULTICAST COMMUNICATION SIGNAL

| RADIO CONTROL FIELD | MULTICAST COMMUNICATION SIGNAL | MULTICAST INFORMATION FIELD |
|---|---|---|

| CONTROL CLASSIFICATION FIELD | CONTROL INFORMATION FIELD | MULTICAST INFORMATION FLAG | MULTICAST DATA |
|---|---|---|---|

CONTROL CLASSIFICATION

| b7 | b6 | b5 | b4 | b3 | b2 | b1 | b0 | CONTROL CLASSIFICATION |
|---|---|---|---|---|---|---|---|---|
| 0 | 0 | 0 | 0 | 0 | 0 | 0 | 0 | CONTROL INFORMATION INVALID |
| 0 | 0 | 0 | 0 | 0 | 0 | 0 | 1 | POLLING REQUEST |
| 0 | 0 | 0 | 0 | 0 | 0 | 1 | 0 | PRESS TALK RECEPTION |
| 0 | 0 | 0 | 0 | 0 | 0 | 1 | 1 | POINT-TO-POINT COMMUNICATION RECEPTION |
| 0 | 0 | 0 | 0 | 0 | 1 | 0 | 0 | CHANNEL SWITCHING INDICATION |
| 0 | 0 | 0 | 0 | 0 | 1 | 0 | 1 | GROUP NUMBER ASSIGNMENT |
| 0 | 0 | 0 | 0 | 0 | 1 | 1 | 0 | BUSY TONE TRANSMISSION REQUEST |
| 0 | 0 | 0 | 0 | 0 | 1 | 1 | 1 | INDIVIDUAL CALL |
| 0 | 0 | 0 | 0 | 1 | 0 | 0 | 0 | MULTICAST COMMUNICATION DISCONNECTION INDICATION |
| 0 | 0 | 0 | 0 | 1 | 0 | 0 | 1 | MULTICAST COMMUNICATION DISCONNECTION COMPLETION |
| OTHERS ||||||||  RESERVATION |

CONTROL INFORMATION

| INFORMATION ELEMENT | DIRECTION |
|---|---|
| PERSONAL STATION IDENTIFICATION NUMBER | DOWN |
| GROUP NUMBER | DOWN |
| COMMUNICATION CHANNEL | DOWN |

MULTICAST COMMUNICATION FLAG

| b0 | MULTICAST COMMUNICATION FLAG |
|---|---|
| 1 | DATA VALID |
| 0 | DATA INVALID |

FLOWCHART : MULTICAST COMMUNICATION/POLLING CONTROL
(PERSONAL STATION REQUESTING SIMULTANEOUS CALL)

FLOWCHART : MULTICAST COMMUNICATION/POLLING CONTROL
(RECEIVER PERSONAL STATION)

FIGURE 13

SG3 COMMUNICATION SIGNAL

| RADIO CONTROL FIELD | COMMUNICATION CONTROL FIELD | INFORMATION FIELD |
|---|---|---|

| | CONTROL CLASSIFICATION FIELD | CONTROL INFORMATION FIELD | INFORMATION FLAG | DATA |
|---|---|---|---|---|

CONTROL CLASSIFICATION

| b7 | b6 | b5 | b4 | b3 | b2 | b1 | b0 | CONTROL CLASSIFICATION |
|---|---|---|---|---|---|---|---|---|
| 0 | 0 | 0 | 0 | 0 | 0 | 0 | 0 | CONTROL INFORMATION INVALID |
| 0 | 0 | 0 | 0 | 0 | 0 | 0 | 1 | POLLING RESPONSE(UP)/POLLING REQUEST(DOWN) |
| 0 | 0 | 0 | 0 | 0 | 0 | 1 | 0 | PRESS TALK REQUEST(UP)/PRESS TALK RECEPTION(DOWN) |
| 0 | 0 | 0 | 0 | 0 | 0 | 1 | 1 | CANCEL PRESS TALK |
| 0 | 0 | 0 | 0 | 0 | 1 | 0 | 0 | POINT-TO-POINT COMMUNICATION REQUEST(UP)/POINT-TO-POINT COMMUNICATION RECEPTION(DOWN) |
| 0 | 0 | 0 | 0 | 0 | 1 | 0 | 1 | CARRIER SENSING RESPONSE |
| 0 | 0 | 0 | 0 | 0 | 1 | 1 | 0 | CHANNEL SETTING RESPONSE |
| 0 | 0 | 0 | 0 | 0 | 1 | 1 | 1 | CHANNEL SWITCHING REQUEST |
| 0 | 0 | 0 | 0 | 1 | 0 | 0 | 0 | BUSY TONE |
| 0 | 0 | 0 | 0 | 1 | 0 | 0 | 1 | MULTICAST COMMUNICATION PARTICIPATION REQUEST |
| 0 | 0 | 0 | 0 | 1 | 0 | 1 | 0 | MULTICAST COMMUNICATION INFORMATION |
| 0 | 0 | 0 | 0 | 1 | 0 | 1 | 1 | COMMUNICATION DISCONNECTION REQUEST |
| 0 | 0 | 0 | 0 | 1 | 1 | 0 | 0 | COMMUNICATION DISCONNECTION INDICATION |
| 0 | 0 | 0 | 0 | 1 | 1 | 0 | 1 | COMMUNICATION DISCONNECTION COMPLETION |
| 0 | 0 | 0 | 0 | 1 | 1 | 1 | 0 | CALL REQUEST |
| 0 | 0 | 0 | 0 | 1 | 1 | 1 | 1 | RECEPTION RESPONSE |
| ALL OTHERS | | | | | | | | RESERVATION |

CONTROL INFORMATION

| INFORMATION ELEMENT | DIRECTION |
|---|---|
| PERSONAL STATION IDENTIFICATION NUMBER | BOTH DIRECTIONS |
| GROUP NUMBER | DOWN |
| COMMUNICATION CHANNEL | DOWN |
| CARRIER SENSING RESULT | UP |
| CHANNEL SETTING RESULT | UP |
| | UP |
| MULTICAST COMMUNICATION PARTICIPATION ACCEPTANCE RESULT | DOWN |

CONTROL CLASSIFICATION

| b0 | INFORMATION FLAG |
|---|---|
| 1 | DATA VALID |
| 0 | DATA INVALID |

FLOWCHART : MULTICAST COMMUNICATION/POINT-TO-POINT COMMUNICATION ( RECEIVER PERSONAL STATION)

FLOWCHART : PRESS TALK( PERSONAL STATION REQUESTING SIMULTANEOUS CALL)

FLOWCHART : PRESS TALK( RECEIVER PERSONAL STATION)

FLOWCHART: SIMULTANEOUS CALL FROM CELL STATION / CHANNEL SETTING (RECEIVER PERSONAL STATION)

FLOWCHART: CHANNEL SWITCHING RECEPTION/POINT-TO-POINT COMMUNICATION RECEPTION (CELL STATION)

FIGURE 33

MULTICAST COMMUNICATION SIGNAL/COMMUNICATION SIGNAL

| RADIO CONTROL FIELD | COMMUNICATION CONTROL FIELD | | | INFORMATION FIELD |
|---|---|---|---|---|
| | CONTROL CLASSIFICATION FIELD | CONTROL INFORMATION FIELD | INFORMATION FLAG | DATA |

CONTROL CLASSIFICATION

| b7 b6 b5 b4 b3 b2 b1 b0 | CONTROL CLASSIFICATION (UP) | CONTROL CLASSIFICATION (DOWN) |
|---|---|---|
| 0 0 0 0 0 0 0 0 | CONTROL INFORMATION INVALID | CONTROL INFORMATION INVALID |
| 0 0 0 0 0 0 0 1 | POLLING RESPONSE | POLLING REQUEST |
| 0 0 0 0 0 0 1 0 | PRESS TALK REQUEST | PRESS TALK RECEPTION |
| 0 0 0 0 0 0 1 1 | CANCEL PRESS TALK | |
| 0 0 0 0 0 1 0 0 | POINT TO POINT COMMUNICATION REQUEST | POINT-TO-POINT COMMUNICATION RECEPTION |
| 0 0 0 0 0 1 0 1 | CARRIER SENSING RESPONSE | GROUP NUMBER ALLOCATION |
| 0 0 0 0 0 1 1 0 | CHANNEL SETTING RESPONSE | CHANNEL SETTING INDICATION |
| 0 0 0 0 0 1 1 1 | CHANNEL SWITCHING REQUEST | CHANNEL SWITCHING INDICATION |
| 0 0 0 0 1 0 0 0 | BUSY TONE | BUSY TONE TRANSMISSION REQUEST |
| 0 0 0 0 1 0 0 1 | MULTICAST COMMUNICATION PARTICIPATION REQUEST | MULTICAST COMMUNICATION PARTICIPATION RESPONSE |
| 0 0 0 0 1 0 1 0 | MULTICAST COMMUNICATION INFORMATION | |
| 0 0 0 0 1 0 1 1 | COMMUNICATION DISCONNECTION REQUEST | |
| 0 0 0 0 1 1 0 0 | COMMUNICATION DISCONNECTION INDICATION | MULTICAST COMMUNICATION DISCONNECTION INDICATION |
| 0 0 0 0 1 1 0 1 | COMMUNICATION DISCONNECTION COMPLETION | MULTICAST COMMUNICATION DISCONNECTION COMPLETION |
| 0 0 0 0 1 1 1 0 | CALL REQUEST | INDIVIDUAL CALL |
| 0 0 0 0 1 1 1 1 | RECEPTION RESPONSE | |
| OTHERS | RESERVATION | |

CONTROL INFORMATION

| INFORMATION ELEMENT | DIRECTION |
|---|---|
| PSID | BOTH |
| GROUP NUMBER | DOWN |
| COMMUNICATION CHANNEL | DOWN |
| CARRIER SENSING RESULT | UP |
| CHANNEL SETTING RESULT | UP |
| MULTICAST COMMUNICATION CONTINUATION INFORMATION | UP |
| MULTICAST INFORMATION PARTICIPATION ACCEPTANCE RESULT | DOWN |

CONTROL CLASSIFICATION

| b0 | INFORMATION FLAG |
|---|---|
| 1 | DATA VALID |
| 0 | DATA INVALID |

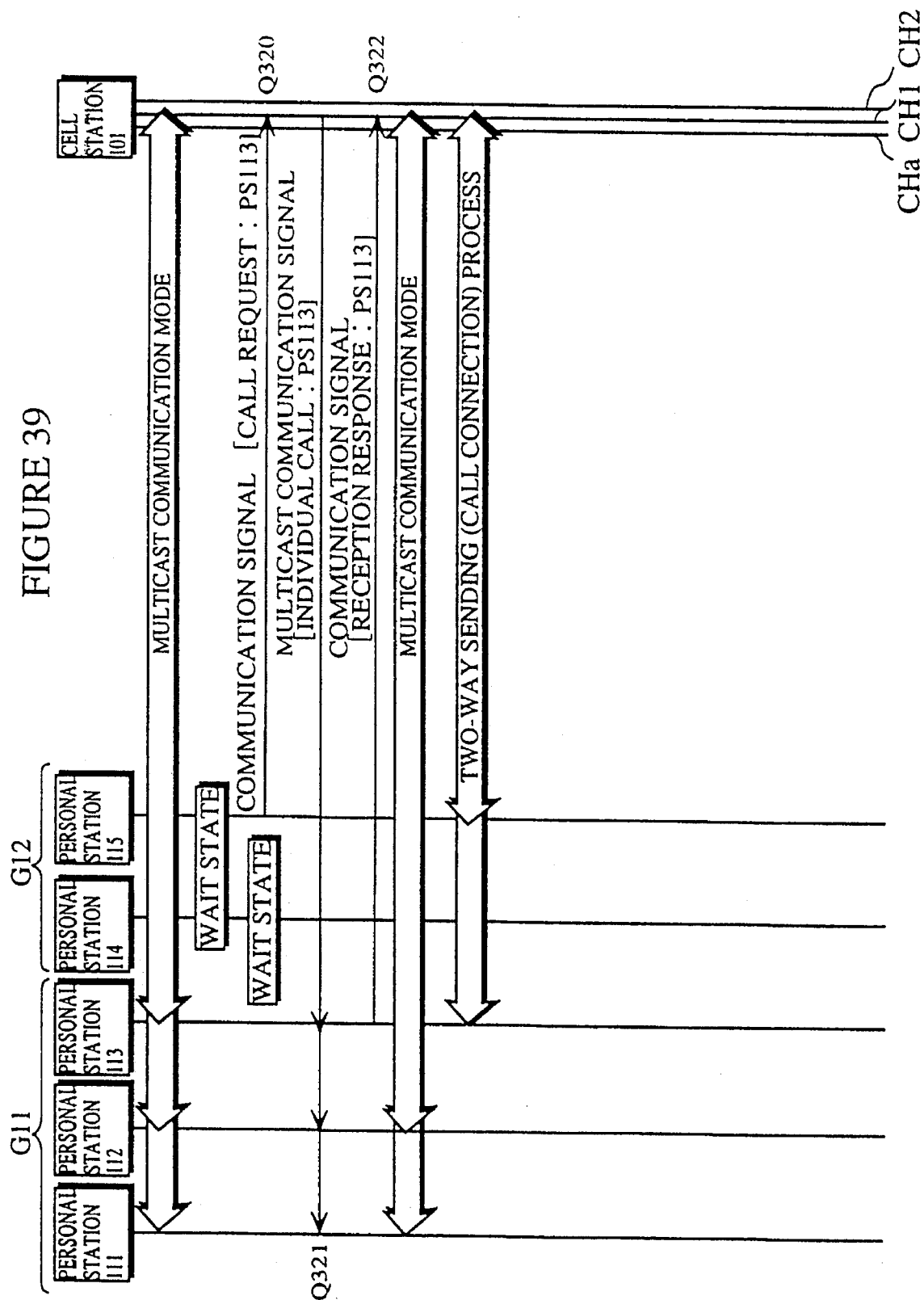

FLOWCHART : MULTICAST COMMUNICATION/
BUSY TONE TRANSMISSION
(RECEIVER PERSONAL STATION)

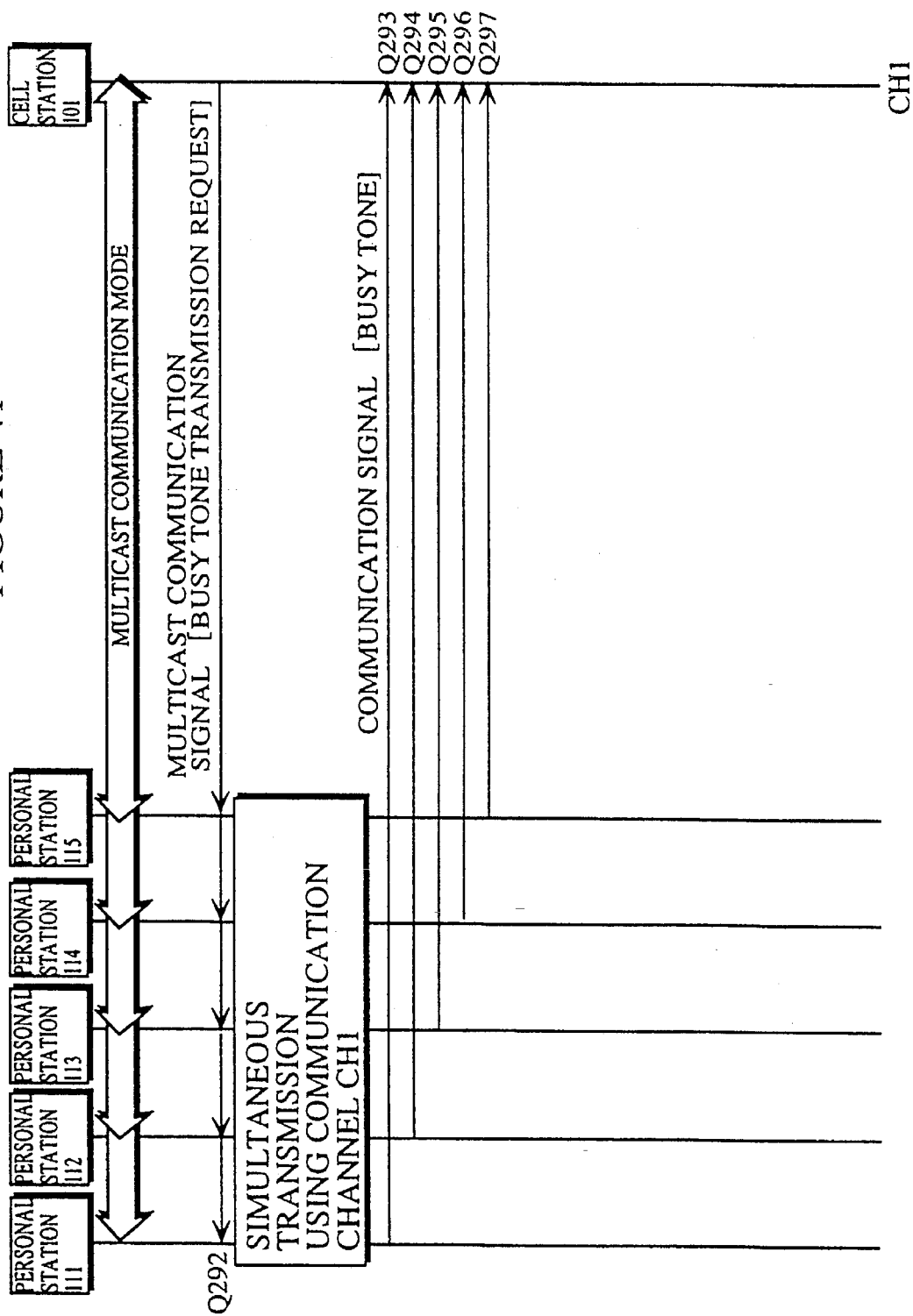

SG4 REPORTING SIGNAL

CONTROL CLASSIFICATION

| b7 | b6 | b5 | b4 | b3 | b2 | b1 | b0 | CONTROL CLASSIFICATION |
|---|---|---|---|---|---|---|---|---|
| 0 | 0 | 0 | 0 | 0 | 0 | 0 | 1 | MULTICAST COMMUNICATION INFORMATION |
| 0 | 0 | 0 | 0 | 0 | 0 | 1 | 0 | MULTICAST COMMUNICATION PARTICIPATION RESPONSE |
| OTHERS | | | | | | | | RESERVATION |

CONTROL INFORMATION

| INFORMATION ELEMENT | DIRECTION |
|---|---|
| GROUP NUMBER | DOWN |
| COMMUNICATION CHANNEL | DOWN |
| MULTICAST PARTICIPATION ACCEPTANCE RESULT | DOWN |

FLOWCHART : MULTICAST COMMUNICATION INFORMATION REPORTING/PARTICIPATION RECEPTION (CELL STATION)

FLOWCHART: PARTICIPATION DURING MULTICAST COMMUNICATION (PERSONAL STATION)

FLOWCHART : POINT-TO-POINT COMMUNICATION TERMINATION (PERSONAL STATION)

CALLER PERSONAL STATION EQUIPPED WITH SIMULTANEOUS CALL FUNCTION AND MULTICAST COMMUNICATION FUNCTION AND CORRESPONDING RECEIVER PERSONAL STATION, AND CELL STATION AND CORRESPONDING RECEIVER PERSONAL STATION

BACKGROUND OF THE INVENTION

1. Field of the Invention

The present invention relates to mobile radio communication and, in particular, to personal stations and cell stations which allow for multicast communication between a personal station or a cell station and a number of personal stations.

2. Related Art

There have been great advancements in information technologies in recent years, with much attention being focused on mobile communication systems of superior performance and responsiveness, which have been put to a variety of uses such as portable phones and cordless phones. However, the benefits due to the realization of mobile communication systems have been outstripped by the increased demands on radio communication systems. Increasing use is also being made of mobile communication systems using digital methods such as TDMA/TDD techniques in order to make efficient use of channels and improve communication services. For mobile communication systems using TDMA/TDD techniques, a frequency (one carrier) is divided into time slots of a predetermined time period. In order to achieve full duplex communication, an equal number of up and down time slots are provided as TDMA frames, with one up and one down time slot forming one radio channel.

In order to achieve full-duplex communication of audio data or non-audio data, between a cell station and one personal station, or (directly) between one person station and another, one radio channel is used. When communication between one personal station and another is achieved via a cell station, then the use of two radio channels becomes necessary. Such radio channels can be divided in terms of function into control channels and communication channels. Control channels are used for the sending and receiving of control signals such as those for positional registration or for outgoing/incoming control signals, while communication channels are principally used for the sending and receiving of information signals such as audio information or data. A number of separate carriers are allocated to the control channels and communications channels, respectively. Personal stations are set up so as to always observe the control channels, while the cell station manages the personal stations by using these control channels. Once personal stations transfer to a communications channel indicated on a control channel, the transmission of audio and non-audio data can be commenced.

There are also the following techniques described below for multicast communication, that is to say, the communication of information of a same content to a number of personal stations.

The first example of a multicast communication technique is taught by U.S. Pat. No. 5,081,704. Under this technique, the cell station first divides the personal stations to receive the signal transmitted using a notification information signal into groups by means of the control channel, before setting up the control channel for sending and receiving signals between the cell station and the personal stations for multicast communication use, and then executing communication with each of the personal stations in the group successively in order.

The second example of a multicast communication technique is taught by Japanese Patent 63-282129. Under this technique, the cell station, on receiving a request for multicast transmission from a personal station, transmits a multicast communication signal to all of the personal stations in the group. Here, "all of the personal stations in the group" refers to all of the personal stations which are positionally registered as being in the radio cell covered by the cell station in question, and which are capable of mobile communication, with each personal station being allocated its own personal station number for identification purposes.

There have, however, been the following problems with the techniques described above.

The first multicast communication technique involves the dividing of all the personal stations to receive the signal into groups and the specifying of a control channel on which each personal station in a specified group observes an individual call signal directed towards itself, so that it is not possible to call all of the personal stations belonging to a group concurrently. Therefore, by using the control channel for the transmission and reception of control signals between the cell station and the personal stations when there is positional registration or outgoing/incoming control signals and suchlike, since the notification information is multicast transmitted to all of the personal stations in the radio cell, then compared with a communications channel, there is the problem that only small amount of data can be transmitted in one time unit.

Since under the second multicast communication technique multicast communication must be executed via the cell station, then multicast communication will not be possible when there are no communication channels open for use by the cell station, for example, due to the communication channels being used for communication between use by the cell station and other personal stations. Therefore, due to reasons such as the positioning of a personal station in a given cell at a point where it is also included in an overlapping area of a neighboring cell, when the signal for such a personal station suffers from electric wave interference due to the stations in the neighboring radio cell, there is the problem of the cell station for said personal station not being able to actually receive the multicast communication signal on the communication channel indicated for multicast communication. Additionally, when, for reasons such as a personal station to be reached by a simultaneous call being switched OFF, or already communicating with another station, there are the problems in that the communication channel to be used for multicast communication cannot be established when multicast communication is to be commenced, and that it is not possible for a station to participate in the multicast communication once it has begun.

SUMMARY OF THE INVENTION

The first object of the present invention is to provide personal stations one of which can be a caller personal station effectively performing multicast communications with the other personal stations which are receiver personal stations, by directly transmitting a simultaneous call on a communication channel without passing through a cell station.

The second object of the present invention is to provide such caller personal station which performs multicast communications with receiver personal stations which belong to a specified group.

The third object of the present invention is to provide such caller personal station and receiving personal stations which perform multicast communication without fail by continually securing a channel for multicast communications.

The fourth object of the present invention is to provide such caller personal station and receiving personal stations which can move from the multicast communications to point-to-point communications.

The fifth object of the present invention is to provide such caller personal station and receiving personal stations which can communicate in the bidirections in the multicast communications.

The sixth object of the present invention is to provide such caller personal station and receiving person stations which can perform press talk communications by transmitting multicast data from one of the receiving personal stations to another personal station via the caller personal station in the multicast communications.

The seventh object of the present invention is to provide a cell station and receiving personal stations which perform effective multicast communications by transmitting a simultaneous call from the cell station to the receiving personal stations.

The eighth object of the present invention is to provide such cell station and receiving personal stations which can set a multicast channel without fail in the multicast communications.

The ninth object of the present invention is to provide such cell station which performs multicast communications with receiver personal stations which belong to a specific group.

The tenth object of the present invention is to provide such cell station and receiving personal stations which perform multicast communication without fail by continually securing a channel for multicast communications.

The eleventh object of the present invention is to provide such cell station and receiving personal stations which can move from the multicast communications to point-to-point communications.

The twelfth object of the present invention is to provide such cell station and receiving personal stations which can switch from the multicast communications to the point-to-point communications without any disconnection.

The thirteenth object of the present invention is to provide such cell station and receiving personal stations which can communicate in the bidirections in the multicast communications.

The fourteenth object of the present invention is to provide such cell station and receiving personal stations which can accept another personal station when the multicast communications are in progress or some of the receiving personal stations can suspend the multicast communications.

The caller personal station that can achieve the first object comprises the following units:

a channel search unit for scanning the plurality of communication channels to search for an unoccupied channel and regarding the unoccupied channel as a multicast channel;

a simultaneous call unit for repeatedly transmitting a simultaneous call frame on the multicast channel for a first predetermined time period, the simultaneous call frame indicating a simultaneous call to the other personal stations;

a multicast unit for transmitting multicast frames ion the multicast channel when a second predetermined time period has passed, the multicast frames containing data to be multicast; and on receiving the simultaneous call frame by sequentially sensing the plurality of communication channels, the other personal stations enter a receiving state of multicast frames on the multicast channel.

The simultaneous call unit may comprise the following units:

a simultaneous call frame generation unit for generating the simultaneous call frame;

a transmission timer for counting the first predetermined time period and generating a time-out; and a simultaneous call frame transmission unit for repeatedly transmitting the simultaneous call frame on the multicast channel from a start of counting the predetermined time period until the time-out is generated.

The multicast unit may comprise the following units:

a stand-by timer for counting a stand-by time period required for the other personal stations to set the multicast channel into a communication state when the time-out is generated;

a multicast frame generation unit for generating multicast frames which carry data to be multicast to the other personal stations; and a multicast frame transmission unit for transmitting generated multicast frames on the multicast channel when the stand-by time period has passed.

According to the above-explained construction, efficient multicast communications can be performed on a single communication channel without using the control channel. In addition, the simultaneous call is directly transmitted among the personal stations without passing through the cell station, so that other personal stations outside the radio zone can take part in the multicast communications.

The caller personal station may further comprise a table unit for holding group numbers respectively assigned to groups into which the plurality of personal stations are predeterminately divided.

The simultaneous call unit may further comprises a call number setting unit for setting one of the group numbers to the simultaneous call frame generated by the simultaneous call frame generation unit.

The simultaneous call frame transmission unit may transmit on the multicast channel the simultaneous call frame in which the group number is set. On receiving the simultaneous call frame, any of the other personal stations which belong to a group indicated by the group number set in the simultaneous call frame may enter a receiving state of multicast frames on the multicast channel.

According to the above-explained construction, the second object can be achieved. That is, the simultaneous call is applied to a specific group only which is shown in the table, without calling other receiving personal stations. For example, appropriate communications can be performed by making a group of the receiving personal stations depending on the various types of personal stations to be multicast such as facsimile devices, telephones, or data terminals.

The caller personal station may further comprise an invalid data information setting unit for setting information which indicates that data are invalid to a multicast frame generated by the multicast frame generation unit when there is no data to be transmitted, so that the cell station and the other personal stations distinguish the multicast channel from an unoccupied channel.

According to the above-explained construction, the third object can be achieved. That is, in a range in which busy tone of the caller personal station can reach, the cell station and the other personal stations can distinguish the multicast channel from an unoccupied channel.

The multicast unit may further comprise a point-to-point communications information setting unit for setting point-to-point communications information to a multicast frame generated by the multicast frame generation unit, together with a personal station number of a personal station to be applied the point-to-point communications. The point-to-point communications information indicates that the caller personal station starts to communicate with one of the other personal stations. The multicast frame transmission unit may transmit the multicast frame which contains the point-to-point communication information. On receiving the multicast frame which contains the point-to-point communication information, a personal station which is assigned the personal station number set in the multicast frame may enter a point-to-point communication state on the multicast channel, and the other personal stations which are not assigned the personal station number may suspend the multicast communications on the multicast channel.

According to the above-explained construction, the third object fan be achieved. That is, the caller personal station and the receiving personal stations can move from the multicast communications to the point-to-point communications. In addition, the multicast channel can be used for the point-to-point communications, which can save more time required for the transition compared with establishing new connection.

The caller personal station may further comprise a table unit for holding personal station numbers and group numbers, the personal station numbers being assigned to each of the plurality of personal stations and the group numbers being assigned to groups into which all of the plurality of personal stations are predeterminately divided. The multicast unit may further comprise a group number setting unit for setting a specified group number to a multicast frame generated by the multicast frame generation unit. The multicast frame transmission unit may transmit the multicast frame in which the specified group number is set. On receiving the multicast frame, any of the personal stations which do belong to a group indicated by the group number set in the multicast frame may abandon the multicast frame.

The second object can also be achieved by the above-explained construction. That is, after the simultaneous call is transmitted, multicast data can be transmitted either to all the receiving personal stations which received the simultaneous call or to a specific group shown in the table.

The caller personal station may further comprise a table unit for holding all of the plurality of personal stations. The multicast unit may further comprise the following units:

a polling information setting unit for setting polling information to a multicast frame generated by the multicast frame generation unit, the polling information indicating that a personal station which receives the multicast frame is allowed to transmit data;

a polling number setting unit for setting one of the personal station numbers of the personal stations held in the table unit as a polling number to every generated multicast frame.

The multicast frame transmission unit may transmit a multicast frame in which polling information and a polling number are set. On receiving the multicast frame in which the polling information and a group number are set, a personal station assigned the group number set in the multicast frame may transmit a response frame which carries data to be transmitted on the multicast channel, information which indicates that the frame is a response frame, and the personal station number.

According to the above-explained construction, the fifth object can be achieved. That is, a collision of the response frames transmitted from the receiving personal stations to the caller personal station is avoided, and as a result, the response frames can be transmitted from the receiving personal stations for the multicast transmissions.

The caller personal station may further comprise a press talk request judging unit for judging a received radio frame to be a press talk request if the radio frame carries information which indicates a request for consecutive transmission of radio frames and a personal station number equal to the personal station number set by the polling number setting unit; and a press talk reception setting unit for setting to the multicast frame press talk reception information which indicates a permission of press talk and a personal station number of the personal station which has made the press talk request, when the radio frame is judged to be the press talk request.

The polling information setting unit and the polling number setting unit may stop an operation when the radio frame is judged to be the press talk request.

The multicast frame transmission unit may transmit the multicast frame in which the press talk reception information and the personal station number of the personal station which has made the press talk request are set.

On receiving the multicast frame, a personal station which is assigned the personal station number of the personal station which has bade the press talk request set in the radio frame may transmit on multicast channel a response frame which carries data to be transmitted.

According to the above-explained construction, the sixth object can be achieved. That is, the caller personal station can receive response frames which are consecutively transmitted from the receiving personal stations, allowing the communications in the bidirections.

The caller personal station may further comprise a data relay unit for setting data carried in the response frame received by the radio frame reception unit to a multicast frame generated by the multicast frame generation unit as relay data. The multicast frame transmission unit may transmit the multicast frame in which the relay data are set, in order to allow the personal station that has made the press talk request to transmit multicast data to another personal station via the caller personal station.

According to the above-explained construction, receiving personal stations which have received the polling request can sequentially transmit the response frames to other personal stations via the caller personal station.

The receiving personal station that can achieve the first object comprises the following units:

a reception unit for receiving radio frames ion the plurality of communication channels;

a channel scanning unit for sequentially scanning the plurality of communication channels;

a simultaneous call frame judging unit for judging whether a radio frame received by the reception unit is a simultaneous call frame transmitted from the caller personal station; and a multicast channel setting unit for setting a communication channel on which the simultaneous call frame is received to the reception unit as a multicast channel when the radio frame is judged to be the simultaneous call frame and for suspending an operation of the channel scanning unit.

The reception unit may receive multicast frames transmitted from the caller personal station on the multicast channel.

According to the above-explained construction, efficient multicast communications can be performed on a single communication channel without using the control channel.

The receiver personal station may further comprise a call number holding unit for holding one of group numbers assigned to the receiver personal station, the group numbers respectively assigned to groups into which the plurality of personal stations are predeterminately divided.

The simultaneous call frame judging unit may comprise the following units:

a simultaneous call identification judging unit for judging whether a radio frame received by the reception unit carries an identification of simultaneous call;

a call number judging unit for judging whether the radio frame carries the group number assigned to the receiver personal station; and a reception determination unit for determining to receive the radio frame when the radio frame is judged to carry the identification of simultaneous call and the group number assigned to the receiver personal station.

The multicast channel setting unit may make the reception unit set a communication channel on which the radio frame is received to a multicast channel and suspend the operation of the channel scanning unit.

According to the above-explained construction, the second object can be achieved. That is, a group which has been applied the simultaneous call enters the receiving station, the caller personal station can call a specific group only.

The receiver personal station may further comprise the following units:

a call number holding unit for holding one of group numbers assigned to the receiver personal station, the group numbers respectively assigned to groups into which the plurality of personal stations are predeterminately divided;

a multicast frame judging unit for judging whether a multicast frame received by the reception unit carries a group number assigned to the receiver personal station as a destination number; and a frame abandonment unit for abandoning the multicast frame when the multicast frame is judged not to carry the group number assigned to the receiver personal station, and for receiving data in the multicast frame when the multicast frame is judged to carry the group number assigned to the receiver personal station.

when the caller personal station performs the multicast communications with a specific group, the caller personal station may set a group number to the multicast frame.

The second object can also be achieved by the above-explained construction. That is, receiving personal stations abandon multicast frames which are not destined for the group to which the receiving personal stations belong even after the simultaneous call is transmitted. Consequently, the caller personal station can transmit the multicast data only to a specific group.

The receiver personal station may further comprise a validity judging unit for judging whether a multicast frame received by the reception unit carries information which indicates that data in the multicast frame is invalid; and a data abandonment unit for abandoning the data when the multicast frame is judged to carry the information which indicates invalidity of the data.

The caller personal station may transmit ion the multicast channel a multicast frame which carries information which indicates that data are invalid when there is no data to be transmitted, so that the cell station and the other personal stations distinguish the multicast channel from an unoccupied channel.

According to the above-explained construction, the third object can be achieved. That is, the multicast channel can be secured in the range in which busy tone of all the personal stations can reach.

The receiver personal station may further comprise the following units:

an instruction reception unit for receiving from an operator an instruction which indicates a start of point-to-point communications with the caller personal station;

point-to-point communication request setting unit for suspending the operation of the polling response setting unit and setting to a generated response frame information indicating a point-to-point communications request and the personal station number of the receiver personal station when the multicast frame is judged to be the polling request and the instruction indicating the start of the point-to-point communications is received;

a point-to-point communications determination unit for determining to start point-to-point communications if a multicast frame received by the reception unit carries point-to-point communications information which indicates the start of the point-to-point communications and the personal station number of the receiver personal station; and an point-to-point communication start unit for starting the point-to-point communications with the caller personal station on the multicast channel if the start of the point-to-point communications is determined.

According to the above-explained construction, the fourth object can be achieved. That is, a quick transition can be performed from the multicast communication to the point-to-point communications.

The receiver personal station may further comprise the following units:

a response frame generation unit for generating a response frame which carries data to be transmitted to the caller personal station;

a polling judging unit for judging a multicast frame received by the reception unit as a polling request if the multicast frame carries polling information which indicates that the caller personal station allows the receiver personal station to transmit data and a personal station number assigned to the receiver personal station;

a polling response setting unit for setting information indicating that the response frame is a response to the polling, and the personal station number of the receiver personal station to the response frame when the multicast frame is judged to be the polling request; and a transmission unit for transmitting on the multicast channel the response frame in which the information indicating that a response frame is a response to the polling and the personal station number of the receiver personal station are set.

According to the above-explained construction, the fifth object can be achieved. That is, receiving personal stations can transmit the response frame to response to the multicast frame transmitted by the caller personal station, thereby realizing the bidirectional communications.

The receiver personal station may further comprise the following units:

an instruction reception unit for receiving from an operator an instruction which indicates a start of press talk for sequentially transmitting response frames to the caller personal station; and a press talk request setting unit for suspending an operation of the polling response setting unit and setting to a generated response frame information which indicating a press talk request and the personal station number of the receiver personal station when the multicast frame is judged to be the polling request and the instruction indicating the start of the press talk is received.

The transmission unit may transmit on the multicast channel the response frame in which the information indicating that the response frame is the press talk request and the personal station number of the receiver personal station are set.

According to the above-explained construction, the sixth object can be achieved. That is, the receiving personal stations can consecutively transmit a press talk, which allows a great amount of data to be transmitted efficiently.

The cell station that can achieve the seventh object comprises the following units:

a channel search unit for scanning the plurality of communication channels to search for an unoccupied channel and regarding the unoccupied channel as a multicast channel;

a simultaneous call unit for transmitting a simultaneous call frame which carries multicast channel information indicating the multicast channel on the control channel, the simultaneous call frame indicating a simultaneous call to the plurality of personal stations; and a multicast unit for transmitting multicast frames on the multicast channel when a predetermined time period passes after the simultaneous call frame is transmitted, the multicast frames containing data to be multicast.

The plurality of personal stations set the multicast channel indicated by the multicast channel information to a receiving state, on receiving the simultaneous call frame on the control channel.

The simultaneous call unit may comprise the following units:

a simultaneous call frame generation unit for generating the simultaneous call frame;

a multicast channel information setting unit for setting the multicast channel information to a generated simultaneous call frame;

a simultaneous call direction setting unit for setting a simultaneous call direction to the generated simultaneous call frame, the simultaneous call direction directing the plurality of personal stations to set the multicast channel indicated by the multicast channel information to a communication state; and a simultaneous call frame transmission unit for transmitting the simultaneous call frame in which the simultaneous call direction is set on the control channel.

The simultaneous call unit may further comprise the following units:

a carrier sense request setting unit for setting a carrier sense request to the simultaneous call frame in which the multicast channel information is set, the carrier sense request requesting that the multicast channel indicated by the multicast channel information is checked;

a control channel reception unit for receiving radio frames sent from the plurality of personal stations on the control channel;

a frame judging unit for judging whether each of the received radio frames carries a carrier sense result, which indicates whether each of the plurality of personal stations can use the multicast channel; and a carrier sense result judging unit for judging whether a ratio of carrier sense results which indicate that the multicast channel can be used exceeds a predetermined value.

The simultaneous call frame transmission unit may transmit the simultaneous call frame in which the carrier sense request and the multicast channel information are set on the control channel, and transmit the simultaneous call frame in which the simultaneous call direction and the multicast channel information on the control channel when the ratio of carrier sense results which indicate that the multicast channel can be used is judged to exceed the predetermined value.

On receiving the simultaneous call frame which carries the carrier sense request, the plurality of personal stations may check whether the multicast channel indicated by the multicast channel information can be used, and transmit a checked result as the carrier sense result on the control channel.

On receiving the simultaneous call frame which carries the simultaneous call direction, the plurality of personal stations may set the multicast channel indicated by the multicast channel information to the communication state.

The channel search unit may search for an unoccupied channel again when the ratio of carrier sense results which indicate that the multicast channel can be used is judged not to exceed the predetermined value, and make another communication channel a new multicast channel.

The simultaneous call unit may retransmit a simultaneous call frame which carries a carrier sense request for the new multicast channel.

According to the above-explained construction, the eighth object can be achieved. That is, the receiving personal stations checks whether the multicast channel is used before starting the simultaneous call, so that the multicast channel that is free from busy tone interference can be secured in advance in a range where busy tone of each personal station can reach.

The simultaneous call unit may further comprise the following units:

a reception unit for receiving radio frames sent from the plurality of personal stations on the control channel and the multicast channel;

a frame judging unit for judging whether each of received radio frames carries a channel setting result which indicates whether each of the plurality of personal stations has set the multicast channel to the communication state; and a channel set judging unit for judging whether a ratio of channel setting results which indicate that the multicast channel has been set to the communication state exceeds a predetermined value.

On receiving the simultaneous call frame, the plurality of personal stations may set the multicast channel to the communication state if the multicast channel is not occupied, transmit a notice of a successful setting of the multicast channel on the multicast channel, and transmit a notice of an unsuccessful setting of the multicast channel on the control channel if the multicast channel is in use.

The multicast unit may transmit the multicast frame which carries data to be multicast on the multicast channel when the ratio of channel setting results which indicate that the multicast channel has been set to the communication state is judged to exceed the predetermined value.

The channel search unit may search for an unoccupied channel again when the ratio of channel setting results which indicate that the multicast channel has been set to the communication state is judged not to exceed the predetermined value, and makes another communication channel a new multicast channel.

The simultaneous call unit may retransmit a simultaneous call frame for the new multicast channel.

The eighth object can also be achieved by the above-explained construction. That is, the receiving personal stations confirm the multicast channel setting results, so that the cell station can secure the multicast channel that is free from busy tone interference in a range where busy tone of each of the personal stations can reach.

The cell station may further comprise a table unit for holding group numbers respectively assigned to groups into which the plurality of personal stations are predeterminately divided.

The simultaneous call unit may further comprise a call number setting unit for setting one of the group numbers to the simultaneous call frame generated by the simultaneous call frame generation unit.

The simultaneous call frame transmission unit may transmit the simultaneous call frame in which the group number is set on the control channel.

On receiving the simultaneous call frame, any of the plurality of personal stations which belong to a group indicated by the group number set in the simultaneous call frame may set the multicast channel indicated by the multicast channel information to a receiving state.

According to the above-explained construction, the ninth object can be achieved. That is, the cell station transmits the simultaneous call to a specific group shown in the table, without call the other receiver personal stations.

The multicast unit may comprise the following units:

a stand-by timer for counting a stand-by time period required for the plurality of personal stations to set the multicast channel into a communication state when the simultaneous call frame has been transmitted;

a multicast frame generation unit for generating multicast frames which carry data to be multicast to the plurality of personal stations; and a multicast frame transmission unit for transmitting generated multicast frames on the multicast channel when the stand-by time period has passed.

The cells station may further comprise an invalid data information setting unit for setting information which indicates that data are invalid to a multicast frame generated by the multicast frame generation unit when there is no data to be transmitted, so that the cell station and the personal stations distinguish the multicast channel from an unoccupied channel.

According to the above-explained construction, the tenth object can be achieved. That is, the cell station can secure the multicast channel in a range wider than the radio zone of the cell station, or in a range whether busy tone of all the receiving personal stations can reach.

The multicast unit may further comprise a busy tone transmission direction setting unit for setting a busy tone transmission direction to the multicast frame generated by the multicast frame generation unit, the busy tone transmission direction indicating a transmission of a busy tone, which indicates a channel is busy.

The multicast frame transmission unit may transmit the multicast frame which carries the busy tone transmission direction.

On receiving the multicast frame which carries the busy tone transmission direction, the plurality of personal stations may transmit a busy tone on the multicast channel, so that another cell station and the plurality of personal stations distinguish the multicast channel from an unoccupied channel in a wide range in which busy tone of the plurality of personal stations reach.

The tenth object can also be achieved by the above-explained construction. The cell station can secure the multicast channel in a wider range by making the receiving personal station transmit busy tone.

The caller personal station may further comprise a table unit for holding all of the plurality of personal stations. The multicast unit may further comprise a polling information setting unit for setting polling information to a multicast frame generated by the multicast frame generation unit, the polling information indicating that a personal station which receives the multicast frame is allowed to transmit data; and a polling number setting unit for setting one of the personal station numbers of the personal stations held in the table unit as a polling number to every generated multicast frame.

The multicast frame transmission unit may transmit a multicast frame in which polling information and a polling number are set. On receiving the multicast frame in which the polling information and a group number are set, a personal station assigned the group number set in the multicast frame may transmit a response frame which carries data to be transmitted on the multicast channel, information which indicates that the frame is a response frame, and the personal station number.

According to the above-explained construction, the eleventh object can be achieved. That is, the multicast communications can be replaced by the point-to-point communications.

The multicast unit may further comprise a point-to-point channel information setting unit for setting point-to-point channel information which indicates a channel for point-to-point communications to the multicast frame in which the point-to-point communications information is set.

The multicast frame transmission unit may transmit a multicast frame which carries the point-to-point communications information and the point-to-point channel information.

On receiving the multicast frame which carries the point-to-point communications information and the point-to-point channel information, a personal station which is assigned a personal station number set in the multicast frame may start the point-to-point communications on the communication channel indicated by the point-to-point communications channel information.

The eleventh object can also be achieved by the above-explained construction. That is, a smooth transition can be performed from the multicast communication to the point-to-point communications.

The multicast unit may further comprise a suspension-continuation information setting unit for setting suspension/continuation information to the multicast frame in which the point-to-point channel information is set, the suspension/continuation information indicating one of suspension and continuation of the multicast communication.

The multicast frame transmission unit may transmit the multicast frame which carries the point-to-point communications information, the point-to-point channel information, and the suspension/continuation information.

On receiving the multicast frame which carries the point-to-point communications information, the point-to-point channel information, and the suspension/continuation information, a personal station which is assigned the personal station number set in the multicast frame may start the point-to-point communications on the communication channel indicated by the point-to-point communications channel information, and the other personal stations which are not assigned the personal station number set in the multicast frame suspend or continue to receive frames on the multicast channel in accordance with the suspension/continuation information.

According to the above-explained construction, the twelfth object can be achieved. That is, when the communications are moved from the multicast communications to the point-to-point communications, the multicast communications can be either suspended or continued.

The cell station may further comprise a table unit for holding personal station numbers and group numbers, the personal station numbers being assigned to each of the plurality of personal stations and the group numbers being assigned to groups into which all of the plurality of personal stations are predeterminately divided.

The multicast unit may further comprise a group number setting unit for setting a specified group number to a multicast frame generated by the multicast frame generation unit.

The multicast frame transmission unit may transmit the multicast frame in which the specified group number is set.

On receiving the multicast frame, any of the personal stations which do belong to a group indicated by the group number set in the multicast frame may abandon the multicast frame.

The ninth object can also be achieved by the above-explained construction. That is, the cell station transmits the simultaneous call to a specific group shown in the table, without call the other receiver personal stations. For example, appropriate communications can be performed by making a group of the receiving personal stations depending on the various types of personal stations to be multicast such as facsimile devices, telephones, or data terminals. Furthermore, the cell station can exclude some receiving personal stations not to transmit data.

The multicast unit may further comprise a polling information setting unit for setting polling information to a multicast frame generated by the multicast frame generation unit, the polling information indicating that a personal station which receives the multicast frame is allowed to transmit data; and a polling number setting unit for setting one of the personal station numbers of the personal stations belonging to a predetermined group held in the table unit as a polling number to every generated multicast frame.

The multicast frame transmission unit may transmit a multicast frame in which polling information and a polling number are set.

On receiving the multicast frame in which the polling information and a group number are set, a personal station assigned the group number set in the multicast frame may transmit a response frame which carries data to be transmitted on the multicast channel, information which indicates that the frame is a response frame, and the personal station number. According to the above-explained construction, the thirteenth object can be achieved. That is, receiving personal stations can transmit the response frame to response to the multicast frame transmitted by the caller personal station, thereby realizing the bidirectional communications.

The cell station may further comprise the following units:

a radio frame reception unit for receiving radio frames from the other personal stations on the multicast channel;

a response frame judging unit for judging a received radio frame to be a response frame if the radio frame carries information which indicates that the information is a response to the polling and a personal station number equal to the personal station number set by the polling number setting unit; and a data reception unit for receiving data contained in the response frame.

The cell station may further comprise a no-entry personal station judging unit for judging whether there is any personal station that is not taking part in the multicast communications; an announcement frame generation unit for generating announcement frames which carry multicast communications information which indicates that the multicast communication is in progress, a group number of the predetermined group, and channel information which indicates the multicast channel.

The simultaneous call frame transmission unit may transmit the announcement frame on the control channel. Personal stations which have not in the multicast communications and which belong to the group indicated by the announcement frame may set the multicast channel indicated by the channel information to the communication state.

According to the above-explained construction, the fourteenth object can be achieved. That is, receiving personal stations can join the multicast communications which are in progress, in such cases that they have so far been in other communications or the power was off when the simultaneous call was transmitted.

The cell station may further comprise the following units:

a no-entry personal station judging unit for judging whether there is any personal station that is not taking part in the multicast communications;

an announcement frame generation unit for generating announcement frames which indicate that the multicast communication is in progress;

a multicast information setting unit for setting to a generated announcement frame multicast information which carries a group number of the predetermined group and the multicast channel;

a control channel reception unit for receiving radio frames on the control channel;

a frame judging unit for judging whether a received radio frame is an announcement response frame which carries entry information which indicates that a personal station joins in the multicast communication and the personal station which has transmitted the entry information; and an entry reception setting unit for setting reception information which indicates an entry of the personal station is received to a newly generated announcement frame when a personal station number set in the announcement response frame belongs to the predetermined group, and for setting rejection information which indicates that the entry is rejected to a newly generated announcement frame when the personal station number does not belong to the specified group.

The simultaneous call frame transmission unit may transmit on the control channel the announcement frame which carries the multicast information and the announcement frame in which the reception information is set.

On receiving the announcement frame which carries the multicast information, personal stations which have not in the multicast communications and which belong to the group indicated by the group number set in the announcement frame may transmit the announcement response frame on the control channel.

On receiving the announcement frame in which the reception information is set, personal stations which have not in the multicast communications may set the multicast channel indicated by the multicast information to the communication state.

According to the above-explained construction, the cell station can let the receiving personal stations which belong to a specific group join the multicast communications, among the receiving personal stations that failed in joining the multicast communications when the simultaneous call was transmitted.

The multicast unit may further comprise a disconnection direction setting unit for setting to the multicast frame generated by the multicast frame generation unit a disconnection direction which indicates that the multicast communications are disconnected and a personal station number of personal station to be applied the disconnection direction.

The multicast frame transmission unit may transmit the multicast frame which carries the disconnection direction.

On receiving the multicast frame which carries the disconnection direction, a personal station which is assigned the personal station number set in the multicast frame may suspend the multicast communications.

According to the above-explained construction, the cell station can let each receiving personal station remove from the multicast communications.

The cell station may further comprise the following units:

a reception unit for receiving the disconnection direction for a specific personal station and an instruction which indicates the personal station number of the personal station to be applied the disconnection direction, the disconnection direction and the instruction being inputted from one of an operating unit of the cell station, the plurality of personal stations, and a communications unit connected with the cell station via a communications network;

a target personal station judging unit for judging whether the personal stations to be applied the disconnection direction are in a multicast communication state; and a start unit for starting the disconnection direction setting unit when the personal stations to be applied the disconnection direction are judged to be in he multicast communication state.

According to the above-explained construction, the cell station can exclude any receiving personal station from the multicast communications.

The multicast unit may further comprise the following units:

a switch request judging unit for judging whether the response frame judged by the response frame judging unit carries a switch request which requests for a change of multicast channels;

a search control unit for directing the channel search unit to search for an unused channel and making the unused channel a new multicast channel when the response frame has been judged to carry the switch request; and a switch direction setting unit for setting a switch direction to the multicast frame generated by the multicast frame generation unit, the switch direction including channel information which indicates a new multicast channel and an instruction which indicates switching from the multicast channel to the new multicast channel.

The multicast frame transmission unit may transmit the multicast frame which carries the switch direction.

When a number of reception errors of multicast frames in the multicast channel has increased, the plurality of personal stations may transmit a response frame which carries the switch request.

On receiving the multicast frame which carries the switch direction, the plurality of personal stations may set the new multicast channel indicated by the channel information to the multicast communications state.

According to the above-explained construction, the multicast channel can be replaced by a new multicast channel when any of the receiving personal stations suffer from busy tone interference.

The cell station may further comprise the following units:

a reception unit for receiving specified personal station numbers and a direction which indicates making a group of personal stations which are assigned the specified personal station numbers from one of an operating unit of the cell station, the plurality of personal stations, and a communications unit connected with the cell station via a communication network;

a group number storage unit for storing a new group number to the table unit when the direction to make a group of personal stations is received, and storing the personal station numbers which belong to the group; and a number assignment information setting unit for setting to the multicast frame generated by the multicast frame generation unit assignment information which indicates assignment of group numbers, the new group number held in the table unit, and personal station numbers of personal stations which belong to the group indicated by the new group number.

The multicast frame transmission unit may transmit the multicast frame which carries the assignment information, the new group number, and the personal station numbers.

On receiving the multicast frame which carries the assignment information, a personal station which is assigned personal station number set in the multicast frame may hold the new group number as the group number assigned to the group to which the personal station belongs.

According to the above-explained construction, a new group number is assigned to the receiving personal stations.

The receiving personal station that can achieve the seventh object comprises the following units:

a reception unit for receiving radio frames;

a simultaneous call frame judging unit for judging whether a radio frame received on the control channel by the reception unit is a simultaneous call frame transmitted from the cell station; and a multicast channel setting unit for setting a multicast channel indicated by the multicast channel information to a receiving state when the radio frame is judged to be the simultaneous call frame which carries a simultaneous call direction.

The reception unit may receive multicast frames transmitted from the cell station on the multicast channel after receiving the radio frame on the control channel.

According to the above-explained construction, the eighth object can be achieved. That is, the receiving personal stations checks whether the multicast channel is used before starting the simultaneous call, so that the multicast channel that is free from busy tone interference can be secured in advance in a range where busy tone of each personal station can reach.

The receiver personal station may further comprise the following units:

a radio frame generation unit for generating radio frames;

a channel setting result setting unit for setting to a radio frame a channel setting result which indicates whether the multicast channel ash been set to the communication state by multicast channel setting unit; and a transmission unit for transmitting generated radio frames on the control channel when the multicast channel has not been set, and transmitting the generated radio frames on the multicast channel when the multicast channel has been set.

The multicast channel setting unit may sense the multicast channel indicated by the channel information, and set the multicast channel to the communication state if the multicast channel is not being used by the cell station and other personal stations.

The eighth object can also be achieved by the above-explained construction. That is, the receiving personal stations confirm the multicast channel setting results, so that the cell station can secure the multicast channel that is free from busy tone interference in a range where busy tone of each of the personal stations can reach.

The receiver personal station may further comprise a call number holding unit for holding one of group numbers assigned to the receiver personal station, the group numbers respectively assigned to groups into which the plurality of personal stations are predeterminately divided.

The simultaneous call frame judging unit may comprises the following units:

a simultaneous call identification judging unit for judging whether a radio frame received by the reception unit carries an identification of simultaneous call;

a call number judging unit for judging whether the radio frame carries the group number of the receiver personal station; and a reception determination unit for determining to join the multicast communications when the radio frame is judged to carry the identification of simultaneous call and the group number assigned to the receiver personal station.

The multicast channel setting unit may set the multicast channel indicated by the multicast channel information to the receiving state when the reception determination unit determines to join the multicast communications.

According to the above-explained construction, the ninth object can be achieved. That is, the cell station transmits the simultaneous call to a specific group shown in the table, without call the other receiver personal stations.

The receiver personal station may further comprise the following units:

a response frame generation unit for generating a response frame which carries data to be transmitted to the cell station;

a polling judging unit for judging a multicast frame received by the reception unit as a polling request if the multicast frame carries polling information which indicates that the cell station allows the receiver personal station to transmit data and a personal station number assigned to the receiver personal station;

a polling response setting unit for setting information indicating that the response frame is a response to the polling, and the personal station number of the receiver personal station to the response frame when the multicast frame is judged to be the polling request; and a transmission unit for transmitting to the multicast channel the response frame in which the information indicating that a response frame is a response to the polling and the personal station number of the receiver personal station are set.

According to the above-explained construction, the thirteenth object can be achieved. That is, receiving personal stations can transmit the response frame to response to the multicast frame transmitted by the caller personal station, thereby realizing the bidirectional communications.

The receiver personal station may further comprise the following units:

an instruction reception unit for receiving from an operator an instruction which indicates a start of point-to-point communications via the cell station;

a point-to-point communication request setting unit for suspending the operation of the polling response setting unit and setting to a generated response frame information indicating a point-to-point communications request and the personal station number of the receiver personal station when the multicast frame is judged to be the polling request and the instruction indicating the start of the point-to-point communications is received;

a point-to-point communications determination unit for determining to start point-to-point communications if the multicast frame received by the reception unit carries point-to-point communications information which indicates the start of the point-to-point communications and the personal station number of the receiver personal station; and a point-to-point communication start unit for starting the point-to-point communications via the cell station on the multicast channel if the start of the point-to-point communications is determined.

The transmission unit may transmit the multicast frame which carries the point-to-point communications request.

According to the above-explained construction, the eleventh object can be achieved. That is, the multicast communications can be replaced by the point-to-point communications.

The receiver personal station may further comprise the following units:

a reception unit for receiving from an operator a removal request which indicates to remove from the multicast communications;

a removal request setting unit for setting to a generated response frame information which indicates the removal request and a personal station number of the receiver personal station when the multicast frame is judged to be the polling request and the reception unit has received the removal request;

a frame judging unit for judging whether the multicast frame received by the reception unit carries disconnection direction which indicates that the multicast communications to the receiver personal station are disconnected, and the personal station number of the receiver personal station; and a suspension control unit for controlling the reception unit to suspend a reception on the multicast channel if the multicast frame is judged to carry the disconnection direction.

According to the above-explained construction, the fourteenth object can be achieved. That is, the receiving personal stations can suspend the multicast communications halfway.

The receiver personal station may further comprise the following units:

an announcement information judging unit for judging whether a radio frame received on the control channel by the reception unit is an announcement frame which carries multicast information including a group number and a multicast channel and which indicates that the multicast communications are in progress;

a group number judging unit for judging whether the group number included in the announcement frame is assigned to the group to which the receiver personal station belongs;

an announcement response frame generation unit for generating announcement response frames which carry entry information indicating to joint the multicast communications and a personal station which has transmitted the entry information;

a transmission unit for transmitting the announcement response frames on the control channel; and a reception information judging unit for judging whether a radio frame received on the control channel by the reception unit is an announcement frame which carries reception information which indicates that the entry to the multicast communications has been received.

On receiving an announcement frame that is judged to carry the reception information, the reception determination unit may determine to joint the multicast communications.

The fourteenth object can also be achieved by the above-explained construction. The cell station can let the receiving personal stations which belong to a specific group join the multicast communications, among the receiving personal stations that failed in joining the multicast communications when the simultaneous call was transmitted.

The receiver personal station may further comprise a frame judging unit for judging whether the multicast frame received by the reception unit carries an instruction which indicates switching multicast channels and channel information which indicates a new multicast channel.

The multicast channel setting unit may set the new multicast channel to the receiving state when the multicast frame is judged to carry the instruction which indicates switching multicast channels.

According to the above-explained construction, the receiving personal station can make the cell station to replace the multicast channel with a new multicast channel when the receiving personal station suffers from busy tone interference.

The frame judging unit may further judge whether the multicast frame received by the reception unit carries a direction which indicates to transmit a busy tone which indicates that a channel is being used.

The receiver personal station may further comprise a busy tone setting unit for setting information indicating a busy tone to the response frame generated by the response frame generation unit.

The transmission unit may transmit the response frame which carries the busy tone on the multicast frame.

The tenth object can also be achieved by the above-explained construction. The cell station can secure the multicast channel in a wider range by making the receiving personal station transmit busy tone.

BRIEF DESCRIPTION OF THE DRAWINGS

These and other objects, advantages and features of the invention will become apparent from the following description taken in conjunction with the accompanying drawings which illustrate a specific embodiment of the invention. In the drawings:

FIG. 4A shows an example of a number management table according to the same embodiment;

FIG. 4B shows an example of a group management table according to the same embodiment;

FIG. 9 shows the data composition of the multicast communication signal according to the same embodiment;

FIG. 13 shows the data composition of the communication signal according to the same embodiment;

FIG. 33 is a table showing the data composition of the multicast communication signal and the communication signal in the present embodiment;

FIG. 39 is a sequence chart showing the multicast communication midway termination control sequence by means of an individual call in the present embodiment;

FIG. 41 is a sequence chart showing the busy tone control sequence in the present embodiment;

DESCRIPTION OF THE PREFERRED EMBODIMENTS

First Embodiment

Figure 1:
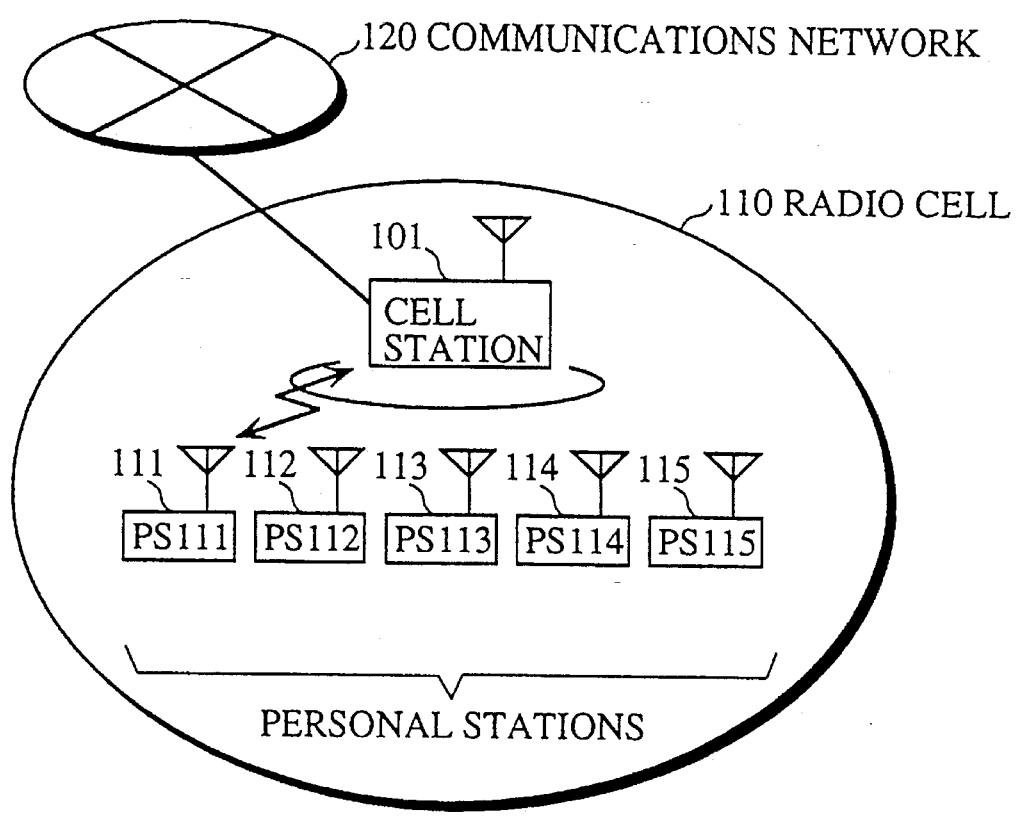
FIG. 1 is a block diagram showing the entire construction of the mobile communication set up according to the first embodiment of the present invention.

FIG. 1 is a block diagram showing the entire construction for mobile communication according to the first embodiment of the present invention.

In this drawing, the cell station 101 is connected via communication lines to the communication network 120. The communications network 120 utilizes a variety of communication networks including telephone networks, ISDN (Integrated Services Digital Networks) and radio networks. In the example shown, 5 personal stations 111 through 115 are positioned within the radio cell 110 of the cell station 101.

Each of the 5 personal stations 111 through 115 are allocated their own personal station identification number (hereafter abbreviated to PSID, PS111 through PS115, respectively, for identification purposes. In this embodiment, communication between the cell station 101 and each of the personal stations 111–115, and communication between the personal stations 111–115 themselves is executed in a digital form using TDMA/TDD techniques. Under TDMA/TDD techniques, radio channels are physically defined as a specified time slot on a frequency (carrier). Radio channels are principally divided in terms of function into control channels and communication channels. Control channels are used for the sending and receiving of control signals such as position registration and outgoing/incoming control signals, while communication channels are principally used for the sending and receiving of information signals such as audio signals and data. The special feature of this embodiment is that it is designed so as to allow multicast communication directly from one personal station to a number of others without transmitting via the cell station.

Figure 2:
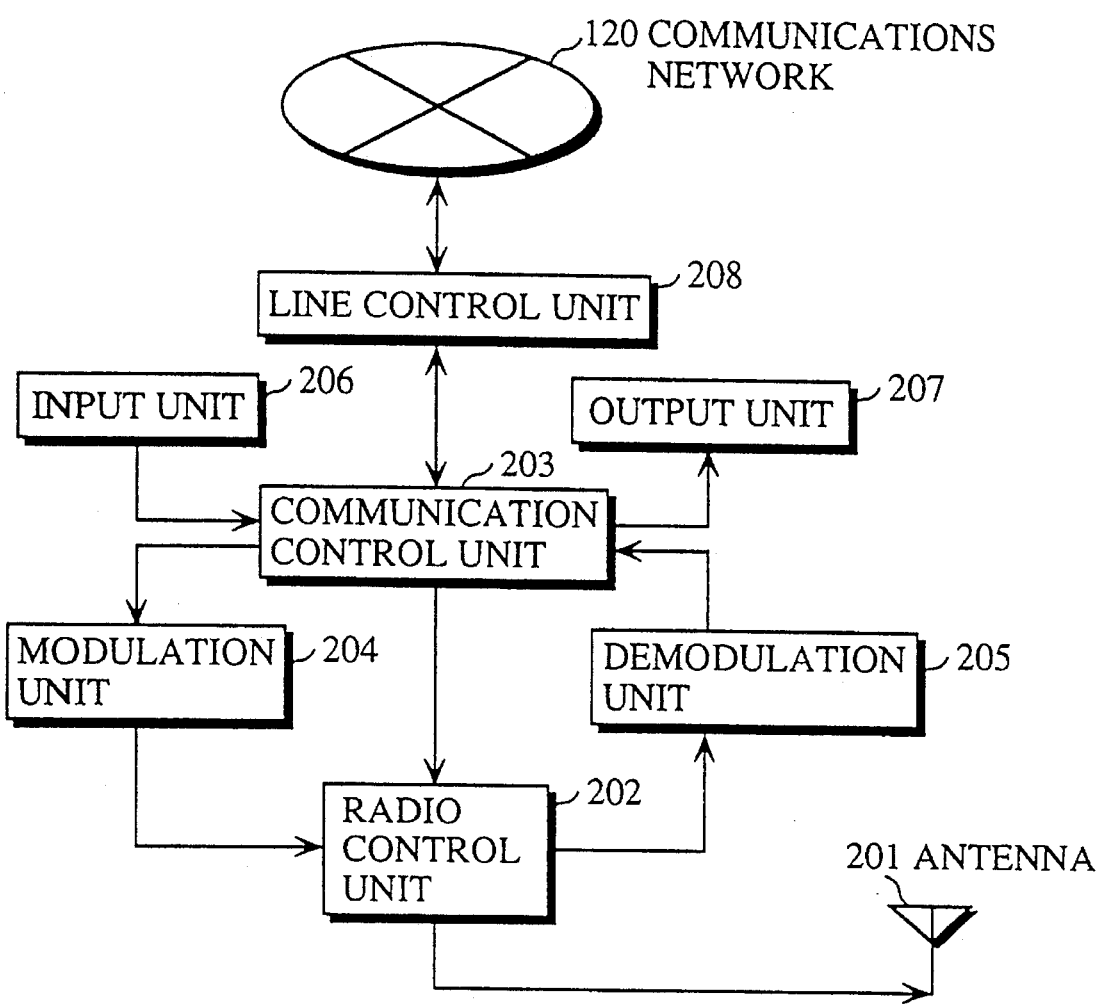
FIG. 2 is a block diagram showing the construction of a cell station according to the same embodiment.

FIG. 2 is a block diagram showing a simplified construction of a cell station 101. In this figure, the cell station 101 can be seen to be composed of an antenna 201, a radio control unit 202, a communication control unit 203, a modulation unit 204, a demodulation unit 205, an input unit 206, an output unit 207, and a line control unit 208.

The radio control unit 202 has the twin junctions of expressing the modulated data received from the modulation unit 204 in a carrier waveform which it transmits via the antenna 201 and of receiving signals within a predetermined frequency range out of the high frequency signals picked up by the antenna 201. On such an occasion, the radio control unit 202 sets the radio channels for TDMA/TDD according to the setting indication received from the communication control unit 203, and, in the same way, switches between transmission mode and reception mode in accordance with the transmission/reception switching indication received from the communication control unit 203.

The communication control unit 203 includes a CPU, ROM, RAM, and suchlike, and controls the communication state of the cell station 101 according to a sequence chart described below.

The modulation unit 204 modulates the transmission data outputted by the communication control unit 203 according to a predetermined formula (for example, π/4 shift QPSK modulation), and outputs to the radio control unit 202.

The demodulation unit 205 demodulates the signal received by the radio control unit 202 and outputs it to the communication control unit 203.

The input unit 206 is composed of a keyboard, a microphone, a scanner, or suchlike, and inputs data, audio, or images into the communication control unit 203.

The output unit 207 is composed of a display, a speaker, a magnetic disc device, or suchlike, and performs the displaying, the audio outputting, the storing, and suchlike of the data outputted from the communication control unit 203.

The line control unit 208 is connected to the communications network 120 and the communication control unit 203 and controls the connection state and switching of the line.

Figure 3:
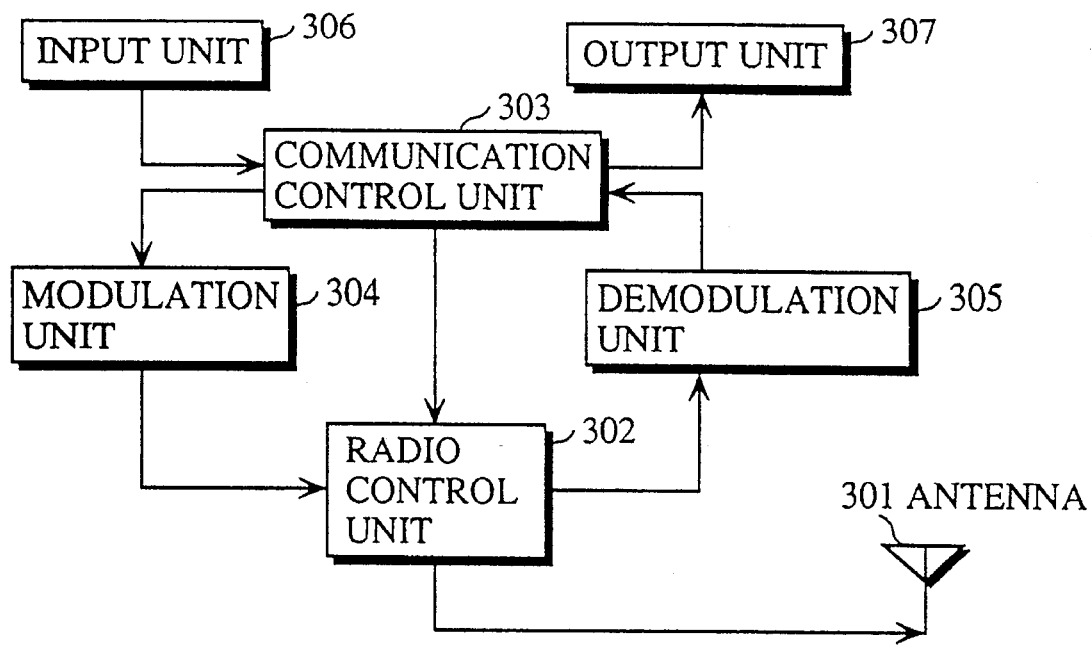
FIG. 3 is a block diagram showing the construction of a personal station according to the same embodiment.

FIG. 3 is a block diagram showing the simplified construction of one of the personal stations 111–115. In this figure, it can be seen the each of the personal stations 111–115 is composed of an antenna 301, a radio control unit 302, a communication control unit 303, a modulation unit 304, a demodulation unit 305, an input unit 306, and an output unit 307.

The radio control unit 302 has the twin functions of expressing the modulated data received from the modulation unit 304 in a carrier waveform which it transmits via the antenna 301 and of receiving signals within a predetermined frequency range out of the high frequency signals picked up by the antenna 301. The radio control unit 302 sets the radio channels for TDMA/TDD according to the setting indication received from the communication control unit 303, and, in the same way, switches between transmission mode and reception mode in accordance with the transmission/reception switching indication received from the communication control unit 303.

The communication control unit 303 includes a CPU, ROM, RAM, and suchlike, and controls every aspect of communication for the cell station according to a sequence chart and a flowchart described below. It is of special note that the communication control unit 303 is equipped with a simultaneous call function and a multicast data transmission function. For this invention, simultaneous call refers to the calling by a personal station to a number of other personal stations simultaneously using communication channels, without transmitting via the cell station, and without using control channels. There are also two kinds of simultaneous calls, with these being on the one hand the simultaneous calling of every other personal station, and on the other hand the simultaneous calling of all the personal stations belong to a specified group. Multicast data transmission refers to the transmission of a data content to a number of other personal stations without passing though the cell station which follows the simultaneous call. The communication control unit 303 stores a number management table for managing the PSIDs of the other personal stations and a group management table for managing the information as to which stations belong to which groups when there is such group division either in ROM or in RAM.

The modulation unit 304 modulates the transmission data outputted by the communication control unit 303 according to a predetermined formula (for example, π/4 shift QPSK modulation), and outputs to the radio control unit 302.

The demodulation unit 305 demodulates the signal received by the radio control unit 302 and outputs it to the communication control unit 303.

The input unit 306 inputs data and audio into the communication control unit 303.

The output unit 307 performs the displaying, the audio outputting, the storing, and suchlike of the data outputted from the communication control unit 303.

FIG. 4A shows an example of the content of the number management table in the communication control unit 303. As shown in the drawing, this table stores call codes corresponded with a respective bit composition. The call codes include a global number, group numbers and PSIDs. The global number is the number used for calling all of the other personal stations, while group numbers are used for calling all of the other personal stations in a specified group, and PSIDs are the numbers used for calling other personal stations separately.

FIG. 4B shows an example of the content of the group management table in the communication control unit 303. As shown in the drawing, this table stores the number of personal stations and the PSIDs for the personal stations in each group.

Figure 5A:
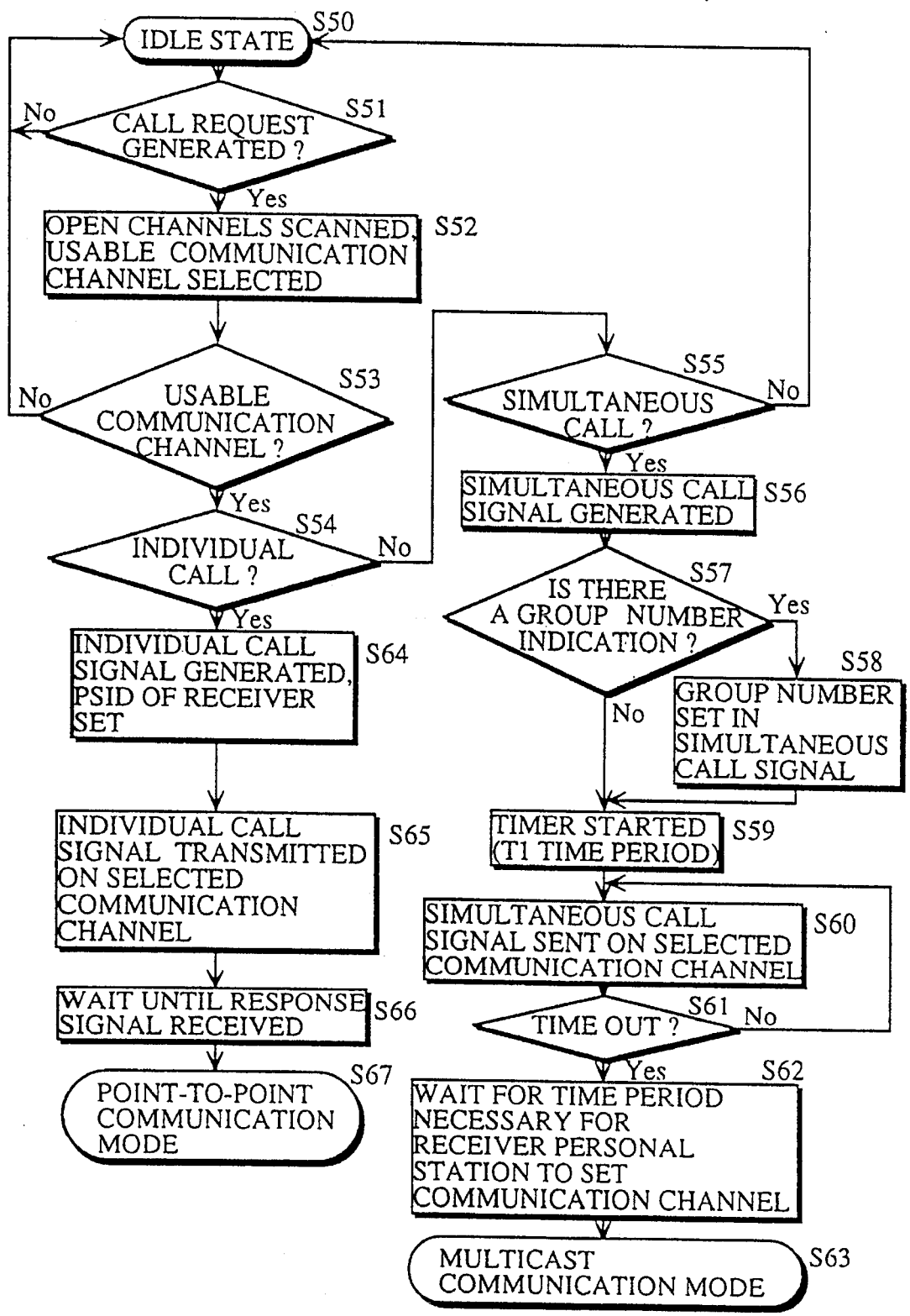
FIG. 5A is a flowchart for a simultaneous call for the caller personal station according to the same embodiment.
Figure 5B:
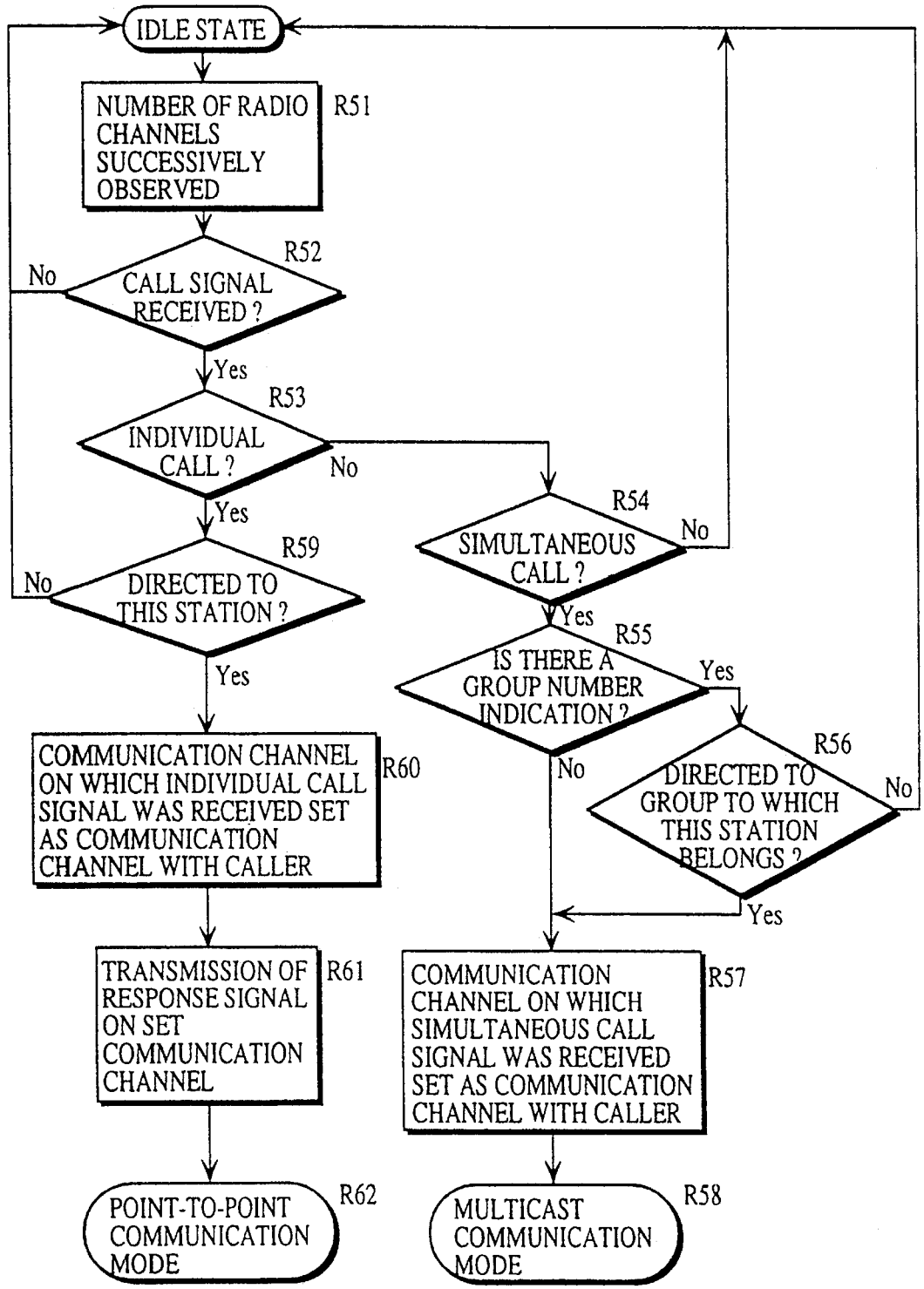
FIG. 5B is a flowchart for a simultaneous call for the receiver personal stations according to the same embodiment.

FIGS. 5A, 5B are flowcharts for the simultaneous call function and the reception of simultaneous call function of the communication control unit 303 in each personal station 111–115. The simultaneous call function and the reception of simultaneous call function may both be provided in the same personal stations, or may be provided separately to only the personal stations for which they are necessary. In this embodiment, personal stations equipped with a simultaneous call function are referred to as caller personal stations while personal stations equipped with a reception of simultaneous call function are referred to as receiver personal stations.

Figure 6:
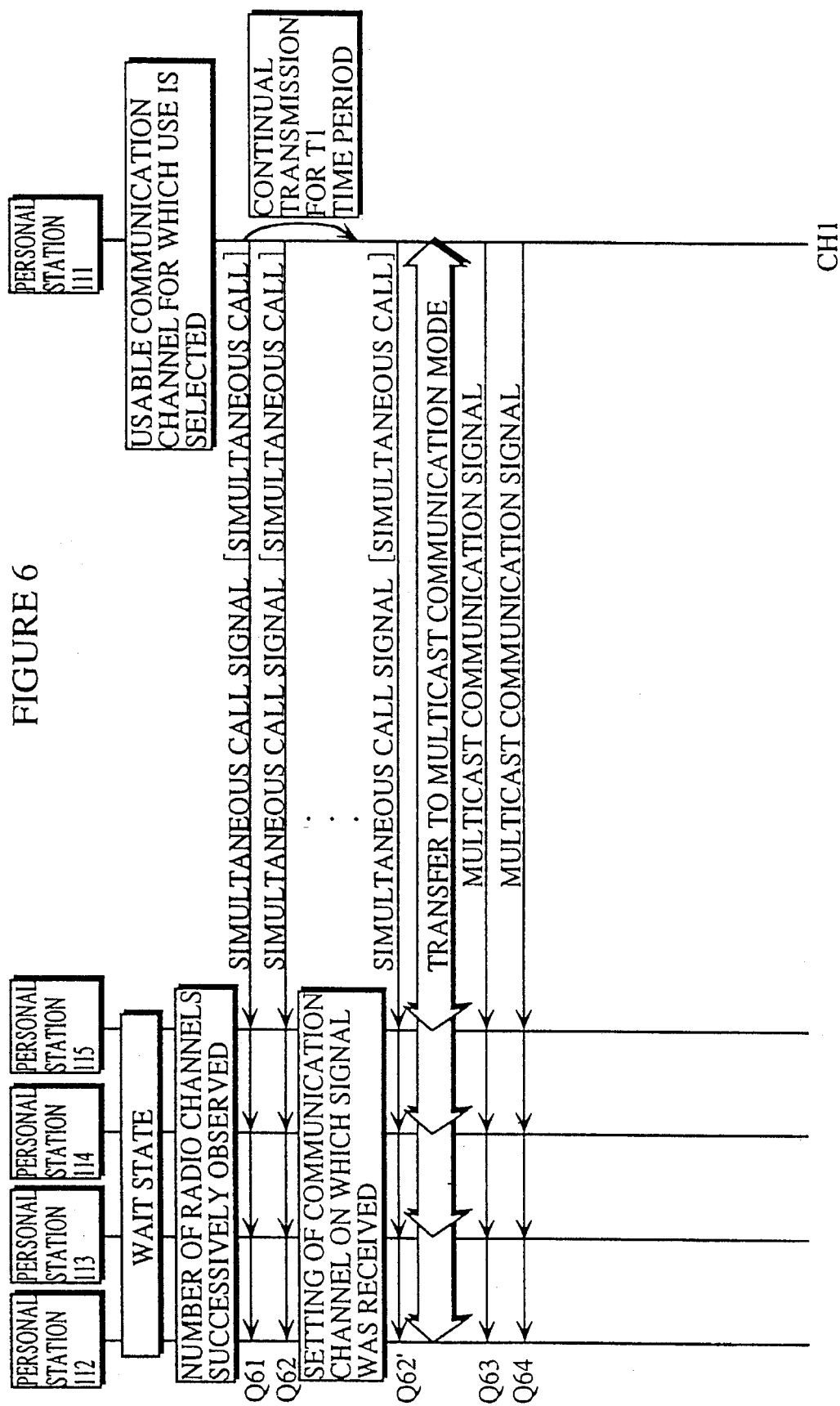
FIG. 6 shows the simultaneous call control sequence according to the same embodiment.

The following is an explanation of the sending and receiving sequence for a simultaneous call and the following multicast communication between a caller personal station and receiver personal stations. This sequence is shown in FIG. 6. As shown in the drawing, in this example, personal station 111 is the caller, while personal stations 112–115 are the receivers. The caller personal station 111 selects a communication channel which is free for use out of a number of channels, before repeatedly transmitting a simultaneous call signal for the duration of a fixed time period T1, thereby establishing multicast communication mode (Q61, Q62 ... Q62'). The personal stations 112–115 which are the receivers observe the number of radio channels in a wait state, and, on receiving a simultaneous call signal from another personal station, set the communication channel on which the simultaneous call signal was received as the multicast communication channel, and switch to multicast communication mode. In multicast communication mode, the personal station 111 transmits multicast communication signals using the appropriate communication channels (Q63, Q64 ... ).

In FIG. 5A, the communication control unit 303 in the caller personal station 111 in an idle state (S50), on receiving a call request (S51:Yes) inputted via a user operation, scans all of the communication channels in order for which communication between the personal stations is possible (on a PHS system, there are 10 carriers of communication channels between personal stations) and, if there is no channel for which the reception electrical field strength is weak (that is, channels not in use), returns to the idle state (S53:No), while if there is a channel not in use, selects this channel as the simultaneous call channel (S52, S53:Yes).

If, after selecting the simultaneous call channels, the user's call request is a simultaneous call request (S54:No, S55:Yes), the communication control unit 303 generates the simultaneous call signal SG1 directed towards all of the other personal stations (S56), while if, at this point, the user performs an operation specifying a group number, a group address will be set in the simultaneous call signal SG1 (S57:Yes, S58).

Figure 7:
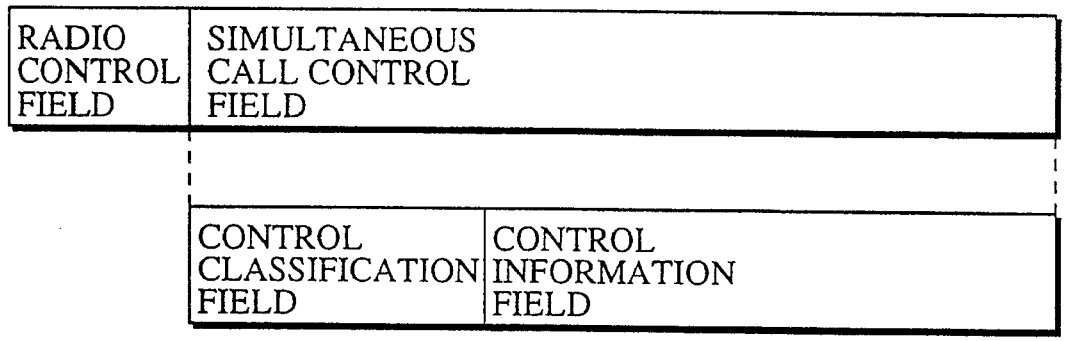
FIG. 7 shows the data composition of the simultaneous reception signal according to the same embodiment.

FIG. 7 shows the format of the simultaneous call signal SG1. As shown in the drawing, the simultaneous call signal SG1 includes a radio control field and a simultaneous call control field. All kinds of radio control information are set in the radio control field, while control classifications and control information which are necessary for the simultaneous call function of the present invention are set in the simultaneous call control field.

Control classifications include "Simultaneous call indication", "Channel setting indication", "Carrier sensing request indication" and suchlike, and are given by the bit patterns shown in the diagram. "Simultaneous call indication (0000 0001B)" shows a simultaneous all to all of the other personal stations or to all of the personal stations in a group indicated in the control information. "Channel setting indication (0000 0010B)" and "Carrier sensing indication (0000 0011B)" are not used by the personal stations in this embodiment.

The call code and the communication channel are set as the control information. The call code shows a global number when the simultaneous call is for all of the other personal stations, and a group number when calling only the personal stations in a specified group. The communication channel is not indicated by the personal stations in this embodiment (See the fourth embodiment onwards).

The simultaneous call signal, for the example of a PHS, is generated in the format of one function channel such as PCH (Paging Channel) or SCCH (Signalling Control Channel) in a physical slot for control use. In such a case, the radio control field equates to a field including a start symbol SS, preamble PR, a unique word UW for signifying that it is a physical slot for control use, a Channel Identifier showing a channel classification of the physical slot for control use, and a cycle redundancy check (CRC). In the same way, the simultaneous call field equates to a CAC field for the physical slot for control use. The global number and the group number equate to receiver identification code fields.

After the simultaneous call frame is generated in steps S56–S58, the communication control unit 303 of the sender activates the timer (soft timer (S59) which generates the time out signal after time T1 has elapsed, and repeatedly transmits the simultaneous call signal on the communication channel selected in S52 until the time out signal is generated (S60, S61:No). This transmission of the simultaneous call signal is repeated for a time period T1 so that it can be received by the other personal stations which permanently scan a number of communication channels. Therefore time T1 is set so as to be sufficiently long for the other personal stations to scan all of the communication channels several times. During this time period, the personal stations which are in a wait state can detect the simultaneous call. For the example of a PHS, when 10 carriers are allocated as communication channels, if it takes 200 Ms to sense 1 carrier, then a time T1 of 2–3 seconds would be probably be sufficient. Also, after the time out signal has been generated, and having waited for sufficient time for the receiver personal stations to set the communication channel (S62), it transfers into multicast communication mode (S63). It should be noted that the process flow for calling an individual in FIG. 5A (S54:Yes, S64–67) shows the normal process for point-to-point communication, but since this is not a characteristic feature of the present invention, it will not be explained.

The following is an explanation of the process for the communication control unit 303 in the receiver personal station corresponding to the process of the caller personal station with reference to FIG. 5B.

As shown in FIG. 5B, when each communication control unit 303 in the receiver personal stations 112–115 is in an idle state, it successively observes the number of communication channels which can be used for communication between personal units (R50, R51, R52:No), and, on receiving a simultaneous call signal SG1 (R52:Yes, R53:No, R54:Yes), returns to an idle state if there is an indication of a group number to which its personal station does not belong (R56:No), while, if there is no indication of a group number in the control information of the simultaneous call signal SG (R55:No) or if there is an indication of a group number to which its personal station belongs (R56:Yes), receives the simultaneous call signal SG1 and sets the channel on which the simultaneous call signal SG1 was received as the communication channel for communication with the personal station 111 (R57).

Figure 8A:
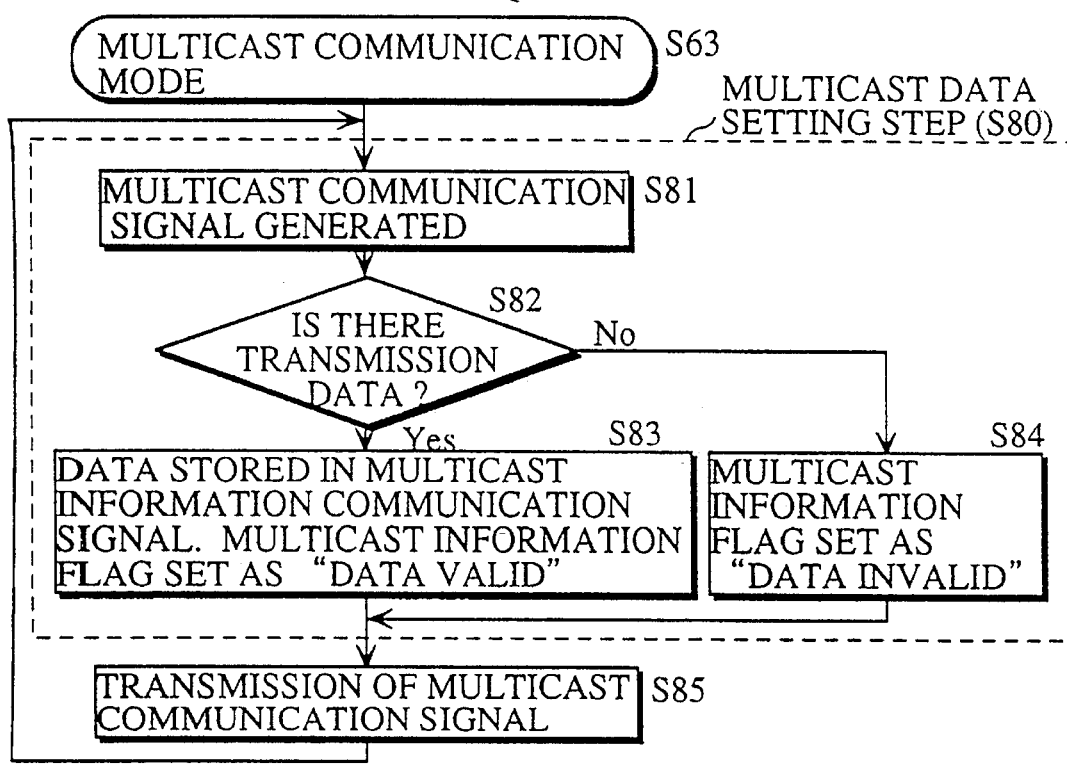
FIG. 8A is a multicast communication flowchart for the caller personal station according to the same embodiment.
Figure 8B:
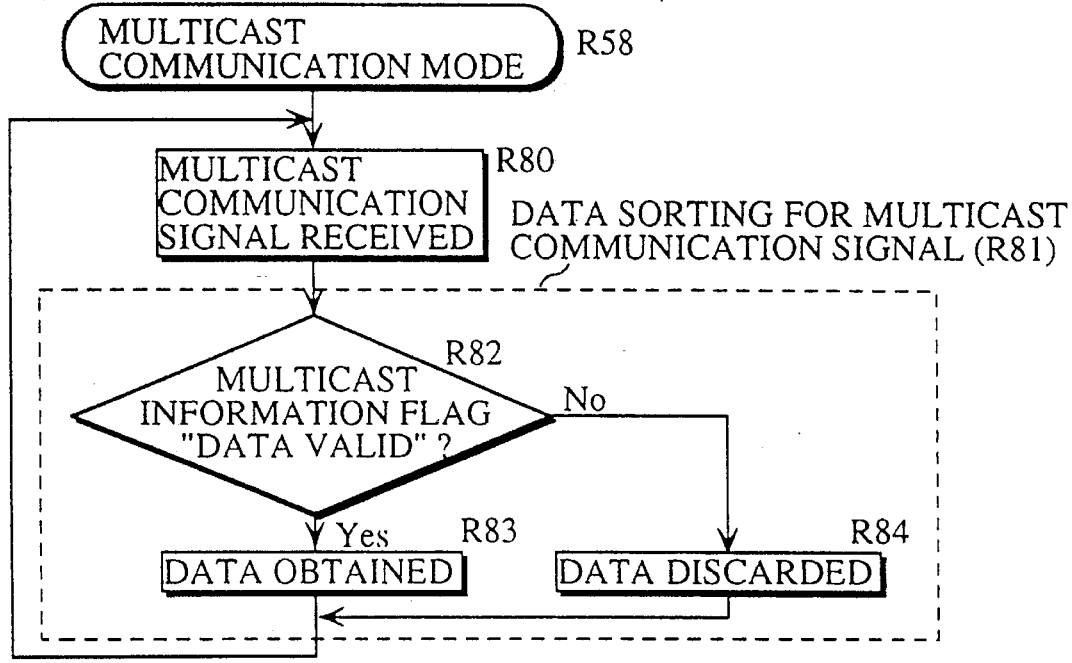
FIG. 8B is a multicast communication flowchart for the receiver personal stations according to the same embodiment.

FIGS. 8A and 8B are flowcharts showing the transmission process of multicast data and the corresponding reception process for the respective communication control units 303. A multicast data transmission function is provided to the caller personal station, while a corresponding reception function is provided to the receiver personal stations.

As shown in FIG. 8A, once the caller personal station 111 has transferred to multicast communication mode (S63) and generated the multicast communication signal at step S81, the communication control unit 303 of the caller personal station 111 repeats the multicast data setting step (S80) and the transmission of the multicast communication signal (S85) cyclically for each transmission cycle. More specifically, it generates the multicast communication signal which has as its content the data which should be transmitted to all of the other personal stations called during the simultaneous call (S81).

FIG. 9 shows an logical example of the format of the multicast communication signal. In this figure, the multicast communication signal is shown to include a radio control field, a multicast communication control field, and a multicast information field. The radio control field is set with all kinds of radio control information, while the multicast communication control field is set with the control classification field, the control information field and the multicast information flag which are necessary for the multicast communication function of the present invention.

The control classification field contains such classifications as "Control information invalid", "Multicast communication disconnection indication", and "Multicast communication disconnection completion", corresponded, as shown in the diagram, with the bit patterns by which they are expressed.

"Control information invalid" (0000 0000B) is for when the control classification is invalid, and shows that only the multicast data is valid for either all of the other personal stations or for all of the personal stations in the group specified in the control information.

"Multicast communication disconnection request (0000 1000B)" shows an indication to disconnect multicast communication to the other personal stations.

"Multicast communication disconnection completion (0000 1001B)" is a notification of the completion of disconnection of multicast communication to the other personal stations. The other classifications shown in this drawing, such as "Polling request", or "Press talk reception" are not used in this embodiment.

PSIDs, group numbers, the communication channel and suchlike are set as information elements in the control information field. The entry "down" which is registered alongside the information elements means that this information element is sent from the caller personal station to the receiver personal stations.

The multicast information flag is the flag which shows whether the content of the multicast information field is valid or invalid. This flag is provided for the reasons described below. When the caller personal station has no data to transmit (for example, when the data is temporarily not readied in time for transmission, or when there is no sound broadcast), then if there is a break in the transmission on the selected channel, then the cell station and other personal stations which are not involved in the multicast communication will mistake this communication channel for a communication channel which is not in use, and will therefore be apt to use this channel. Should this communication channel be used, for example, by the cell station, then there will be interference between the signals and multicast communication will become highly unreliable. In order to avoid such an eventuality, the caller personal station continually transmits a signal on the selected communication channel. When there is no data to be sent, then it is this multicast information flag which shows that the data in the information field is invalid.

The multicast information to be transmitted is registered in the multicast information field.

The multicast communication signal, for the example of a PHS, is generated in the format of one kind of function channel such as USPCH (User Specific Packet Channel) in a physical slot for control use. However, the multicast information control field and the multicast field equate to a CAC field in the physical slots for control use.

Having generated the multicast communication signal at step S81, the communication control unit 303 in the caller personal station repeats the multicast data setting step (S80) and the transmission of the multicast communication signal (S85) cyclically for each transmission cycle.

More specifically, the communication control unit 303 in the caller personal station writes the data to be transmitted into the multicast information field in the multicast information signal, as well as setting the multicast information flag as valid (=1) (S82:Yes, S83) before transmitting the multicast communication signal (S85). If the data to be transmitted has not been readied, then the multicast information flag is set as invalid (=0) (S82:No, S84) before transmitting the multicast communication signal (S85). For a PHS, the timing of this transmission is cyclical for each TDMA frame, and is set for a time slot on the communication channel selected for the simultaneous call.

On the other hand, as shown in FIG. 8B, after switching to multicast communication mode (R58), the communication control unit 303 in the receiver personal station repeats the reception of the multicast communication signal (R80) and the data sorting of the multicast communication signal (R81). More specifically, the communication control unit 303 in the receiver personal station obtains the data (R83) if the multicast information flag is valid (R82: Yes) or discards the data (R84) if the multicast information flag is invalid (R82: No)

The following is a description of the operation for mobile transmission in this first embodiment constructed as described above, with (1.1) being the operation for a simultaneous call by the personal station 111 for all of the personal stations in a specified group, while (1.2) is a description for the transmission operation for valid/invalid data during multicast communication.

Figure 10:
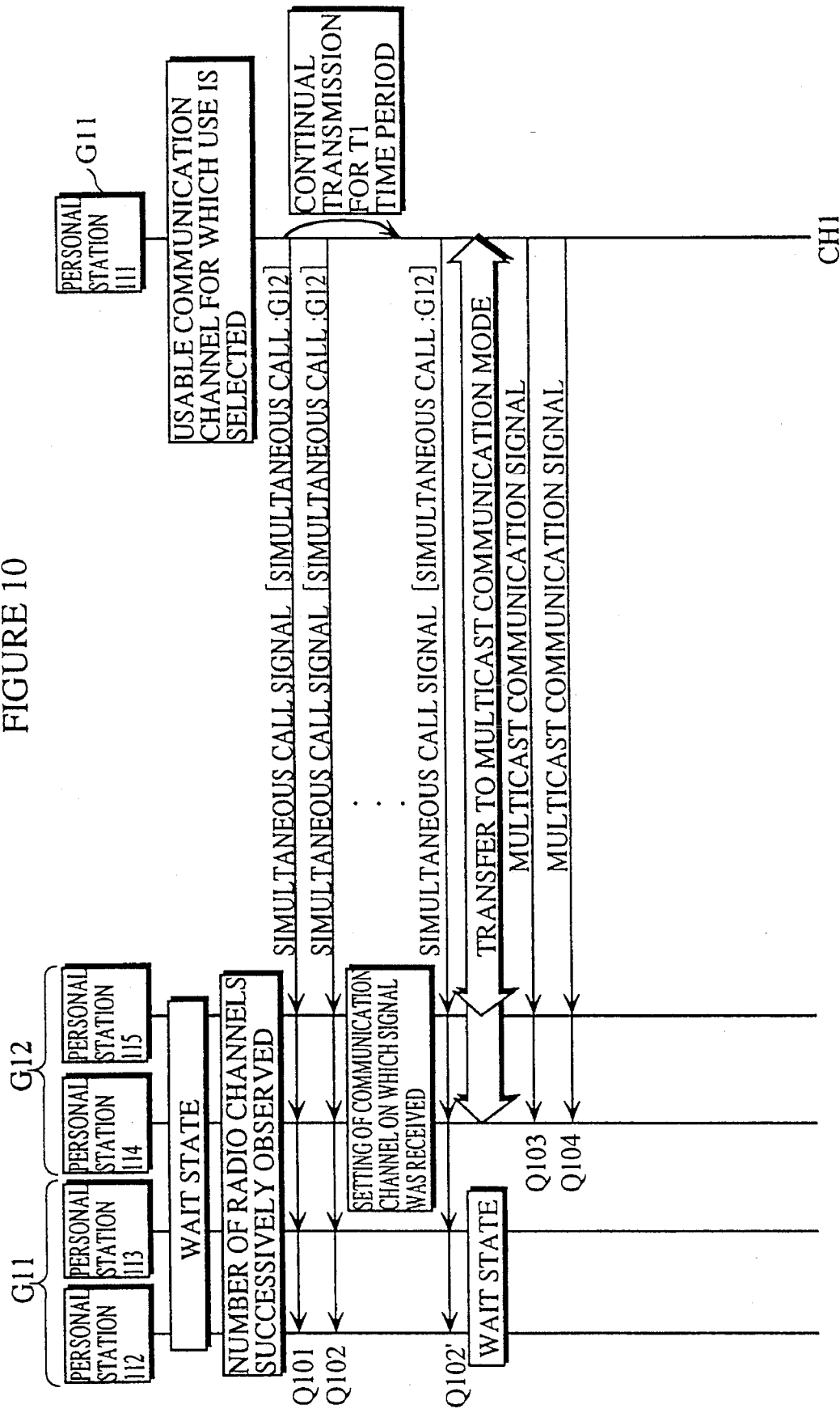
FIG. 10 shows the group indication simultaneous call control sequence according to the same embodiment.

(1.1) FIG. 10 shows the sending and receiving sequence for when there is a simultaneous call from personal station 111 to the group G2 which is made up of personal stations 114 and 115. As shown in this drawing, once the communication control unit 303 in the personal station 111 receives a group number indication and a simultaneous call indication from the user via the input unit 306, and once it has selected a communication channel out of all the communication channels for which communication is possible, then it repeatedly sends the simultaneous call signal for the duration of the time period T1 (Q101, Q102, Q102'). This time, the communication control unit 303 sets, in the simultaneous call signal, "Simultaneous call (0000 0001B)" in the control classification field and "Group Number G12 (1000

0010B)" in the control information field. Having done so, it transfers into multicast communication mode.

Meanwhile, the receiver personal stations 112–115 observe a number of communication channels successively in their wait state, before receiving the simultaneous call signal from the personal station 111 (Q101 ... Q102'). Since personal stations 112 and 113 belong to a group G11 which differs to the group G12 for the simultaneous call, they return to their idle state. Since personal stations 114 and 115 belong to the group G12 for the simultaneous call, then they receive the simultaneous call signal and by setting the communication channel on which the simultaneous call signal was received as the communication channel for multicast communication, switch into multicast communication mode.

From here on, the multicast communication signal from the personal station 111 is not received by the personal stations outside the group G12, and so is only received by the personal stations 114 and 115 belonging the group G12 (Q103, Q104).

By means of the operation described above, it is possible to execute a simultaneous call and multicast transmission to only the personal stations belonging to a specified group.

(1.2) The simultaneous call sequence shown in FIG. 6 shows how the personal stations 112–115 switch to multicast communication mode according to the simultaneous call signal from the personal station 111. Following on in this mode, the multicast communication sequence is shown in FIG. 11.

Figure 11:
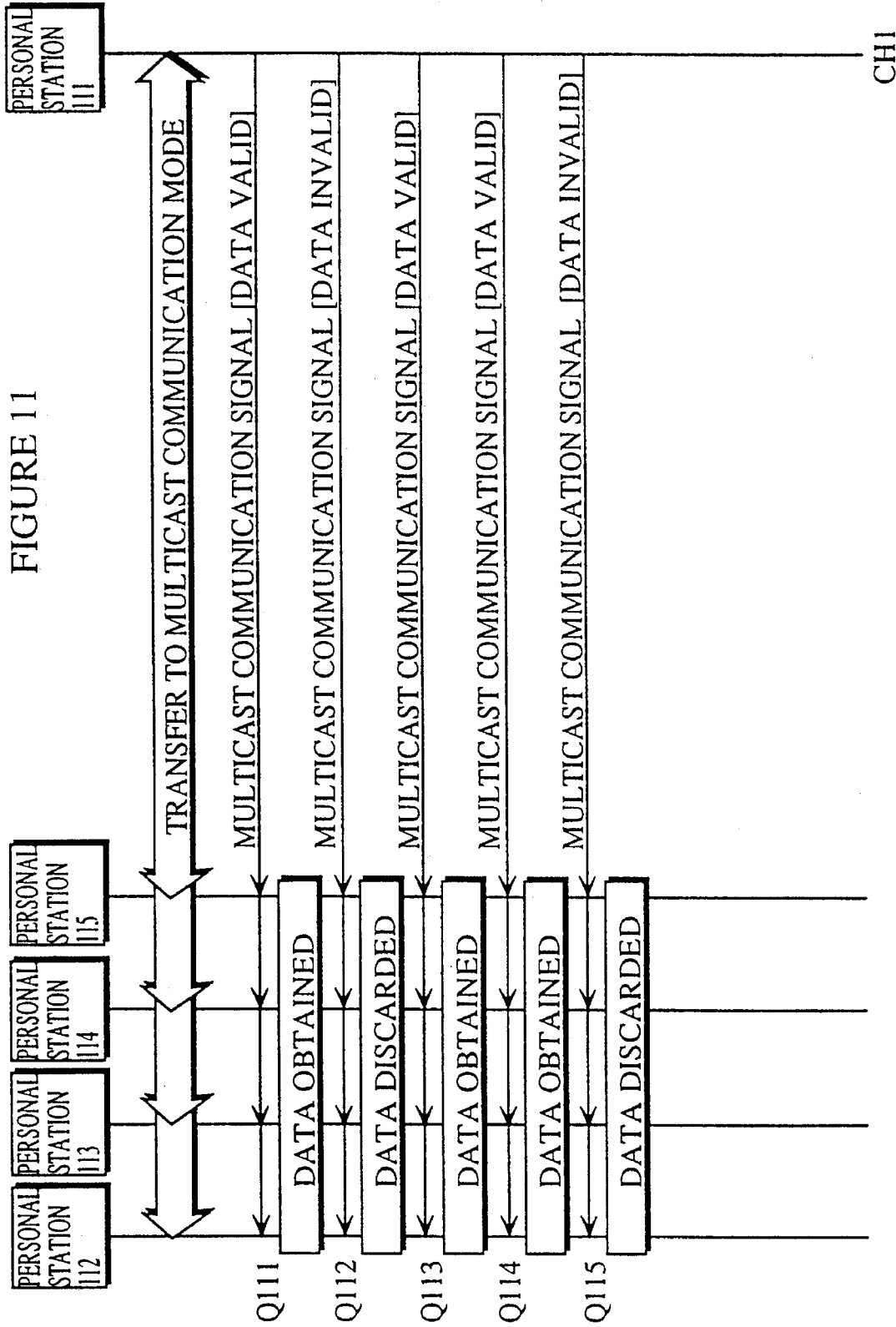
FIG. 11 shows the multicast data valid/invalid indication control sequence according to the same embodiment.

In FIG. 11, the caller personal station 111 sets the multicast information flag in the multicast communication signal as valid (=1) when there is data to be sent, as well as writing the data to be sent into the multicast information field and sending the multicast communication signal (Q111, Q113, Q114), while, when the data to be sent is not ready, the caller personal station 111 sets the multicast information flag in the multicast communication signal as invalid (=0) and sends the multicast communication signal (Q112, Q115).

On the receivers' side, the receiver personal stations 112–115 obtain the data in the multicast information field if the multicast information flag in the multicast communication signal is valid (=1) (Q111, Q113, Q114), while, if the multicast communication signal is valid (=0), discards the data (Q112, Q115).

By means of the operation described above, since the multicast communication signal is sent continuously from the personal station 111, interference from other personal stations which are not involved in the present communication can be avoided and a high degree of reliability can be maintained for multicast communication.

Second Embodiment

The construction for mobile communication in the second embodiment is principally the same as that of the first embodiment which was shown in the block diagrams in FIGS. 1 through 3, and in the tables shown in FIGS. 4A and 4B. Construction elements which are the same will not be explained, and instead the following description will focus on the differences with the first embodiment.

The main difference is that a two-way communication function has been added to the communication control unit 303 in the personal stations whose construction was shown in FIG. 3. More specifically, after the input unit 306 has received the input of a simultaneous call indication as well as a polling indication by means of a user operation, the communication control unit 303 successively gives in order to each receiver personal station during multicast communication the right to transmit data thereby encouraging the receiver personal station to transmit data (hereafter, called polling control). Additionally, each communication control unit 303 in the receiver personal stations can transmit data to the caller personal station when given the right to transmit data.

FIG. 13 shows a logical format for the multicast communication signal and the communication signal in the present embodiment. Here the multicast communication signal is used for point-to-multipoint communication from the caller personal station to the receiver personal stations, with the communication signal being used as the point-to-point communication signal from one of the receiver personal stations to the caller personal station. These multicast communication signals and communication signals are in the same format as that shown in FIG. 9, with the only difference being in radio classification field for which the unique is different for the up direction and for the down direction (for the case of a PHS), in the control classification field and in the control information field.

The aforementioned communication signal is generated for the example of a PHS as a physical slot for communication use such as a TCH (Traffic Channel), a FACCH (Fast Associated Control Channel), or a USPCH (User Specific Packet Channel), or alternatively, as a physical slot for control use such as a SCCH (Signalling Control Channel) or a USCCH (User Specific Control Channel).

"Control information invalid (0000 0000B)" shows that the control classification is invalid, and shows that only the multicast data is valid for either all of the other personal stations or for all of the personal stations in the group specified by the control information.

"Polling request (0000 0001B)" is used in the down direction (that is, from the caller personal station to the receiver personal station), and refers to the granting of a right of transmission in the up (that is, from the receiver personal station to the caller personal station) direction in the same time slot.

"Polling response (0000 0001B)" is used in the up direction and shows that there is data transmission from the receiver personal station which is granted the right of transmission to the caller station.

"Press talk request (0000 0010B)" is used in the up direction and refers to a request by a receiver personal station for multicast communication by having the data in the information field which it sends to the caller personal station sent on by the caller personal station to all of the other personal stations. On being granted the right of transmission, the receiver personal station can, instead of giving a polling response, make a request for press talk. On receiving a request for press talk, the caller personal station temporarily halts polling control.

"Press talk (0000 0010b)", "Cancel press talk (0000 0011B)", "Point-to-point communication request (0000 0100B)", "Point-to-point communication reception (0000 0101B)", "Carrier sensing request (0000 0101B)", "Channel setting response (0000 0110B)", "Channel switching request (0000 0111B)", "Busy tone (0000 1000B)", "Multicast communication participation request (0000 1001B)", and "Multicast communication information (0000 1010B)" are not used in the present embodiment.

"Communication disconnection request (0000 1011B)" shows a disconnection indication for multicast communication for the receiver personal station.

"Communication disconnection indication (0000 1100B)" shows a termination indication for multicast communication for the receiver personal station.

"Multicast communication disconnection completion (0000 1101B)" shows that the disconnection of multicast communication for the receiver personal station has been completed.

"Call request (0000 1110B)" is not used in this embodiment.

"Reception response (0000 1111B)" is not used in this embodiment.

Also, information elements such as "PSID", "Group number", "Communication channel", "Carrier sensing result", "Channel setting result", and "Multicast communication participation acceptance result" are set as so as to supplement the control classification field.

The "PSID" shows, when set along with a down direction polling request, which personal station was granted the right of data transmission, and, when set along with a down direction point-to-point communication reception, shows the specified receiver personal station which should switch to point-to-point communication. When set along in the up direction along with a polling response, a press talk request, or a point-to point request, it shows the receiver personal station which is transmitting.

The "Group number" shows a request for multicast communication for a specified group when set along with a press talk request, while, when set along with a press talk reception shows multicast transmission for the specified group.

"Communication channel", "Carrier sensing result", "Channel setting result" and "Multicast communication participation acceptance result" are not used in this embodiment.

Figure 12A:
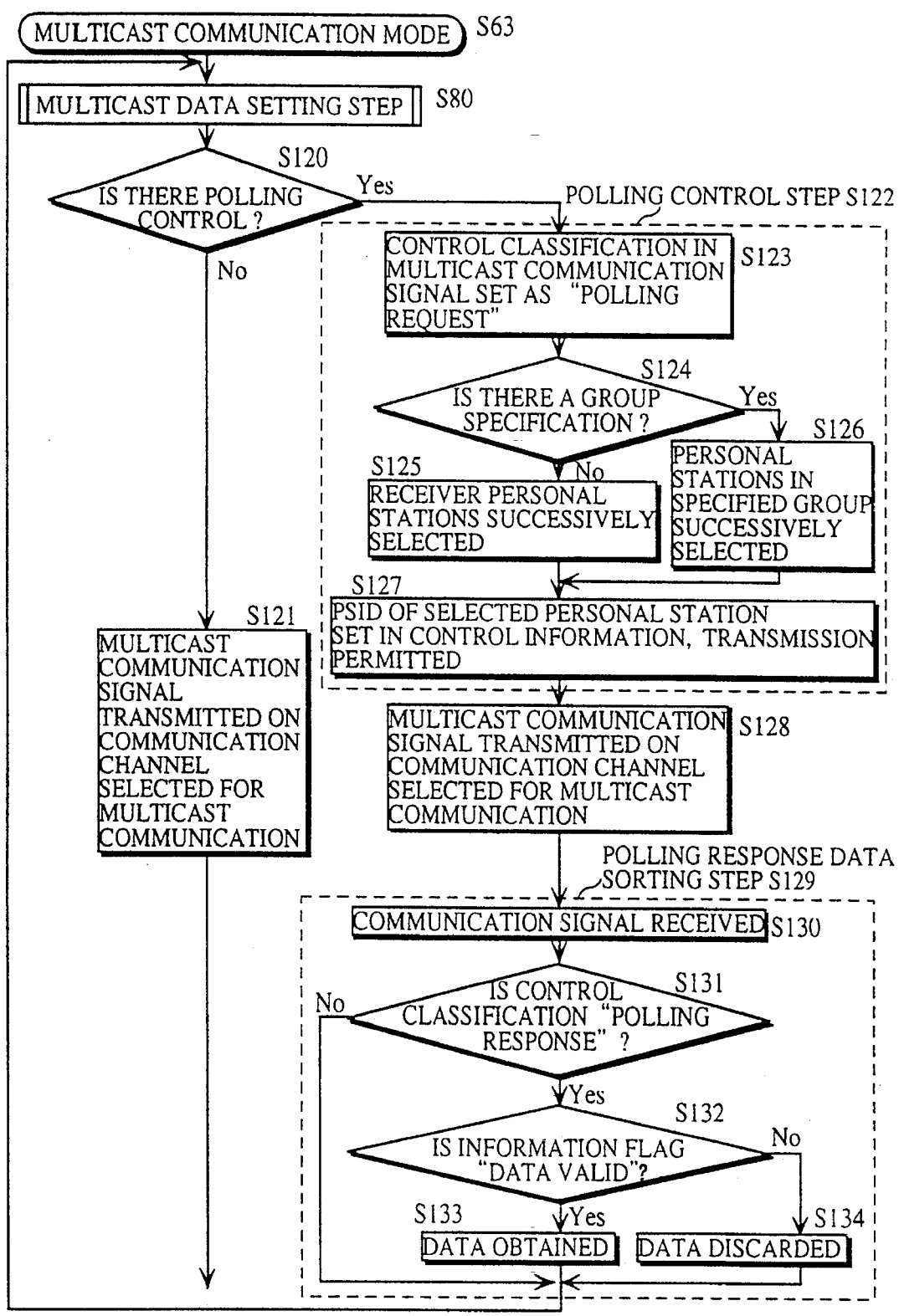
FIG. 12A is a multicast communication/polling control flowchart for the caller personal station according to the same embodiment.
Figure 12B:
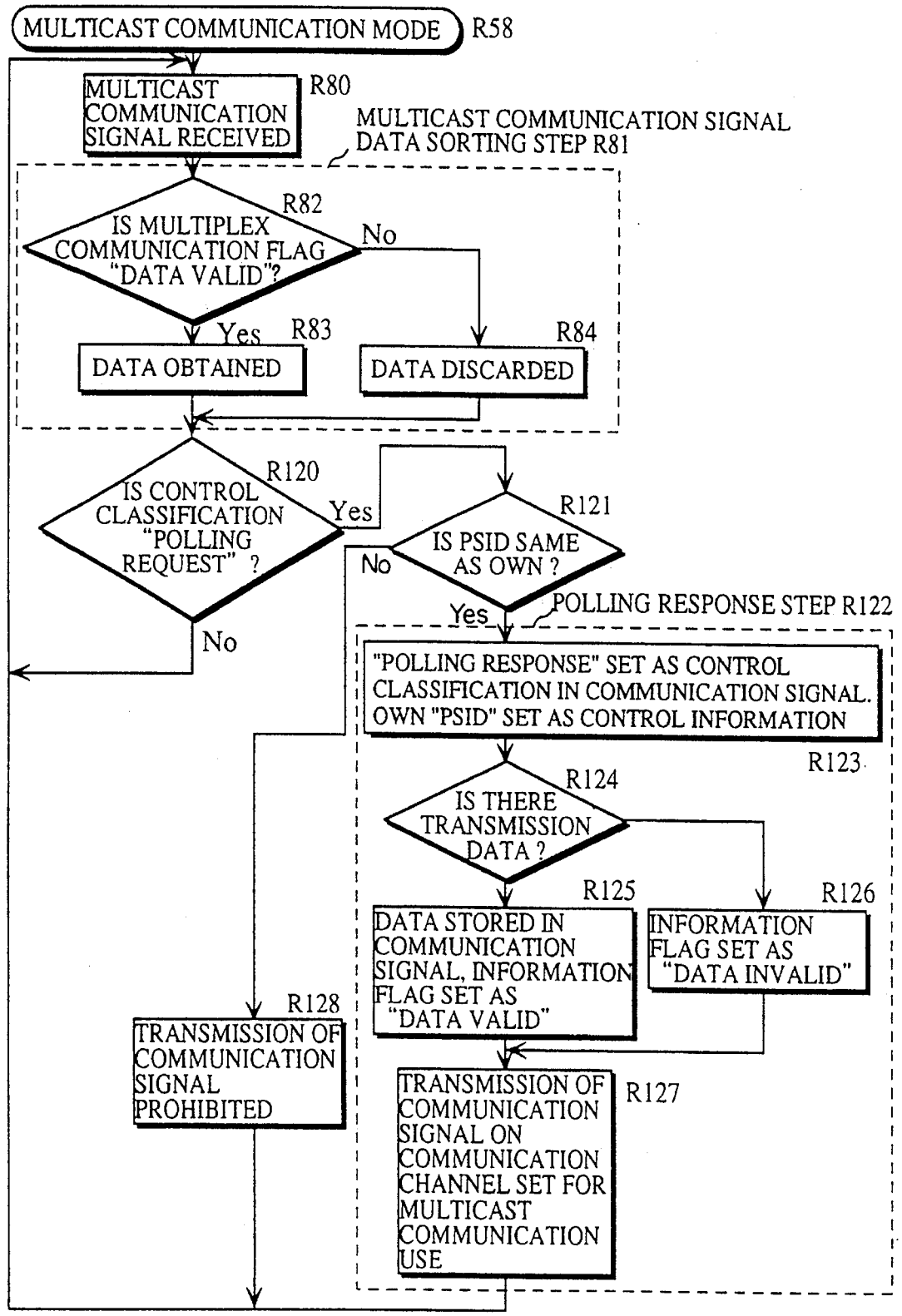
FIG. 12B is a multicast communication/polling control flowchart for the receiver personal stations according to the same embodiment.

FIGS. 12A and 12B are flowcharts showing the multicast data transmission process, and the corresponding reception process according to the polling control by the respective communication control units 303. A multicast data transmission function is provided to the caller personal station, while a corresponding multicast data reception function is provided to the receiver personal station. It should be noted that steps in the flowcharts which involve the same processes as those in the first embodiment have been given the same reference numerals with no further explanation being given.

In FIG. 12A, once the caller personal station 111 has switched into multicast communication mode after a simultaneous call (S63), it generates the multicast communication signal which has as its content the data which is to be sent to the other personal stations which were contacted by the simultaneous call (S80, then, if there is no polling request indicated by the operation by the user, the caller personal station 111 sends the multicast communication signal on the communication channel set for multicast communication use (S120:No, S121), while if there is a polling request, the caller personal station 111 sends the multicast communication signal with an addition setting for polling control (S120:Yes, S128), before immediately performing the sorting of polling response data (S129). More specifically, when polling control is specified, "Polling request (0000 0001B)" is set in the control classification field of the multicast communication signal (S123), and, if there is no group number indication by the user, one personal station out of all of the receiver personal stations is selected (S124:No, S125), or, if there is a group number indication one of the receiver personal stations in the group is selected (S124:Yes, S126), with in either case the PSID of the selected personal station then being set in the control information field (S127). When there is no group indication, this PSID in the control information field is set successively for each time a PSID in the number management table shown in FIG. 4A is issued by the communication control unit 303. When there is a group indication, this PSID in the control information field is set successively for each time a PSID in the specified group in the group management table shown in FIG. 4B is issued by the communication control unit 303.

Also, after transmitting the multicast communication signal, the communication signal from the receiver personal station which is being polled is received (S130, and, if the control classification field is not "Polling response (0000 0001B)", the process returns to S80 (S131:No), while if the control classification field is "Polling response (0000 0001B)", and the information flag is valid (=1), then the data is obtained (S132:Yes, S133), while if the information flag is invalid (=0), then the data is discarded (S132:No, S134). The multicast transmission process performed in accordance with the polling control described above is repeated cyclically for every TDMA frame.

On the other hand, in FIG. 12B the communication control unit 303 for the receiver personal station first sorts the data received in the multicast communication signal (R81), and, if the control field is "Polling request (0000 0001B)" and the PSID in the control information field is the same as the personal station to which the communication control unit 303 belongs (R120:Yes, R121:Yes), then it sets "Polling response (0000 0001B)" into the control classification field in the communication signal, and the PSID of its own personal station in the control information field (R123). If there is data to be transmitted, then the data is set in the information field and the information flag is set as valid (=1) (R:124:Yes, R125), or, if there is no data to be transmitted, the multicast information flag is set as invalid (=0) (R:124:No, R126), before the communication signal is transmitted ion the communication channel used for multicast communication (R127). Also, when there is no polling request in the control field of the received multicast communication signal, or, despite there being a polling request, should the PSID in the control information field not be for the personal station in question, then since this personal station does not have right of transmission it does not perform data transmission and instead returns to R80. The reception process performed in accordance with the polling control described above is repeated cyclically for every TDMA frame.

The following is a description of the operation for mobile transmission in this second embodiment constructed as described above, with (2.1) being the operation for multicast communication according to polling control, while (2.2) is a description for the transmission operation for multicast communication towards a specified group according to polling control.

Figure 14:
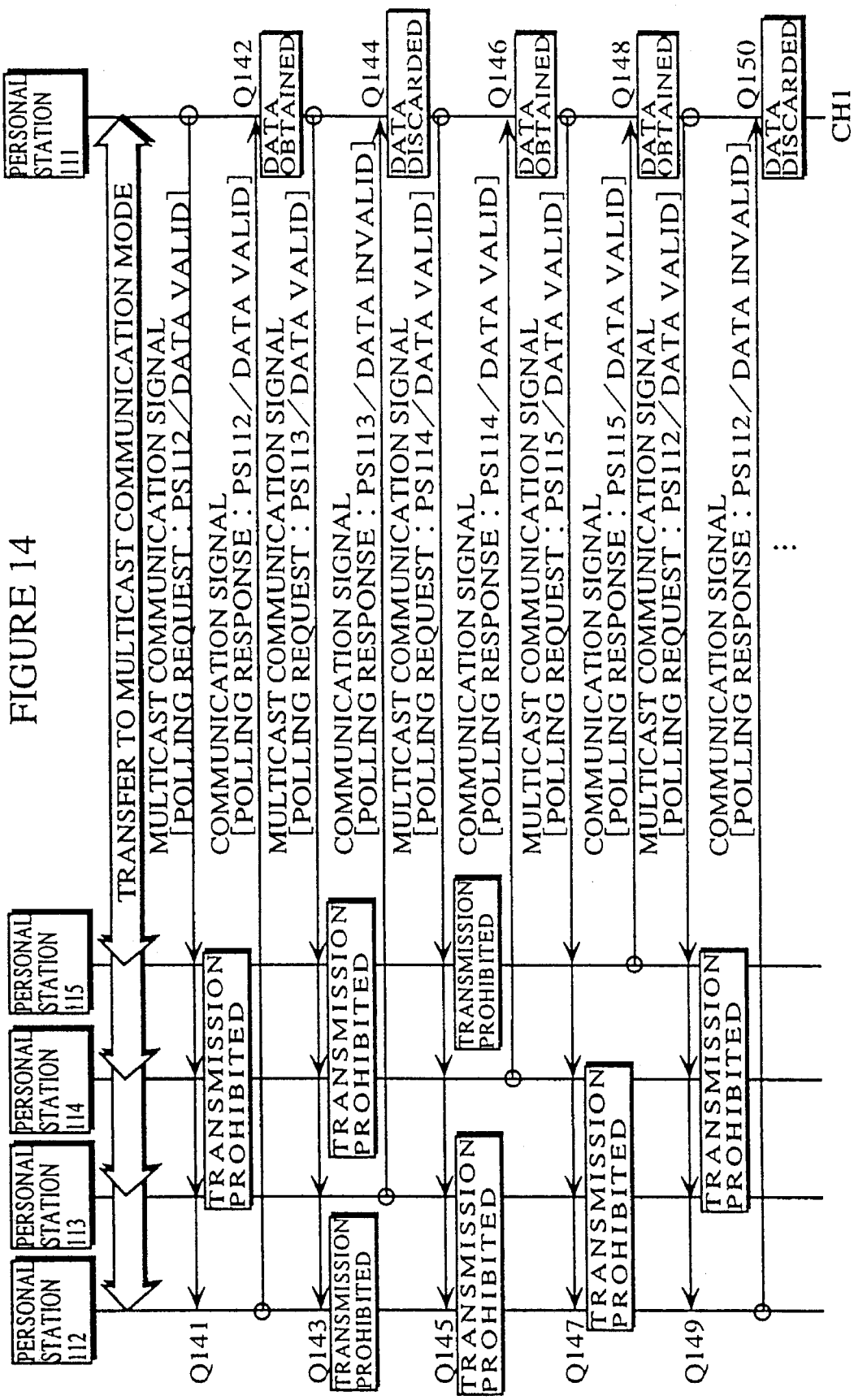
FIG. 14 is a drawing showing the polling control sequence for multicast communication mode according to the same embodiment.

(2.1) FIG. 14 is a sequence chart for multicast communication according to polling control. This sequence follows the simultaneous call sequence shown in FIG. 6, so that the receiver personal stations 112–115 have switched to multicast communication mode in accordance with the simultaneous call from the caller personal station 111. Here, multicast communication between the caller personal station 111 and the receiver personal stations 112–115 is executed using the communication channel CH1. FIG. 14 shows the communication sequence in this state.

The caller personal station 111, once given an indication for a polling operation by means of a user operation, sets the polling request information in the multicast information field of the multicast communication signal SG2, and by transmitting this to the personal stations 112–115, grants transmission permission to the personal stations 112–115 one at a time. More specifically, "Polling request" is set as in the control classification in the multicast control field as the polling request information and the "PSID" of the personal station which is being polled is set in the control information field. This PSID in the control information field is set one PSID at time successively out of the number control table shown in FIG. 4A by the communication control unit 303 every time a polling request is issued.

First, the personal station 111, in order to grant transmission permission to the personal station 112, sets "Polling request" as the control classification in the multicast control field of the multicast communication signal, and "PS112" as the control information, before transmitting to the personal stations 112–115 (Q141). Out of all the personal stations 112–115 which receive the multicast communication signal, only the personal station 112 which is being polled is permitted to transmit. The personal station 112 sets "Polling response" as the control classification and sets its own PSID as the control information before transmitting the communication signal to the personal station 111 (Q142).

The personal station 111, by using a polling request which indicates a PSID in the control information field, successively performs communication with the personal stations 113–115 in the same way as described above (Q143, Q144, Q145, Q146, Q147, Q148, Q148, Q149, and Q150).

In this way, when the caller personal station 111 executes polling control, only the personal station out of the receiver personal stations 112–115 which is granted the right of transmission is able to transmit a communication signal to the personal station 111. In this way, two-way communication is possible during multicast communication using only one communication channel.

Figure 15:
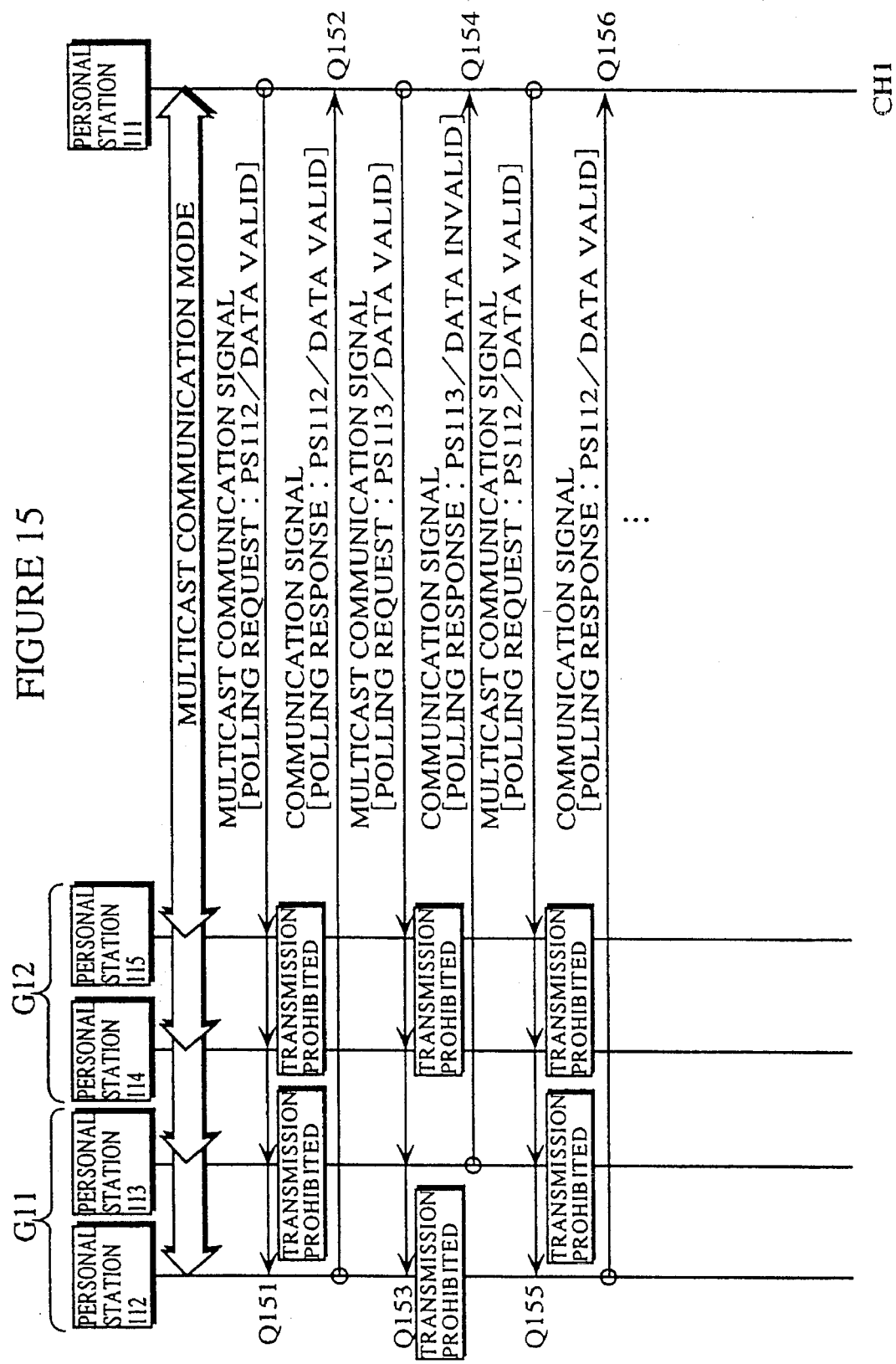
FIG. 15 is a drawing showing the specified group polling control sequence for multicast communication mode according to the same embodiment.

(2.2) FIG. 15 is a sequence chart for the multicast communication to a specified group according to polling control. This sequence differs from that shown in FIG. 14 in that polling is only executed for the personal stations 112 and 113 in the specified group G11, so that the personal stations in the group G12 are not polled. This is because when the caller personal station 111 issues a polling request then the PSIDs in group G11 shown in FIG. 4B are successively set in the control information field by the communication control unit 303 (Q151, Q153, Q155). By doing so, personal stations 112 and 113 in group G11 are successively granted the right of data transmission, and so can send a communication signal to the caller personal station 111 (Q152, Q154, Q156).

In this way, when the caller personal station 111 executes polling control for a specified group, only the personal stations in the specified group are granted the right of transmission to transmit the communication signal to the personal station 111. In this way, two-way communication is possible during multicast communication using only one communication channel.

Third Embodiment

The construction for mobile communication in the third embodiment is principally the same as that of the second embodiment, except that the communication control unit 303 shown in FIG. 3 is equipped with a press talk function and a point-to-point communication transfer function. The press talk function refers to the function whereby the caller personal station can receive data back from one of the receiver personal stations and multicast transmit it to all of the receiver personal stations. In this way, a receiver personal station an be connected to all of the other personal stations and perform multicast communication with them. Point-to-point communication transfer function refers to the function whereby the caller personal station can transfer from multicast communication mode to communicating with only a specified receiver personal station.

Construction elements which are the same as the second embodiment will not be explained, and instead the following description will focus on the differences.

The logical format of the multicast communication signal is the same in this embodiment as that shown in FIG. 13, except some parts of the content of the "Control classification field" and the "Control information field" which were not used in the second embodiment are used in the third embodiment.

In the control classification field in the same drawing, "Polling request (0000 0001B)", "Polling response (0000 0001B)", "Communication disconnection request (0000 1011B)", "Communication disconnection indication (0000 1100B)" and "Communication disconnection completion (0000 1101B)", in the same way as the second embodiment, are not used in this embodiment and so have not been explained.

"Press talk request (0000 0010B)" is used in the up direction and refers to a request for multicast communication by a receiver personal station of the data in the information field transmitted along with the request to all of the other receiver personal stations via the caller personal station. Each receiver personal station can make a press talk request instead of a polling response at the point when it is granted the right of transmission. On receiving a press talk request, the caller personal station temporarily suspends polling control.

"Press talk reception (0000 0010B)" is used in the down direction and refers to the multicast transmission by the caller personal station which received the press talk request of the data received from the receiver personal station which issued the press talk request.

"Cancel press talk (0000 0011B)" is used in the up direction and refers to an indication by the receiver personal station which issued thee press talk request to the caller personal station to cancel the press talk mode. The caller personal station which issued the cancel press talk request then resumes the polling control which was temporarily suspended.

"Point-to-point communication request (0000 0100B)" is used in the up direction and refers to a request from a receiver personal station to the caller personal station to terminate multicast communication and transfer to point-to-point communication.

"Point-to-point communication reception (0000 0100B)" is used in the down direction and refers to an indication from a caller personal station for a transfer into point-to-point communication by a receiver personal station.

"Carrier sensing request (0000 0101B)", "Channel setting response (0000 0110B)", "Channel switching request (0000 0111B)", "Busy tone (0000 1000B)", "Multicast communication participation (0000 1001B)", "Multicast communication information (0000 1010B)", "Call request (0000 1110B)", and "Reception response (0000 1111B)" are not used on this embodiment.

In the same way, "PSID", "Group number", "Communication channel", "Carrier sensing result", "Channel setting result", "Multicast communication continuation information", "Multicast communication participation acceptance result" and so on are set as supplementary to the control classification field.

"PSID", when set along with a polling request in the down direction, shows which receiver personal station is to be granted right of transmission, while when set along with a point-to-point communication reception in the down direction, shows which receiver personal station should transfer to point-to-point communication, while, when set along with polling response, press talk request, point-to-point communication request and so on in the up direction, indicates the receiver personal station which is currently transmitting.

"Group number", when set along with a press talk request shows a request for multicast transmission to the specified group, while when set along with a press talk reception shows multicast transmission for the specified group is being performed.

"Communication channel", "Carrier sensing result", "Channel setting result", "Multicast communication continuation information", and "Multicast communication participation acceptance result" are not used in this embodiment.

FIGS. 16A, 16B, 16C, and 16D are flowcharts which respectively show the multicast communication process for caller personal station for press talk and point-to-point communication transfer, the press talk reception process by the receiver personal station for when it made the press talk request and when it did not make the press talk request, the point-to-point communication transfer process for the receiver personal station, and the point-to-point communication request process for the receiver personal station. Steps which are the same as those in the first and second embodiments have been given the same reference numerals and have not been explained.

Press Talk Reception Process for the Caller Personal Station

Figure 16A:
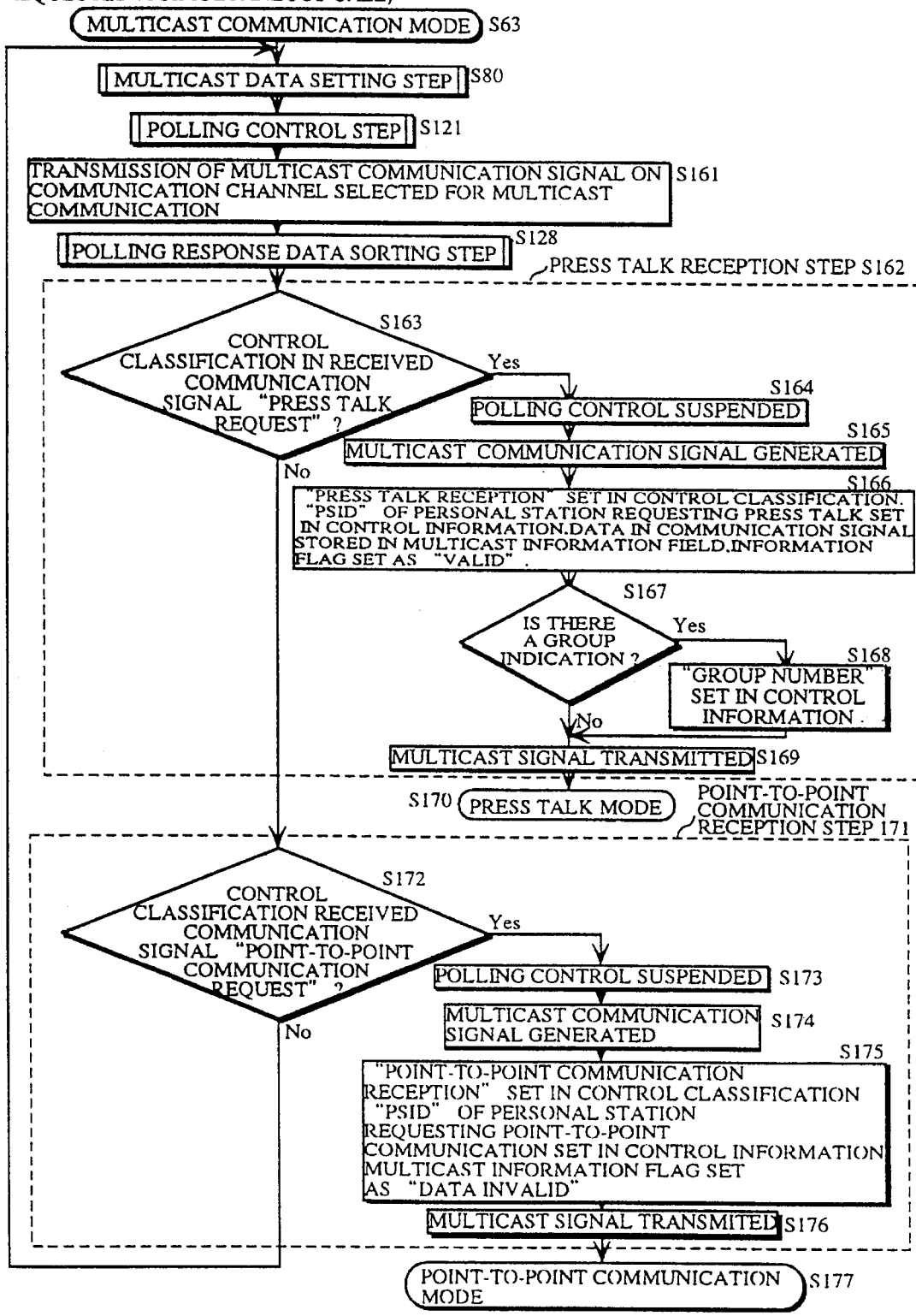
FIG. 16A is a flowchart for press talk reception/point-to-point communication reception for a caller personal station under the third embodiment.

As shown in FIG. 16A, after transferring to multicast communication mode (S63), the communication control unit 303 in the caller personal station 111 generates the multicast communication signal with as its content the data which is to be transmitted to the other personal stations which were called during the simultaneous call (S80), before executing the polling process and receiving the communication signal from the receiver personal station which is being polled (S121, S161, S128). The communication control unit 303 suspends polling control if "Press talk request (0000 0010B)" is set in the control classification field in the received communication signal (S163:Yes), and generates the multicast communication signal (S164, S165). In generating the multicast communication signal, the communication control unit 303 sets "Press talk reception (0000 0010B)" in the control classification field, the PSID of the personal station which requested press talk in the control information field, and the data in the received communication signal in the multicast information field (S166). Additionally, if there is a group number set in the information field of the received communication signal, the communication control unit 303 sets the appropriate group number in the control information filed of the generated multicast communication signal (S167:Yes, S168). This multicast communication signal is then multicast transmitted on the channel used for multicast communication use (S169), and from here on it transfers into press talk mode (S170).

Point-to-point Communication Reception Process for the Caller Personal Station When "Point-to-point communication request (0000 0100B)" is set in the control classification filed in the received communication signal (S172:Yes), the communication control unit 303, suspends polling control and generates the multicast communication signal (S173, S174). Also, the communication control unit 303, in generating the multicast communication signal, sets "Point-to-point communication reception (0000 0100B)" in the control classification field, the PSID of the personal station requesting point-to-point communication in the control information field, and the multicast information flag as invalid (S175). This multicast communication signal is then multicast transmitted on the communication channel for multicast communication use (S176) and point-to-point communication mode is then assumed (S177).

Figure 16B:
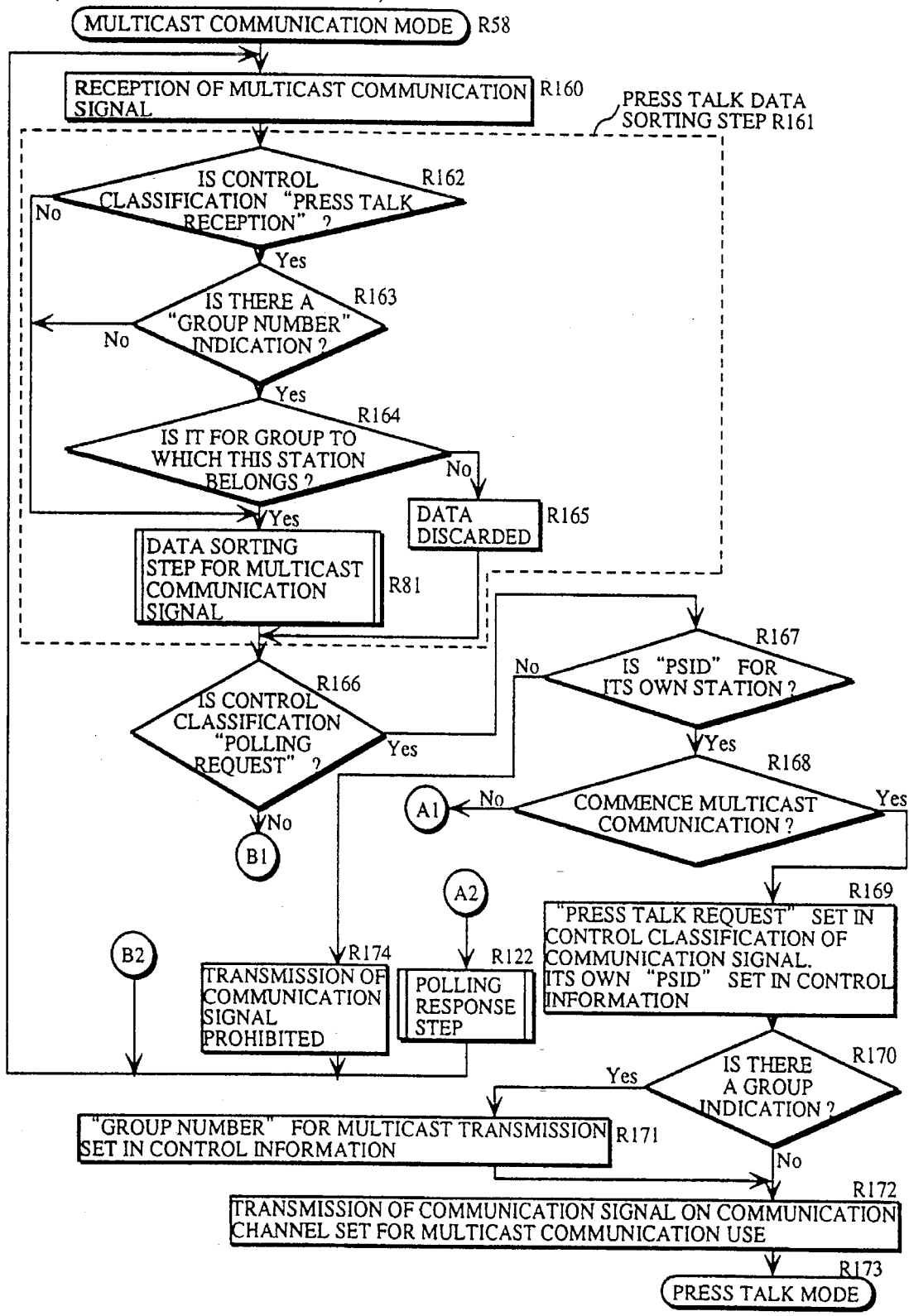
FIG. 16B is a flowchart for multicast communication/press talk for receiver personal stations under the same embodiment.
Figure 16C:
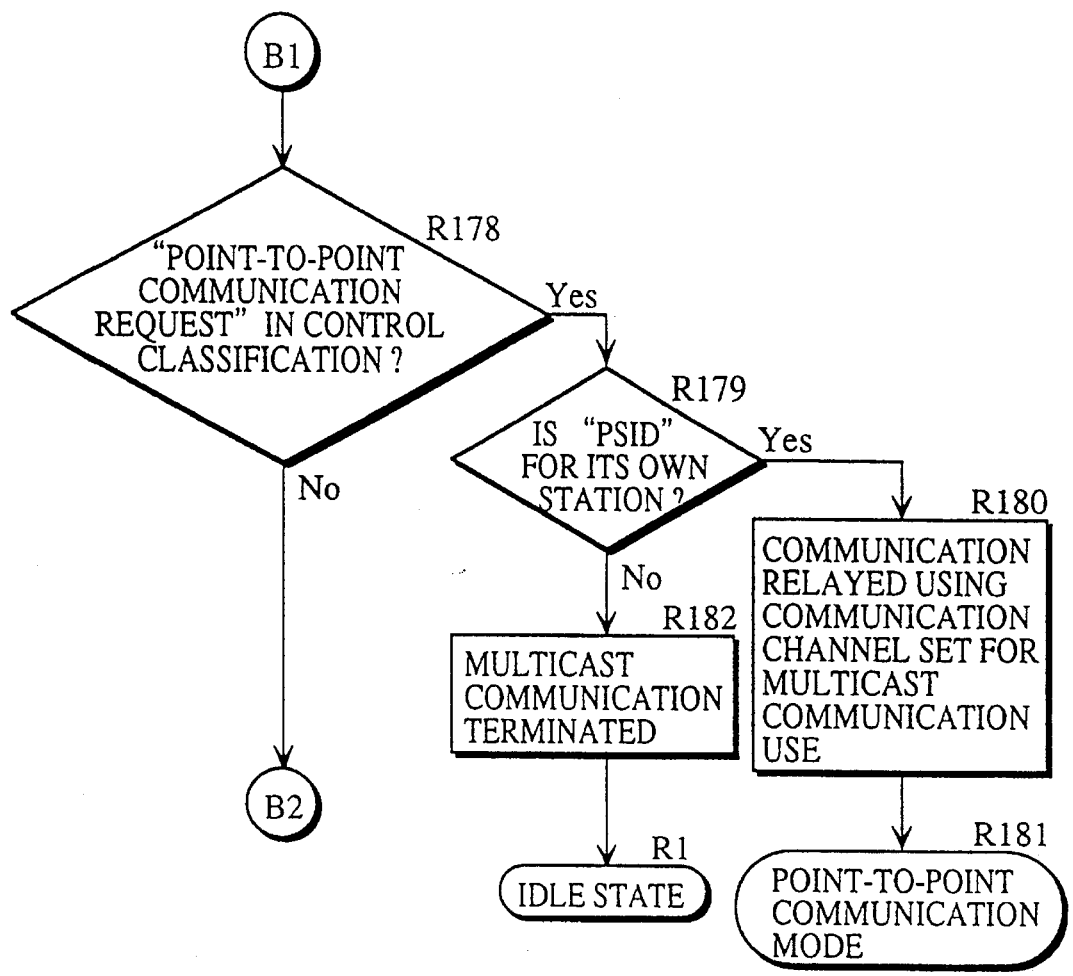
FIG. 16C is a flowchart for multicast communication/point-to-point communication for receiver personal stations under the same embodiment.
Figure 16D:
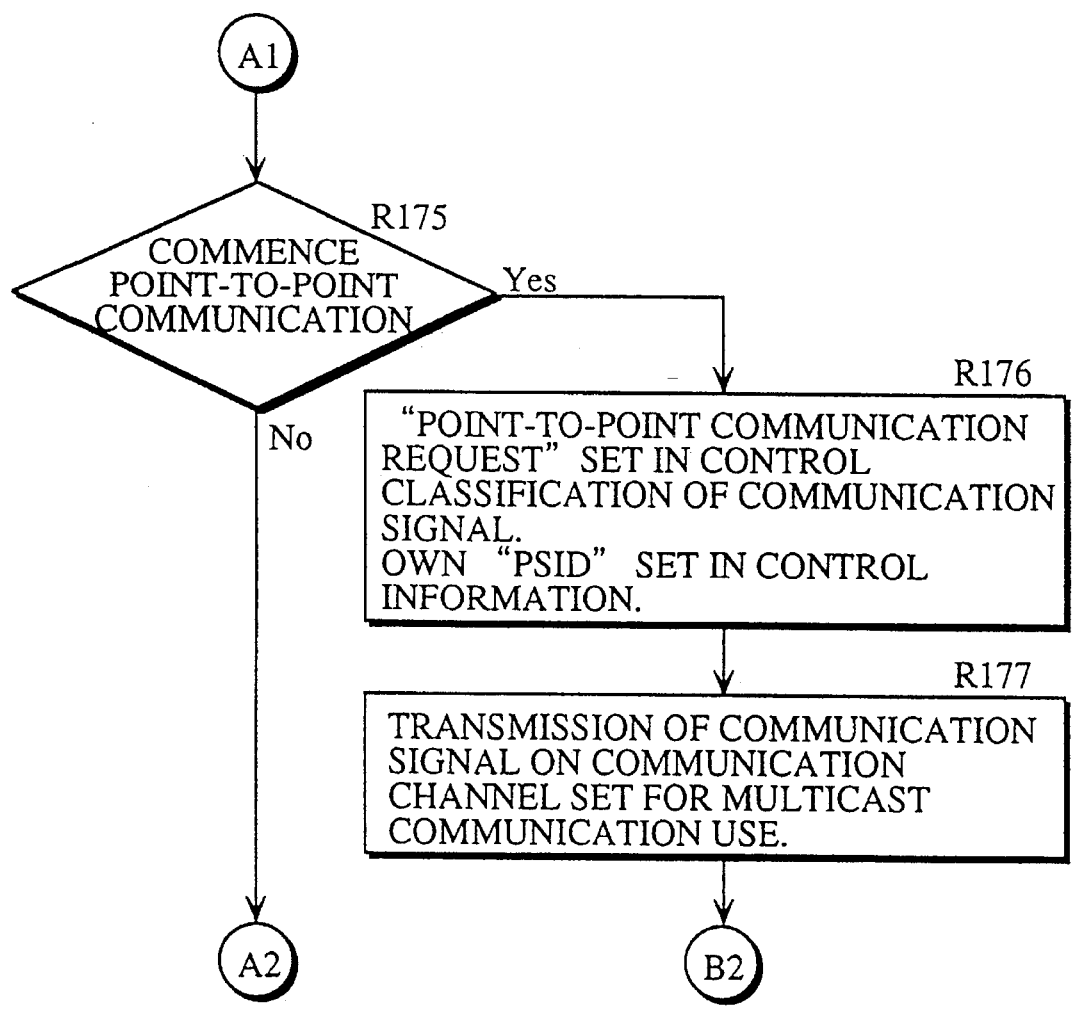
FIG. 16D is a flowchart for a point-to-point communication request by a receiver personal stations under the same embodiment.

Reception Process for Press Talk Data from Another Receiver Personal Station On the other hand, as shown in FIG. 16B, after receiving the multicast communication signal from the caller personal station, the communication control units 303 in the receiver personal stations continually execute the press talk data sorting process when press talk is executed by a different receiver personal station, because polling control is temporarily suspended (R160, R161, R166:No). More specifically, the communication control unit 303 set "Press talk reception (0000 0010B)" in the control classification field (R163:Yes) and, when its own PSID is not set in the control information field (R164:Yes, R164:No), discards the data (R165). When "Press talk reception (0000 0010B)" is not set in the control classification field (R162:No), or when "Press talk reception (0000 0010B)" is set in the control classification field (R162:Yes) and the group number refers to the group for which the receiver personal station belongs (R163:Yes, R164:Yes), then data sorting is executed (R81). In each of the cases described above, when "Press talk reception (0000 0010B)" is set in the control classification field (R166:No), then the above process is repeated.

Press Talk Request Process of a Receiver Personal Station

In the same way, when "Polling request (0000 0001B)" is set in the control classification field of the multicast communication signal (R166:Yes), and its own station is being polled (R167:Yes), then the communication control unit 303 in the receiver personal station, fi there is an indication for commencing press talk by means of a user operation (R168:Yes), sets "Press talk request (0000 0010B)" and its own PSID in the control classification field and the control information field in the communication signal (R169), while if there is an indication of a group number, adds this to the control information field (R170:Yes, R171), before transmitting the communication signal to the caller personal station (R172), and hereafter assuming press talk mode (R173).

Point-to-point Communication Request Process for a Receiver Personal Station In the same way, the communication control unit 303 in the receiver personal station, when "Polling request (0000 0001B)" is set in the control classification field of the multicast communication signal (R166:Yes), and its own station is being polled (R167:Yes), if there is an indication for commencing point-to-point communication by means of a user operation (R175:Yes in FIG. 16D), sets "Point-to-point communication request (0000 0100B)" and its own PSID in the control classification field and the control information field in the communication signal (R176), before transmitting the communication signal to the caller personal station (R177), and hereafter returning to multicast communication mode (R58), (it waits for the caller personal station to receive the point-to-point communication).

Switching to Point-to-point Communication for a Receiver Personal Station

Afterwards, the communication control unit 303 in the receiver personal station, when "Point-to-point communication reception (0000 0100B)" is set in the control classification field of the multicast communication signal (R178:Yes in FIG. 16C) and the PSID of another station is set in the control information field (R179:No), terminates multicast communication and returns to its idle state (R1). On this occasion, point-to-point communication mode between the other station and the caller personal station is assumed. However, when its own PSID is set in the control information field (R179:Yes), it assumes point-to-point communication mode with the caller personal station (R181) using the multicast communication channel (R180).

Figure 17A:
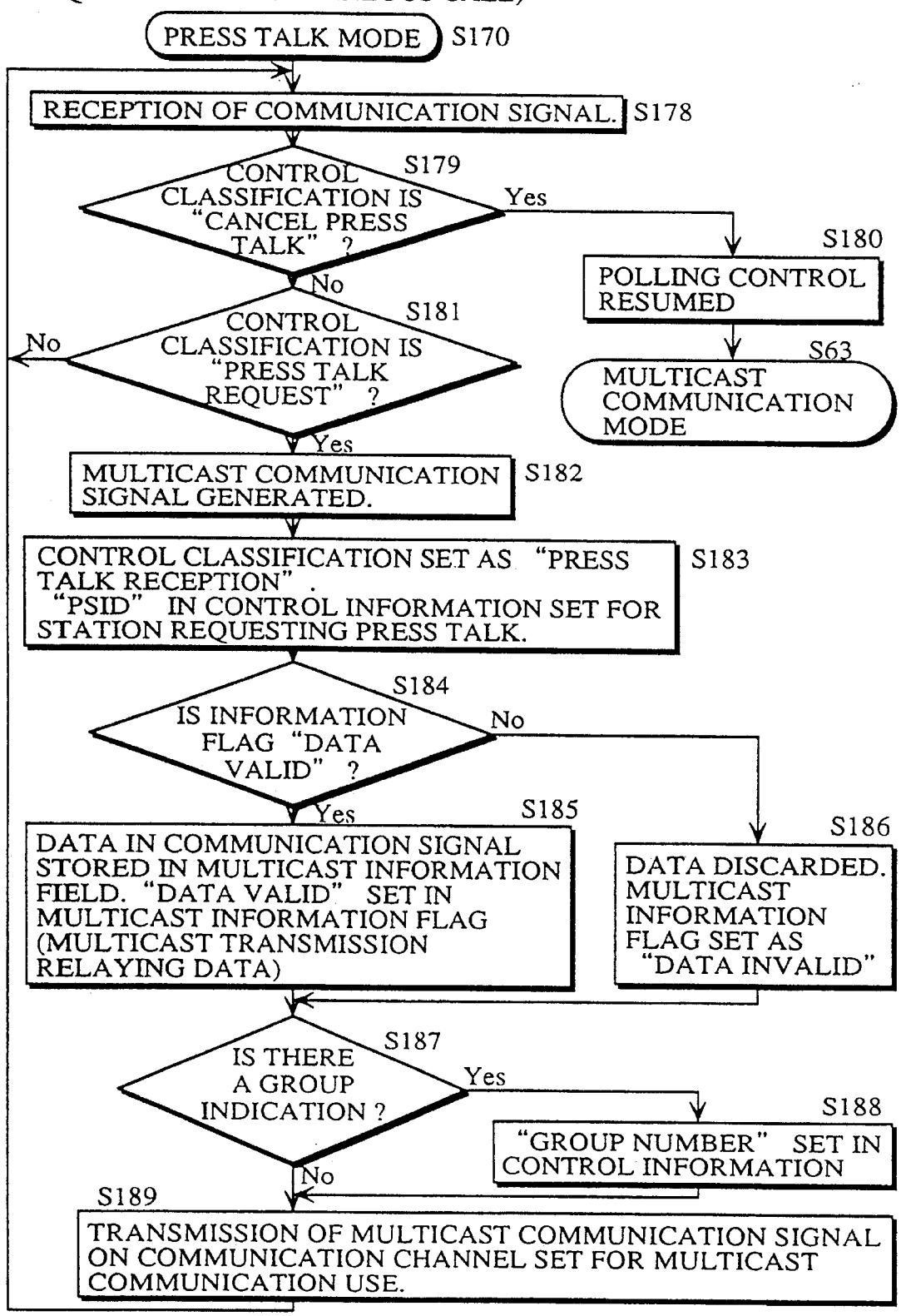
FIG. 17A is a flowchart for press talk for a caller personal station under the same embodiment.
Figure 17B:
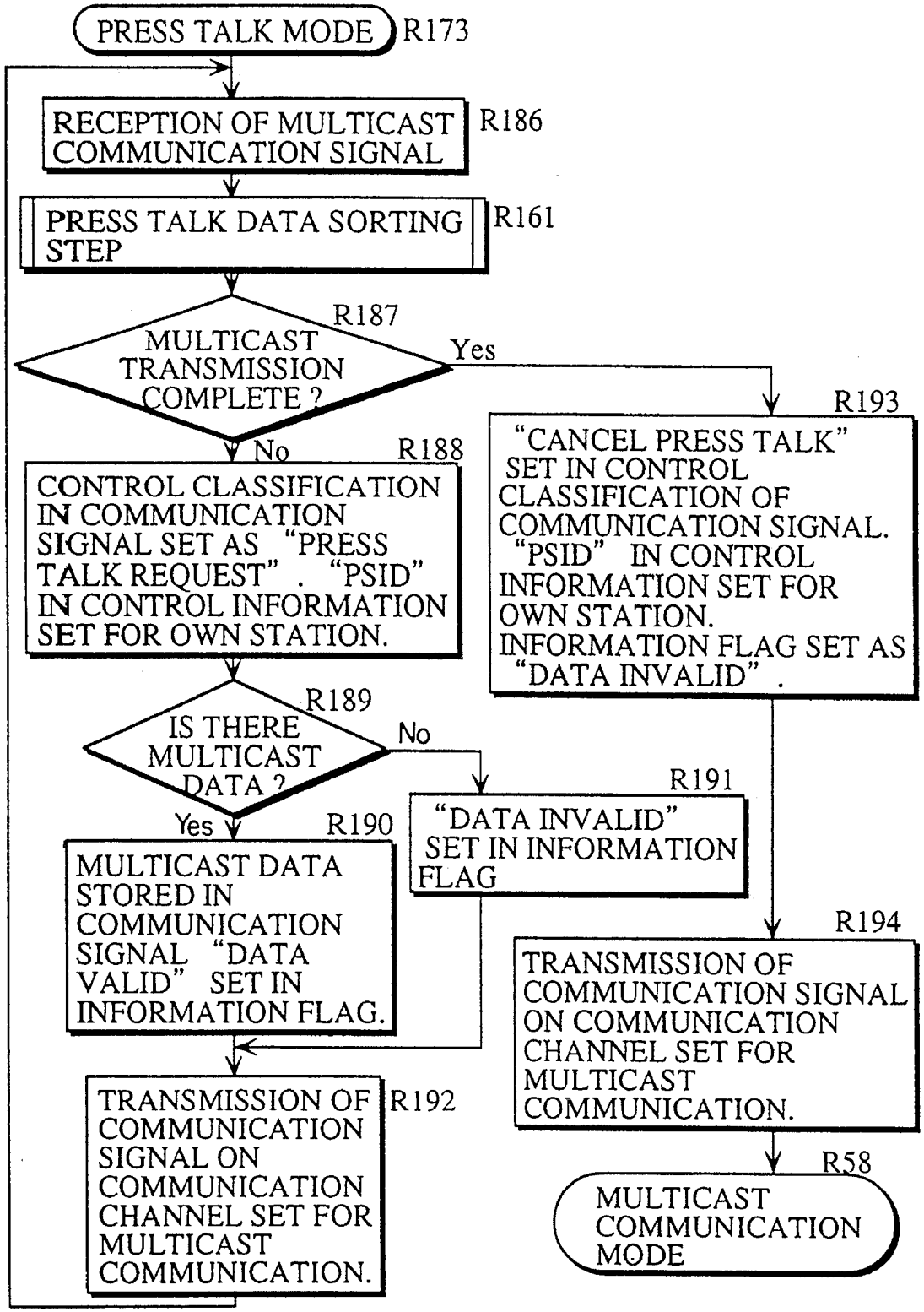
FIG. 17B is a flowchart for press talk for a receiver personal station under the same embodiment.

FIGS. 17A and 17B are flowcharts showing the multicast transmission process for the caller personal station 111 when in press talk mode it sends on data received from a receiver personal station and the corresponding communication process for the receiver personal station which requested press talk.

Press Talk Process for Caller Personal Station in Press Talk Mode

After switching to press talk mode by means of the press talk reception process described above (see FIG. 16A), the communication control unit 303 in the caller personal station, as shown in FIG. 17A receives the communication signal from the receiver personal station which issued the press talk request (S178). If the control information field in the communication signal is "Cancel press talk (0000 0011B)" (S179:Yes), then polling control is resumed and the it returns to multicast communication mode (S180, S63). If, however, the control classification filed is "Press talk request (0000 0010B)" (S181:Yes), then it generates the multicast communication signal (S182), setting "Press talk reception (0000 0010B)" and the PSID of the receiver personal station which issued the press talk request in the control classification field and the control information field, respectively (S183), while if the control information flag in the communication signal received from the personal station requesting press talk is valid (S184:Yes), then the data is set in the multicast information field of the generated multicast communication signal, and the multicast information flag is set as valid (S185). If the control information flag is invalid (S184:No), then the multicast information flag in the multicast communication signal is set as invalid (S186). In the same way, if there is a group number indication in the received communication signal (S187:Yes), then this group number is set in the control information field of the generated multicast communication signal (S188). The multicast communication signal generated in this way is then transmitted on the multicast communication channel (S189).

Reception Process for a Receiver Personal Station in Press Talk Mode

As shown in FIG. 17B, the communication control unit 303 of the receiver personal station which sent the press talk request, having received the multicast communication signal from the caller personal station and executed the press talk data sorting step (R186, R161), for the case when press talk is not terminated (R187:No), sets "Press talk request (0000 0010B)" in the control classification field of the communication signal, and its own PSID in the control information field (R188), as well as setting the data to be transmitted along with the information flag (R189–191), before transmitting to the caller personal station on the multicast communication channel (R192).

If there is an indication for cancelling press talk given by a user operation inputted via the input unit 306 (R187:Yes), then, in the communication signal, the control classification field is set as "Cancel press talk (0000 0011B)" and the information flag is set as invalid (R193), before the communication signal is transmitted to the caller personal station on the multicast communication channel (R194). After this, it switches from press talk mode to multicast communication mode (R58).

The following is a description of the operation for mobile transmission in this third embodiment constructed as described above, with (3.1) being the operation for a switching to and a return from polling control under multicast communication mode to press talk control, while (3.2) is a description of the operation for press talk control for a specified group, and (3.3) is the operation for a switch from polling control to point-to-point communication.

Figure 18:
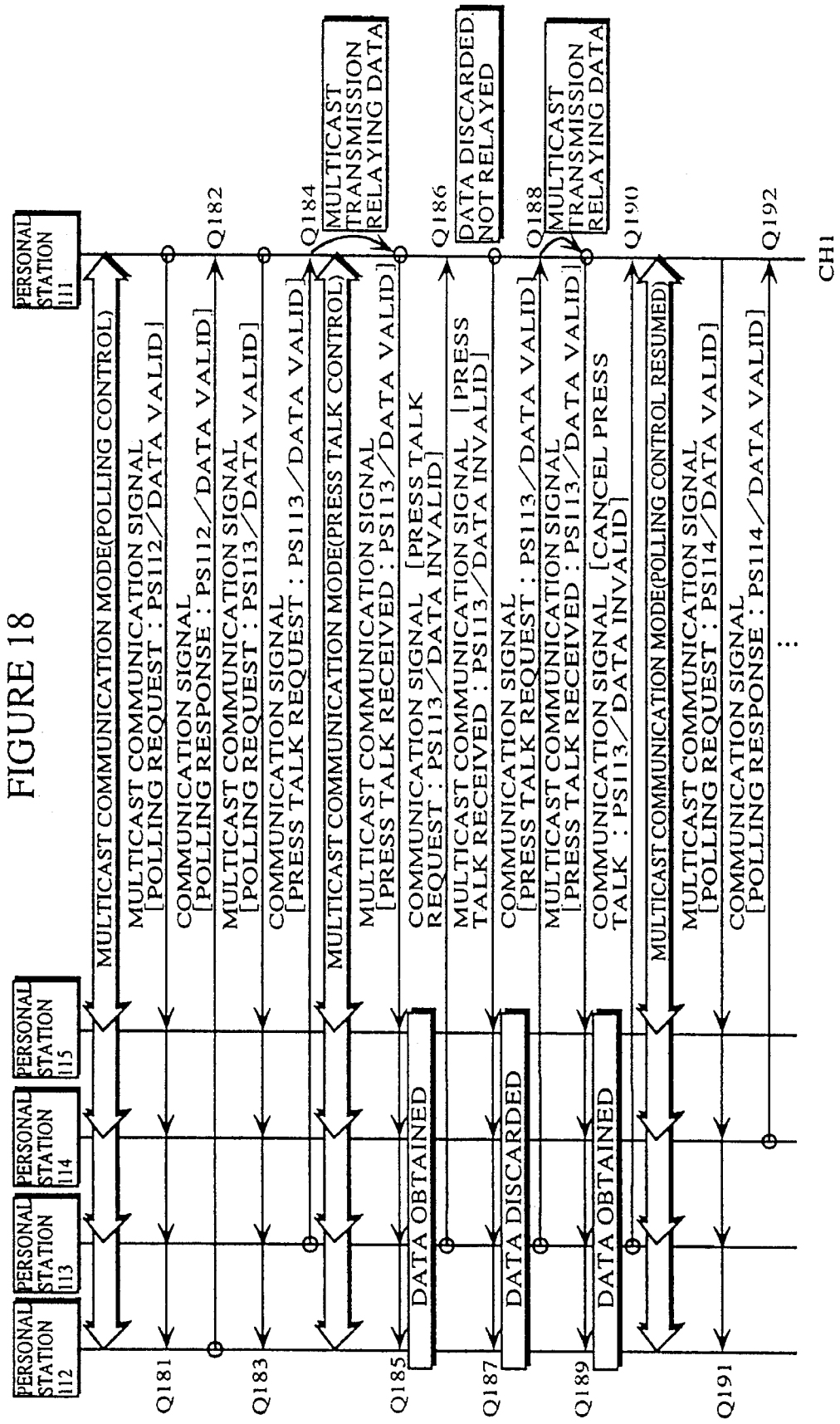
FIG. 18 shows the press talk control sequence under the same embodiment.

(3.1) FIG. 18 is a sequence chart showing the control sequence showing the switching to and return from polling control to press talk control.

At the start of this sequence, the personal station 111 which made the simultaneous call is performing multicast communication with the receiver personal stations 112–115 using the communication channel CH1, and under polling control, is granting transmission permission successively one at a time to the receiver personal stations 112–115 (Q181–Q183).

In order to grant transmission permission to the personal station 113, the personal station 111 sends the multicast communication signal SG2 in which "PS113" is set as the control information as the polling request information (Q183). If there is a request for multicast communication, the personal station 113 which receives this multicast communication signal SG2 transmits the communication signal SG3 to the caller personal station 111 as the press talk request signal in place of the polling response signal (Q184). On such an occasion, in the communication control field of the communication signal SG3 sent as the press talk request signal, "Press talk request" is set as the control classification in the control classification field and the data to be multicast transmitted is stored in the control information field.

Following this, when the indication "data valid" is given in the information flag, the personal station 111 which received the communication signal SG3 as the press talk request signal obtains the data from the personal station 113, and stores it in the multicast communication signal SG2 as the press talk reception signal, before relaying the data to the receiver personal stations 112–115 (S185). In the multicast information field of the multicast communication signal SG2 sent as the press talk reception signal at this time, "Press talk request" is set as the control classification and "Data valid" is set as the multicast information flag. On the other hand, when the indication "Data invalid" is set in the information flag in the communication signal SG3 used as the press talk request signal, the data received from the personal station 113 is discarded, and is therefore not relayed to the receiver personal stations 112–115 (Q187).

Following this, if the personal station 113 wishes to complete multicast transmission, then it sends the communication signal SG3 as the cancel press talk signal to the personal station 111 (Q190). This time, the control classification "Cancel press talk" is set in the multicast information filed of the communication signal SG3 sent as the cancel press talk signal. In this way the personal station 111 resumes polling control (Q191, Q192 . . . ).

(3.2) Operation of Press Talk Control for a Specified Group

Figure 19:
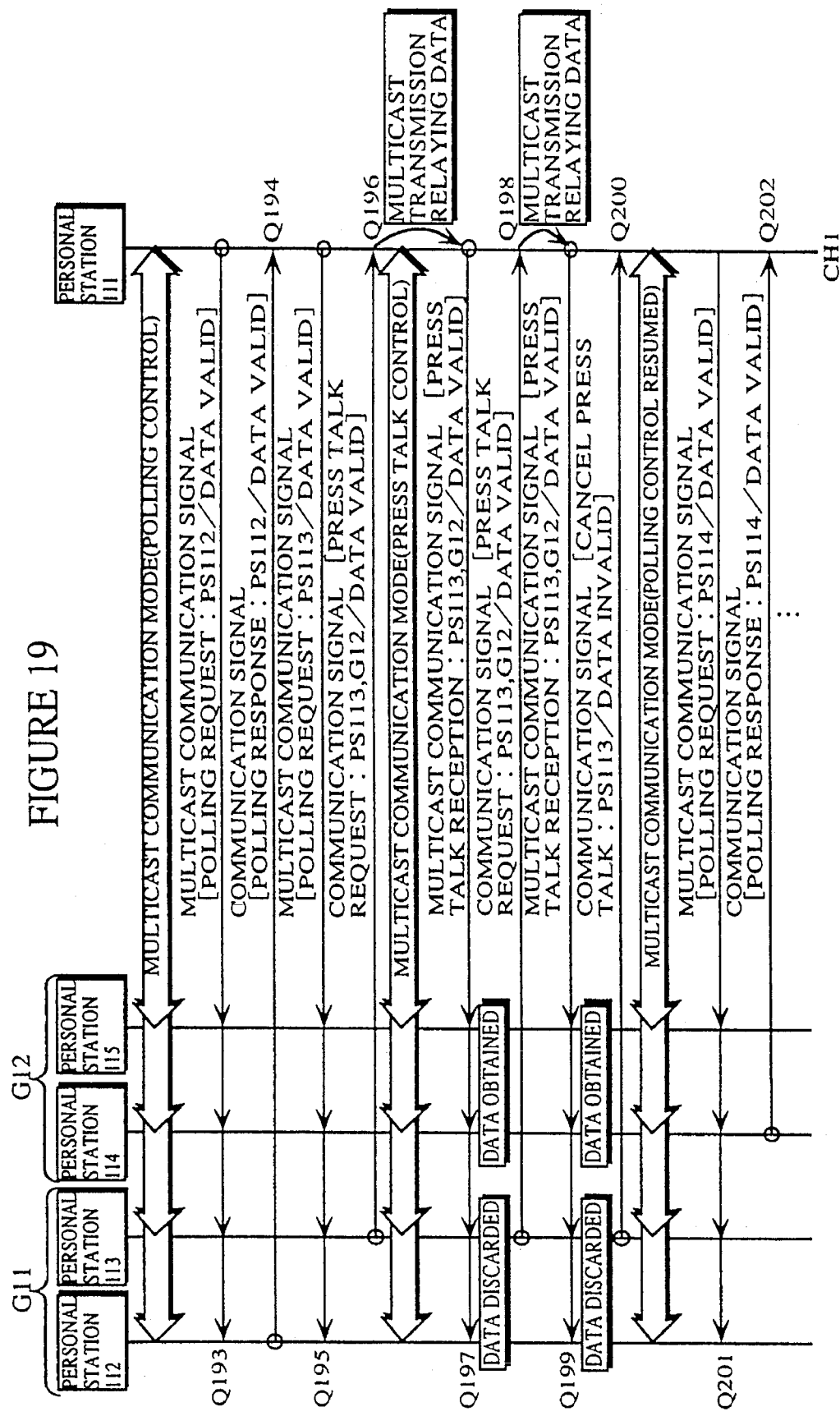
FIG. 19 shows the group indication press talk control sequence under the same embodiment.

FIG. 19 shows the sequence chart which shows the control sequence for press talk with a group specification.

At the start of this sequence, the personal station 111 which made the simultaneous call is performing multicast communication with the receiver personal stations 112–115 using the communication channel CH1, and under polling control, is granting transmission permission successively one a time to the receiver personal stations 112–115 (Q193–Q195). Also, in this example, the receiver personal stations are divided up so that personal stations 112 and 113 belong to group 1 and personal stations 113 and 114 belong to group 2. For purposes of identification, groups 1 and 2 have been allocated the groups numbers G11 and G12.

In order to grant transmission permission to personal station 113, personal station 111 sends as the multicast communication signal SG2 with "PS113" set in the control information as the polling request information (Q195). If there is a request for multicast transmission to a specified group of personal stations, the personal station 113 which receives the multicast communication signal SG2 transmits the communication signal SG3 as the specified group press talk request signal, in place of the press talk request signal, to the personal station 111 (Q196). On this occasion, the communication control unit 303 of the receiver personal station 113 sets the control classification "Press talk request" and the information flag in the multicast control field of the communication signal SG3 sent as the group specified press talk request signal, as well as setting the group number "G12" of the group for multicast transmission in the control information and storing the data for multicast transmission in the information field.

Next, if the indication "Data valid" is set in the information flag, the personal station 111 which received the communication signal SG2 as the group specified press talk request signal obtains the data from the personal station 113, and stores it in the multicast communication signal SG2 to be used as the press talk reception signal, before relying it to the receiver personal stations 112–115 (Q197). In the multicast information field of the multicast communication signal SG2 used as the press talk reception signal at this point, "Press talk reception" is set as the control classification, group number "G12" is set in the control information as the multicast address specified by the personal station 113, and the multicast information flag is set as "Data valid". In this example, the group number G12 is specified, so that personal stations 112 and 113 discard the data stored in the multicast communication signal SG2.

After this, when the personal station 113 completes the press talk, it transmits the communication signal SG3 to the personal station 111 as the cancel press talk signal (Q200). On this occasion, the control classification "Cancel press talk" is set in the multicast control field of the communication signal SG3 sent as the cancel press talk signal. In this way, the personal station 111 then resumes polling control (Q201, Q202 . . . ).

Figure 20:
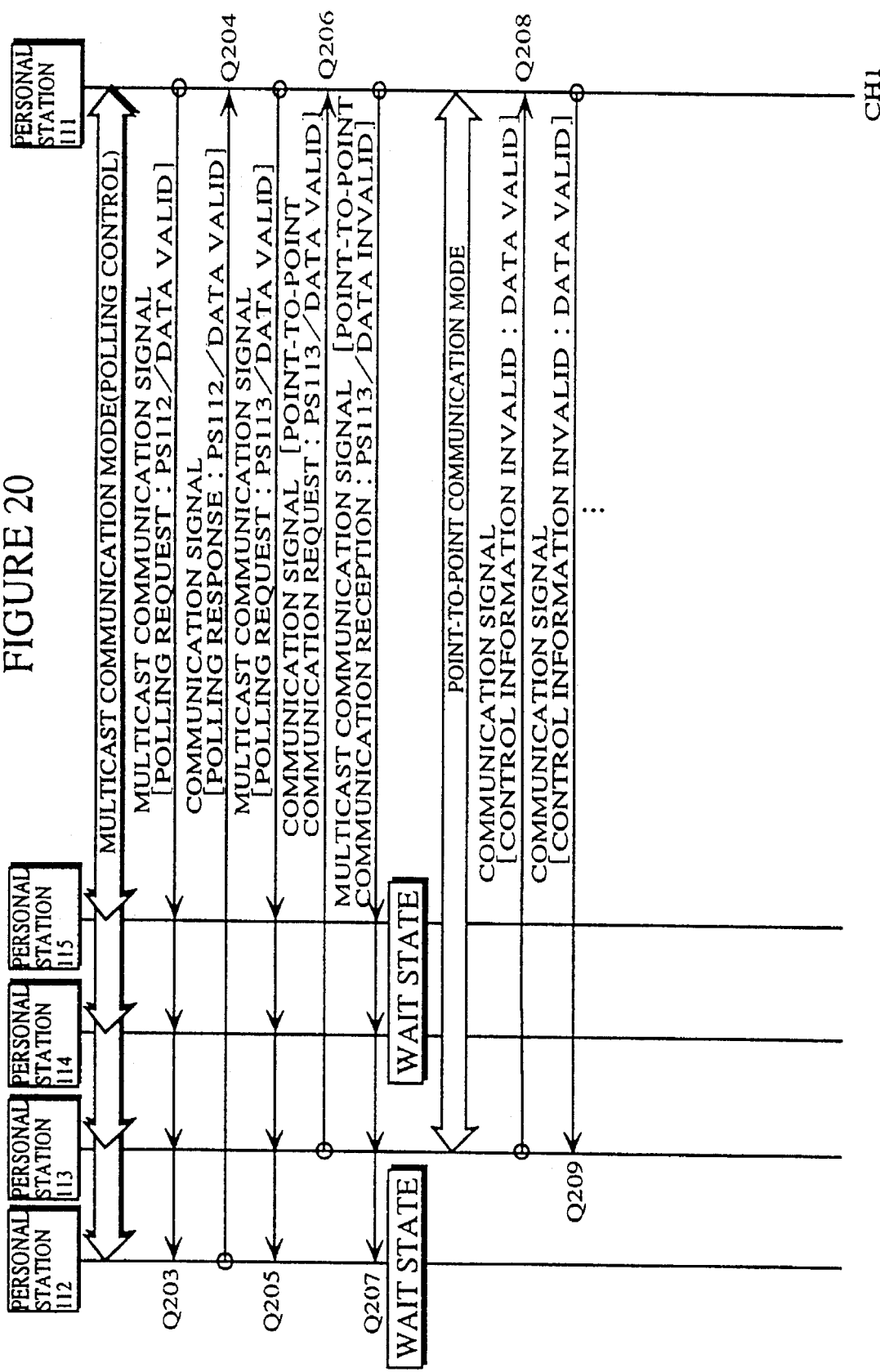
FIG. 20 shows the point-to-point communication transfer control sequence under the same embodiment.

(3.3) Operation for Switching from Polling Control to Point-to-point Communication FIG. 20 is a sequence chart showing the control sequence for switching to point-to-point communication. A the start of this process, the personal station 111 which made the simultaneous call is executing multicast communication with the receiver personal stations 112–115 using the communication channel CH1 and, by using polling control, is successively ranting transmission permission to each of the receiver stations 112–115 (Q203–Q205).

In order to grant transmission permission to the personal station 113, the personal station 111 sets "PS113"0 in the control information as polling request information and transmits the multicast communication signal SG2 (Q205). If there is a point-to-point communication request for the personal station 111 which made the simultaneous call, the personal station 113 which received the multicast communication signal SG2 transmits the communication signal SG3 as the point-to-point communication request signal to the caller personal station 111 in place of the press talk request signal (Q206). At this point, the control classification "Point-to-point communication request" and the information flag are set in the communication signal SG3 sent as the point-to-point communication request signal, with the data to be transmitted to the caller personal station 111 stored in the information field.

Next, the caller personal station 111 which receives the communication signal SG3 sent as the point-to-point communication request signal sets the multicast communication signal SG2 as the point-to-point communication reception signal (Q207). At this point, if the information flag in the communication signal SG3 sent as the point-to-point communication request signal is "Data valid", then the data stored in the information field is obtained. Also, in the multicast control field of the multicast communication signal SG2 sent as the point-to-point communication reception signal, the control classification "Point-to-point communication received" is set as the control classification and the PSID "PS113" for the personal station which requested point-to-point communication is set as the control information.

Following this, the caller personal station 111 executes point-to-point communication with the personal station 113 using the communication channel CH1 which is being used for multicast communication (Q208, Q209).

On the other hand, the receiver stations 112–115 which are not performing point-to-point communication, that is to say all of the stations except personal station 113, on receiving the multicast communication signal SG2 as the point-to-point communication reception signal (Q207), switch to a wait state. That is to say, personal stations 112, 114–115 terminate multicast communication on communication channel CH1, and return to the wait state wherein they once again successively observe the radio channels.

Fourth Embodiment

The construction for mobile communication in this fourth embodiment is principally the same as that of the first to third embodiments shown in FIGS. 1 to 3, with the tables also being of roughly the same composition as that shown in FIGS. 4A and 4B. Construction elements which are the same as the before will not be explained, and instead the following description will focus on the differences.

The principle difference with the first to third embodiment is that in this embodiment the simultaneous call is made by the cell station. Also, although the simultaneous call signal and its format and content are the same as that shown in FIG. 7, it is transmitted by the cell station on the control channel and not on a communication channel as before. The format and content of multicast communication signal and of the communication signal, shown in FIG. 13, are also largely the same as before, except that they are transmitted from the cell station and not from a personal station. In FIG. 13, the direction "down" refers to the transmission from the cell station to the personal station(s), while the "up" direction refers to transmission from the personal stations to the cell station. The control classification "Group number allocation (0000 0101B)" is also used to indication the allocation of new temporary group numbers to the personal stations for multicast communication. When "Group number allocation" is executed, the group number and the PSIDs of the personal stations belonging to that group are indicated in the control information field.

The communication control unit 203 shown in the block diagram of the cell station given in FIG. 2 is provided with the group management table and the number management table shown respectively in FIGS. 4A and 4B, as well as having a simultaneous call function and a multicast communication function.

When the cell station performs multicast communication with itself as the center, then when the cell station receives a request for a simultaneous all from a outside terminal (telephone) via the communications network 120, or when the cell station receives a request for a simultaneous call from one of the personal stations in its cell, this simultaneous call function is the function allowing the cell station to transmit a simultaneous call signal on the control channel to all of the personal stations in its cell. On such an occasion, the simultaneous call signal indicates a communication channel to be used for multicast communication.

The multicast communication function is the function for multicast communication from the cell station to the personal stations on the communication channel indicated by the simultaneous call signal.

The communication control unit 303 shown in the block diagram of the personal station shown in FIG. 3 has a reception function corresponding to that in the cell station.

Figure 21A:
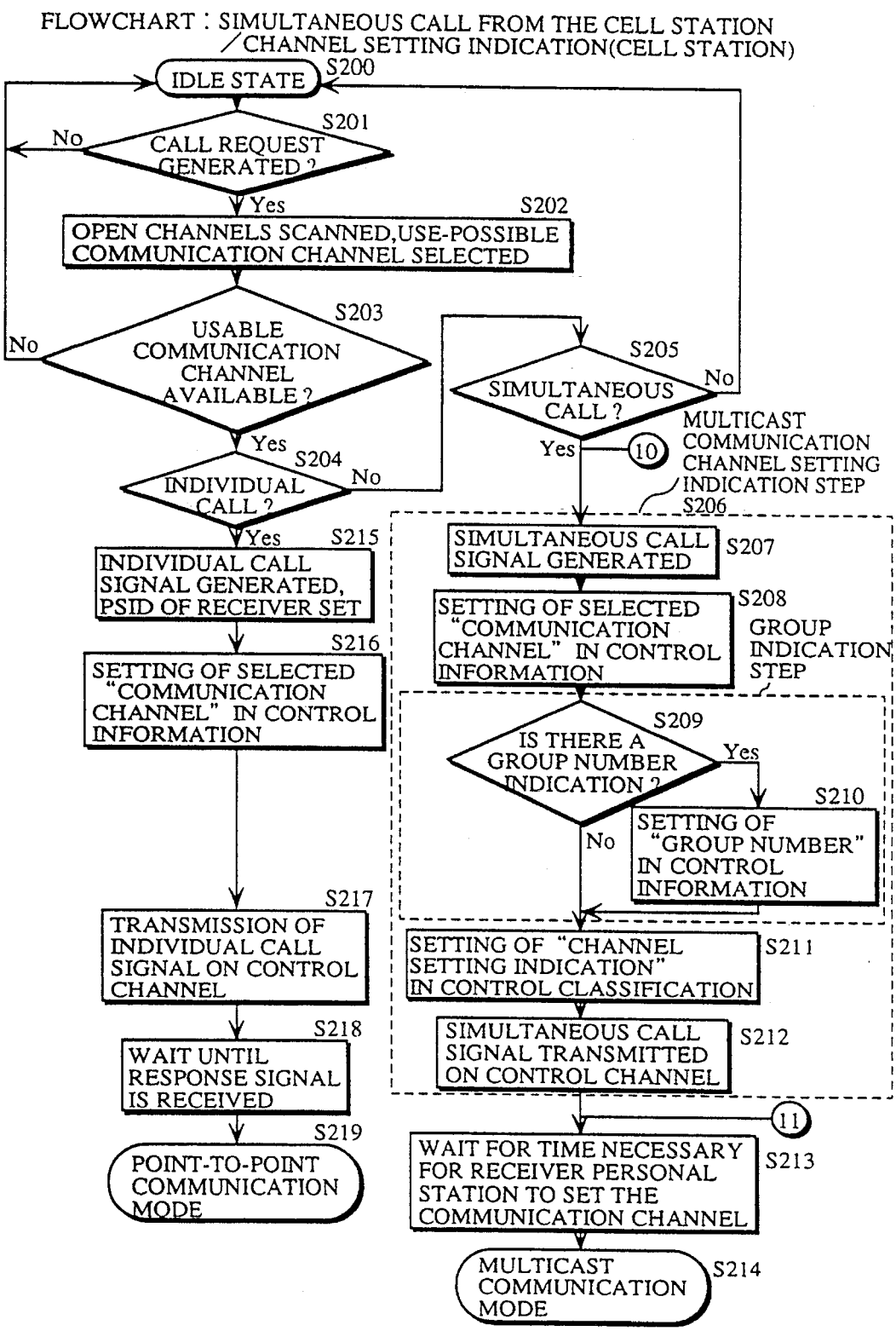
FIG. 21A is a flowchart for simultaneous call/channel setting indication process by the cell station in the present embodiment.
Figure 21B:
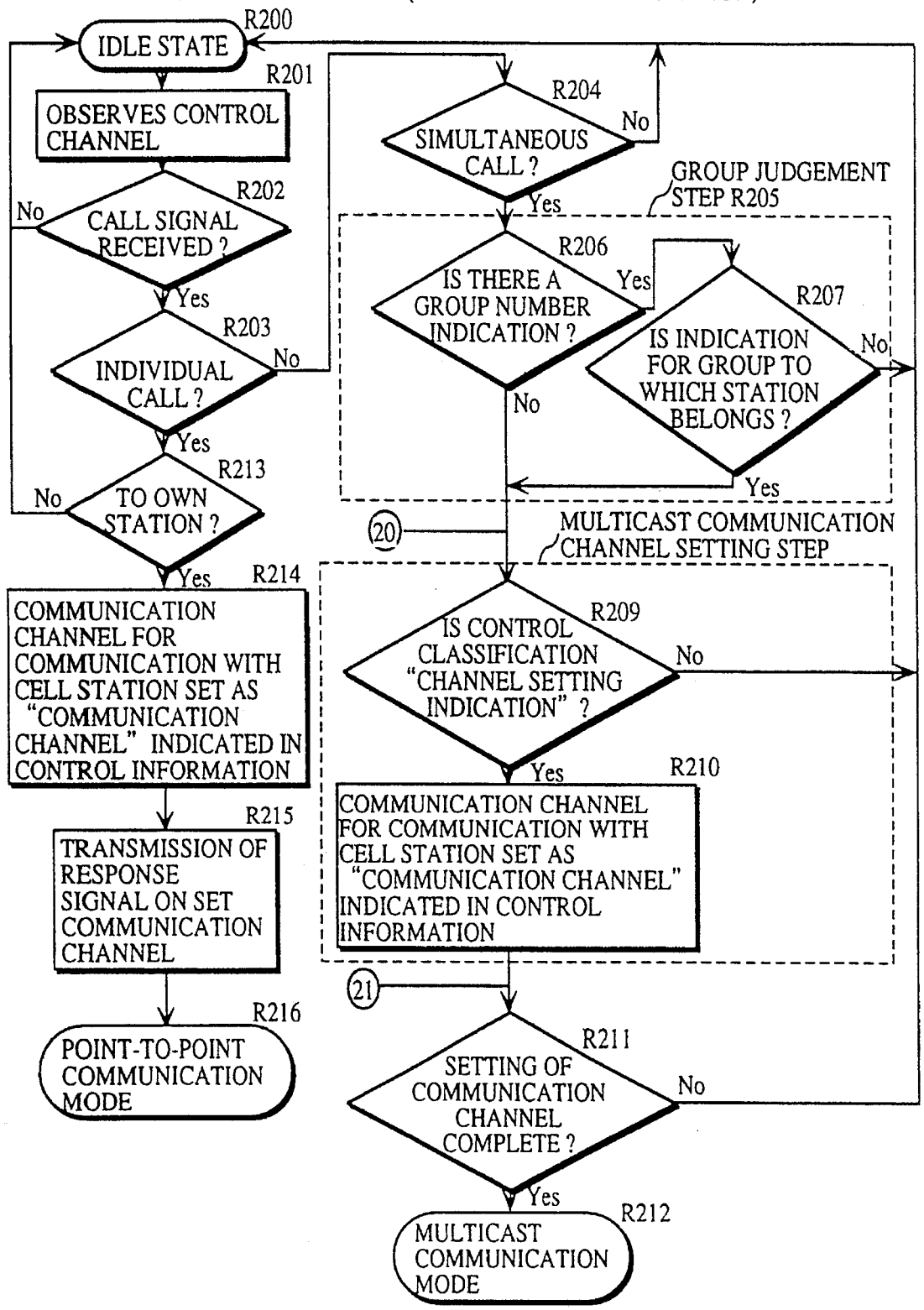
FIG. 21B is a flowchart for simultaneous call/channel setting indication process by a receiver personal station in the present embodiment.

FIGS. 21A and 21B are flowcharts showing the details of the simultaneous call process for the communication control unit 203 of the cell station and the corresponding reception process for the communication control unit 303 of the receiver personal stations.

In FIG. 21A, the communication control unit 203 of the cell station 101 observes the control channel for call request from each of the personal stations (S200: Idle state). Observation of the personal stations (or the communications network 120) and point-to-point communication (S215–S219) are the same as for a PHS under the related art, so that no explanation will be given. Once the communication control unit 203 in its idle stat receives a call request created by a user operation (S201:Yes), it first scans all of the unused channels successively in order (For a PHS, communication channels of 35 carrier parts for isolated use or 40 carrier parts for outdoor public use are usable for a cell station), and if there is no communication channel whose reception electric field signal is weak (that is, an unused channel), it returns to its idle state (S203:No), while if there is an unused communication channel it is selected as the multicast communication channel (S202, S203:Yes).

If, after selecting the communication channel, the received call request is for a simultaneous call (S204:No, S205:Yes), the communication control unit 203 of the caller generates a simultaneous call signal for all of the other personal stations (S207) and, if there is an indication of a group number by means of a user operation, it sets the group address in the simultaneous call signal (S209:Yes, S210). Also the communication control unit 203, sets "Channel setting operation" in the control classification field of the simultaneous call signal, and "Selected communication channel number" in the control information field (S211), before transmitting the simultaneous call signal on the control channel (S212). After this, the communication control unit 203 waits for sufficient time for the receiver personal stations to switch to the appropriate communication channel (S213), before switching into multicast communication mode (S214).

As shown in FIG. 21B, the communication control unit 303 in the receiver personal stations 112–115 in its idle state (R200) continually observes only the control channel (R201, R202:No), while when there is a simultaneous call (R202:Yes, R203:No, R204:Yes), if there is an indication of a group to which its own station does not belong (R207:No), it returns to the idle state, or else if there is no group indication (R206:No), or an indication of the group number of the group to which its own station belongs (R207: Yes), then the channel indicated by the "Channel setting indication" (R209:Yes) in the control information field is set as the multicast communication channel (R210), and it switches into multicast communication mode (R211, R212). At this point, if for reasons such as the use by other personal stations, it is unable to set this communication channel, the personal station returns to its idle state (R211:No).

In this way the receiver personal stations which receive the simultaneous call on the control channel set the communication channel according to the channel setting indication, and assume multicast communication mode (R212).

Figure 22A:
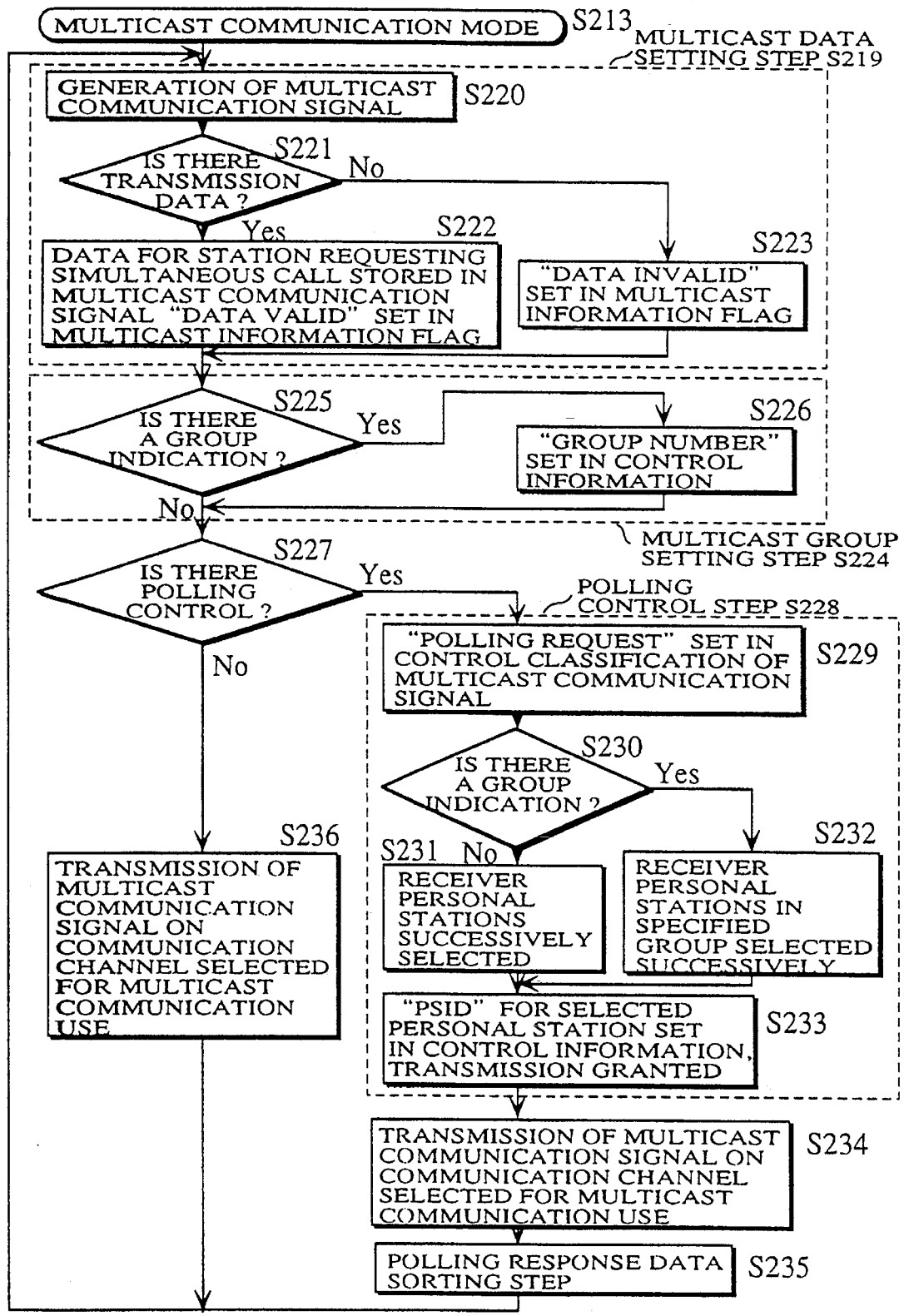
FIG. 22A is a flowchart for multicast communication/polling control process by the cell station in the present embodiment.
Figure 22B:
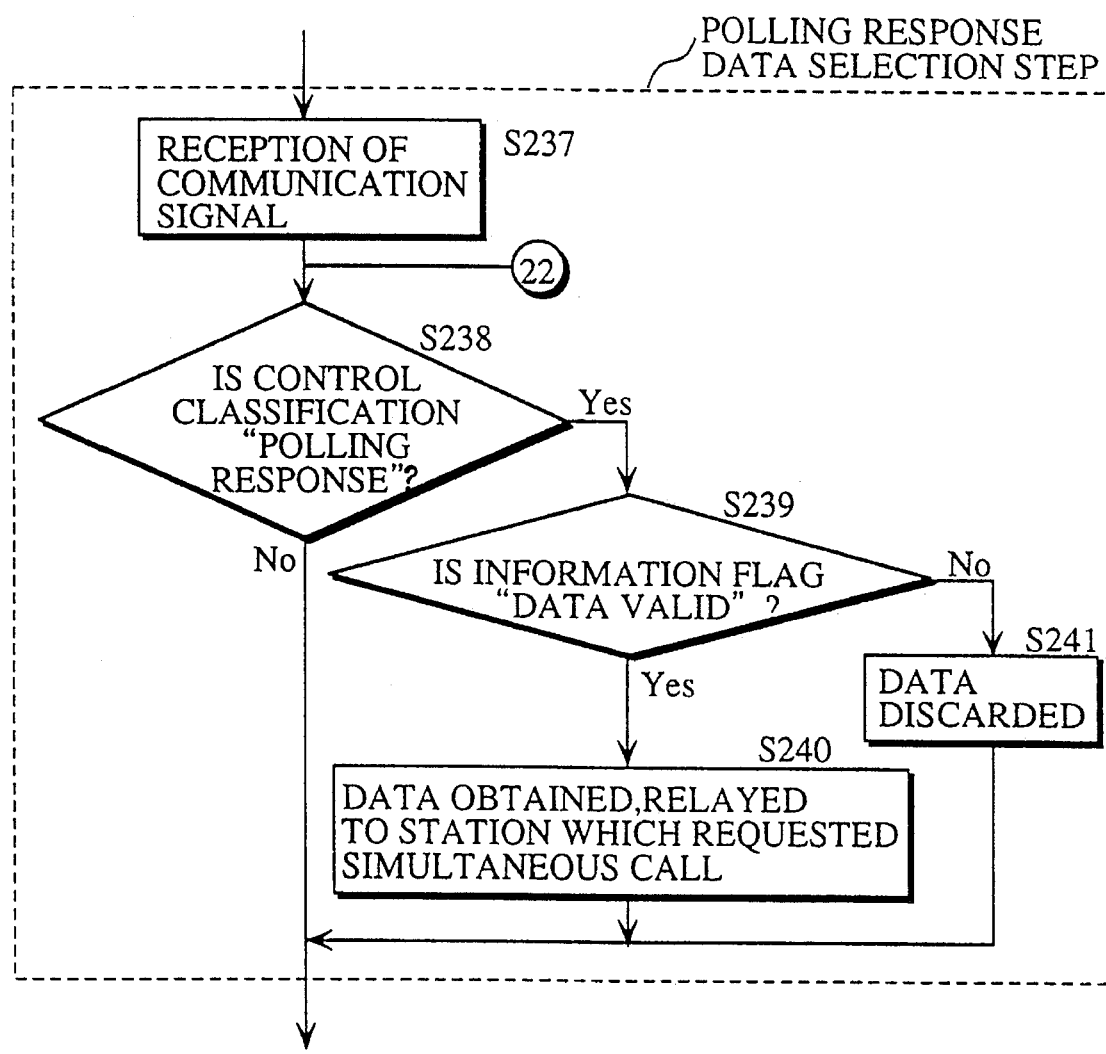
FIG. 22B is a flowchart for multicast communication/polling response process by a receiver personal station in the present embodiment.
Figure 22C:
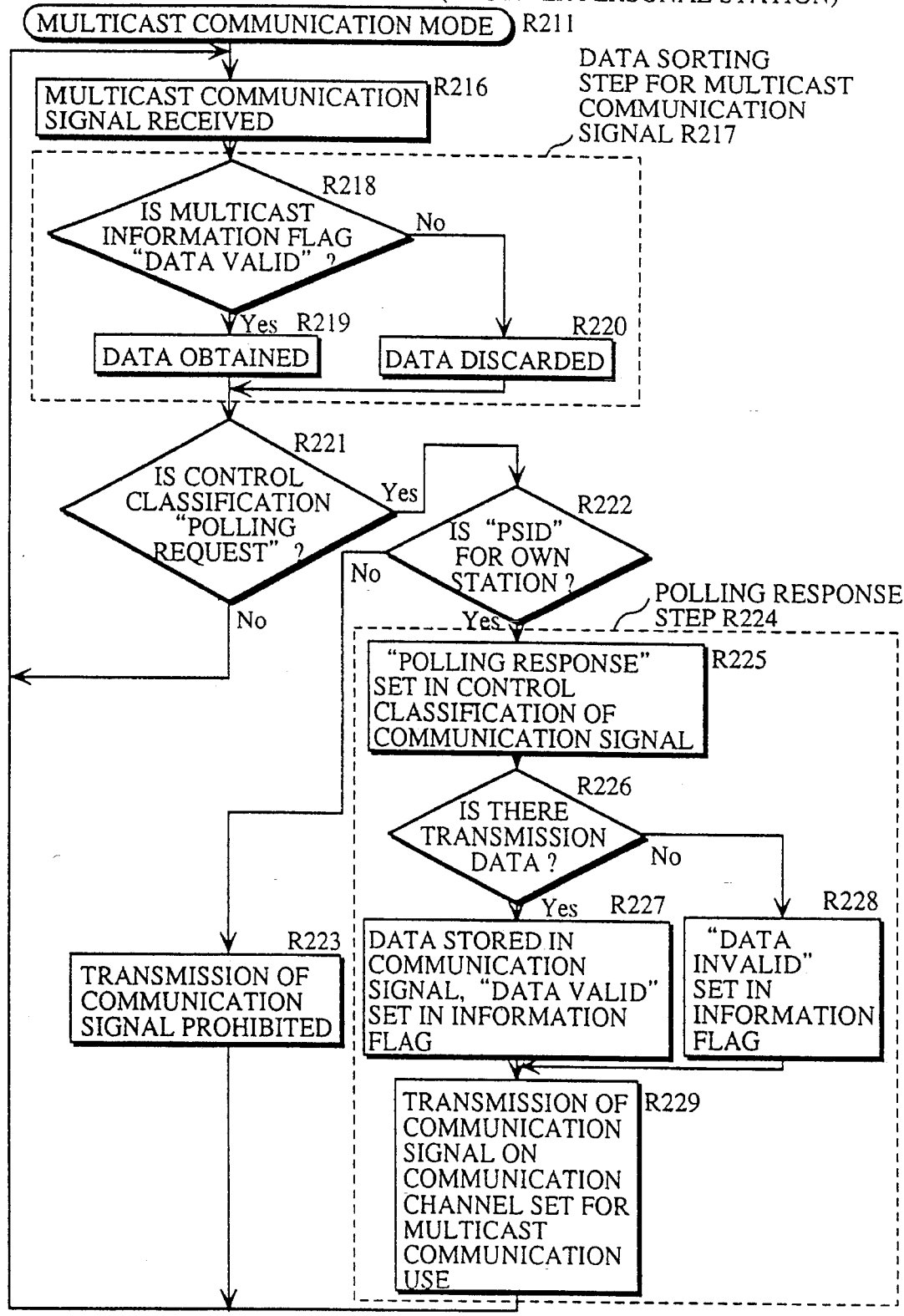
FIG. 22C is a flowchart for multicast communication/polling control process by a receiver personal station in the present embodiment.

FIGS. 22A, 22B and 22C are flowcharts showing the multicast data transmission process according to polling control by the communication control unit 203 of the cell station, the corresponding reception process for the communication control unit 303 of a receiver personal station, and the polling data sorting process for a receiver personal station, respectively.

As sown in FIG. 22A, after switching to multicast communication mode (S213), the cell station generates the multicast communication signal containing the data to be transmitted to the other stations called under the simultaneous call (S220), if there is data to be set (S221:Yes), setting it in the multicast information field as well as setting the multicast information flag as valid (S222), or if there is no data (S221:No), setting the multicast information flag as invalid (S223). Data to be sent here refers to data received from the station which requested the simultaneous call. Therefore, if the station which requested the simultaneous call is one of the personal stations, then the reception data from that personal station is set in the multicast information field, or if the station which requested the simultaneous call is a station (telephone) connected via the communications network, then the reception data from the user of the cell station is set in the multicast information field.

Also, if there is a group number indication by the station which requested the simultaneous call, then this group number is set in the control information field (S225, S226).

If there is no indication for polling control by the station which requested the simultaneous call (S227:No), then the multicast communication signal is transmitted on the multicast communication channel (S236), while if there is an indication for polling control by the station which requested the simultaneous call (S227:Yes), the polling control is executed (S228). In more detail, this polling control involves the communication control unit 203 in the cell station setting "Polling request (0000 0001B)" in the control classification field of the multicast communication signal (S229) and, if there is an indication from the station which requested the simultaneous call for a group number of a group to be subject to polling control (S230:Yes), it consults the group management table and selects the personal stations in the specified group one at a time in order (S232), while if there is no group number indication (S230:No), then one personal station at a time in the radio cell is selected (S231), with the PSID of the selected personal station being set in the control information field (S233).

Next, the communication control unit 203, transmits the multicast communication signal including the polling request on the communication channel selected for multicast communication, and sorts the response data.

As shown in FIG. 22B, after transmitting the multicast communication signal, the communication control unit 203 receives the communication signal from the polled personal station, and if the control classification field is "Polling response (0000 0001B)" (S238:Yes), and the information flag is valid (S239:Yes), then the data in the multicast information field is obtained. If the control classification field is not "Polling response (0000 0001B)" (S238:No), then the communication signal is ignored or, when the information flag is invalid (S239:No), then the data is discarded.

On the other hand, the communication control unit 303 in the receiver personal station performs the reception process for polling control according to the flowchart shown in FIG. 22C. The process in this drawing is the same as that shown in FIG. 12B for the second embodiment, so no further explanation will be given.

The following is a description of the operation for mobile transmission in this fourth embodiment constructed as described above, with (4.1) being the simultaneous call operation for the cell station, while (4.2) is a description of the simultaneous call operation for a specified group, (4.3) is the multicast communication operation for a specified group, (4.4) is the group number allocation operation for multicast communication, and (4.5) is the polling control operation.

(4.1) Simultaneous Call Operation by the Cell Station

Figure 23:
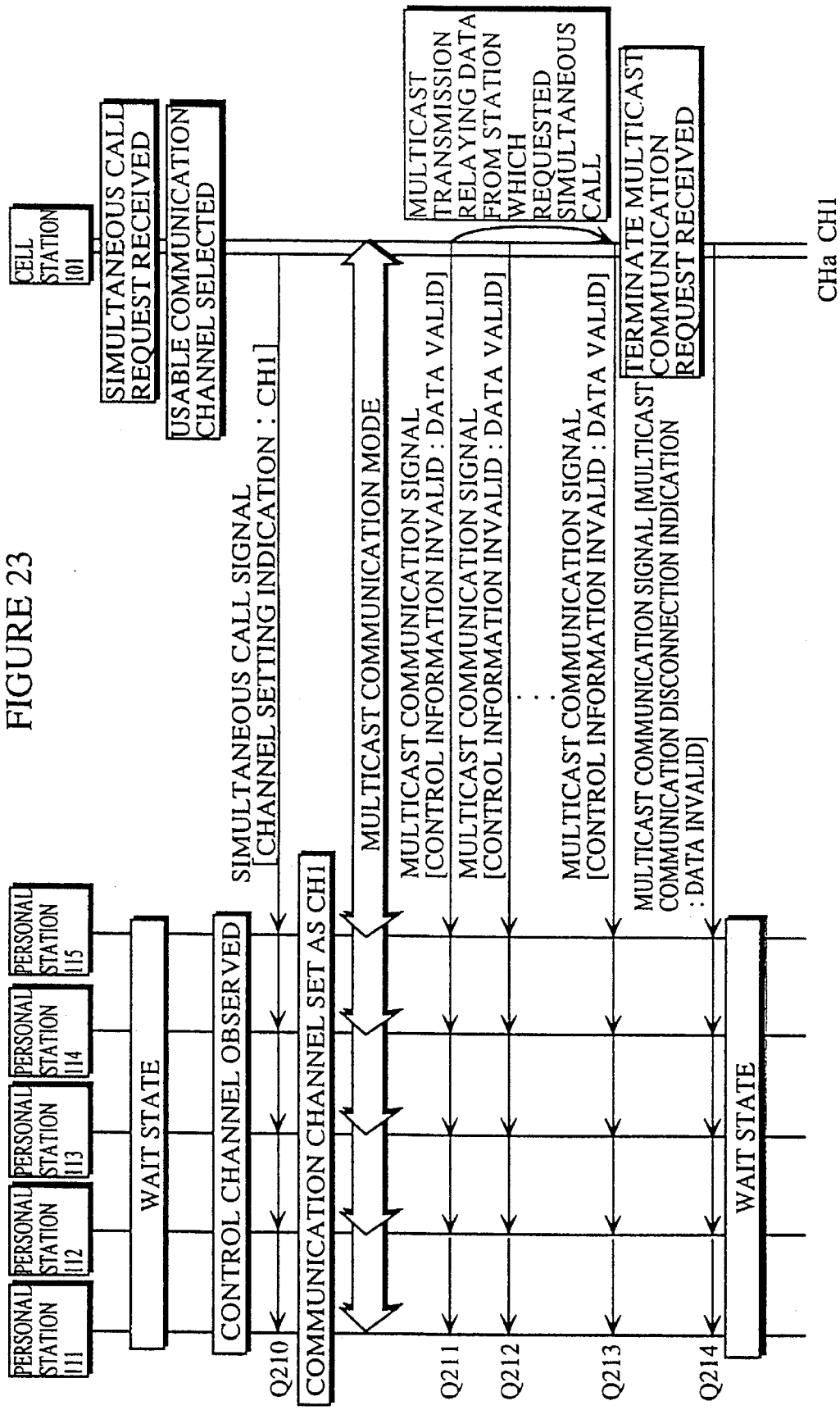
FIG. 23 is a sequence chart showing the simultaneous call control sequence for the cell station in the present embodiment.

FIG. 23 is a sequence drawing for the showing the simultaneous call operation by the cell station. When a simultaneous call request is generated by one of the personal stations 111–115 in the radio cell 110, or when a simultaneous call request is received from the communications network 120, the cell station 101 transmits the simultaneous call signal SG1 to all of the personal stations in the radio cell using the control channel CHa (Q210). At this point, the cell station 101, before transmitting the simultaneous call signal SG1 scans all of the open channels and out of the number of communication channels selects CH1 as the channel for multicast communication, as well as setting in the simultaneous call control field of the simultaneous call signal SG1, "Channel setting indication" as the control classification and the communication channel "CH1" as the control information.

On the other hand, the personal stations 111–115 continually observe the control channel used by the cell station 101, and on receiving the simultaneous call signal SG1 (Q210), set the communication channel CH1 indicated in the simultaneous call control field as the communication channel for communication with the cell station 101.

Having waited for sufficient time for the personal stations 111–115 to set CH1 as the communication channel, the cell station 101 then transmits the multicast communication signal SG2 on the communication channel CH1 (Q211–Q214). At this point, the data from the station which requested the simultaneous call (which can be the cell station itself) can be set as the "Multicast data" in the multicast information field in the multicast communication signal SG2.

On the other hand, by the personal stations 111–115 receiving the multicast communication signal SG2 using the communication channel CH1, multicast communication can be executed between the station which requested the simultaneous call (which can be the cell station itself) and the personal stations 111–115 via the cell station 101.

(4.2) Simultaneous Call Operation for a Specified Group

Figure 24:
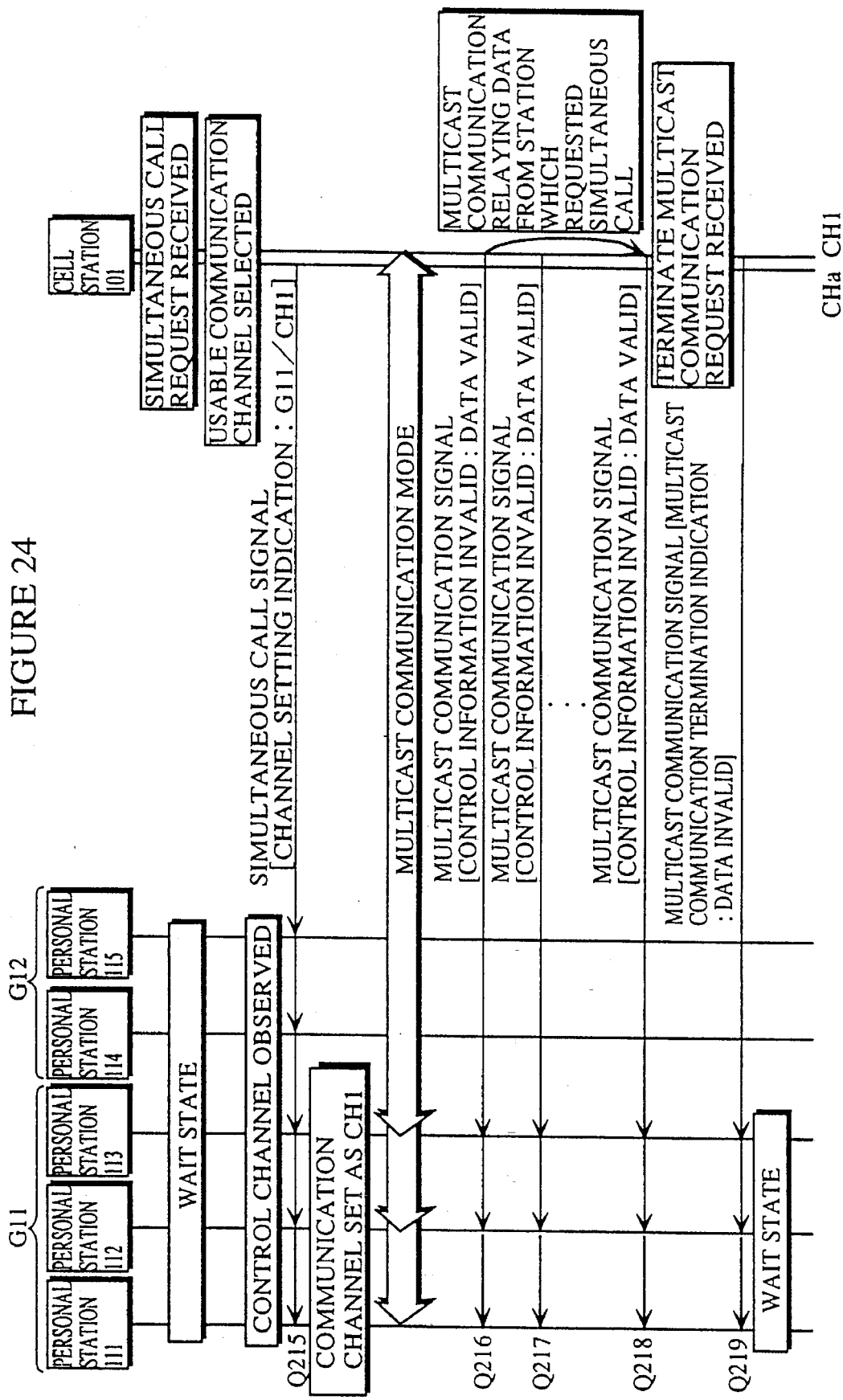
FIG. 24 is a sequence chart showing the group specified simultaneous call control sequence in the present embodiment.

FIG. 24 is a sequence drawing for the simultaneous call operation executed according to a group specification. In this example, personal stations 111–113 belong to group 1 and personal stations 114–115 belong to group 2. Groups 1 and 2 are allocated the group numbers G11 and G12 respectively for identification purposes.

When a simultaneous call request is generated by one of the personal stations 111–115 in the radio cell 110, or when a simultaneous call request is received from the communications network 120, the cell station 101 transmits the simultaneous call signal SG1 to all of the personal stations in the radio cell using the control channel CHa (Q215). At this point, the cell station 101, before transmitting the simultaneous call signal SG1, scans all of the open channels and, out of the number of communication channels, selects CH1 as the channel for multicast communication, as well as setting in the simultaneous call control field of the simultaneous all signal SG1, "Channel setting indication" as the control classification and communication channel "CH1" and group number "G11" as the control information.

After this, the cell station 101 transmits the multicast communication signal SG2 on communication channel CH1 (Q216–Q219).

The personal stations 111–115 continually observe the control channel used by the cell station 101, and on receiving the simultaneous call signal SG1 (Q215), refer to the group number specification indicated in the simultaneous call control field, executing control so as to switch into multicast communication mode when the specified group number agrees with its own. If the specified group number does not agree with its own, then the entire simultaneous call is discarded and the personal station remains in its wait state. Since in this example, the group number indication is for group G11, personal stations 114–115 ignore the simultaneous call signal SG1 and remain in a wait state.

Hereafter, only the personal stations 111–113 in the group G11 receive the multicast communication signal in their multicast communication mode (Q216–Q219).

(4.3) Multicast Communication Operation for a Specified Group

Figure 25:
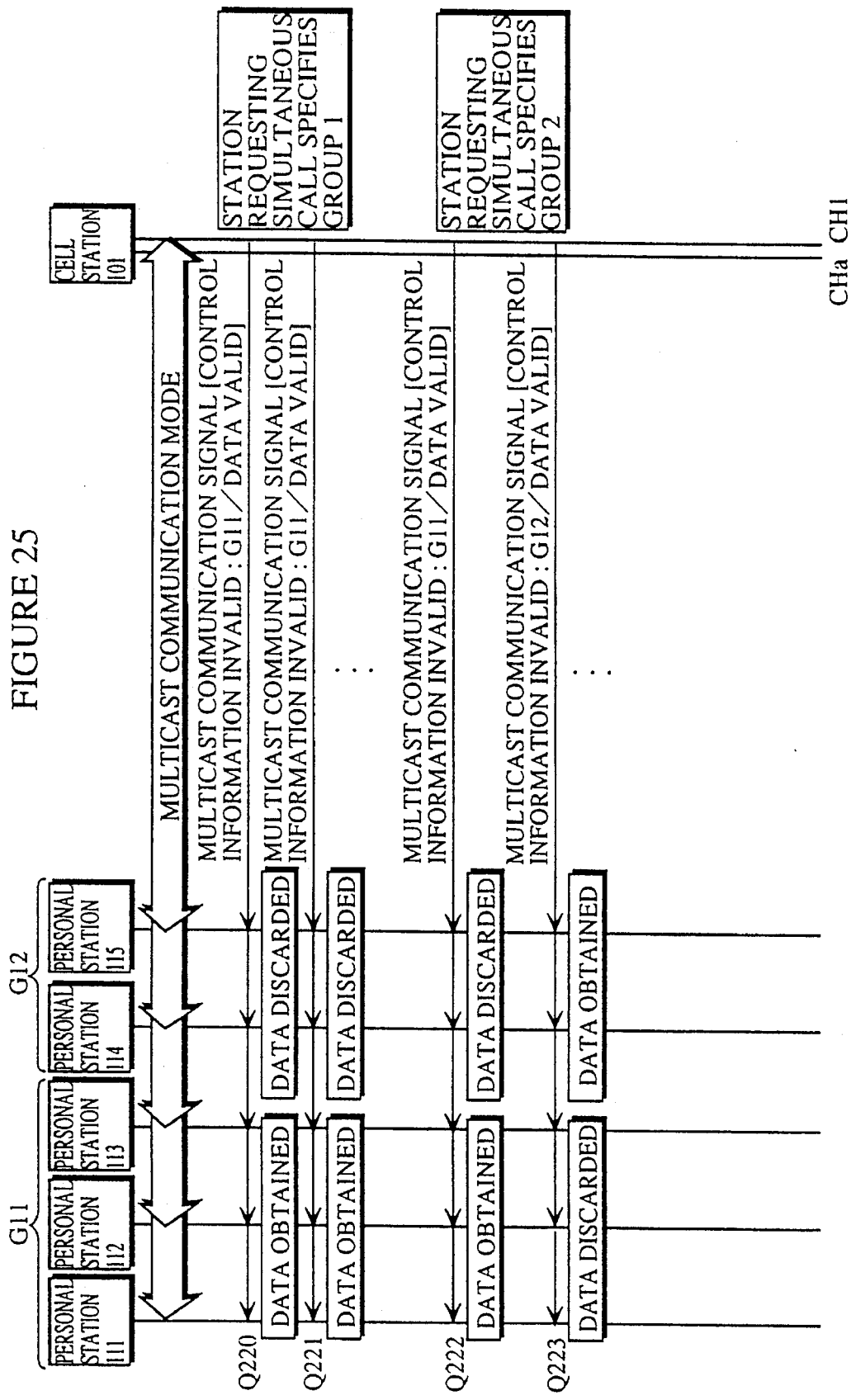
FIG. 25 is a sequence chart showing the group specified simultaneous call control sequence in the present embodiment.

FIG. 25 is a sequence drawing for the multicast communication operation executed according to a group specification. In this example, personal stations 111–113 belong to group 1 and personal stations 114–115 belong to group 2. Groups 1 and 2 are allocated the group numbers G11 and G12 respectively for identification purposes.

At the start of this process, the station which requested the simultaneous call (which can be the cell station) is executing multicast communication with the personal stations 111–115 on communication channel CH1 via the cell station 101.

If there is a group indication from the station which requested the simultaneous call for a group to which the transmission data is to be sent, then the cell station 101 sets this group number as the control information of the multicast communication signal SG2 before transmitting (Q220–Q223). Here, if the station which requested the simultaneous call is to perform point-to-multipoint communication indicating group 1, then the cell station 101, specifies group number "G11" in the control information of the multicast communication signal SG2, and stores the multicast data to be multicast transmitted in the multicast information field.

Next, when the personal stations 111–115 receive the multicast communication signal SG2 (Q220–Q223), the group number stored in the control information is referenced, with personal stations whose group number agrees with the specified group number obtaining the multicast data in the multicast information field, while personal stations whose group number does not agree with the specified group number discard the multicast data. In this example, since the specified group number is G11, personal stations 111–113 obtain the multicast data while personal stations 111–115 discard it.

(4.4) Group Number Allocation Operation During Multicast Communication

Figure 26:
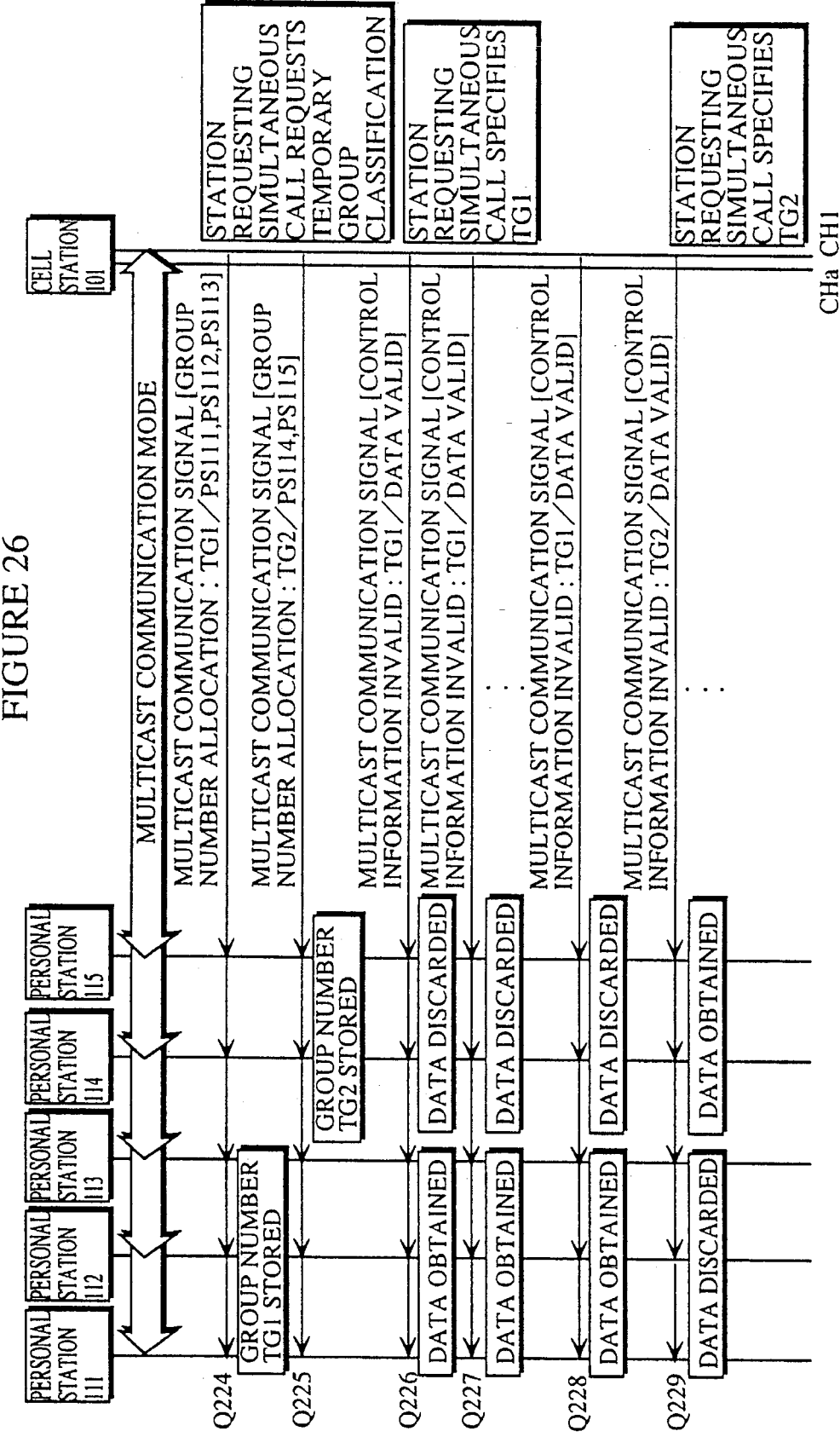
FIG. 26 is a sequence chart showing the group number allocation control sequence in the present embodiment.

FIG. 26 is a sequence drawing showing the group number allocation operation during multicast communication. At the start of the sequence, the station which requested the simultaneous call (which can be the cell station) is executing multicast communication via the cell station 101 to all of the personal stations 111–115 in the radio cell 110 using communication channel CH1. In this example, during multicast communication mode, personal stations 111–113 are temporarily set as group 1, while personal stations 114–115 are temporarily set as group 2, with groups 1 and 2 being allocated the group numbers TG11 and TG12 for purposes of identification.

If a request for group number allocation of the receiver personal stations is received from the station which requested the simultaneous call, the cell station 101 transmits the multicast communication signal SG2 as the group number storage indication signal (Q224). At this point, the cell station 101 temporarily sorts each of the personal stations in its radio cell in accordance with the request from the station which requested the simultaneous call, and, in the multicast communication control field of the multicast communication signal SG2 sent as the group number storage indication signal, sets "Group number allocation" as the control classification, the group number "TG11" as the control information, and the PSIDs of the personal stations classified into group 1 "PS111, PS112, PS113" in the multicast information field.

Next, the personal stations 111–115, on receiving the multicast communication signal SG2 sent as the group number storage indication signal, refer to the PSIDs in the multicast information field, and if their PSID is included, store the group number indicated by the control information, and from here on perform reception of the multicast communication signal according this set group number. On the other hand, if their PSID is not included, they discard the signal. Since in this example, the PSIDs "PS111, PS112, PS113" are indicated in the multicast information field, personal stations 111–113 store the group number "TG11".

Next the cell station 101 sets in the multicast communication control field of the multicast communication signal SG2 sent as the group number storage indication signal, "Group number allocation" as the control classification, the group number "TG12" as the control information, and the PSIDs of the personal stations classified into group 2 "PS114, PS115" in the multicast information field, before transmitting (Q225), thereby indicating to personal stations 114 and 115 to store the group number "TG12". In this way, the station which requested the simultaneous call an multicast transmit data, using the temporarily allocated group numbers TG11, TG12, indicating a group number in the same way as in the operation shown in FIG. 25.

(4.5) Polling Control Operation

Figure 27:
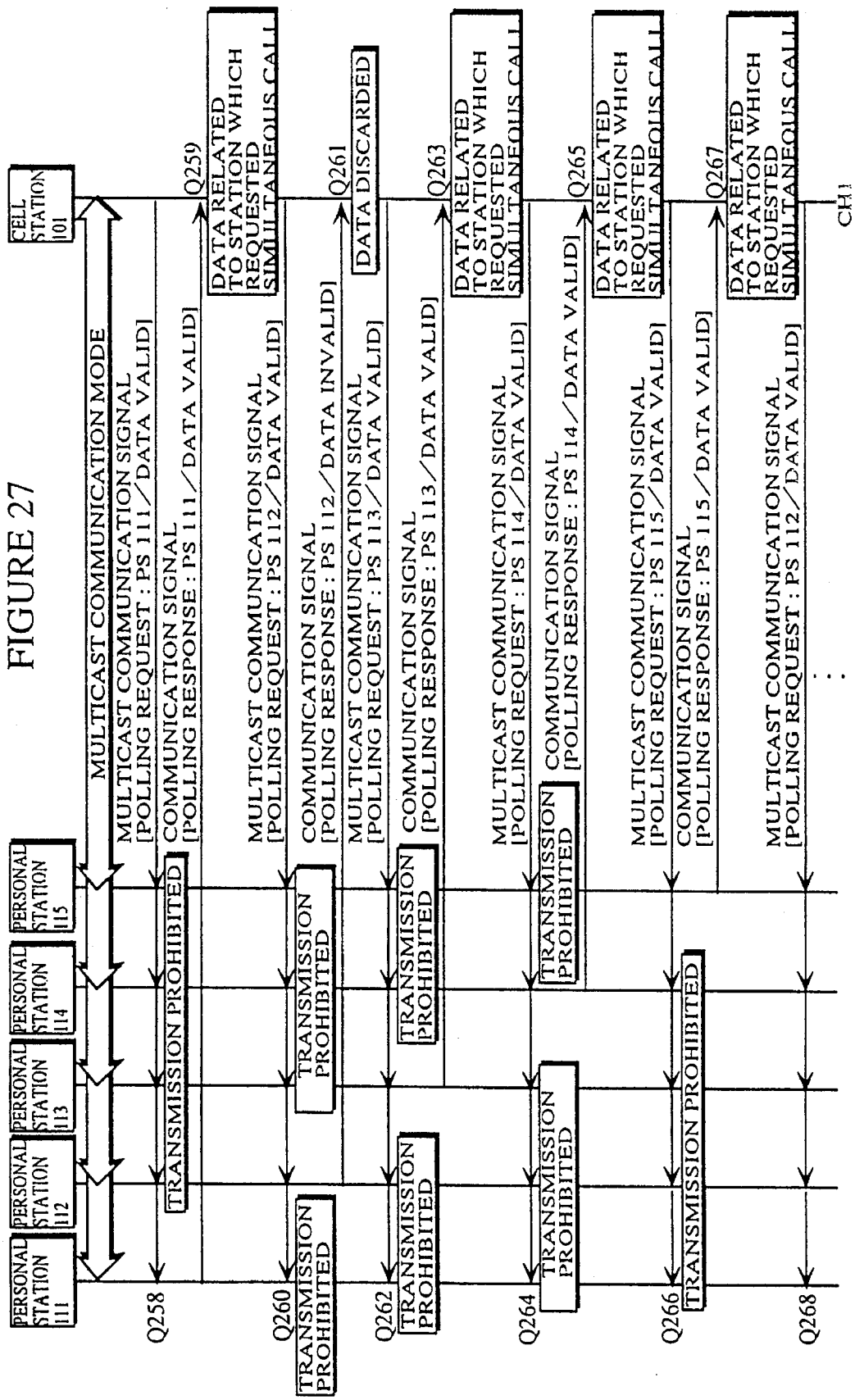
FIG. 27 is a sequence chart showing the cell station polling control sequence in the present embodiment.

FIG. 27 is a sequence diagram showing the polling operation during multicast communication. At the start of this sequence, multicast communication is being executed between the station which requested the simultaneous call (which can be the cell station) and the personal stations 111–115 on the communication channel CH1 via the cell station 101.

The cell station 101, by setting the polling request information in the multicast control field of the multicast communication signal SG2 and transmitting to the personal stations 111–115, grants transmission permission to each of the personal stations 111–115 one at a time. Here, it sets "Polling request" as the control classification in the multicast control field as the polling request information and the "PSID" of the station to be polled as the control information. Also, when there is data to be transmitted from the station which requested the simultaneous call, then this data is stored in the multicast information field and the information flag is set as "Data valid".

In order to grant transmission permission to the personal station 111, the cell station 101 sets "Polling request" as the control classification in the multicast control field of the multicast communication signal SG2 and sets "PS111" as the control information, before transmitting to personal stations 111–115 (Q258).

Among all of the personal stations 111–115 which receive the multicast communication signal SG2, only the personal station 111 being polled is granted transmission permission, so that it transmits the communication signal SG3 as the polling response signal to the cell station 101 (Q259). At this point, "Polling response" is set as the control classification in the communication control field of the communication signal SG3 sent as the polling response signal. Also, when there is a transmission request at its own station, then "Data" is stored in the information field and the information flag is set as "Data valid". On the other hand, transmission for the personal stations 112–115 which are not being polled is prohibited, so that they continue receiving the multicast communication signal SG2 from the call station 101 on the communication channel CH1. Next, when the cell station 101 receives the communication signal SG3 as the polling response signal from the personal station 111, if the indication "Data valid" is in the information flag, the "Data" stored in the information field is then obtained and is relayed to the station which requested the simultaneous call.

Next, in order to grant transmission permission to the personal station 112, the cell station 101 sets "Polling request" as the control classification in the multicast control field of the multicast communication signal SG2 and sets "PS112" as the control information, before transmitting to personal stations 111–115 (Q260). By doing so, in the same way as above, the polled personal station 112 can transmit the communication signal SG3 as the polling response signal to the cell station 101 (Q261).

Thereafter the same process is repeated for all of the personal stations.

Fifth Embodiment

The construction for mobile communication in the fifth embodiment is principally the same as that of the first to fourth embodiments shown in FIGS. 1 to 3, with the tables also being of roughly the same composition as that shown in FIGS. 4A and 4B. Construction elements which are the same as the before will not be explained, and instead the following description will focus on the differences.

The principle difference with the first to fourth embodiments is that in this embodiment the communication control unit 203 of the cell station 101 shown in FIG. 2 is equipped with a function for having all of the personal stations detect the communication channels before it transmits the simultaneous call signal, while the communication control unit 303 in the personal station shown in FIG. 3 is equipped with a function detecting the communication channels according to requests from the cell station.

In order to do this, the communication control unit 203 of the cell station uses "Carrier sensing request (0000 0011B)" in the control classification field of the simultaneous call signal shown in FIG. 7. On such an occasion, the communication control unit 203 sets the communication channel to be sensed in the control information field along with the "Carrier sensing request". "Carrier sensing request (0000 0011B)" refers to a request by the cell station to the personal stations for carrier sensing on the communication channel indicated in the control information field. Here, carrier sensing means the reception of electrical waves on the communication channel and judging whether the reception level exceeds a stipulated level, thereby investigating whether the communication channel is usable.

In the same way, the communication control unit 303 in the personal station uses the "Carrier sensing response (0000 0101B)" in the control classification field of the communication signal shown in FIG. 13, which it transmits not on a communication channel but on the control channel. "Carrier sensing response" refers to the transmission of the carrier sensing result. At such a time, the communication control unit 303 sets the carrier sensing result (whether said channel is usable/not usable) as well as the "Carrier sensing response".

Figure 28A:
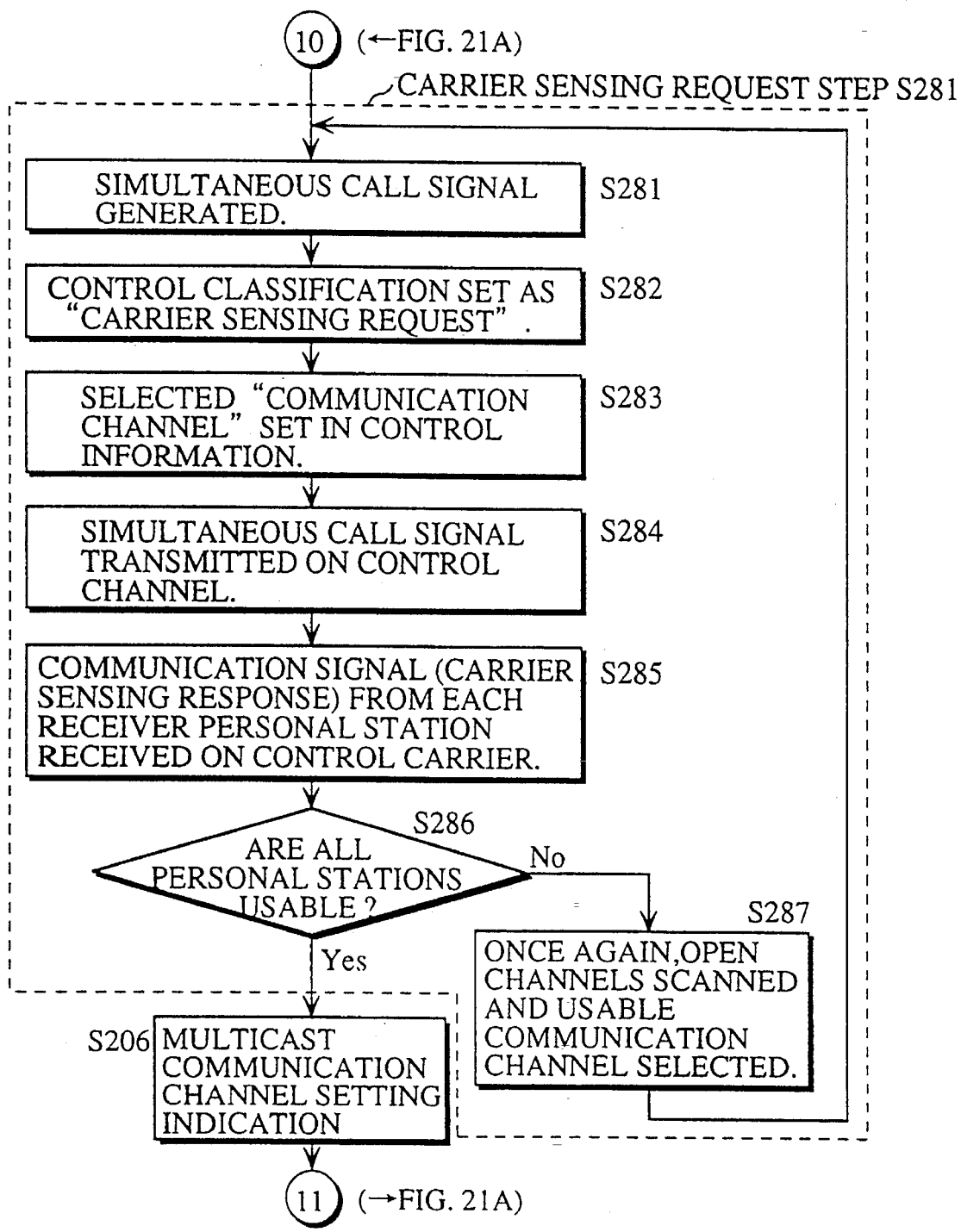
FIG. 28A is a simultaneous call process flowchart according to carrier sensing by the cell station in the fifth embodiment.
Figure 28B:
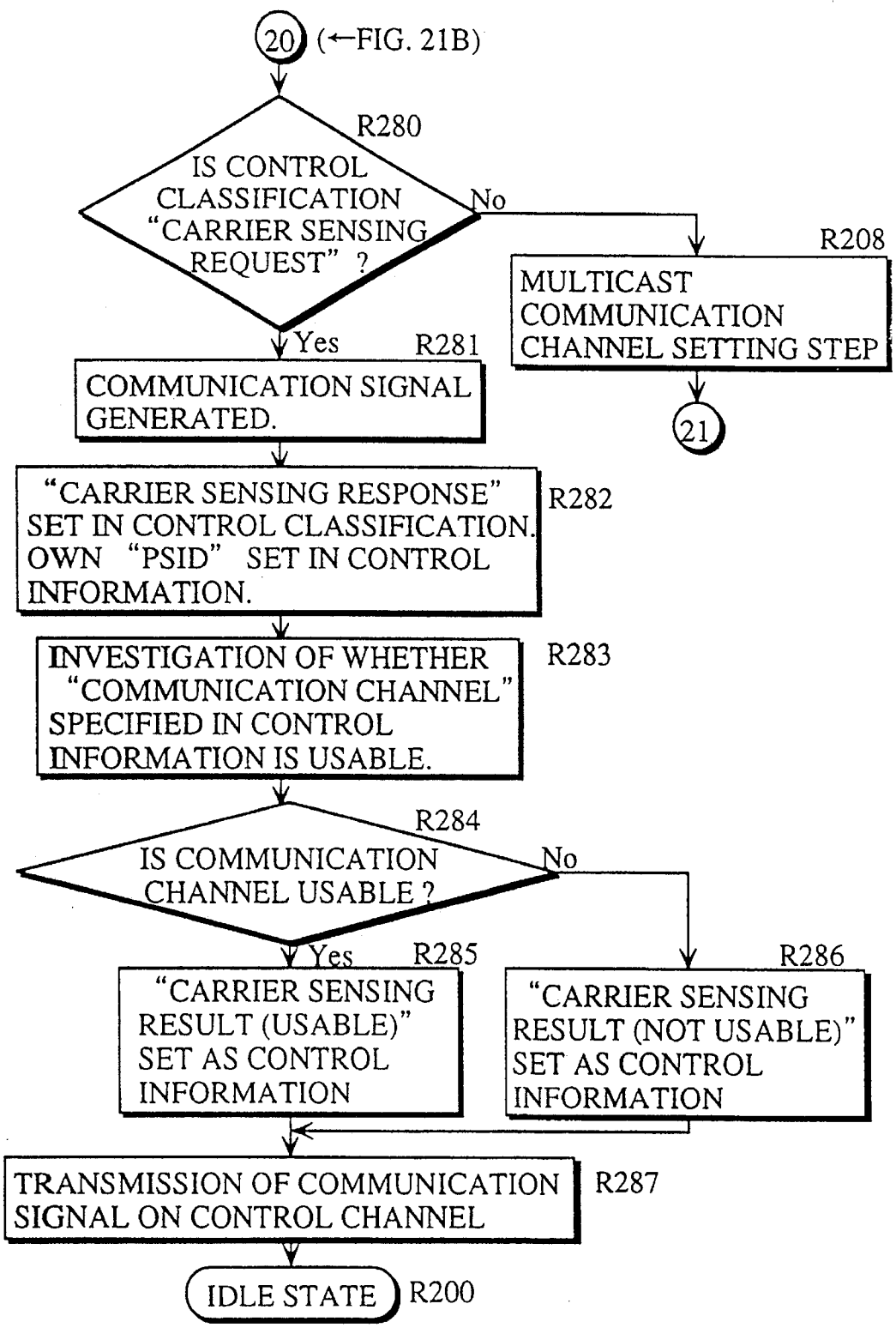
FIG. 28B is a simultaneous call process flowchart according to carrier sensing by a receiver station in the present embodiment.

FIGS. 28A, 28B are flowcharts respectively showing the details of the carrier sensing request process for the communication control unit 203 of the cell station and the details of the carrier sensing response process for a communication control unit 303 in a receiver personal station.

During the simultaneous call process shown in FIG. 21A, the communication control unit 203 of the cell station, in place of the multicast communication channel indication step S206 (between (10) and (11) in FIG. 21A), performs the process shown by the carrier sensing request step S280 (between (10) and (11) in FIG. 28A) shown in FIG. 28A. As shown in FIG. 28A, after selecting the communication channel, if the received call request is a request for a simultaneous call (S205:Yes), the communication control unit 203 generates a simultaneous call signal for all of the personal stations (S281), setting "Carrier sensing request" in the control classification field and "Selected communication channel number" in the control information field (S282, S283), before sending the simultaneous call signal on the control channel (S284). Following this, the communication control unit 203 receives the communication signal (carrier sensing response) from each of the receiver personal stations (S285) and, if the carrier sensing response for every receiver personal station is "usable" (S286:Yes), then, after executing the process shown in the multicast communication channel setting indication step S206, it waits for the necessary time for the receiver personal stations to switch to the said communication channel (S213 in FIG. 21A), before switching into multicast communication mode (S214).

If the carrier sensing response one or more receiver personal station is "not usable" (S286:No), then the communication control unit 203 scans the communication channels and selects a usable communication channel (S287), before returning to S281.

On the other hand, during the simultaneous call process shown in FIG. 21B, the communication control units 303 of the personal stations, in place of the multicast communication channel setting step S208 (between (20) and (21) in FIG. 21B), perform the process shown as the carrier sensing response process (between (20) and (21) in FIG. 28B) shown in FIG. 28B. As shown in FIG. 28B, on receiving the simultaneous call request (S204: Yes in FIG. 21B), if the control classification is not "Carrier sensing request" (R280:No), then the multicast communication channel setting process is performed (R208).

If the control classification in the simultaneous call signal is "Carrier sensing request" (R280:Yes), then the communication control unit 303 generates the communication signal, setting "Carrier sensing response" in the control classification field (R281, R282), and carrier sensing the communication channel indicated in the control information field of the simultaneous call signal, thereby detecting whether it is usable. More specifically, the communication control unit 303 receives the electric waves on the indicated communication channel for a fixed time period and, by detecting whether the level of the received signals exceeds a stipulated level, judges whether the communication channel in question is usable (R283). If the detected result is "usable" (R284:Yes) then it sets the control information in the communication signal as "Carrier sensing result (usable)" (R285), while if the detected result is "not usable" (R284:No), then it sets the control information in the communication signal as "Carrier sensing result (not usable)" (R286), before it transmits the communication signal on the control channel to the cell station (R287), before returning to its idle state (R200).

The following is a description of the operation for mobile transmission in this fifth embodiment constructed as described above, with (5.1) below being the simultaneous call operation according to multicast channel detection.

Figure 29A:
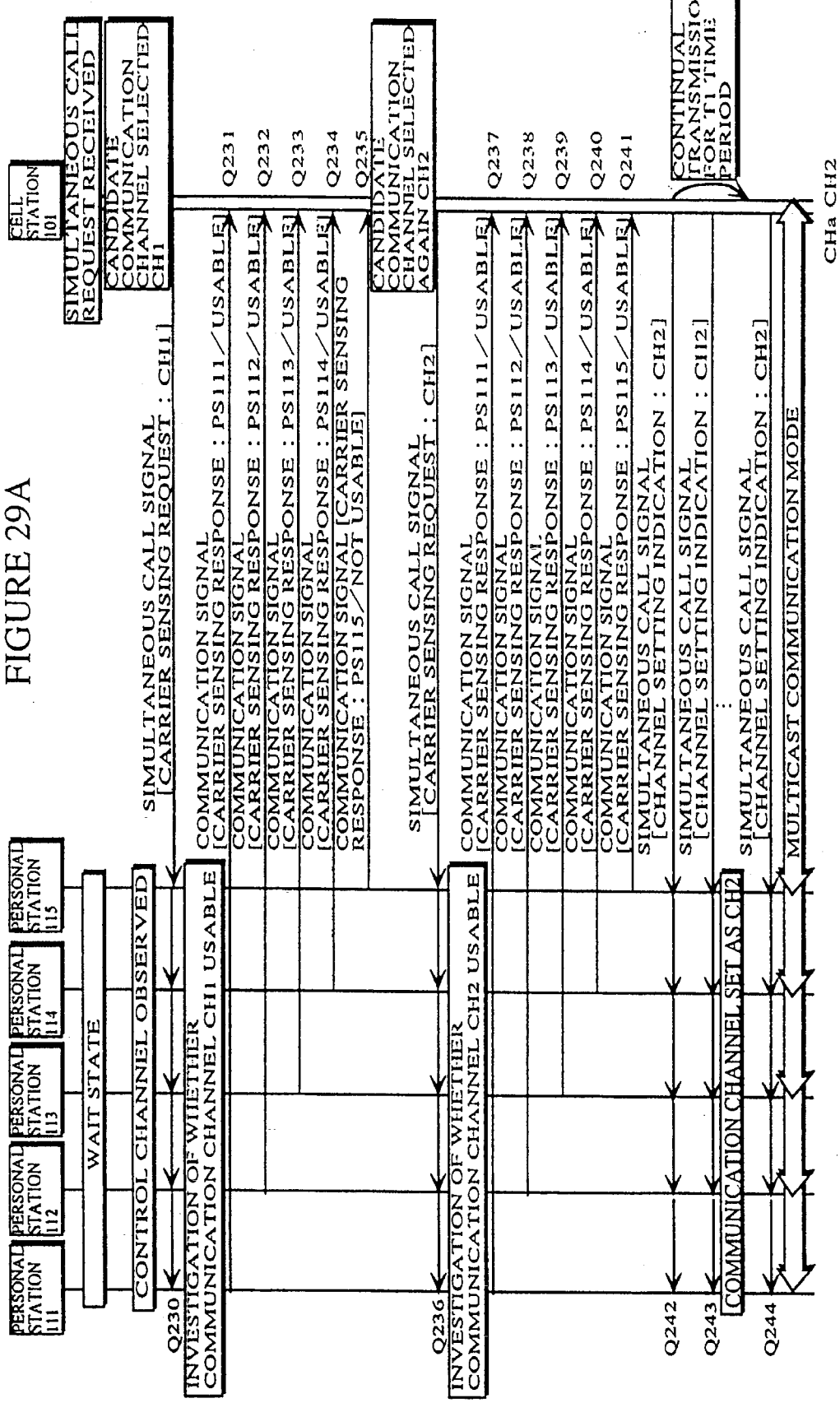
FIG. 29A is a sequence chart for the simultaneous call sequence according to carrier sensing in the present embodiment.

(5.1) Simultaneous Call Operation by the Cell Station in Accordance with a Channel Sensing Request FIG. 29 is a sequence chart showing the control quence for the multicast communication channel detection.

If a simultaneous call request is issued by the cell station 101 for the personal stations 111–115 in its radio cell 110, or if a simultaneous call request is received from another station 121 connected via the communications network 120, then the cell station 101 transmits the simultaneous call signal as the carrier sensing request signal on the control channel CHa to all of the personal stations in the radio cell 110 (Q230). At this time, before sending the simultaneous call signal SG1, the cell station 101 scans the open communication channels and out of the number of communication channels selects the communication channel candidate CH1 to be used for multicast communication, setting in the simultaneous call control field of the simultaneous call signal SG1, the control classification "Carrier sensing request" and the communication channel candidate "CH1" in the control information.

The personal stations 111–115 in the radio cell 110 continually observe the control channel CHa used by the cell station 101 and, on receiving the simultaneous call signal SG1 sent as the carrier sensing request signal, perform carrier sensing of the communication channel candidate CH1 for a fixed time period. If the reception level exceeds the stipulated level, then it is judged that the communication channel candidate CH1 is not usable. In this example, for personal stations 111–114 the judgment is "usable", with only the judgement for personal station 115 being "not usable". This can be caused, as shown in the example in FIG. 29B, by another personal station 511 using CH1 for communication with another cell station 501 near personal station 115, so that since personal station is within the range of the radio signal from personal station 511 (shown by the broken circular line), the reception level detected by personal station 115 is higher due to the radio signal from the personal station 511, resulting in the carrier sensing result that CH1 is not usable.

After performing the carrier sensing, the personal stations 111–115 successively transmit the communication signal SG3 as the carrier sensing response signal reporting the detection result of "usable/not usable" to the cell station 101 on the control channel CHa at a time cycle predetermined for each personal station, before waiting for a response. At this time, the control classification in the communication signal SG3 sent as the carrier sensing response is set as "Carrier sensing response", while the "PSID" of the personal station which transmitted the communication signal SG3 and the "Carrier sensing result (usable/not usable)" are set in the control information. In the example shown in FIG. 29B, the carrier sensing result for personal stations 111–114 is "usable" (Q231–Q234) while for personal station 115 it is "not usable" (Q235). When transmitting the carrier sensing response signal, each personal station transmits its signal timed so as not to interfere with the signals from the other personal stations. For example, each personal station generates a random number, before transmitting at a time slot set according to each random number. As a more reliable technique, each personal station carries out a calculation using its own PSID as one of the parameters (for example, time of reception+(PSID/a constant)*transmission cycle), thereby setting the time for transmission. Since every PSID is allocated exclusively to each personal station, performing a fixed calculation using the PSID will generate a transmission time which is unique to each personal station.

Following this, the cell station 101 receives the communication signals SG3 sent as the carrier sensing responses and, if there is one or more carrier sensing response which is "not usable", then it reselects the communication channel candidate (in FIG. 29B the communication channel CH2 is selected), and transmits the simultaneous call signal SG1 as the carrier sensing request signal (Q236).

If all the carrier sensing responses from the personal stations 111–115 are "usable" (Q237–Q241), then the cell station 101 judges that the communication channel candidate may be used as the communication channel, and by sending the simultaneous call signal SG1 on the control channel CHa to all of the personal stations in the radio cell (Q244), commences multicast communication control.

Sixth Embodiment

The construction for mobile communication in the sixth embodiment is principally the same as that of the fourth embodiment shown in FIGS. 1 to 3, with the tables also being of roughly the same composition as that shown in FIGS. 4A and 4B. Construction elements which are the same as the before will not be explained, and instead the following description will focus on the differences.

The principle difference is that the communication control unit 203 in the cell station shown in FIG. 2 is equipped with a function for confirming the channel setting responses sent from each of the personal stations directly after a simultaneous call, while the communication control unit 303 in each personal station shown in FIG. 3 is equipped with a function for transmitting a channel setting response on a communication channel in response to the channel setting indication in the simultaneous call signal from the cell station.

As a result, the communication control unit 303 in each personal station uses "Channel setting response (0000 0110B)" in the control classification field of the simultaneous call signal shown in FIG. 13. On such an occasion, the communication control unit 303 sets the channel setting result in control information field, in addition to setting the channel setting response. "Channel setting response" shows whether the channel setting by the personal station of the communication channel indicated by the cell station was successful or not (setting completed or not completed). Channel setting failures can be caused by an inability to set the communication channel due to electrical interference due to other personal stations being nearby, and in the same way as channel sensing is found by judging the reception level on the communication channel in question. If the channel setting is successful, then the communication control unit 303 transmits the communication signal (channel setting response) to the cell station using the set communication channel, while if the channel setting is unsuccessful, then the communication control unit 303 transmits the communication signal (channel setting response) to the cell station using the control channel.

Figure 30A:
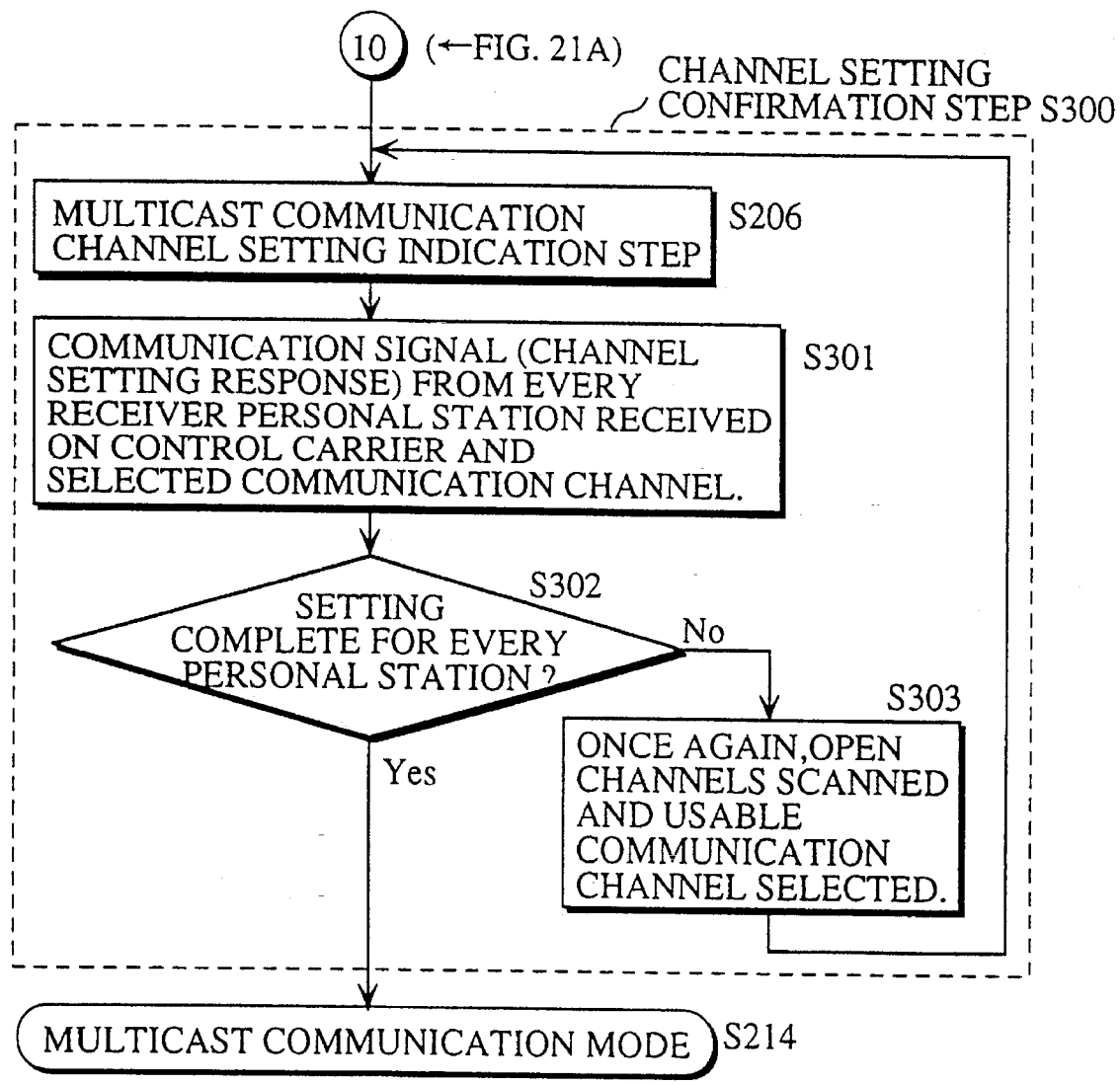
FIG. 30A is a simultaneous call process flowchart according to channel setting confirmation in the sixth embodiment.
Figure 30B:
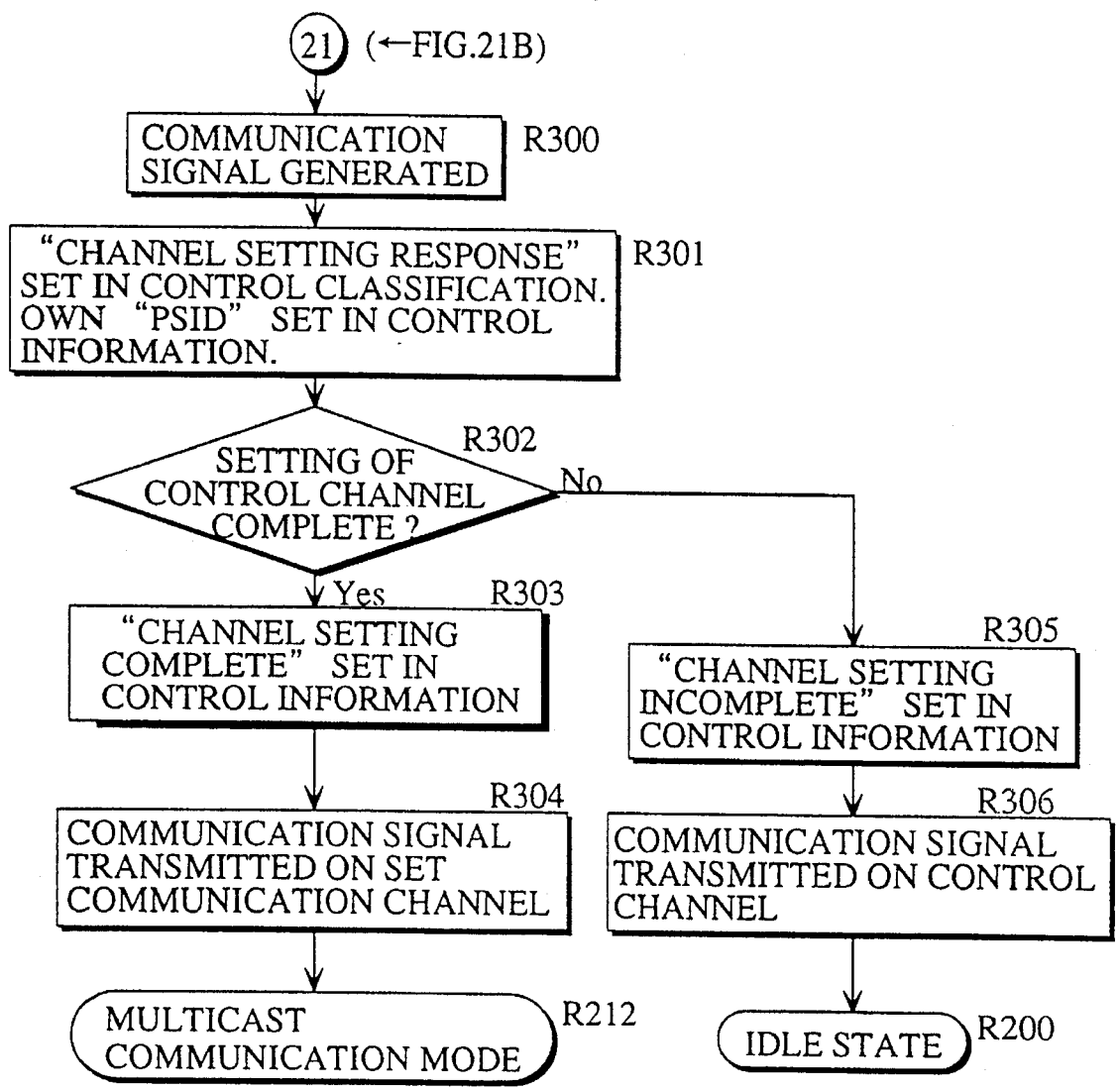
FIG. 30B is a reception processing flowchart according to channel setting confirmation by the receiver personal station in the present embodiment.

FIGS. 30A, 30B are detailed flowcharts showing the channel setting confirmation process by the communication control unit 203 in the cell station and the channel setting confirmation process by the communication control unit 303 in each receiver personal station.

As shown in FIG. 21A, the communication control unit 203, instead of performing the channel indication step S206 (S207–S212) and S212 ((10) onwards in FIG. 21A) in the simultaneous call process, executes the channel setting confirmation step S200 shown in FIG. 30A ((10) onwards in FIG. 30A).

As shown in FIG. 30A, if the received call request is for a simultaneous call (S205:Yes), then the communication control unit 203 executes the channel setting indication process (S206) and receives the communication signals (channel setting responses) from the receiver personal stations on both the control channel and the selected communication channel (S301). Then, if the channel setting was successful for every personal station (S302:Yes), then it switches to multicast communication mode (S214), while if for any of the receiver personal stations setting was unsuccessful (S302:No), then another usable communication channel is selected (S303) and the process returns to step S206.

On the other hand, as shown in FIG. 30B, the communication control unit 303 in each receiver station, instead of performing the simultaneous cell response process R211 ((21) onwards in FIG. 21B), executes the channel setting response step shown in FIG. 30B ((21) onwards in FIG. 30B).

As shown in FIG. 30B, after performing setting process of the multicast communication channel, the communication control unit 303 generates the communication signal (R300), setting "Channel setting response" in the control classification field and its own "PSID" in the control information field (R301) and, when the setting of the communication channel is successful (R302:Yes), sets "Channel setting complete" in the control information (R303) and transmits the communication signal on the set communication channel (S304) before assuming multicast communication mode (R212), while when the setting of the communication channel is unsuccessful (R302:No), sets "Channel setting incomplete" in the control information (R305) and transmits the communication signal on the set control channel (S306) before returning to an idle state (R200).

The following is a description of the operation for mobile transmission in this sixth embodiment constructed as described above, with (6.1) below being the simultaneous cell operation according to multicast channel setting confirmation.

(6.1)

Figure 31:
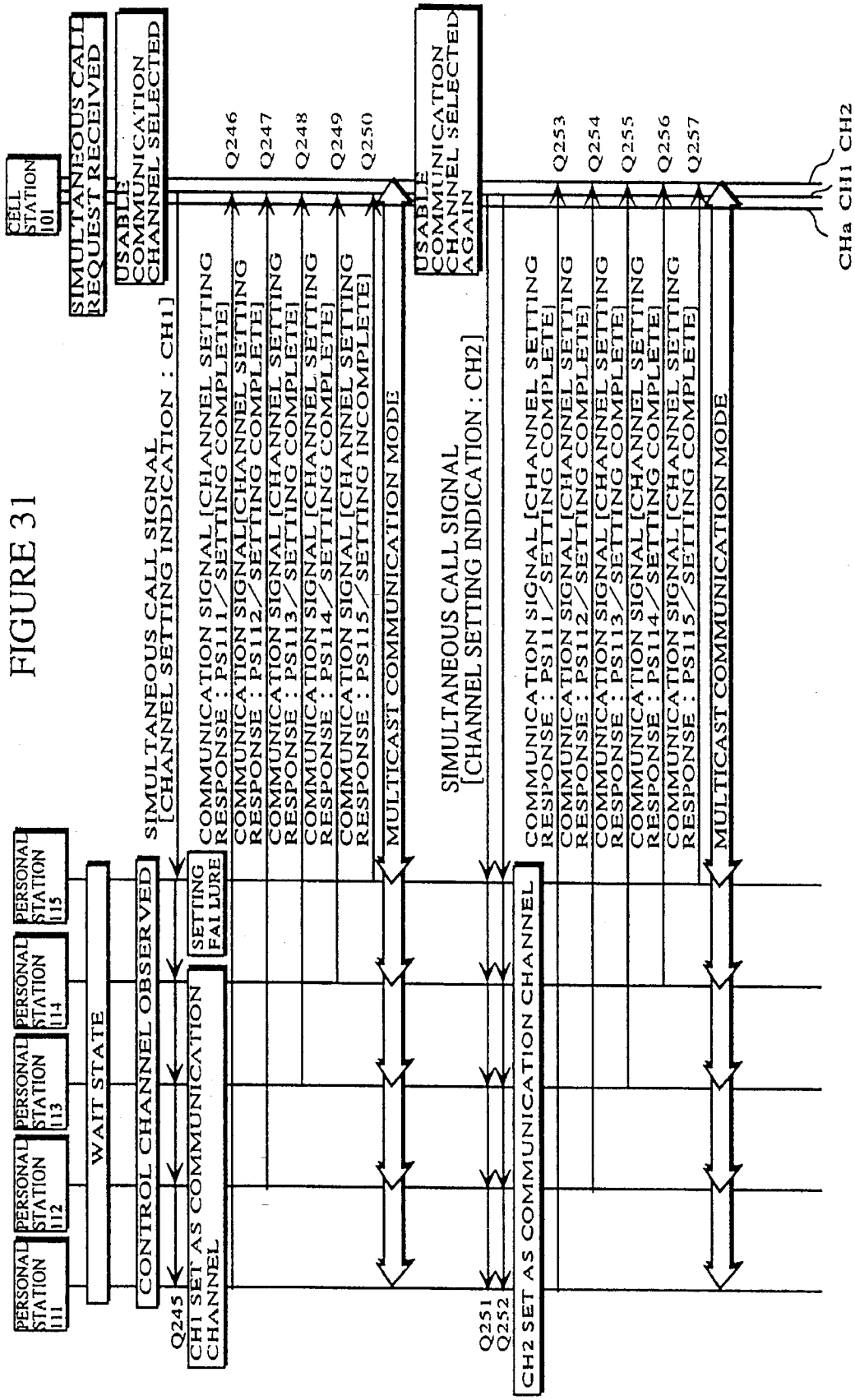
FIG. 31 is a sequence chart showing the channel setting sequence in the present embodiment.

FIG. 31 is a sequence chart showing the control sequence for the multicast communication channel setting confirmation.

Figure 29B:
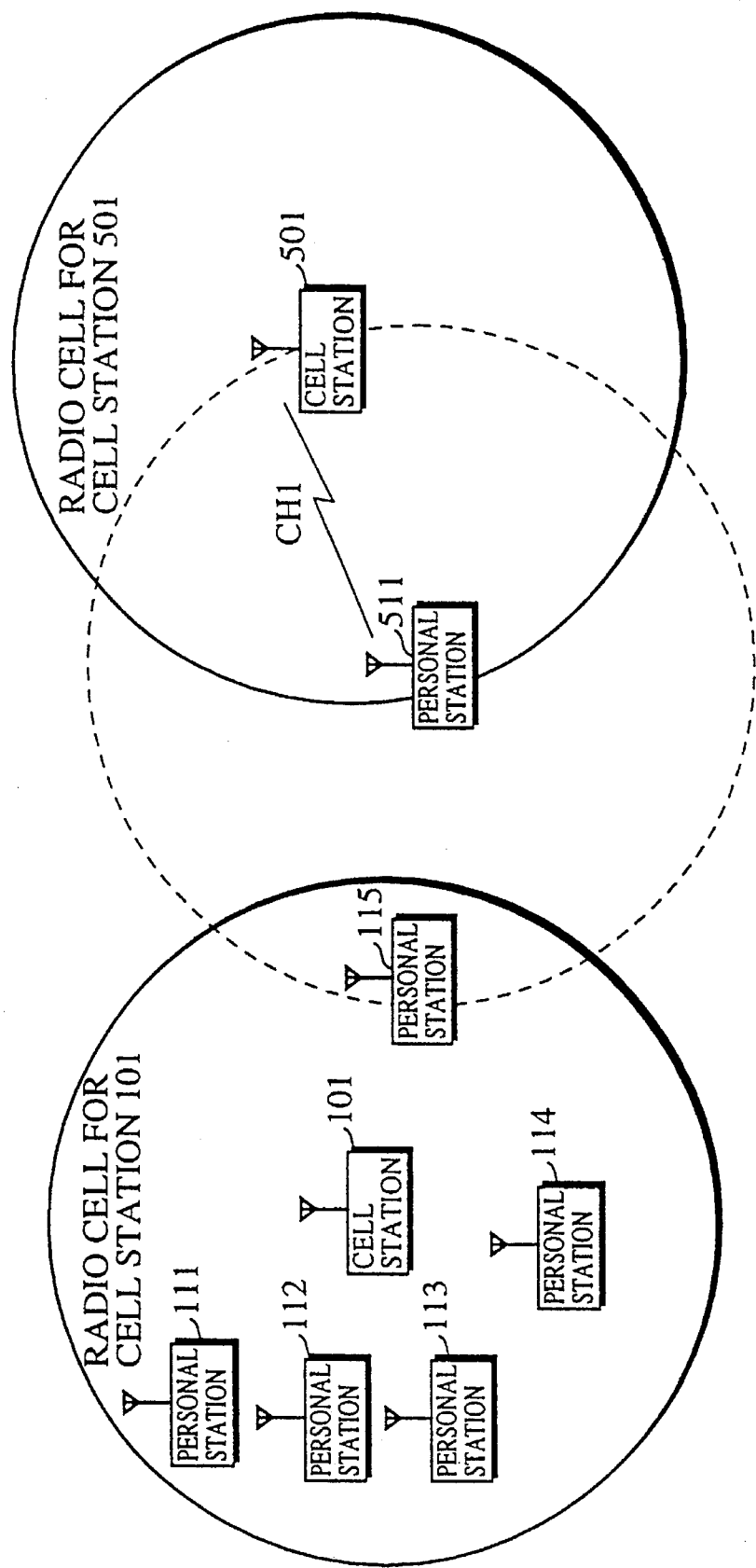
FIG. 29B shows an example of when one of the personal stations receives electrical wave interference.

The personal stations 111–115 in the radio cell 110 continually observe the control channel used by the cell station 101 and, on receiving the simultaneous cell signal SG1 (Q245), attempt to set the communication channel CH1 indicated in the simultaneous call control field as the communication channel for communication with the call station. At this point, as shown in FIG. 29B, personal stations 111–114 can be connected to the cell station 101 using CH1, while, since there is electrical interference from personal station 511, personal station 115 cannot be connected to cell station 101 on communication channel CH1.

In this case, the personal stations 111–114 which have completed the setting of the communication channel send a communication signal SG3 as the channel setting completion signal on communication channel CH1 to the cell station 101 (Q246–Q249), and switch from their wait state to multicast communication mode. On the other hand, the personal station 115 which was unable to complete the setting of the communication channel sends a communication signal SG3 as the channel setting failure signal on the control channel CHa to the cell station 101 (Q250), and remains in its wait state. In doing so, each personal station sets in the communication signal SG3 as the channel setting completion signal, "Channel setting response" in the control classification field, and its own "PSID" and "Channel setting result (setting complete/setting incomplete)" in the control information field. Here, when transmitting the communication signal SG3 as the channel setting response signal, each personal station transmits its signal successively at a predetermined time so as not to interfere with the signals from the other personal stations. For example, each personal station generates a random number, before transmitting at a time slot set according to each random number. As a more reliable technique, each personal station carries out a calculation using its own PSID as one of the parameters (for example, time of reception+(PSID/a constant)*transmission cycle), thereby setting the time for transmission. Since every PSID is allocated exclusively to each personal station, performing a fixed calculation using the PSID will generate a transmission time which is unique to each personal station.

Next, having received the communication signal SG3 as the channel setting failure signal from the personal station 113, the cell station 101 again scans the open channels, and selects the communication channel to be used for multicast communication use (for example, CH2). "CH2" is then set in the simultaneous call control field of the simultaneous call signal SG1, which is then transmitted to all of the personal stations 111–115 in the radio cell using the control channel CHa and the communication channel CH1 which was previously indicated (Q251, Q252). At this point, if connection to the cell station 101 on communication channel CH2 is possible for all of the personal stations 111–115 in the radio cell 101, then each personal station 111–115 sends communication signal SG3 as the channel setting completion signal to the cell station 101 on communication channel CH2 (Q253–Q257). On receiving the communication signal SG3 as the channel setting completion signal from all of the personal stations 111–115 in the radio cell 110, then since the channel setting is complete for every personal station, the cell station 101 switches into multicast communication mode using communication channel CH2.

SEVENTH EMBODIMENT

The construction for mobile communication in the seventh embodiment is principally the same as that of the fourth embodiment shown in FIGS. 1 to 3, with the tables also being of roughly the same composition as that shown in FIGS. 4A and 4B. Construction elements which are the same as the before will not be explained, and instead the following description will focus on the differences.

The principle difference is that the communication control unit 203 in the cell station shown in FIG. 2 is equipped with a function for channel switching and a point-to-point communication switching function within multicast communication mode, while the communication control unit 303 of each personal station is equipped with a function for requesting channel switching, a function for requesting a switch to point-to-point communication with a personal station (terminal) which requested the simultaneous call, and a function for termination multicast communication for itself.

FIG. 33 is a table showing the logical format of the multicast communication signal and the communication signal in this embodiment. The fields are composed in the same way as in FIG. 13, except that the content of the "Control classification field" and the "Control information field" are different.

In the control classification field, "Communication disconnection indication (0000 1100B)" and "Multicast communication disconnection completion (0000 1101B)" are the same as in the fourth embodiment and hence will not be explained.

"Control information invalid (0000 0000b)", "Polling request (0000 0001B)", "Polling response (0000 0001B)", "Press talk request (0000 0010B)", "Press talk reception (0000 0010B)", and "Cancel press talk (0000 0011B)" are the "Communication disconnection completion (0000 1101B)" are the same as in the third embodiment and hence will not be explained.

"Point-to-point communication request (0000 0100B)" (up) refers to a request by a receiver personal station for the completion of multicast communication and a switch into point-to-point communication via the cell station with the personal station (or terminal) which requested the simultaneous call.

"Point-to-point communication reception (0000 0100B)" (down) refers the an indication of a switch to point-to-point communication between a receiver personal station and the station which requested the simultaneous call, given to the receiver personal station by the cell station.

"Carrier sensing response (0000 0101B)" and "Channel setting response (0000 0110B)" are the same as the fifth and sixth embodiments and hence will not be explained.

"Channel setting indication (0000 0110B)" (down) refers to an indication of a switching from one communication channel for multicast communication use to another.

"Channel switching request (0000 0111B)" (up) refers to a request for a switching from one communication channel for multicast communication use to another.

"Busy tone transmission request (0000 1000B)" (down), "Busy tone (0000 1000B) (up), "Multicast communication participation request (0000 1001B)" (up), and "Multicast communication participation reception (0000 1001B)" (down) are not used in this embodiment.

"Multicast communication information (0000 1010B)" is for informing personal stations which are not participating in multicast communication that multicast communication is presently being executed. For example, if a personal station belonging to a specified group which when executing point-to-point communication when a simultaneous call is made to that group is unable to participate in multicast communication, then, after receiving a disconnection request for the point-to-point communication, the cell station transmits the multicast communication information to the personal station on the communication channel which was used for point-to-point communication.

"Communication disconnection request (0000 1011B)" (up) shows a disconnection request for point-to-point communication or multicast communication from a personal station.

"Communication disconnection indication (0000 1100B)" (up) shows a disconnection indication for point-to-point communication from the cell station to a personal station.

"Multicast communication disconnection indication (0000 1100B)" (down) shows a disconnection indication for point-to-point communication from the cell station to a personal station.

"Communication disconnection completion (0000 1101B)" (up) shows a notification to the personal station which requested communication disconnection of the completion of communication disconnection in response to the "Communication disconnection request".

"Call request (0000 1110B)" (up) shows that there is a call request from one of the personal stations in an idle state to another personal station.

"Individual call (0000 1110B)" (down) shows that there is a call request for one of the personal stations in multicast communication mode form another personal station.

"Reception response (0000 1111B)" (up) is the response for an individual call, and shows that the called personal station received the call.

Also, in the control information field, such information elements as "PSID", "Group number", "Communication channel", "Carrier sensing result", "Channel setting result", "Multicast communication continuation information" and "Multicast communication participation acceptance result" are set so as to supplement the control classification field. A number of elements in this control information field may be set at any one time.

When "PSID" is set in the down direction along with a polling request, then it shows which personal station is to be granted the right of data transmission, while when set in the down direction along with a point-to-point communication reception it shows which personal station should switch to point-to-point communication mode, or when set in the up direction along with any one of a polling response, a press talk request, a point-to-point communication request, a channel switching request, or a communication disconnection request shows the receiver personal station which is currently transmitting.

When "Group number" is set along with a press talk request, it shows the group to which multicast communication is being requested, while when set along with a press talk reception it shows the group to which multicast communication is being performed.

When "Multicast communication continuation information" is set along with point-to-point communication request in the control classification field, it becomes either "Multicast continuation" or "Multicast termination", which shows whether the personal station which is to switch to point-to-point communication should continue multicast communication or terminate multicast communication.

"Multicast communication participation acceptance result" is not used in this embodiment.

FIGS. 32A, 32B, 32C, and 32D are flowcharts showing the channel switching/point-to-point communication switching process for the cell station, the communication disconnection reception process, the channel switching/point-to-point communication switching process for the personal station and the channel switching/point-to-point communication switching/multicast communication termination process for the personal station, respectively.

Figure 32A:
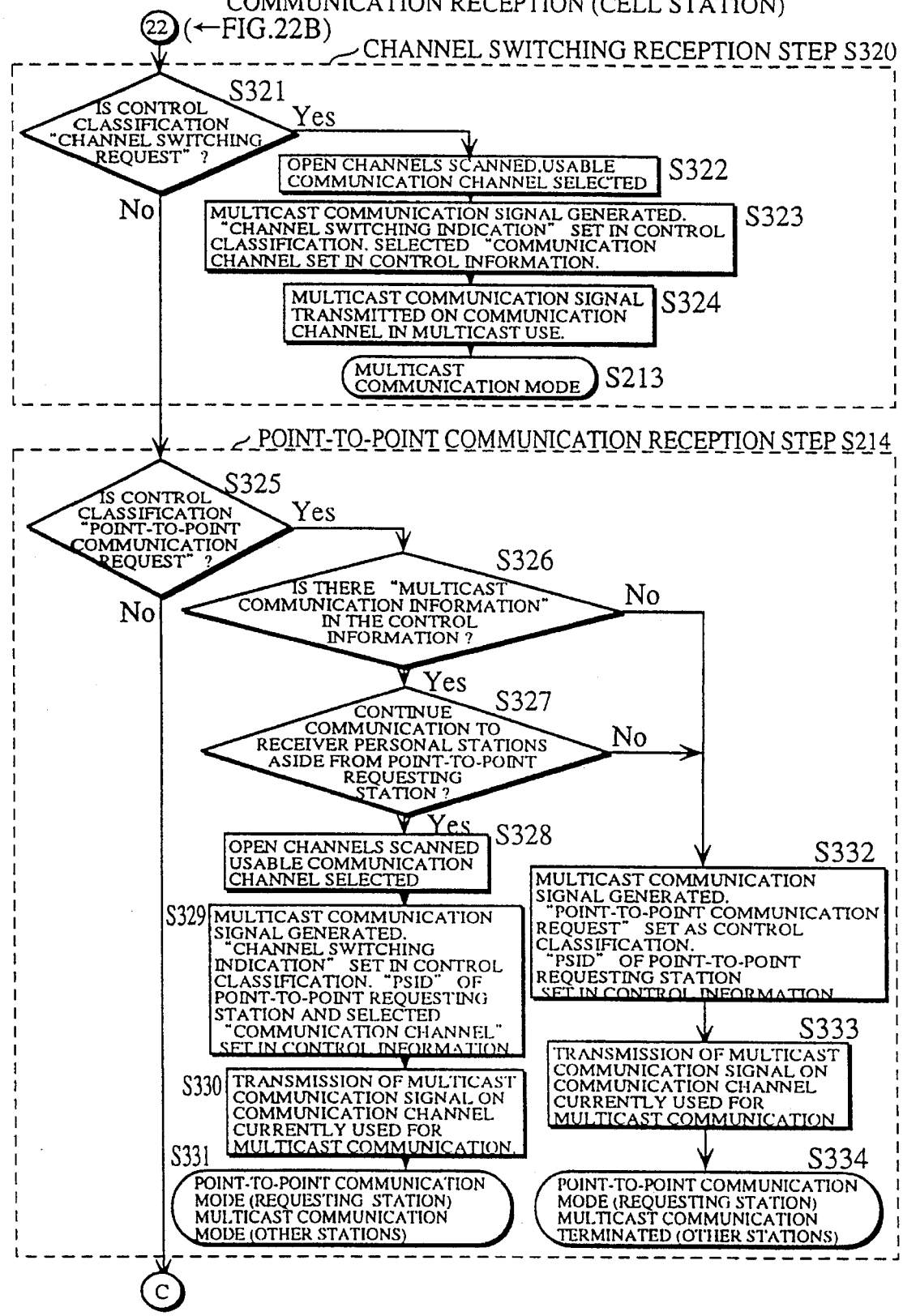
FIG. 32A is a flowchart showing the channel switching reception/point-to-point communication reception process for the cell station in the seventh embodiment.
Figure 32B:
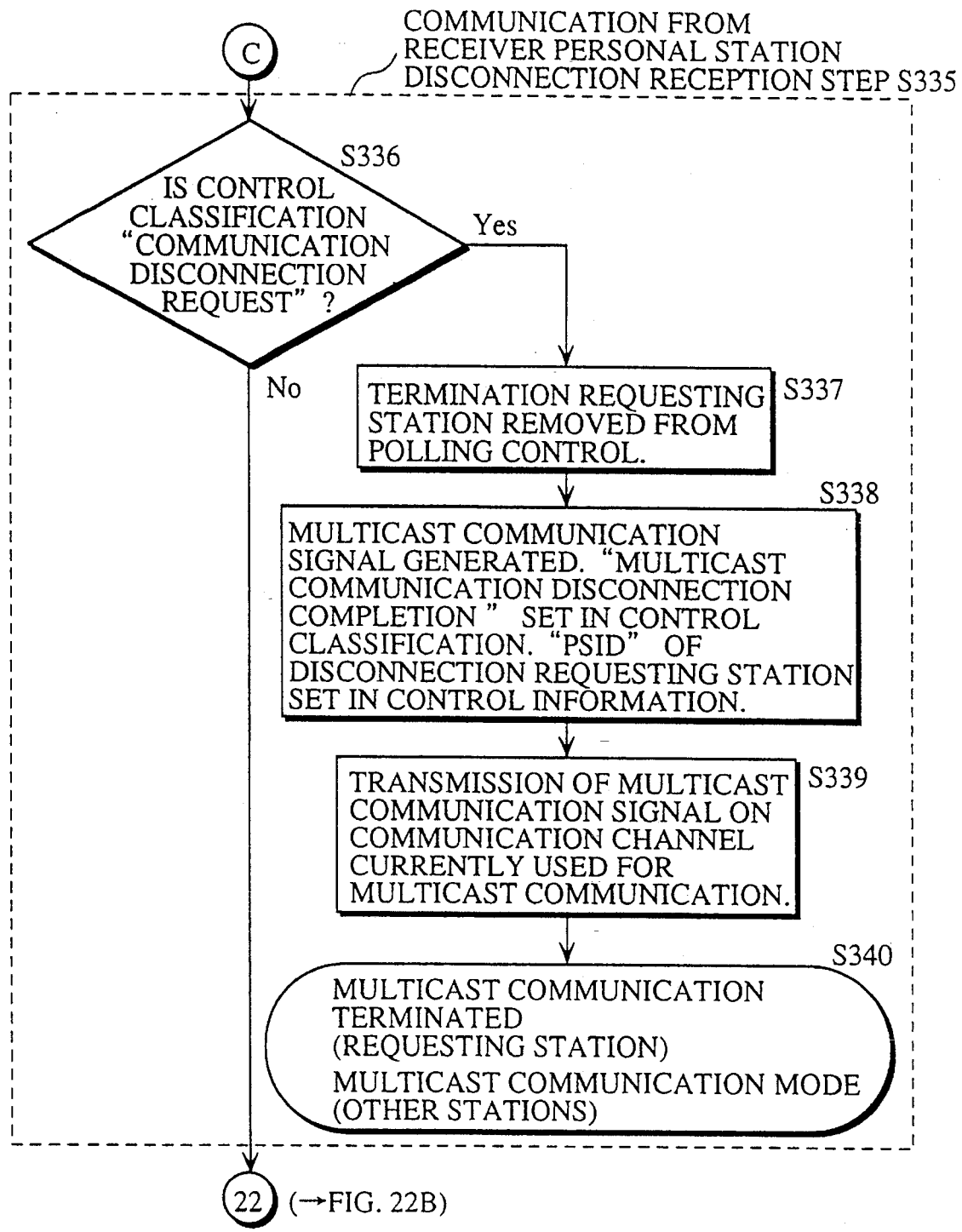
FIG. 32B is a flowchart showing the channel switching reception/point-to-point communication reception process (continued) for the cell station in the same embodiment.

Channel Switching Request Reception,
Point-to-Point Communication Reception Process The communication control unit 203 executes the additional processes shown in FIGS. 32A and 32B between the steps S237 and S238 during the polling response data sorting step shown in FIG. 22B.

As shown in FIG. 32A, after receiving the communication signal from the receiver personal stations in the multicast communication mode, if the control classification field of the communication signal is "Channel switching request (0000 0111B)" (S321:Yes), then the communication control unit 203 scans the communication channels and selects an unused channel (S322), generates the multicast communication signal, setting "Channel switching indication (0000 0111B)" in the control classification field and the number of the selected communication channel in the control information field (S323), before transmitting on the communication channel currently being used (S324).

In the same way, if the control classification field of the communication signal is "Point-to-point communication request (0000 0100B)" (S325:Yes), and there is an indication to continue multicast communication to the personal stations aside from the personal station which requested point-to-point communication (S327:Yes), then the communication control unit 203 scans all of the communication channels and selected an unused channel (S328), before generating the multicast communication signal, setting "Channel switching request (0000 0111B)" in the control classification field and the "PSID" of the personal station requesting point-to-point communication in the control information field (S329), before transmitting the multicast communication signal on the communication channel currently being used (S330). In this way, the personal station which requested point-to-point communication switches into point-to-point communication mode, while the other receiver personal stations remain in multicast communication mode (S331). If there is no multicast communication information in the control information field (S326:No), or if there is no indication to continue multicast communication to the personal stations aside from the personal station which requested point-to-point communication (S327:No), then it generates the multicast communication signal, setting "Point-to-point communication reception (0000 0100B)" in the control classification field and the "PSID" of the personal station which requested point-to-point communication in the control information field (S332), before transmitting the multicast communication signal on the communication channel currently being used (S333). In this way, the personal station which requested point-to-point communication switches into point-to-point communication mode, while the other receiver personal stations terminate multicast communication (S334).

Communication Disconnection Reception Process

As shown in FIG. 32B, if the control classification field of the communication signal is "Communication disconnection request (0000 1011B)" (S336:Yes), then the communication control unit 203 of the cell station removes the personal station set in the control information field which made the communication disconnection request from polling control (S337), and generates the multicast communication signal, setting "Multicast communication disconnection completion (0000 1101B)" in the control classification field, and the "PSID" of the personal station which requested communication disconnection in the control information field (S338), before sending the multicast communication signal on the communication channel currently in use (S339). In this way, the personal station which requested communication disconnection terminates its multicast communication mode while the other personal stations remain in multicast communication mode (S340).

Channel Switching Process

Figure 32C:
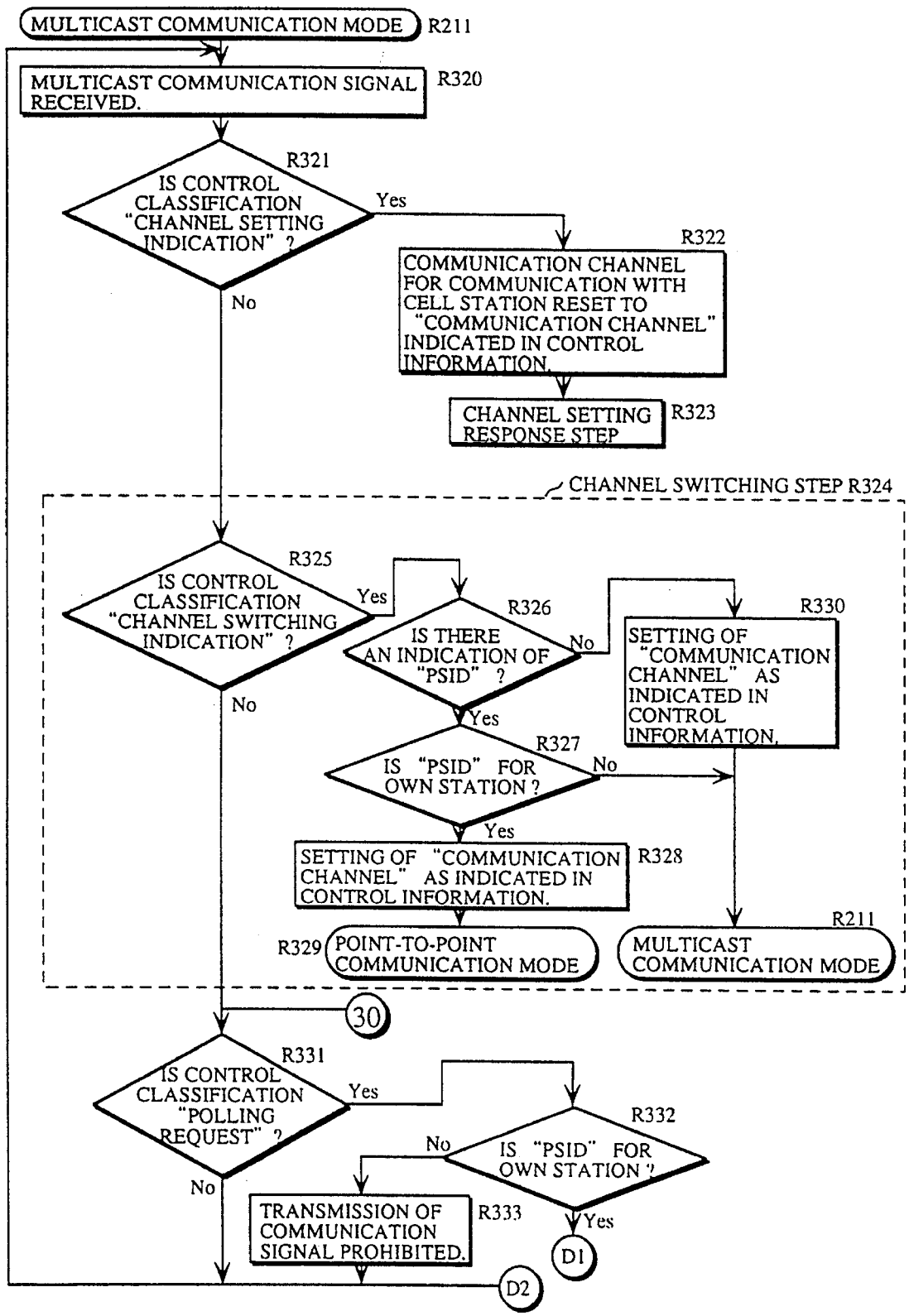
FIG. 32C is a flowchart showing the channel switching process for a receiver personal station in the same embodiment.

If as shown in FIG. 32C, after setting the channel following the simultaneous call from the cell station, the control classification field of the communication signal is "Channel switching indication (0000 0111B)" (R325:Yes), and if there is no PSID indication in the control information field (R326:No), then the communication control unit 303 of the receiver personal station sets the communication channel according to the indication in the control information field (R330), before switching to multicast communication mode (R211). If there is the PSID of another station in the control information field (R327:No), then it stays in multicast communication mode, while if there is the PSID of its own station in the control information field (R327:Yes), it sets the communication channel according to the indication in the control information field (R328), before switching to point-to-point communication mode (R329).

Figure 32D:
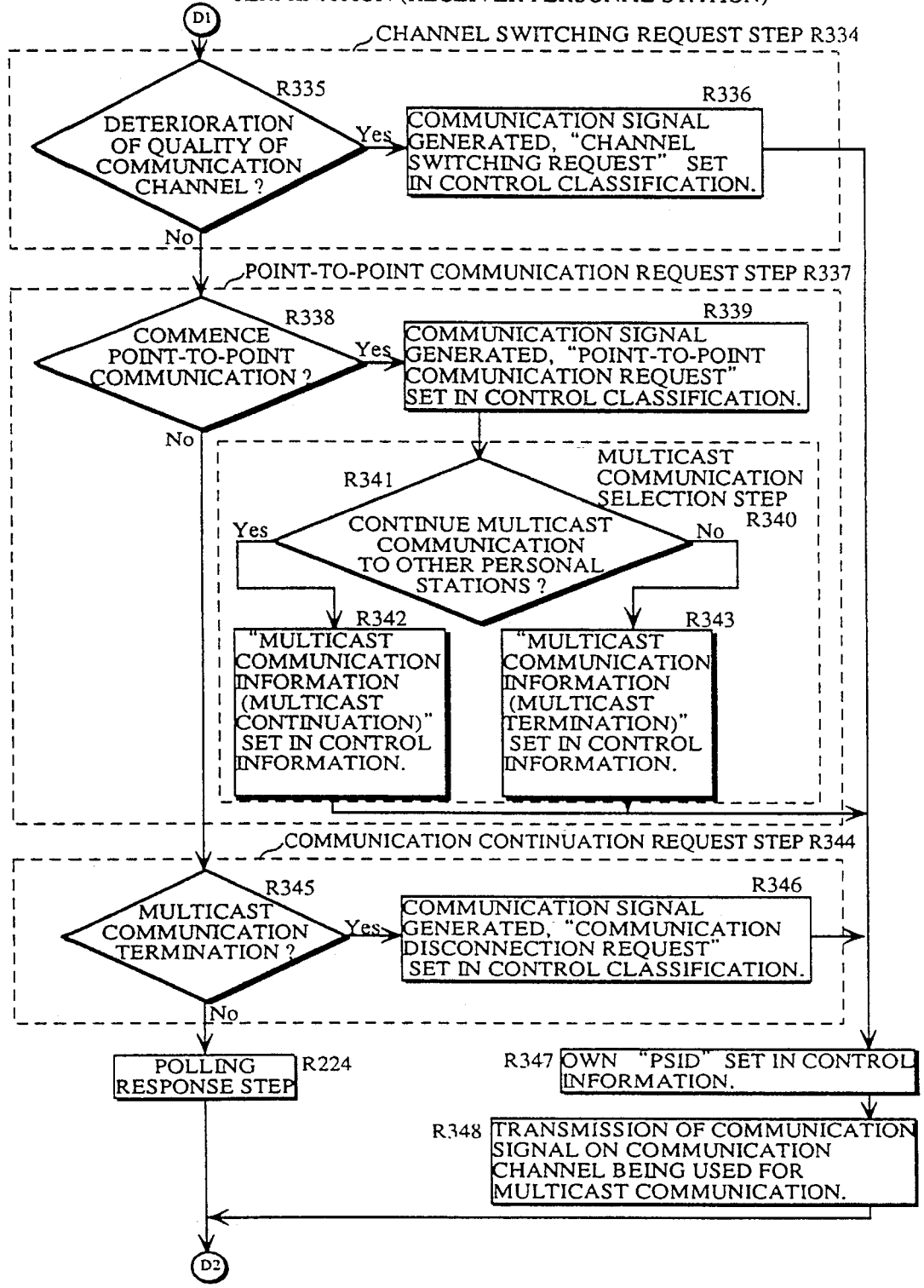
FIG. 32D is a flowchart showing the channel switching process (continued) for a receiver personal station in the same embodiment.

Point-to-Point Communication Transfer for the Cell Station, Multicast Communication Termination Process Also if the multicast communication signal received by the communication control unit 303 is a polling request for it own station (R331:Yes, R332), then it executes the process shown in FIG. 32D.

As shown in FIG. 32D, if there is an indication for channel switching by means of a user operation at a receiver personal station (S335:Yes), then the communication control unit 303 generates a communication signal, setting "Channel switching request (0000 0111B)" in the control classification field (R336) and its own "PSID" in the control information field (R347), before transmitting the communication signal on the communication channel in use (R348).

In the same way, if there is an indication for point-to-point communication by means of a user operation at a receiver personal station (S338:Yes), then the communication control unit 303 generates a communication signal, setting "Point-to-point communication request (0000 0100B)" in the control classification field (R339) and, if there is an indication for continuing multicast communication to the other personal stations by means of a user operation (R341:Yes), then it sets "Multicast communication information (continuation)" in the control information field (R342), while if there is an indication for terminating multicast communication to the other personal stations by means of a user operation (R341:No), then it sets "Multicast communication information (termination)" in the control information field (R343). After this the communication signal is transmitted in the same way as above (R347, R348).

If there is an indication for multicast communication termination by means of a user operation at a receiver personal station (S345:Yes), then the communication control unit 303 generates a communication signal, setting 637 Communication disconnection request (0000 1100B)" in the control classification field (R346) and its own "PSID" in the control information field (R347), before transmitting the communication signal on the communication channel in use (R348).

Figure 32E:
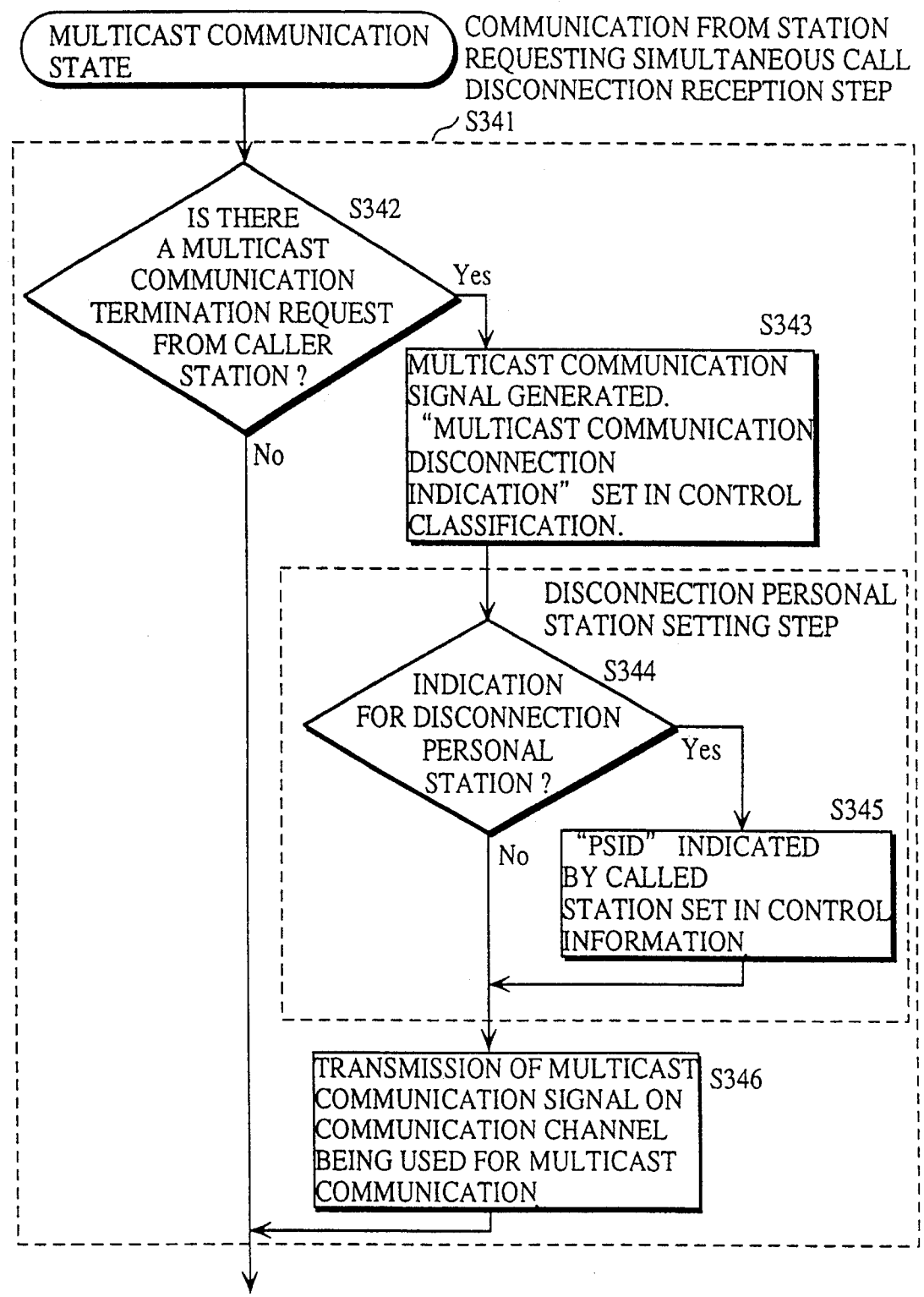
FIG. 32E is a flowchart for the communication disconnection reception process for the cell station with respect to the station which requested the simultaneous call in the present embodiment.
Figure 32F:
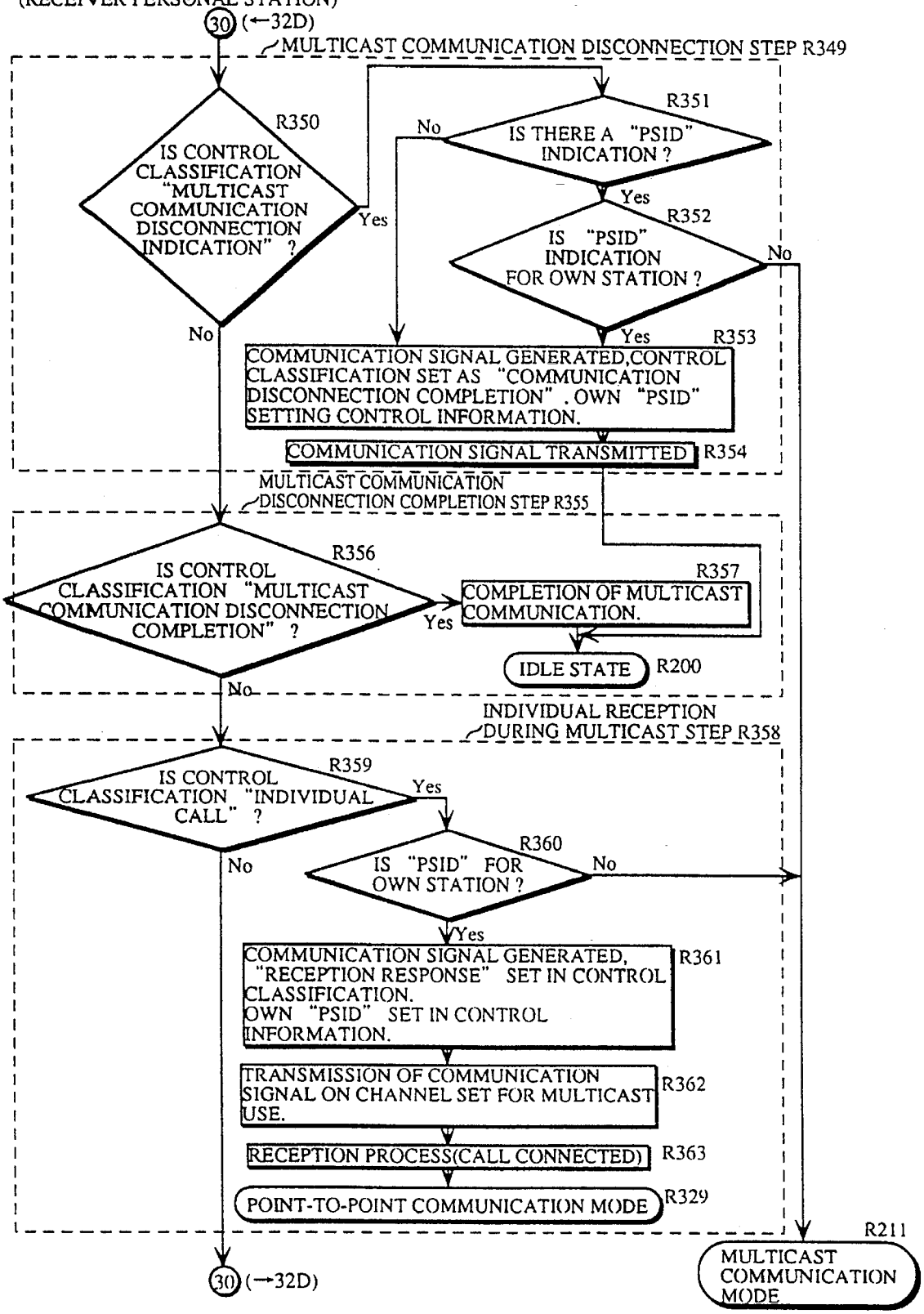
FIG. 32F is a flowchart for the multicast communication termination/individual call process for a receiver personal station in the same embodiment.

FIGS. 32E, 32F are flowcharts showing the multicast communication termination process for the cell station and the multicast communication disconnection process/individual call process for the receiver stations, respectively.

As shown in FIG. 32E, the communication control unit 203 of the cell station executes the reception process of the communication disconnection from the station which requested the simultaneous call together with the above multicast communication process (shown in FIGS. 22A–22C, 32A, 32B).

Reception of a Request for Termination of Multicast Communication from the Station which Requested the Simultaneous Call As shown in FIG. 32E, the cell station observes whether there is a request for termination of multicast communication from the station which requested the simultaneous call (S342). This process, may be achieved by an interruption process, or alternately by inserting a process to be cyclically executed directly before S219 in FIG. 22A. On receiving a request for termination of multicast communication from the station which requested the simultaneous call (S342:Yes), the communication control unit 203 generates the multicast communication signal, setting "Multicast communication disconnection indication (0000 1100B)" in the control classification field (S343), and if there is an indication of the personal station which should be disconnected from the station which requested the simultaneous call (S344:Yes), sets this "PSID" in the control information field (S345), before transmitting the multicast communication signal on the communication channel (S346).

Multicast Communication Disconnection, Individual Call

On the other hand, the communication control unit 303 in the receiver personal station executes the processes for multicast communication disconnection and receiving the individual call, as shown in FIG. 32F. The process in this drawing is also executed between steps R324 and R331 in FIG. 32C (at point (30) shown in FIG. 32C).

As shown in FIG. 32F, if the after receiving the multicast communication signal, the control classification field is "Multicast communication disconnection indication" and the "PSI" in the control information field is for its own station (R351:Yes, R352:Yes), then the communication control unit 303 in the receiver station generates the communication signal, setting "Communication disconnection completion" in the control classification field and its own "PSI" in the control information field (R353), before transmitting the communication signal (R354) and returning to an idle state (R200). Alternatively, if the control classification field is "Multicast communication disconnection completion" (R356), then it terminates multicast communication (S357), and returns to an idle state (R200).

In the same way, if the control classification field is "Individual call" and its own "PSID" is in the control information field (R359:Yes, R360:Yes), then the communication control unit 303 generates the communication signal, setting "Reception response" in the control classification field and its own "PSID" is in the control information field (R361), before transmitting the communication signal (R362), executing the reception process (call connection) (S363), and switching into point-to-point communication mode (R329).

The following is a description of the operation for mobile transmission in this seventh embodiment construction as described above, with (7.1) below being the channel switching operation during multicast communication, mode (7.2) being the switching operation from multicast communication mode into point-to-point communication mode (with the other personal stations terminating multicast communication), (7.3) being the switching operation from multicast communication mode into point-to-point communication mode (with the other personal stations remaining in multicast communication mode), (7.4) being the operation whereby a receiver personal station is removed from multicast communication midway at its own request, (7.5) being the operation whereby a receiver personal station is removed from multicast communication midway at the request of the station which requested the simultaneous call, and (7.6) being the process whereby a receiver personal station is removed from multicast communication midway by means of an individual call.

(7.1) Channel Switching Operation During Multicast Communication Mode

Figure 34:
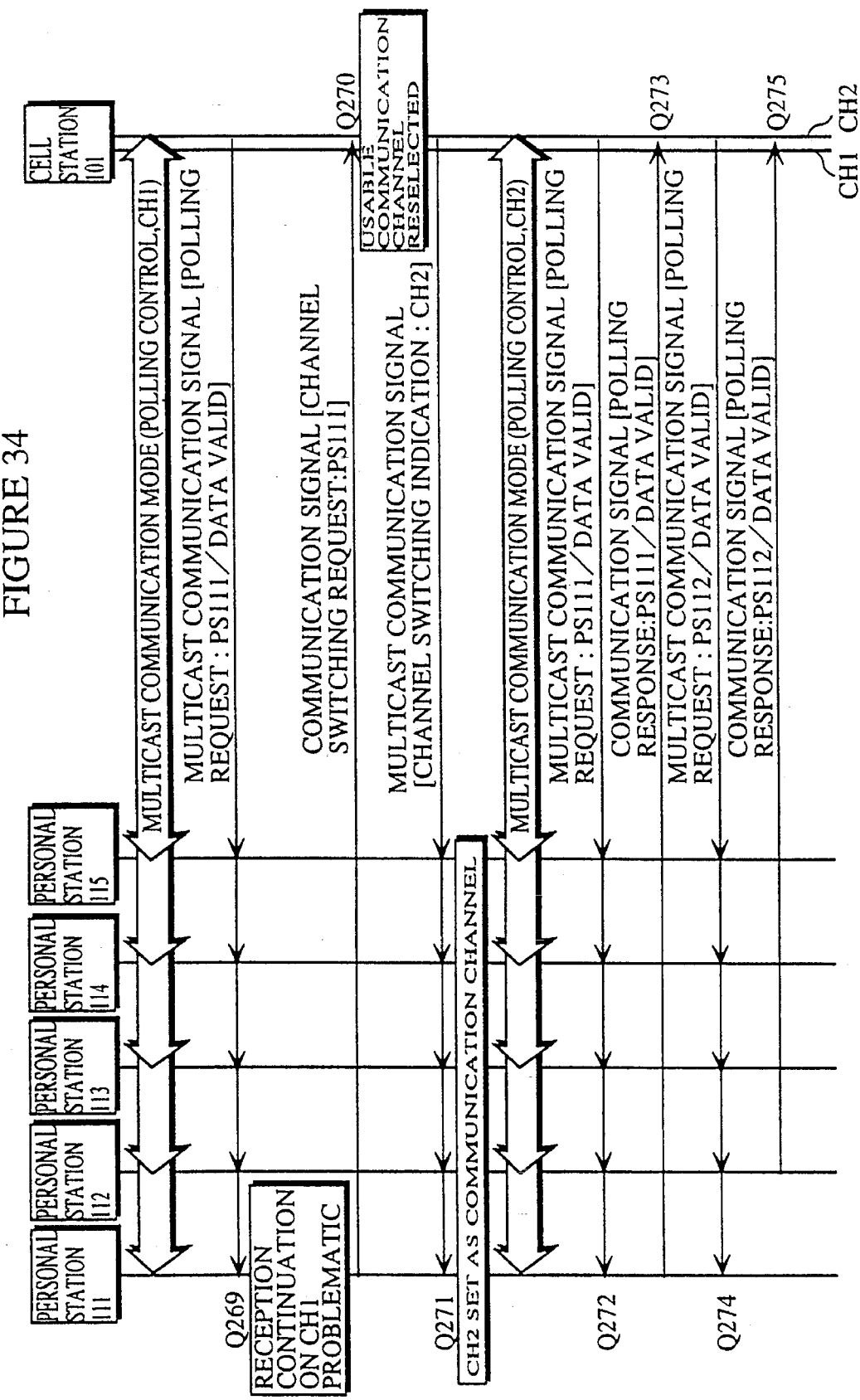
FIG. 34 is a sequence chart showing the multicast communication channel switching control sequence in the present embodiment.

FIG. 34 is a sequence chart showing the control sequence for channel switching.

At the start of this sequence, multicast communication is being executed using communication channel CH1 between the station which requested the simultaneous call and the personal stations 111–115 via the cell station 101, with polling control being performed (Q269).

Channel Switching Request

In this state personal station 111 judges that the continuation of reception of the multicast communication signal from the cell station 101 on communication channel CH1 set for multicast communication use is problematic, due to such factors as radio interference from a neighboring radio cell. As a result the personal station 111, on being granted the right of transmission by the multicast communication signal SG2 sent as the polling request signal which indicates "PS111" from the cell station 101, transmits the communication signal SG3 as the channel switching request signal on the communication channel CH1 to the cell station 101 (Q270). On this occasion, in the communication signal SG3 sent as the channel switching request signal, "Channel switching request" is set in the control classification field and its own PSID "PS111" is set in the control information field.

Channel Switching Indication

On receiving a communication signal SG3 sent as the channel switching request signal from one of the personal stations 111–115, the cell station 101 again scans the open channels and selects another communication channel (CH2) for multicast communication use. Then, it sends the multicast communication signal SG2 as the channel switching indication signal to all of the personal stations 111–115 in the radio cell 110 using the communication channel CH1 set for multicast communication use (S271). In doing so, it sets in the multicast communication signal SG2 sent as the channel switching indication signal, "Channel switching indication" in the control classification field and the communication channel to be switched to "CH2" in the control information field.

Channel Switching

Next, on receiving the multicast communication signal SG2 sent as the channel switching indication signal, the personal stations 111–115 reset the communication channel for communication with the cell station 101 as the communication channel "CH2" in the control information field, and remain in their multicast communication mode, except form here on using the communication channel CH2. On the other hand, the cell station 101, after waiting enough time for the personal stations 111–115 to switch to communication channel CH2, sends the multicast communication signal SG2 on the communication channel CH2 (Q272, Q274).

(7.2) Switching Operation from Multicast Communication Mode into Point-to-Point Communication Mode (with the Other Personal Stations Terminating Multicast Communication)

Figure 35:
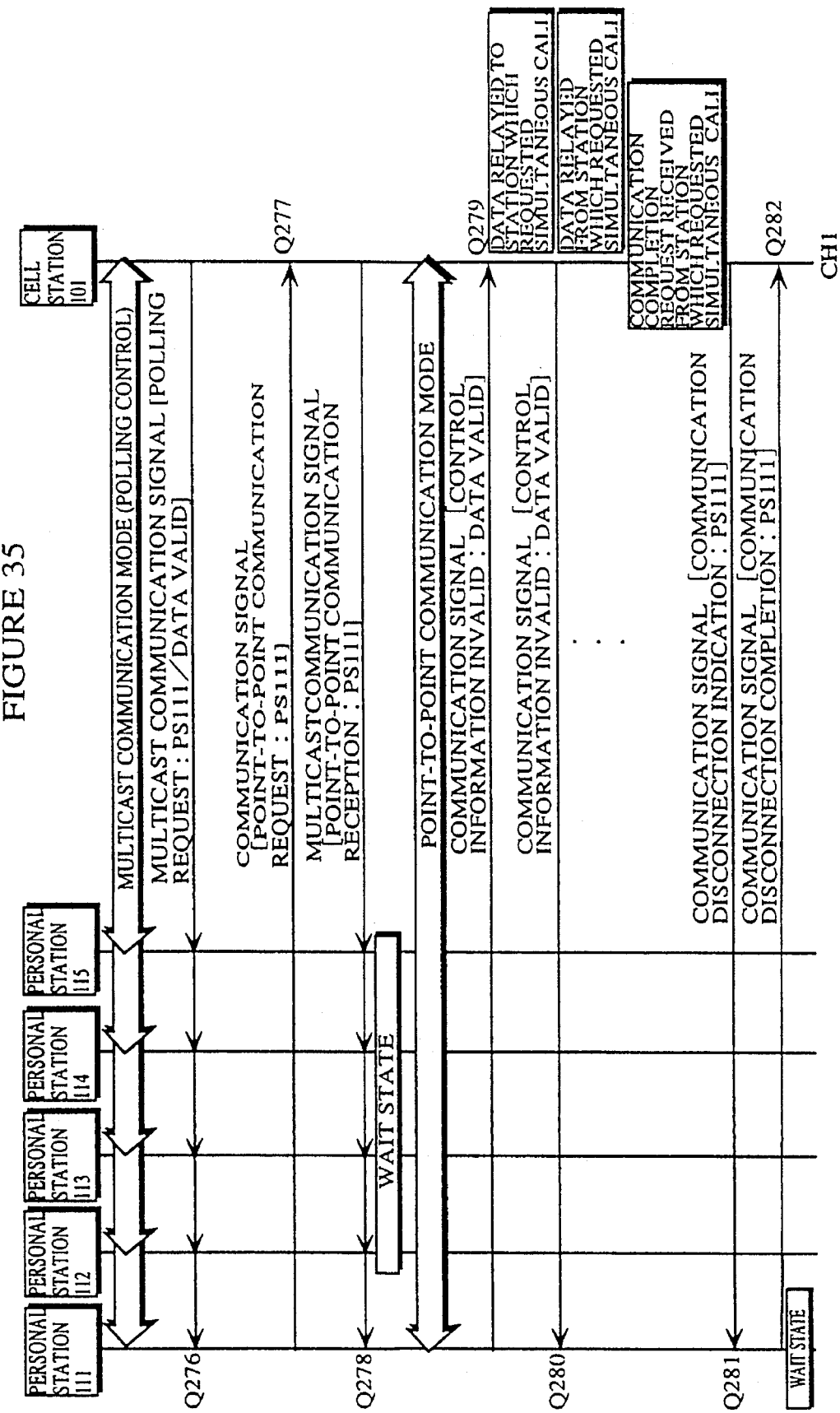
FIG. 35 is a sequence chart showing the point-to-point communication switching control sequence in the present embodiment.

FIG. 35 is a sequence chart showing the control sequence for a switching operation from multicast communication to point-to-point communication.

At the start of this sequence, multicast communication is being executed using communication channel CH1 between the station which requested the simultaneous call (possibly the cell station) and the personal stations 111–115 via the cell station 101, with polling control being performed (Q276).

Personal Station Point-to-Point Communication Request

In this state, a switching request for point-to-point communication with the station which requested the simultaneous call (possibly the cell station) is issued by the personal station 111. In this case, the personal station 111, on being granted the right of transmission by the multicast communication signal SG2 sent as the polling request signal which indicates "PS111" from the cell station 101, transmits the communication signal SG3 as the point-to-point communication request signal on the communication channel CH1 to the cell station 101 (Q277). On this occasion, in the communication signal SG3 sent as the point-to-point communication request signals, "Point-to-point communication request" is set in the control classification field and its own PSID "PS111" is set in the control information field.

Cell Station Point-to-Point Communication Reception

On receiving the communication signal SG3 sent as the point-to-point communication request signal, the cell station 1010 sends the multicast communication signal SG2 as the point-to-point communication reception signal to all of the personal stations 111–115 in the radio cell 110 using the communication channel CH1 set for multicast communication use (S278). On this occasion it sets in the multicast communication reception field of the multicast communication signal SG2 sent as the point-to-point communication reception signal, the control classification "Point-to-point communication request" and the control information "PS111" for the personal station which requested point-to-point communication.

Personal Station Point-to-Point Communication

Next, the personal station 111 in multicast communication mode, on receiving the multicast communication signal SG2 sent as the point-to-point communication reception signal (Q278), switches to point-to-point communication mode since the PSID "PS111" in the control information is for itself. That is to say, it executes point-to-point communication with the station which requested the simultaneous call on the communication channel CH1 which was used for muliticast communication via the cell station 101 (Q279, Q280).

Receiver Station Multicast Communication Termination

On the other hand, on receiving the multicast communication signal SG2 sent as the point-to-point communication reception signal, since the PSID of the personal stations 112–115 does not agree with the PSID "PS111" set in the control information, the personal stations 112–115 terminate multicast communication and assume a wait state.

Cell Station Point-to-Point Communication

After sending the multicast communication signal SG2 as the point-to-point communication reception signal, the cell station 101 relays the data for point-to-point communication between the personal station 111 and the station which requested the simultaneous call (Q279, Q280). Following this, once the cell station 101 receives a communication termination request from either the station which requested the simultaneous call or the personal station 111, it sends the communication signal SG3 as the communication disconnection indication signal to the personal station 111 (Q281). Following this, once it has received the communication disconnection indication signal, the personal station 111 terminates point-to-point communication and sends the communication signal SG3 as the communication disconnection completion signal to the cell station 101 (Q282), before assuming a wait state.

(7.3) Switching Operation from Multicast Communication Mode into Point-to-Point Communication Mode (with the Other Personal Stations Continuing Multicast Communication)

Figure 36:
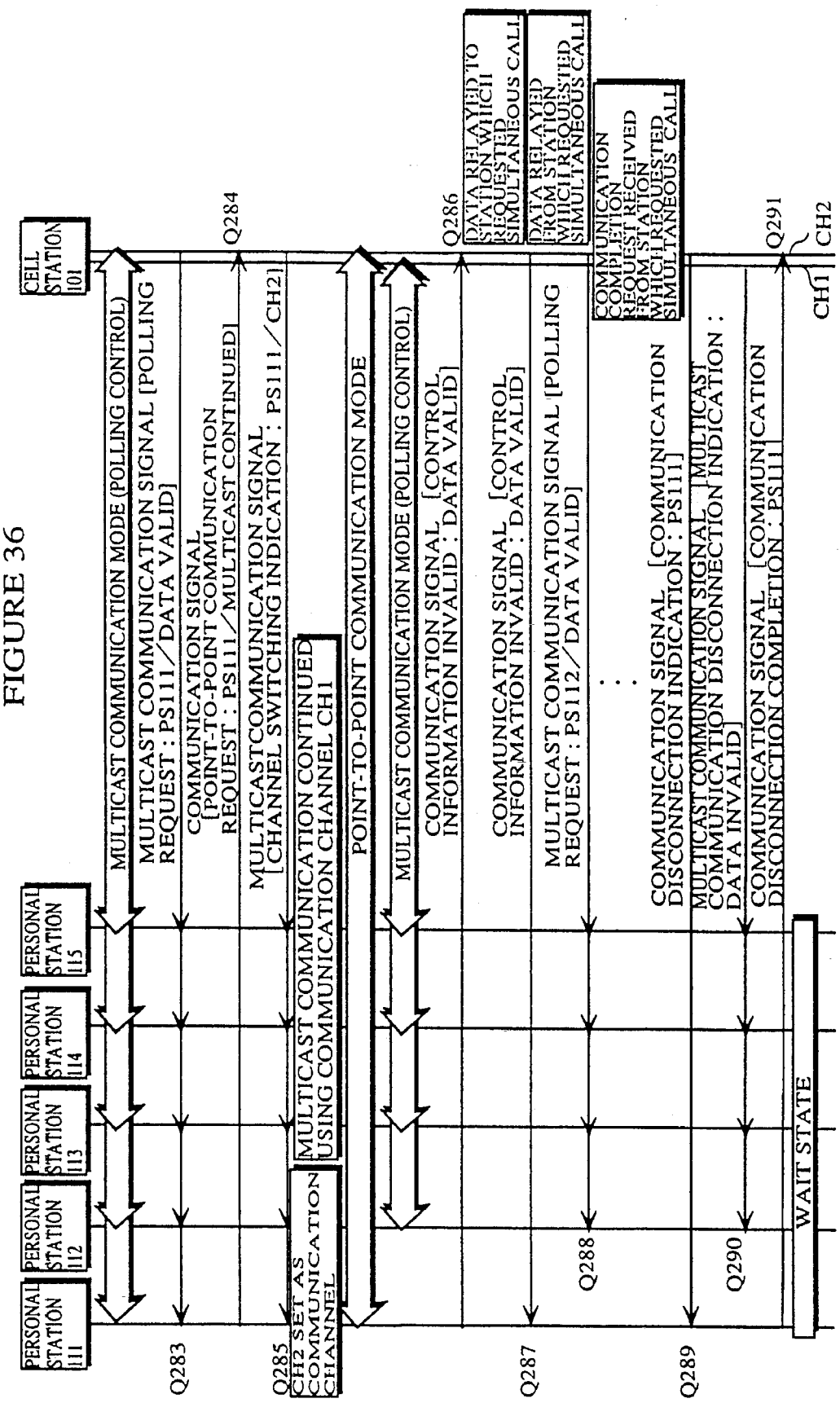
FIG. 36 is a sequence chart showing the point-to-point communication switching control sequence in the present embodiment.

FIG. 36 is a sequence chart showing the control sequence for a switching operation from multicast communication to point-to-point communication.

At the start of this sequence, multicast communication is being executed using communication channel CH1 between the station which requested the simultaneous call (possibly the cell station) and the personal stations 111–115 via the cell station 101, with polling control being performed.

Personal Station Point-to-Point Communication Request

In this state, a switching request for point-to-point communication with the station which requested the simultaneous call (possibly the cell station) is issued by the personal station 111, along with a request to continue multicast communication. In this case, the personal station 111, on being granted the right of transmission by the multicast communication signal SG2 sent as the polling request signal which indicates "PS111" from the cell station 101 (Q283), transmits the communication signal SG3 as the point-to-point communication request signal on the communication channel CH1 to the cell station 101 (Q284). On this occasion, in the communication signal SG3 sent as the point-to-point communication request signal, "Point-to-point communication request" is set in the control classification field and, in the control information field, its own PSID "PS111" and the indication for continuing multicast communication to the other personal stations "Multicast communication continuation information (Multicast communication)" request are set.

Cell Station Point-to-Point Communication Reception/Multicast Continuation Process On receiving the communication signal SG3 with the control information "PS111" and "Multicast communication" sent as the point-to-point communication request signal (Q284), the cell station 101 sends the multicast communication signal SG2 as the point-to-point communication reception (channel switching) signal to all of the personal stations 111–115 in the radio cell 110 using the communication channel CH1 set for multicast communication use (S285). On this occasion the cell station 101 scans all of the open channels and selects communication channel CH2 as the channel for point-to-point communication, setting in the multicast communication reception field of the multicast communication signal SG2 sent as the channel switching indication signal, the control classification "Channel switching indication" and, in the control information, "PS111" for the personal station which requested point-to-point communication and "CH2" for the communication channel to be used for point-to-point communication. Once the personal station 111 receives the multicast communication signal SG2 sent as the channel switching indication signal which includes its own PSID "PS111", it sets CH2 as the communication channel for communication with the cell station and executes point-to-point communication with the station which requested the simultaneous call (Q286, Q287).

Point-to-Point Communication for the Cell Station

After transmitting the point-to-point communication reception signal, the cell station 101 relays the data for point-to-point communication between the personal station 111 and the station which requested the simultaneous call (Q286, Q287).

Additionally, the personal stations 112–115 in multicast communication mode ignore the channel switching indication signal which includes the control information "PS111", and continue to receive the multicast communication signal SG2 from the cell station 101 on communication channel CH1 (Q288).

Multicast Communication Continuation

Data transmission requests from the station which requested the simultaneous call continue being relayed to the personal stations 112–115 in multicast communication mode using communication channel CH1 (Q288).

Communication Termination Process

Once the cell station 101 receives a communication termination request from either the station which requested the simultaneous call or the personal station 111, it sends the communication signal as the communication disconnection indication signal to the personal station 111 and the multicast communication signal as the multicast communication disconnection indication signal to the personal stations 112–115 (Q289, Q290). As a response to this, the personal station 111 transmits the communication signal as the communication disconnection completion signal to the cell station (Q291).

Personal Station Point-to-Point Communication Request/Multicast Completion Process By means of the above process, if there is an indication to terminate multicast communication along with a point-to-point communication request, then the process will be the same as that shown in FIG. 35.

Figure 37:
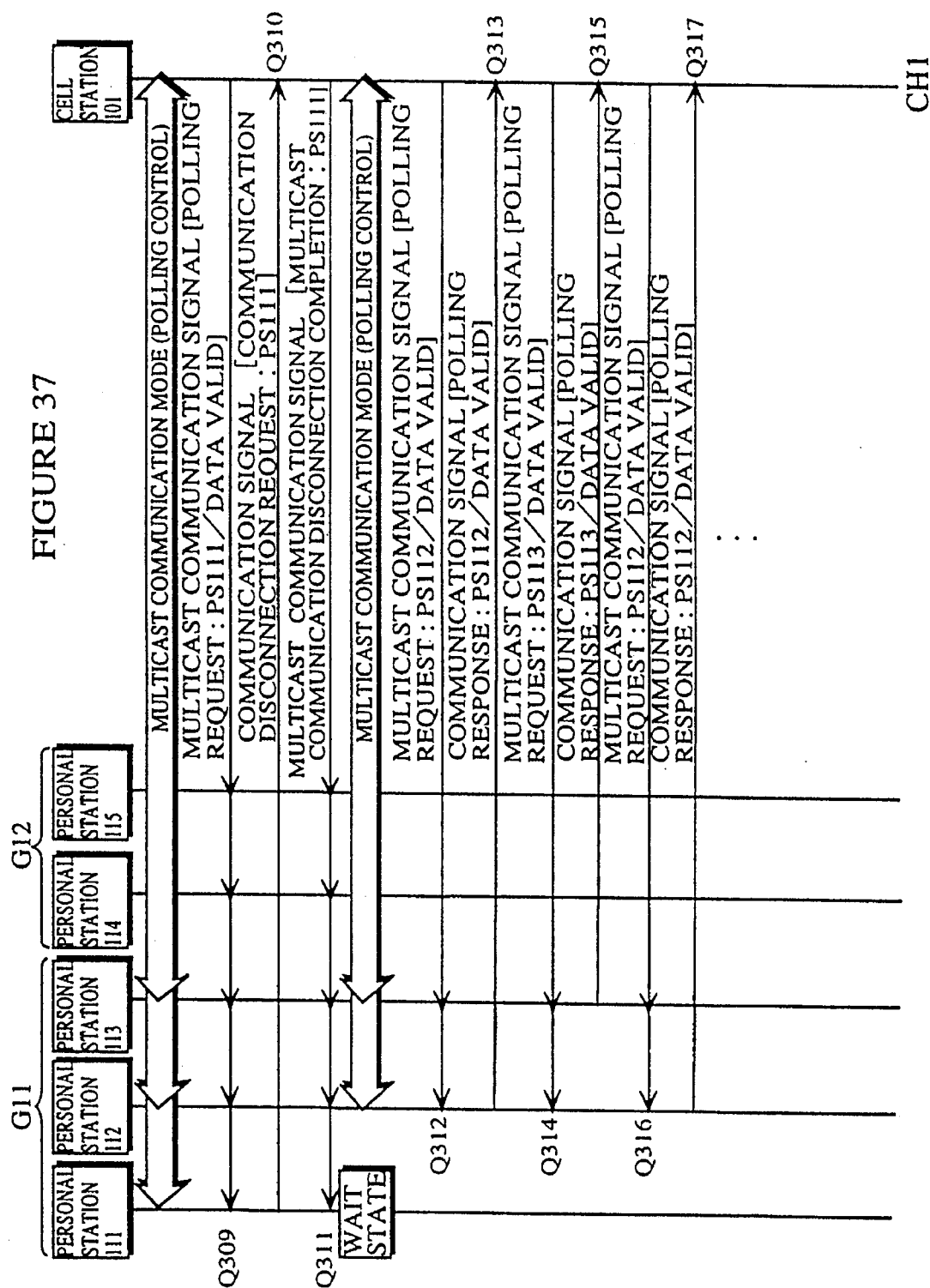
FIG. 37 is a sequence chart showing the multicast communication midway termination control sequence by means of a personal station request in the present embodiment.

(7.4) Removal Process of a Receiver Personal Station During Multicast Communication Midway at its Own Request FIG. 37 is a sequence chart showing the control sequence for multicast communication termination by means of a communication termination request from a receiver personal station.

In this example, personal stations 111–113 belong to group 1 and personal stations 114–115 belong to group 2. Groups 1 and 2 have been allocated the group numbers G11 and G12 for purposes of identification. At the start of this sequence, multicast communication is being executed using communication channel CH1 between the station which requested the simultaneous call (possibly the cell station) and the personal stations belonging to group 1 via the cell station 101, with polling control being performed.

Personal Station Disconnection Request

In this state, the personal station 111 issues a request to terminate multicast communication. In this case, the personal station 111, on being granted the right of transmission by the multicast communication signal SG2 sent as the polling request signal which indicates "PS111" from the cell station 101 (Q309), transmits the communication signal SG3 as the communication disconnection request signal on the communication channel CH1 to the cell station 101 (Q310). On this occasion, in the communication signal SG3 sent as the communication disconnection request signal, "Communication disconnection request" is set in the control classification field and its own PSID "PS111" is set in the control information field.

Cell Station Communication Disconnection Completion

On receiving the communication signal SG3 sent as the communication disconnection request signal, the cell station 101 refers to the specified PSID "PS111" and sends the multicast communication signal SG2 as the communication disconnection completion signal using the communication channel CH1 set for multicast communication use (Q311). On this occasion it sets in the multicast communication reception field of the multicast communication signal SG2 sent as the communication disconnection completion signal, the control classification "Multicast communication disconnection completion" and the control information "PS111" for the personal station for which communication is to be disconnected. Also, in this case, the cell station 101 performs the disconnection of multicast communication with the personal station 111, and removes personal station from polling control during multicast communication whereby personal stations are granted right of transmission.

Personal Station Disconnection Termination

Finally, the personal station 111 receives the multicast communication signal SG2 sent as the communication disconnection completion signal which specifies "PS111", and accordingly terminates multicast communication, assuming a wait state. On the other hand, since personal stations 112–113 are not indicated in the communication disconnection completion signal, they remain in their multicast communication mode (Q312–Q317).

Figure 38:
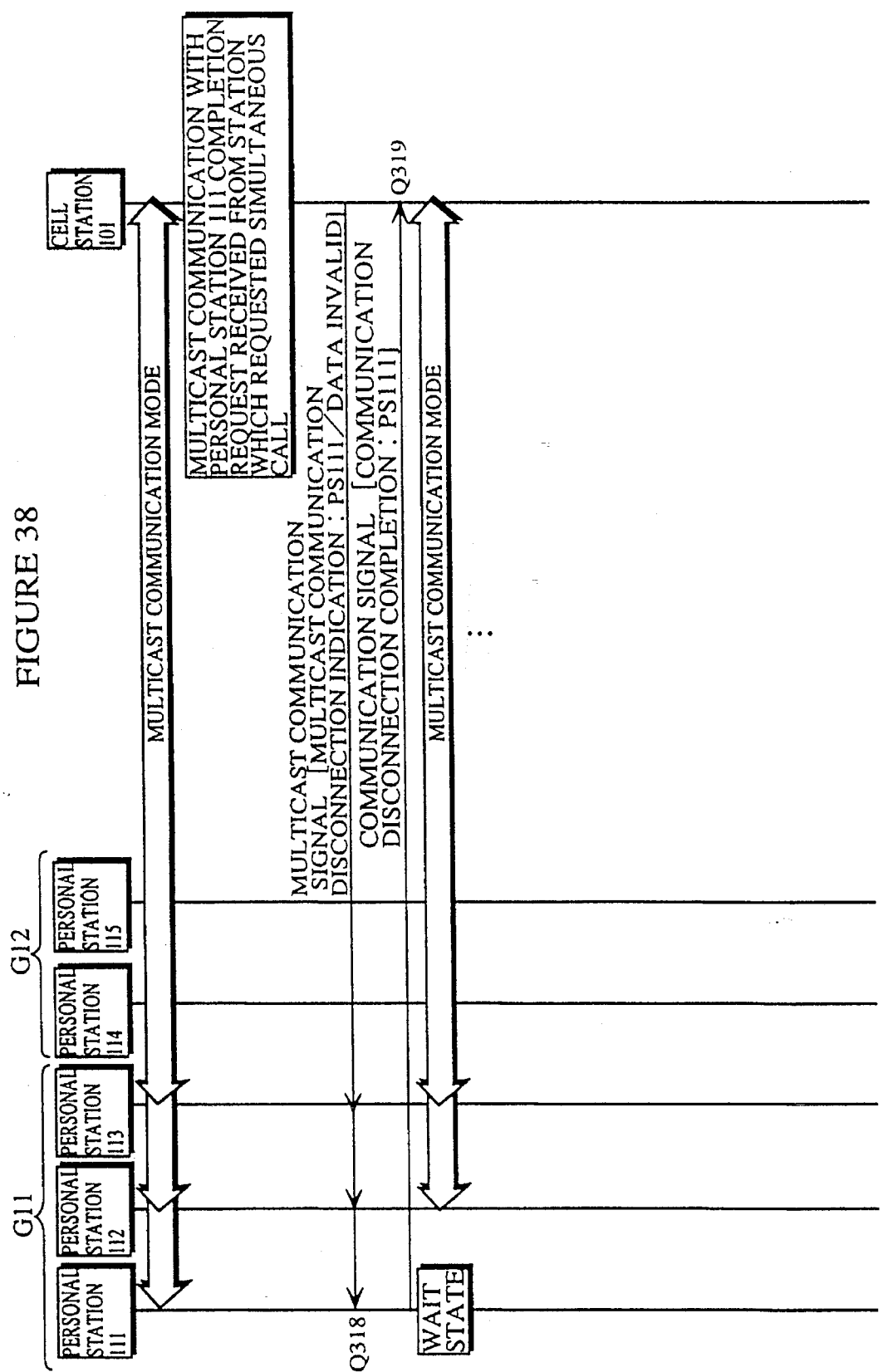
FIG. 38 is a sequence chart showing the multicast communication midway termination control sequence by means of a request by the station which requested the simultaneous call in the present embodiment.

(7.5) Removal Process of Receiver Personal Station During Multicast Communication Midway at a Request from the Station which Requested the Simultaneous Call FIG. 38 is a sequence chart showing the control sequence for multicast communication termination by means of a communication termination request for one of the personal stations form the station which requested the simultaneous call.

In this example, personal stations 111–113 belong to group 1 and personal stations 114–115 belong to group 2. Groups 1 and 2 have been allocated the group numbers G11 and G12 for purposes of identification. At the start of this sequence, multicast communication is being executed using communication channel CH1 between the station which requested the simultaneous call (possibly the cell station) and the personal stations belonging to group 1 via the cell station 101.

Cell Station Disconnection Indication

In this state, the cell station 101 receives a request from the station which requested the simultaneous call to terminate multicast communication with a specified station (for example, personal station 111). In this case, the cell station 101 sends the multicast communication signal SG2 as the communication disconnection indication signal to personal stations 111–113 on the communication channel CH1 (Q318). In doing so, it sets in the multicast communication signal SG2 sent as the communication disconnection indication signal "Multicast communication termination indication" in the control classification field and the PSID of the personal station which is to be disconnected "PS111" in the control information field.

Personal Station Disconnection Termination

Next, having received the multicast communication signal SG2 sent as the communication disconnection indication signal, the personal stations 111–113 refer to the PSID "PS111" in the control information and judge whether their own station is to be disconnected. In this case, personal stations 112–113 are not be disconnected and so remain in multicast communication mode. On the other hand, the personal station 111, judging that its own PSID is indicated, sends the communication signal SG3 as the communication disconnection completion signal (Q319), before terminating multicast communication and assuming a wait state. In doing so, it sets in the communication signal SG3 sent as the communication disconnection completion signal, "Communication disconnection completion" in the control classification field and its own PSID "PS111" in the control information field.

Cell Station Communication
Disconnection/Completion

Finally, the cell station 101 receives the communication signal SG3 sent as the communication disconnection completion signal from the personal station 111 and executes the process for disconnection of multicast communication with the personal station 111. It remains, however, in multicast communication mode with the personal stations 112–113.

(7.6) Removal Process of a Receiver Personal
Station During Multicast Communication Midway
Due to an Individual Call FIG. 39 is a sequence chart showing the control sequence for multicast communication termination for one of the receiver personal stations during multicast communication.

In this example, personal station 111–113 belong to group 1 and personal stations 114–115 belong to group 2. Groups 1 and 2 have been allocated the group numbers G11 and G12 for purposes of identification. At the start of this sequence, multicast communication is being executed using communication channel CH1 between the station which requested the simultaneous call (possibly the cell station) and the personal stations belonging to group 1 via the cell station 101.

Cell Station Reception Notification

In this state, the cell station 101 receives a request from the personal station 115 for an individual call to the personal station 13. That is to say, the personal station 115 sends the communication signal SG3 as the call request signal on the control channel CHa to the cell station 101 (Q320). In doing so, it sets in the communication signal SG3 sent as the call request signal, "Call request" in the control classification field and the PSID of the receiver station to be called "PS113" in the control information field.

Next, having received the communication signal SG3 sent as the call request signal from the personal station 115, the cell station 101 judges whether the called personal station belongs to the personal station group which is performing multicast communication, and if it is in said group, sends the multicast communication signal SG2 as the individual call signal (Q321). In this case, the personal station 113 identified by the PSID "PS113" belongs to group 1, so that in the multicast communication control field of the multicast communication signal SG2 sent as the individual call signal, "Individual call" is set as the control classification and "PS113" as the control information, before the multicast communication signal SG2 is sent on communication channel CH1.

Personal Station Reception Response

Next, having received the multicast communication signal SG2 sent as the individual call signal, the personal stations 111–113 refer to the PSID "PS113" in the control information, and judge whether this PSID is the same as their own. The personal station 213 indicated in the signal then sends the communication signal SG3 as the reception response signal to the cell station 101 (Q322), before terminating multicast communication. On this occasion, in the communication signal SG3 sent as the reception response signal, "Reception response" is set as the control classification and its own PSID "PS113" is set as the control information. Having received the communication signal SG3 sent as the reception response signal, the cell station 101 executes the process disconnecting personal station 113 from multicast communication. On the other hand, personal stations 111–112 remain in multicast communication mode with the station which requested the simultaneous call via the cell station 101. Finally, the personal stations 113 and 115 commence the calling and receiving process on the control channel CHa via the cell station 101.

EIGHT EMBODIMENT

The construction for mobile communication in the eighth embodiment is principally the same as that of the seventh embodiment. Construction elements which are the same as the before will not be explained, and instead the following description will focus on the differences.

The principle difference is that the communication control unit 203 in the cell station shown in FIG. 2 is equipped with a function for indicating busy tone transmission for a receiver personal station in multicast communication mode, while the communication control unit 303 in each receiver station shown in FIG. 3 is equipped with a function or transmitting the busy tone. As a result, the control classification field of the multicast communication signal shown in FIG. 33 uses "Busy tone transmission request" and "Busy tone transmission".

"Busy tone transmission request (0000 1000B)" (down) refers to a request to a personal station for transmission of a busy tone to show that a communication channel being used for multicast communication is currently being used.

"Busy tone (0000 1000B)" (up) refers to a transmission of a busy tone to show that said communication channel is being used for multicast communication by the receiver personal station.

Figure 40A:
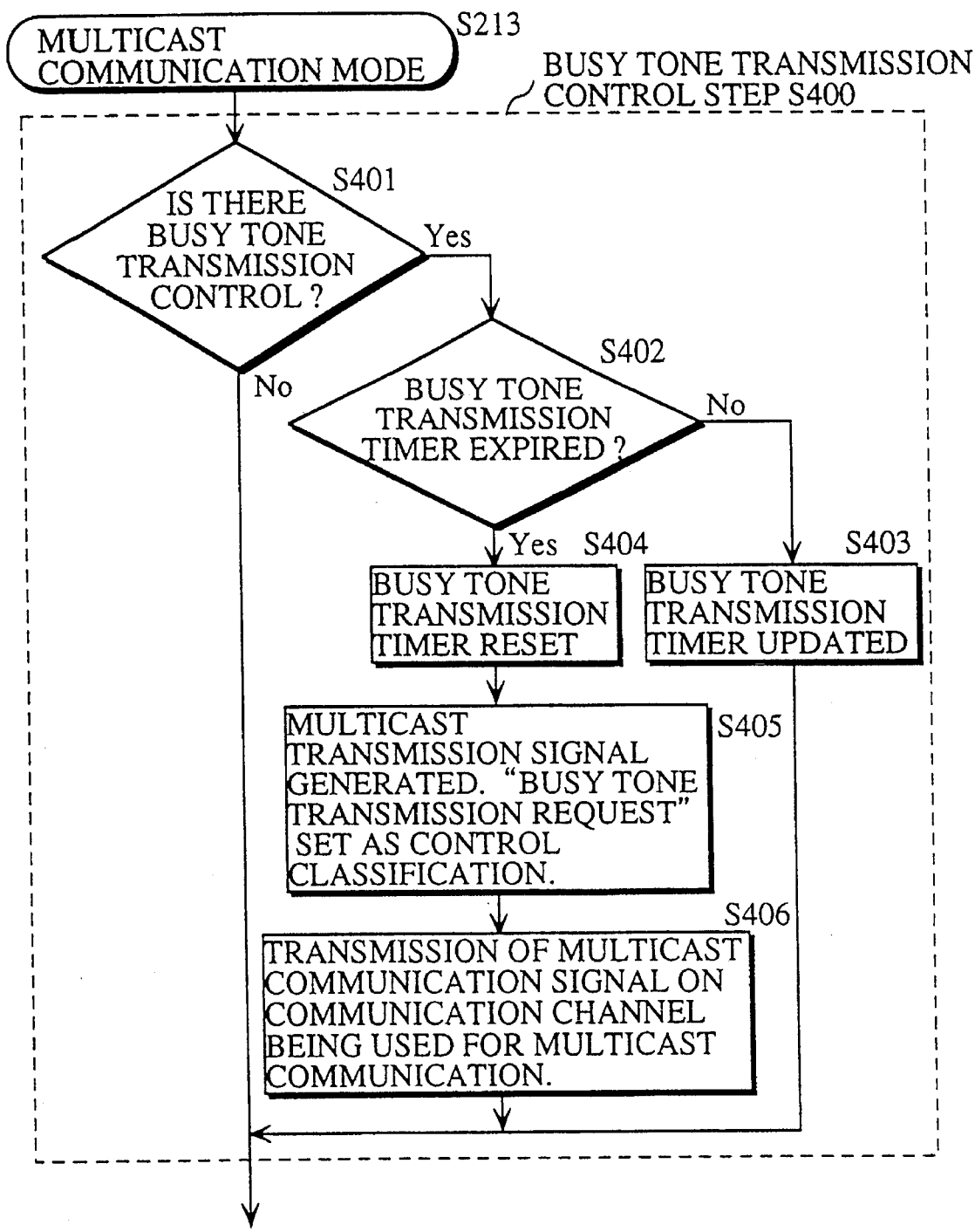
FIG. 40A is a flowchart showing the busy tone transmission control process by the cell station during multicast communication in the eighth embodiment.
Figure 40B:
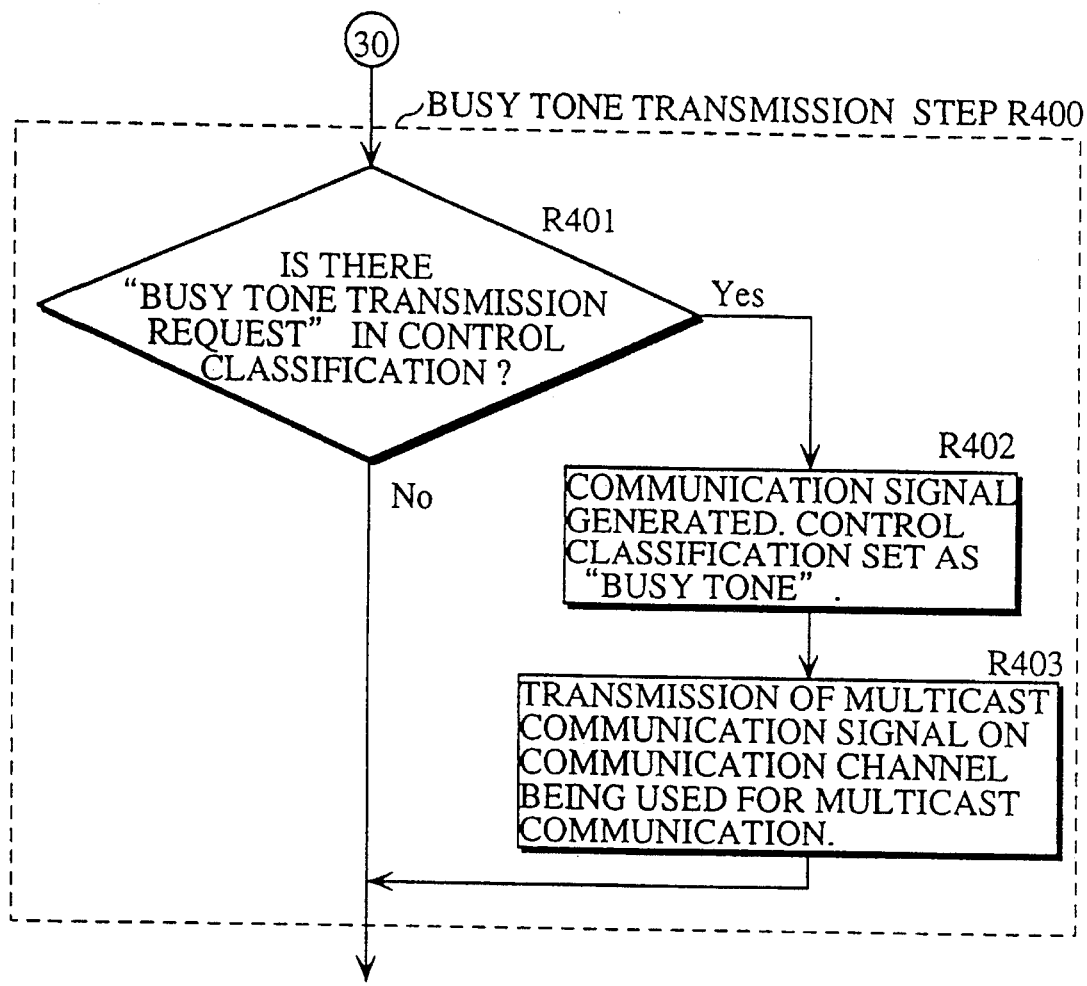
FIG. 40B is a flowchart showing the busy tone transmission process by a receiver station during multicast communication in the same embodiment.

FIGS. 40A, 40B are flowcharts showing the busy tone transmission control process for the cell station and the busy tone transmission process for a receiver personal station. After the multicast data setting step S219 shown in FIG.

22A, the communication control unit 203 in the cell station 101 executes the process shown in FIG. 40A.

As shown in FIG. 40A, if there is an indication or busy tone transmission control by means of a user operation (S401:Yes), then the communication control unit 203 investigates whether the busy tone timer counter (soft timer counter) has reached a certain number. This timer counter is set so as to become this certain number at, for example, 5 second intervals. If the timer counter has not reached this certain number (S402:No), then the timer counter is updated (+1) (S403).

If the timer counter has reached the certain number (S402:Yes), then the timer counter is reset (S404), and the multicast communication signal is generated, with "Busy tone transmission request" set in the control classification field (S405), before being transmitted on the multicast communication channel (S406).

On the other hand, after the channel switching step R324 in FIG. 32C (Point (3) in FIG. 32C), the communication control unit 303 executes the process shown in FIG. 40B. As shown in FIG. 40B, if there is "Busy tone transmission request" in the control classification field of the received multicast communication signal (R401:Yes), then the communication control unit 303 generates the communication signal, setting "Busy tone" in the control classification field (R402), before transmitting on the communication channel (R403).

The following is a description of the operation of mobile transmission in this eighth embodiment constructed as described above, with (8.1) below being the busy tone transmission control process.

(8.1) Busy Tone Transmission Control Process

FIG. 41 is a sequence chat showing the Busy tone transmission control sequence. At the start of this sequence, multicast communication is being executed using communication channel CH1 between the station which requested the simultaneous call (possibly the cell station) and the personal stations 111–115 via the cell station 101.

Busy Tone Transmission Request

The cell station transmits the multicast communication signal SG2 as the busy tone transmission request signal on the communication channel CH1 to the personal stations 111–115 which are in multicast communication mode (Q292). At this time, in the multicast information control field of the multicast communication signal SG2 sent as the busy tone transmission request signal, "Busy tone transmission request" is set in the control classification field.

Busy Tone Transmission

On receiving the multicast communication signal SG2 sent as the busy tone transmission request signal, the persona stations 111–115 simultaneously transmit the communication signal SG3 as the busy tone signal on the communication channel CH1 currently being used for multicast communication (Q293–Q297). By doing so, cell stations and personal stations in neighboring radio cells (not illustrated) are notified that communication channel CH1 is being used. Therefore, when cell stations and personal stations in neighboring radio cells (not illustrated) scan the open channels or execute carrier sensing on a specified channel, if they receive the busy tone signal from personal stations 111–115, then they will know that communication channel CH1 is already being used in a neighboring radio cell, and so will judge that communication channel CH1 is not usable. It should be noted here that the cell station 101 is above to transmit the busy tone transmission request signal regularly at a fixed interval set by the busy tone transmission timer counter. It is, however, also possible for it to be transmitted to the personal stations intermittently.

NINTH EMBODIMENT

The construction for mobile communication in the ninth embodiment is principally the same as that of the seventh embodiment. Construction elements which are the same as the before will not be explained, and instead the following description will focus on the differences.

The principle difference is that the communication control unit 203 in the cell station shown in FIG. 2 cyclically transmits a reporting signal on the control channel for notifying personal stations which are not participating in multicast communication that multicast communication is being executed, as well as transmitting multicast communication signals on the communication channel which request participation in multicast communication to personal stations which were not participating in multicast communication when terminating point-to-point communication. Also, the personal stations shown in FIG. 3 are equipped with a function for midway participation in multicast communication.

In order to achieve this, "Multicast communication participation request" (up) and "Multicast communication participating reception" (down) are used in the control classification field of the communication signal and the multicast communication signal shown in FIG. 33.

"Multicast communication participating request (0000 1011B)" (up) refers to a request to participate in multicast communication from a personal station which is not participating in multicast communication.

"Multicast communication participating reception (0000 1001B)" (down) refers to the response for a request for participating in multicast communication.

Figure 42:
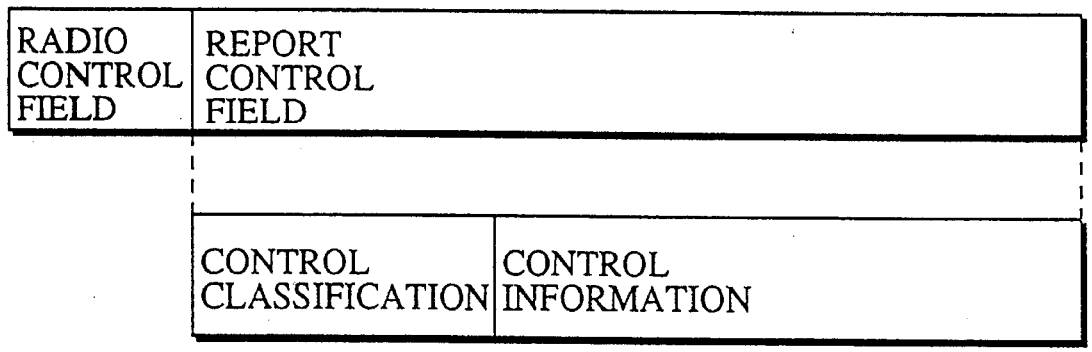
FIG. 42 is a chart showing the data composition of the reporting signal in the present embodiment.

FIG. 42 is a table showing the logical format of the reporting signal which is sent and received on the control channel. This format resembles that of the multicast communication signal/communication signal shown in FIG. 33, but with the following difference. In this drawing, the "Radio control field" shows that it is a reporting signal, with the multicast communication signal being distinguished from the communication signal. The "Reporting signal field" is made up of a control classification field and a control information field.

In the control classification field, "Multicast communication information (0000 0001B)" (down) is a response to a request from a personal station regarding participating in multicast communication.

Figure 43A:
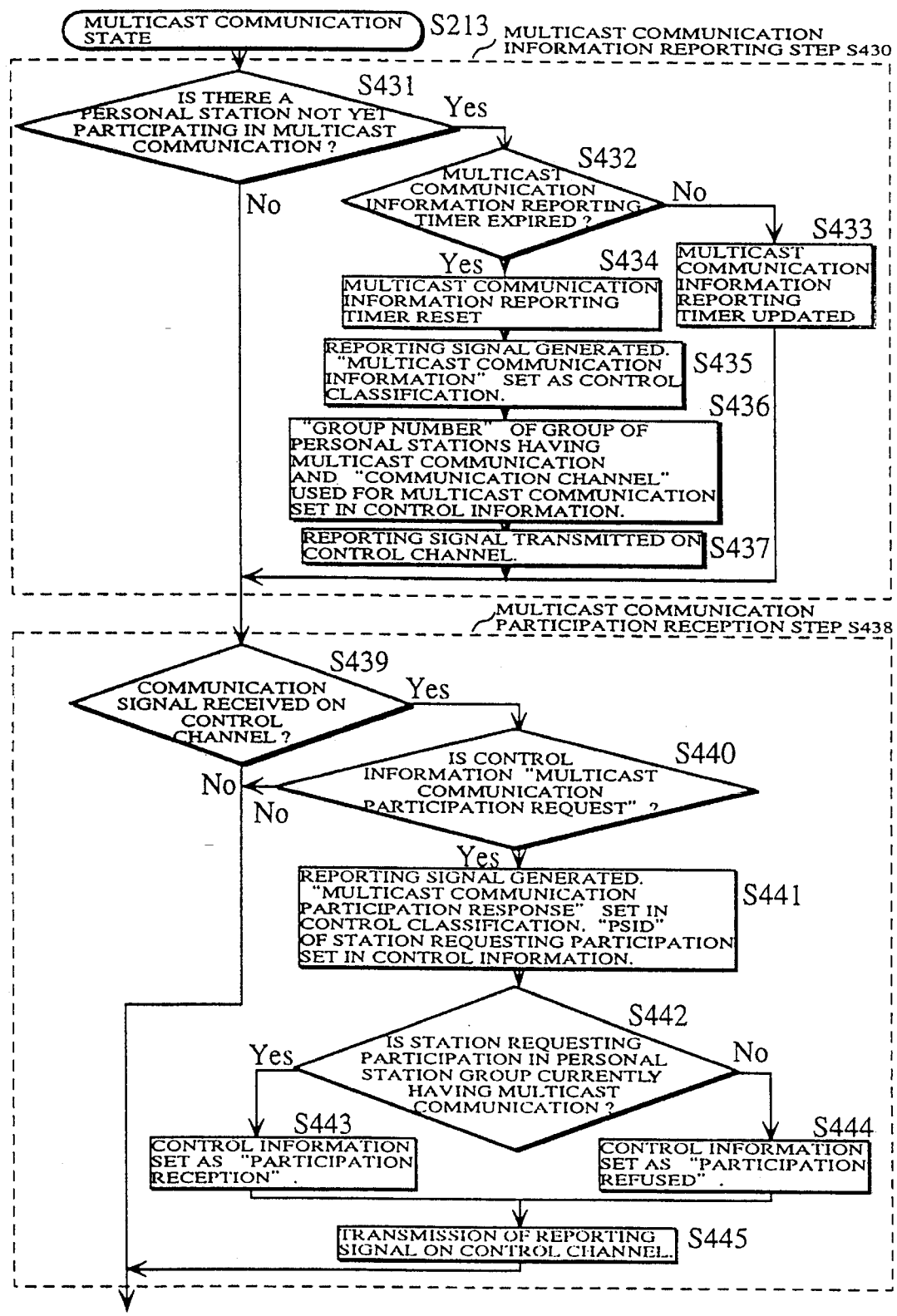
FIG. 43A is a flowchart showing the reporting/participation reception process for the cell station in the ninth embodiment.
Figure 43B:
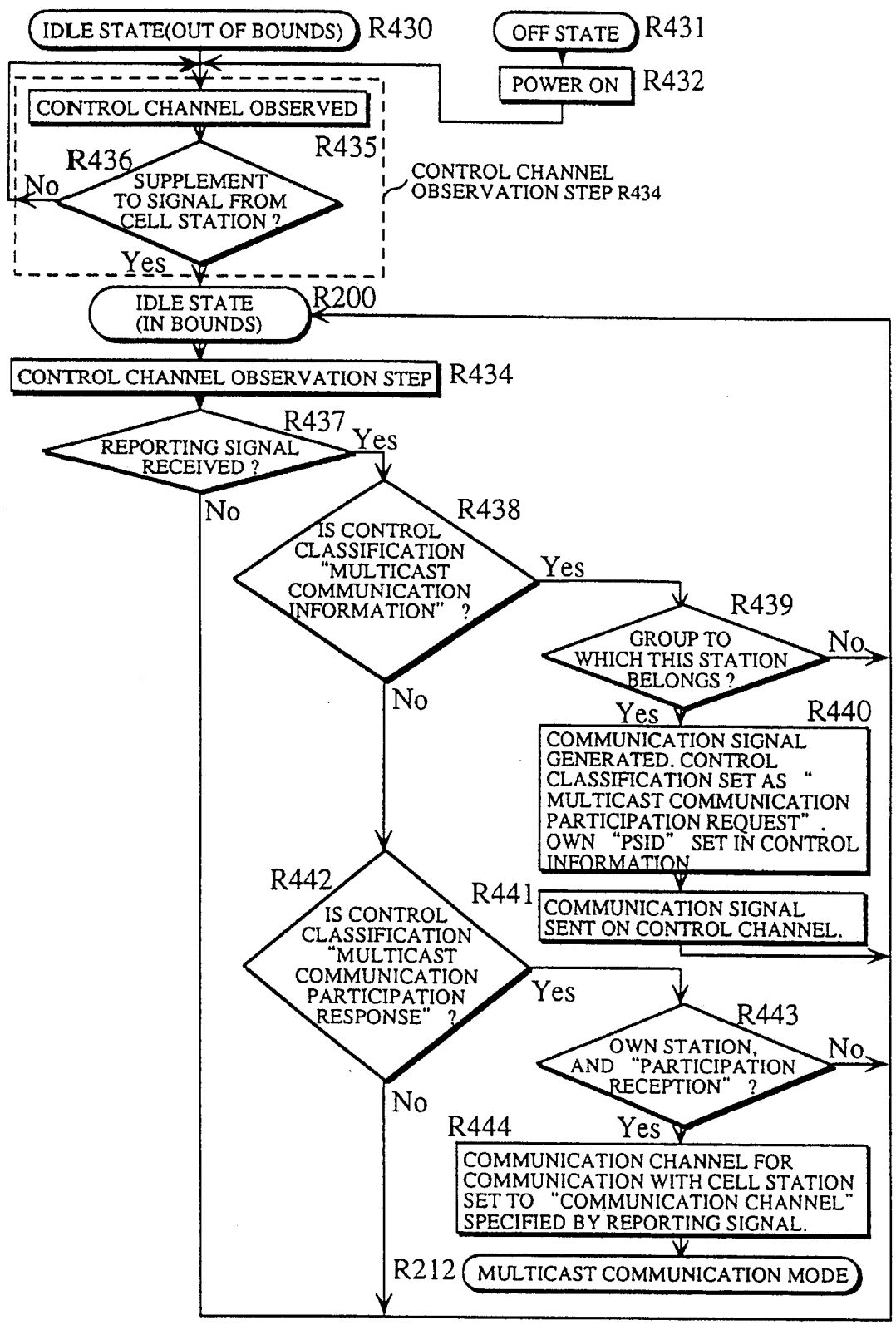
FIG. 43B is a flowchart showing the midway participation process for a receiver personal station in the present embodiment.

FIGS. 43A and 43B are flowcharts showing the reporting/participating reception process for the cell station and the midway participating process for a receiver station.

The communication control unit 203 in the cell station 101 executes the process shown in FIG. 43A after the multicast data setting step S219 shown in FIG. 22A.

As shown in FIG. 43A, if there is a receiver station yet to participate in multicast communication, for example a receiver station which belongs to the group which is performing multicast communication but which is not responding (S431:Yes), then the communication control unit 203 investigate whether the reporting timer counter (soft timer counter) has reached a certain number. This timer counter is set so as to become this certain number at, for example, 5 second intervals. If the timer counter has not reached this certain number (S432:No), then the timer counter is updated (+1) (S433).

If the timer counter has reached the certain number (S432:Yes), then the timer counter is reset (S434), and the multicast communication signal is generated, with "Multicast communication information" set in the control classification field (S435), and the "Group number" of the group performing multicast communication and the "Communication channel" currently in use being set in the control information field (S436), before the multicast communication signal is transmitted ion the multicast communication channel (S437).

For example, if a personal station belonging to the specified group was unable to participate in multicast communication due to being OFF during a simultaneous call for that group, then the cell station 101 transmits a multicast communication signal to the personal station cyclically on the control channel.

Also, if the control information field is in the communication signal received on the control channel is "Multicast communication participation request" (S439, S440:Yes), then the communication control unit 203 generates the reporting signal, setting "Multicast communication participation reception (0000 1001B)" in the control classification field and the "PSID" of the participating requesting station in the control information field (S441). If the station requesting participation belongs to the group currently executing multicast participation (S442:Yes), then "Participation reception" is set in the control information field (S443), or if the station requesting participation does not belong to the group currently executing multicast participation (S442:No), then "Participation refusal" is set in the control information field (S444), before the reporting signal is transmitted on the control channel (S445).

On the other hand, the communication control unit 303 in each receiver station in an idle state execute the process shown in FIG. 43B at the point shown by the reception process of a simultaneous call shown in FIG. 21B.

As shown in FIG. 43B, after being turned ON, the communication control unit 303 observes the control channel and supplements the signal from the cell station (R435, R436) and, if it is a reporting signal (R437:Yes), executes the process described below.

If the control classification field in the reporting signal is "Multicast communication information" (R438:Yes), and the "Group number" in the control information field is the group to which it belongs (R439:Yes), then the communication control unit 303 generates the communication signal, setting "Multicast communication participation request" in the control classification field and its own "PSI" in the control information field (R440), before transmitting the communication signal on the control channel (S441).

Also, if the control classification field in the reporting signal is "Multicast communication participation response" (R442:Yes), and, in the control information field, its own "Group number" and "Participation reception" are set (R443:Yes), then it sets the communication channel indicated in the control information field of the reporting signal (S444) and assumes multicast communication mode (R212).

Figure 44A:
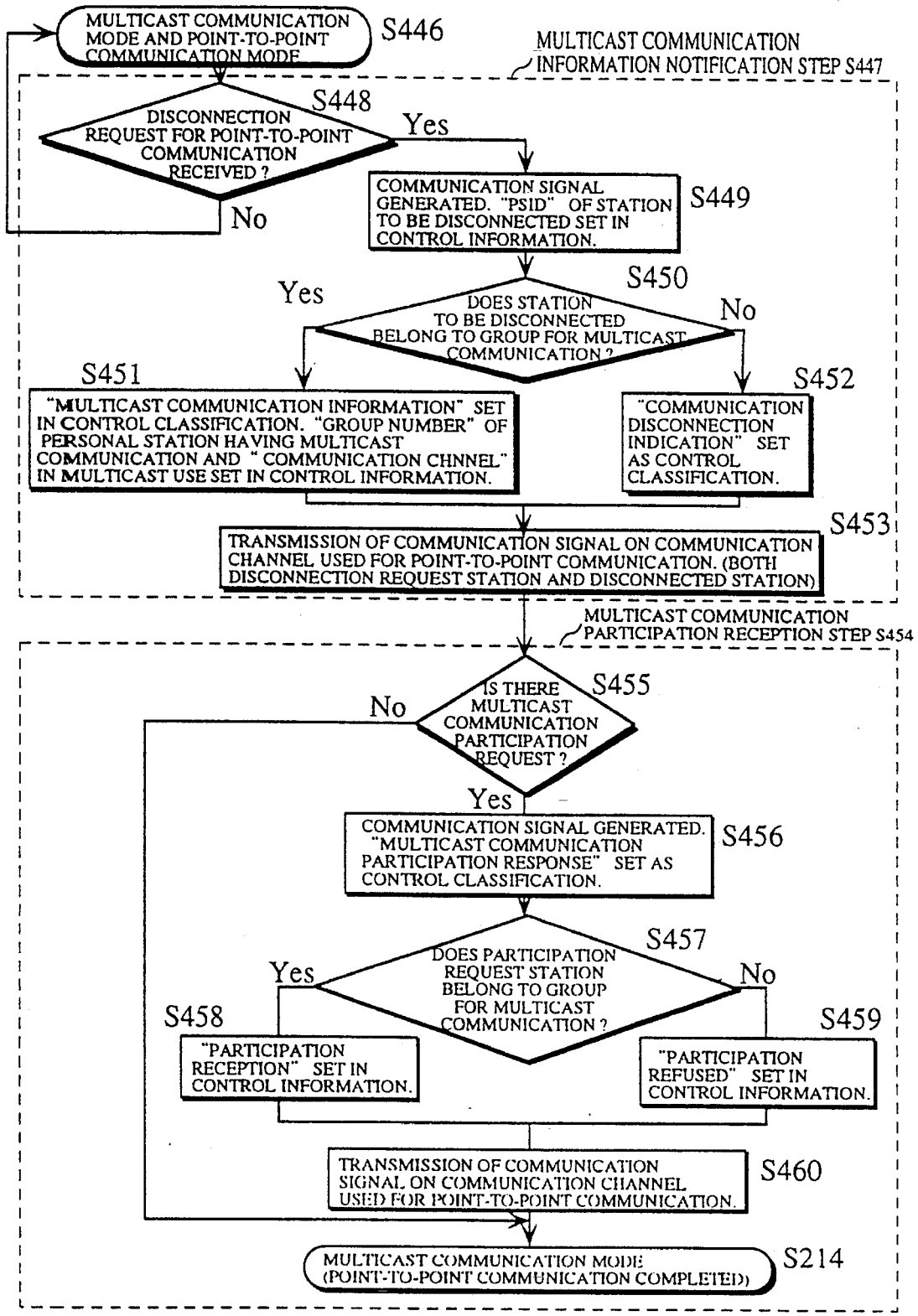
FIG. 44A is a flowchart showing the notification of multicast communication information/participation reception process by the cell station in the present embodiment.
Figure 44B:
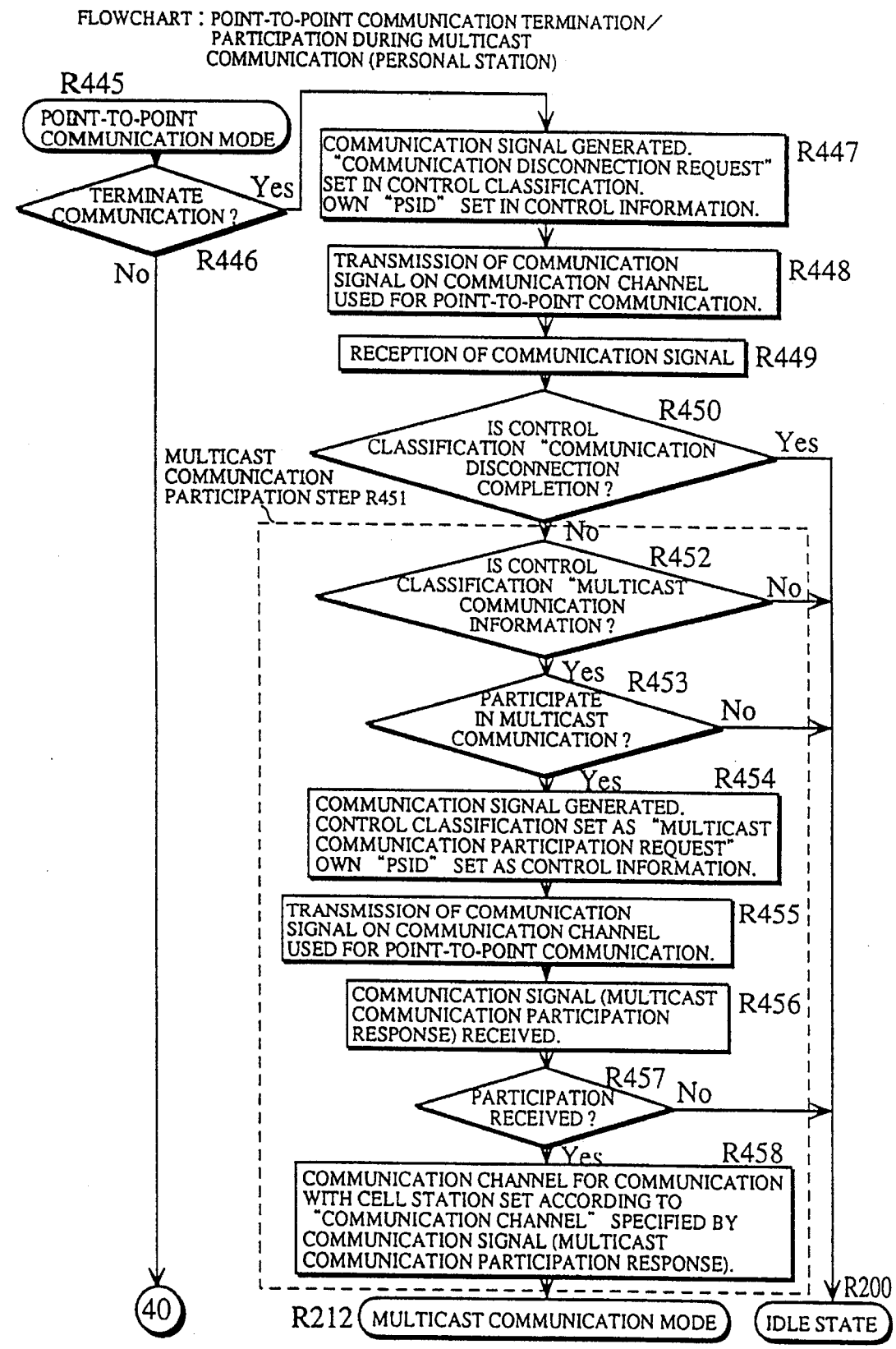
FIG. 44B is a flowchart for the point-to-point communication termination/multicast communication midway participation request process for a personal station in the present embodiment.
Figure 44C:
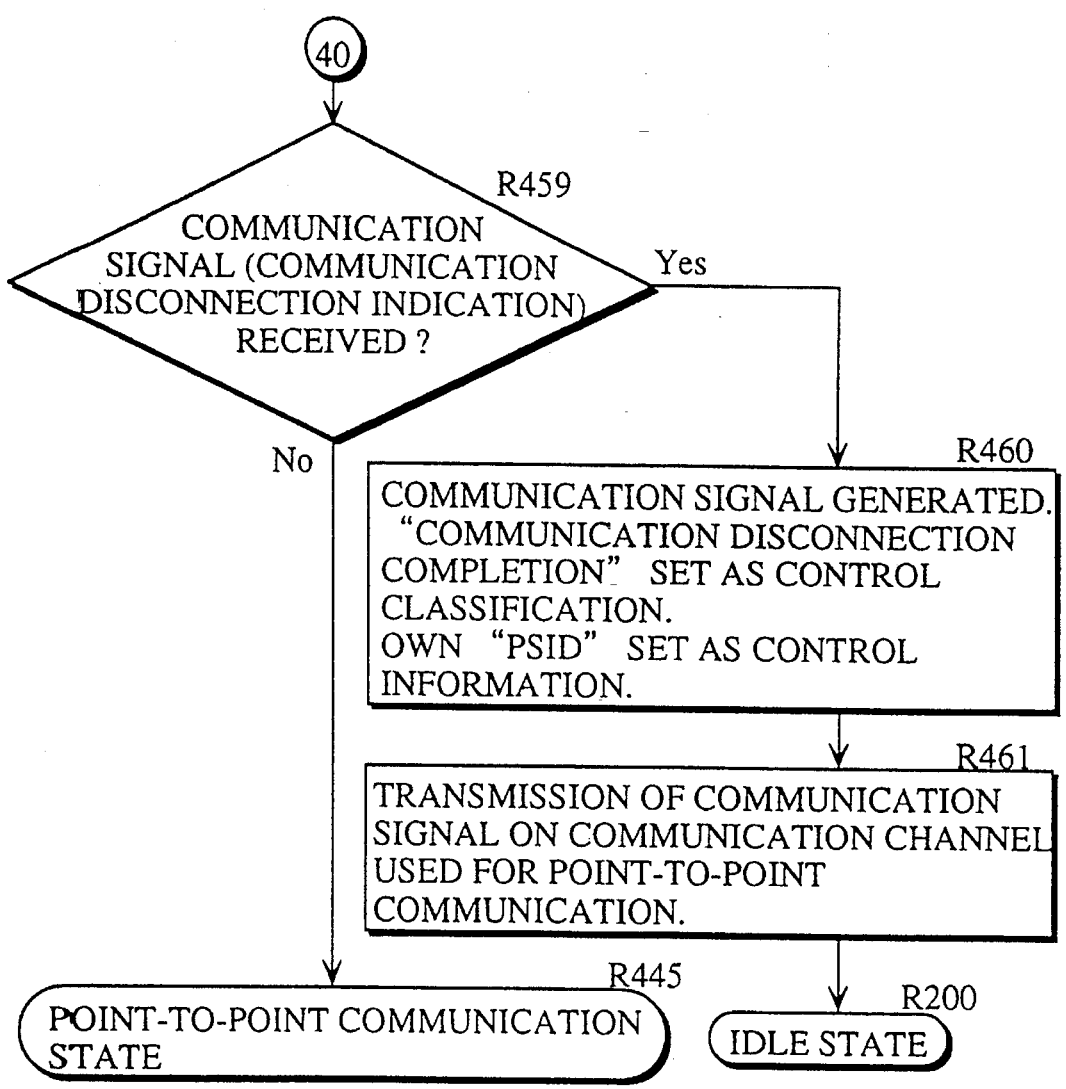
FIG. 44C is a flowchart showing the point-to-point communication termination process for a personal station in the present embodiment.

FIGS. 44A, 44B, and 44C are flowcharts showing the notification/participation reception process for the cell station when executing multicast communication and point-to-point communication simultaneously, the midway participation process for a receiver station, and the point-to-point communication termination process for a receiver station.

The communication control unit 203 in the cell station 101 executes the process shown in FIG. 44A just before executing the multicast data sorting step S219 shown in FIG. 22A. As shown in FIG. 44A, on receiving a communication disconnection request from one of the personal stations (or terminal) executing point-to-point communication (S448:Yes), the communication control unit 203 generates a communication signal, setting the "PSID" of the personal station to be disconnected in the control information field (S449) and, if the station to be disconnected belongs to a group executing multicast communication (S450:Yes), sets "Multicast communication information (0000 1010B)" in the control classification field (S451), while if the station to be disconnected belongs to a group executing multicast communication (S450:No), sets "Communication disconnection information (0000 1100B)" in the control classification field (S452), before transmitting the communication signal on the communication channel that was used for point-to-point communication (S453). This communication signal is generated and transmitted for both of the personal stations executing point-to-point communication.

Also, if there is a request for multicast communication participation from one of the personal stations in point-to-point communication (S455:Yes), then the communication control unit 203 generates a communication signal, setting "Multicast communication participation reception" in the control classification field (S456). If the personal station requesting participation belongs to a group executing multicast communication (S457:Yes), then "Participation reception" is set in the control information field (S458), while if the personal station requesting participation does not belong to a group executing multicast communication (S457:No), then "Participation refusal" is set in the control information field (S459), before the communication signal is set on the communication channel used for point-to-point communication (S460), and point-to-point communication is terminated.

On the other hand, the communication control unit 303 in each receiver personal station executes the process shown in FIG. 44B on terminating point-to-point communication. On receiving an indication or termination of point-to-point communication by means of a user operation (R446:Yes), the communication control unit 303 generates a communication signal, setting "Communication disconnection request" in the control classification field and its own "PSID" in the control information field (R447), transmitting the communication signal on the communication channel used for point-to-point communication (R448). Next, it receives the communication signal from the cell station 101 (R449) and, if the control classification field of the communication signal is "Communication disconnection completion" (R450:Yes), returns to an idle state (R200).

If the control classification is "Multicast communication information" (R452:Yes), and there is an indication to participate in multicast communication by means of a user operation (R453:Yes), then the communication control unit 303 generates a communication signal, setting "Multicast communication participation request" in the control classification field and its own "PSID" in the control information field (R454), before transmitting on the channel used for point-to-point communication (R455). Next it receives the communication signal whose control classification field is "Multicast communication participation response" from the cell station (R456) and, if the control information is "Participation reception" (R457:Yes), sets the communication channel as indicated in the control information field (R458), and assumes multicast communication mode (R212).

As shown in FIG. 44C, if it receives a communication signal which shows a communication disconnection indication from the other station in point-to-point communication (R459), the communication control unit 303 generates a communication signal, setting "Communication disconnection completion" in the control classification field and its own "PSID" in the control information field (R460), before sending the communication signal on the communication channel used for point-to-point communication (R461) and returning to an idle state (R200).

The following is a description of the operation for mobile transmission in this ninth embodiment constructed as described above, with (9.1) below being the operation when a personal station is switched from OFF to ON and participates midway in multicast communication and (9.2) being the operation when a personal station participates midway in multicast communication after terminating point-to-point communication.

Figure 45:
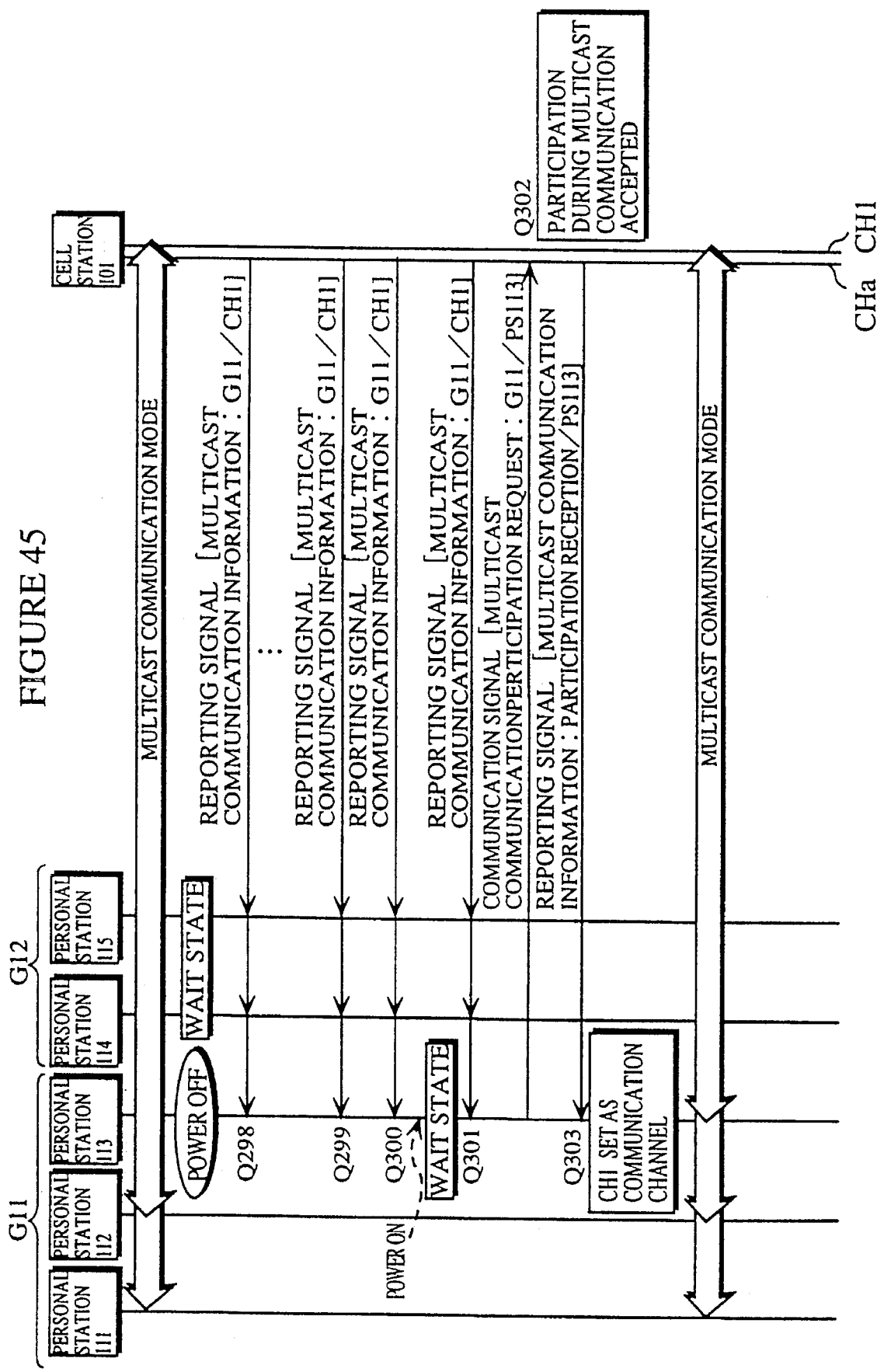
FIG. 45 is a sequence chart showing a multicast communication midway control sequence in the present embodiment.

(9.1) Operation when a Personal Station is Switched from OFF to ON and Participates Midway in Multicast Communication FIG. 45 is a sequence chart showing the control sequence for midway participation into multicast communication for the present embodiment.

For this example, personal stations 111–113 belong to group 1 and personal stations 14–115 belong to group 2. Groups 1 and 2 have been allocated the group numbers G11 and G12 for purposes of identification. At the start of this sequence, multicast communication is being executed using communication channel CH1 between the station which requested the simultaneous call (possibly the cell station) and the personal stations belonging to group 1 via the cell station 101. However, personal station 113 in group 1 is not participating in multicast communication due to its switch being in an OFF position.

Multicast Communication Information Reporting

The cell station 101 cyclically transmits the reporting signal SG4 as the multicast communication information reporting signal on the control channel CHa to all of the personal stations in its radio cell 110 (Q298–Q301, Q303). On this occasion, in the reporting signal SG4 sent as the multicast communication information reporting signal, "Multicast communication information" is set in the control classification field, the group number for the group for multicast communication "G11" and the communication channel for multicast communication "CH1" are set in the control information field. Also, it should be noted that the control channel CHa used here for sending the reporting signal SG4 is a radio channel that can be received by every personal station in a wait state in the radio cell 110.

Multicast Communication Midway Participation Request

Once the personal station 113 is switched ON, it assumes a wait state in the radio cell 110, so that it receives the reporting signal SG4 as the multicast communication information sent cyclically on the control channel CHa by the cell station 101 (Q301). Then the personal station 113 judges whether the group number "G11" specified in the multicast communication information notification signal agrees with the group number of the group to which it belongs, remaining in a wait state if it does not agree. Since in this example personal station 113 belongs to group 1 whose group number is "G11", if personal station 113 wishes to participate in multicast communication, then it sends the communication signal SG3 as the multicast communication participation request signal on the control channel CHa to the cell station 101 (Q302). On this occasion, "Multicast communication participation request" is set as control classification field of the communication signal SG3 sent as the multicast communication participation request signal, with its own PSID "PS113" and the group number of the group to which it belongs "G11" being set in the control information field.

Multicast Communication Participation Reception

Next, on receiving the communication signal SG3 sent as the multicast communication participation request signal from the personal station 113, the cell station 101 refers to "G11" and "PS113" in the control information field and judges whether to accept the participation into multicast communication. Then, by sending the reporting signal SG4 as the multicast communication participation reception signal to personal station 113, it gives notification of participation reception/participation refused for multicast communication (Q303). On this occasion, in the reporting signal SG4 sent as the multicast communication participation reception signal, "Multicast communication participation reception" is set in the control classification field, while the PSID "PS113" and "Multicast participation acceptance result (participation reception/participation refused)" are set in the control information field.

Multicast Communication Participation

Finally, having received the reporting signal SG4 sent as the multicast communication participation reception signal from the cell station, the personal station 113, on finding that the control information is "Participation refused", remains in a wait state. In this example, since the control information field in the multicast communication participation reception signal is set as "Participation reception", the personal station 113 receives the multicast communication signal from the cell station 101 on the communication channel "CH1" indicated in the multicast communication participation reception signal, thereby commencing participation in multicast communication.

Figure 46:
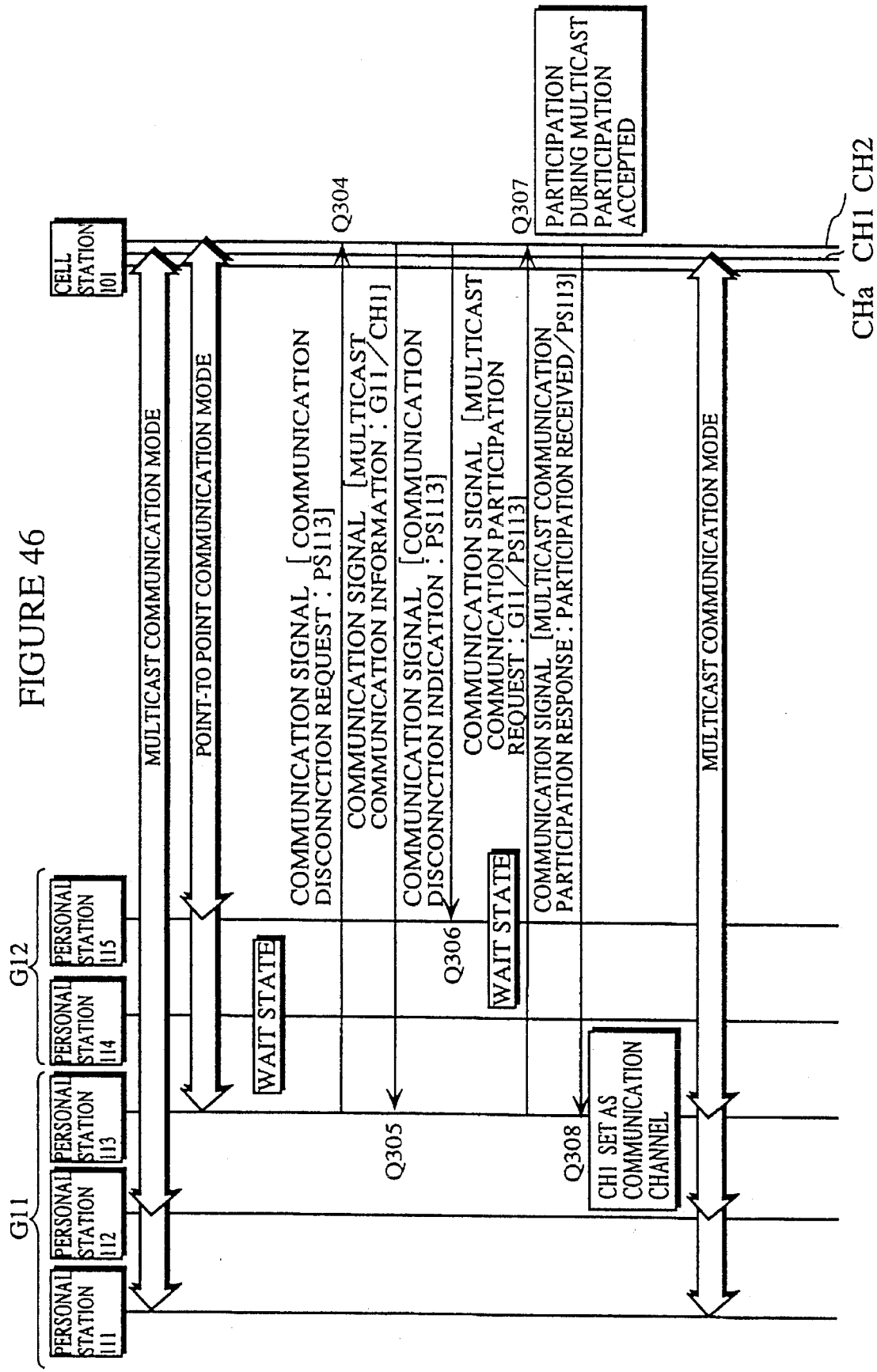
FIG. 46 is a sequence chart showing a multicast communication midway control sequence in the present embodiment.

(9.2) Operation when a Personal Station Participates Midway in Multicast Communication After Terminating Point-to-Point Communication FIG. 46 is a sequence chart showing the control sequence for midway participation into multicast communication for a personal station after terminating point-to-point communication.

At the start of this sequence, multicast communication is being executed using communication channel CH1 between the station which requested the simultaneous cell (possibly the cell station) and the personal stations belonging to group 1 via the cell station 101. However, personal station 113 in group 1 is not participating in multicast communication and is instead executing point-to-point communication with another personal station (for example, personal station 115) on communication channel CH2 via the cell station 101.

Multicast Communication Notification

Once communication between the personal station 113 and the personal station 115 is to be terminated, the personal station 113 sends the communication signal SG3 as the communication disconnection request to the cell station 101 using the communication channel CH2 (Q304). On this occasion it sets for the communication signal SG3 sent as the communication disconnection request, the control classification "Communication disconnection request" and the control information "PS113" for its own station.

Next, on receiving the communication signal SG3 sent as the communication disconnection request from the personal station 113, the cell station 101 determines whether the personal station to be disconnected belongs to the group which is involved in multicast communication and, if it is in such a group, transmits the communication signal SG3 as the multicast communication information notification signal to the personal station 113 on the communication channel CH2 (Q305). On this occasion, in the communication control field of the communication signal SG3 sent as the multicast communication information notification signal, "Multicast communication information" is set in the control classification field and the group number of the group which is involved in multicast communication "G11" and the communication channel being used for multicast communication "CH1" are set in the control information field. On the other hand, for the personal station 115 which does not belong to the group which is involved in multicast communication, the communication signal SG3 in sent by the cell station 101 as the communication disconnection indication signal (Q306), with the personal station 115 returning to a wait state.

Switch to Multicast Communication

Next, on receiving the multicast communication information signal, the personal station 113 refers to the group number "G11" set in the control information field, and determines whether to participate in multicast communication, returning to a wait state if it does not wish to participate in multicast communication. In the illustrated example, since it wishes to participate in multicast communication, it transmits the communication signal SG3 as the multicast communication participation request signal to the cell station 101 (Q307). In doing so it sets in the communication control field of the communication signal SG3 used as the multicast communication participation request signal, the control classification "Multicast communication participation request" and the control information "PS113" for its own station and "G11" for the group to which it belongs.

On receiving the communication signal SG3 used as the multicast communication participation request signal from the personal station 113, the cell station 101 adds personal station 113 to the stations to be called under multicast communication and terminates the communication which was executed on communication channel CH2, before transmitting the communication signal SG3 as the multicast communication participation response signal to the personal station 113 (Q308). In doing so, it sets in the communication control field of the communication signal SG3 used as the multicast communication participation response signal, the control classification "Multicast communication participation response" and the control information "PS113" and "Participation reception". Finally, having received the communication signal SG3 used as the multicast communication participation response signal from the cell station 101, since "Participation reception" is set in the control information, the personal station 113 uses the communication channel CH1 included in the multicast communication information notification signal, receives the multicast communication signal from the cell station 101, and hence participates in multicast participation.

It should be noted that in the embodiments described above, each personal station has been described as belonging to only one group, although it is possible for each of the personal stations to belong to a number of groups simultaneously. In such a case, the PSIDs of the personal stations which belong to a number of groups may be set in the group management table shown in FIG. 4. Also, the group management table was composed so as to have the personal stations classified into independent groups, it may also be composed to have the personal stations classified into overlapping groups or subordinate groups, with in this case, group numbers also being written in the "PSID" column.

In the second and fourth embodiments, the personal station 111 or the cell station 101 executing polling control grants transmission permission to the personal stations successively one at a time, although the personal station 111 or the cell station 101 may grant transmission permission to a personal station in response to a random transmission request. By doing so, a reduction in the energy used when executing polling control may be made for the personal station 111 or the cell station 101.

In the fourth embodiment, the cell station 101, on receiving a request for a simultaneous call, is described as only transmitting the simultaneous call signal once to the personal stations in a wait state, although it may transmit the simultaneous call signal many times. If it does so, then even if the personal stations are equipped with a construction for receiving the control signal from the cell station 101 cyclically (using a battery saving cycle) in order to reduce the amount of electrical power consumed, it can be ensured that every personal station will receive the simultaneous call signal.

In the fifth (or sixth) embodiments, every personal station is described as transmitting its carrier sensing response (or channel setting completion signal/channel setting failure signal) at a predetermined time to the cell station 101 in order to avoid interference between the signals, but if the cell station is able to receive a number of signals on different channels simultaneously, then all of the personal stations may transmit their channel sensing response (or channel setting response signal) simultaneously on different channels.

In the fifth (or sixth) embodiments, the cell station 101 is described as deciding the communication channel to be used and commencing multicast communication after receiving the carrier sensing responses [usable] (or channel setting completion signals) from all of the personal stations in the radio cell 110, although it may commence multicast communication after receiving carrier sensing responses [usable] (or channel setting completion signals) from at least a predetermined number of personal stations or a minimum predetermined percentage of the personal stations. In such a case, S286 in FIG. 28A (S302 in FIG. 30A) is changed so as to confirm whether the number of responses is above the preset number or percentage.

In the fourth embodiment, the cell station 101 is described as relaying the data received from the personal station which was granted the right of transmission during polling control to the station which requested the simultaneous call (possibly the cell station itself), but it may also store the data in the multicast communication signal and multicast transmit it to all of the personal stations. In this case, the communication control unit 203 in the cell station 101 takes the data received in S240 in FIG. 22B and, in addition to setting it in the information field in S234 in FIG. 22A, sets the information flag as valid before transmitting.

In the seventh embodiment, personal stations, on receiving the polling request signal from the cell station 101, send the channel switching request signal on the communication channel CH1 being used for multicast communication to the cell station 101, though they may send the channel switching request signal on the control channel CHa which can be used anytime for sending and receiving signals between the personal stations and the cell station. In this case, S324 in FIG. 32A will change so that transmission is on the control channel and not on a communication channel. In this case, personal stations may be set to observe the control channel.

In the seventh embodiment, the cell station, on receiving the point-to-point communication request signal from a personal station in multicast communication mode, sets the communication mode as point-to-point communication mode, but the cell station may also commence point-to-point communication on receiving a request for point-to-point communication with a specified personal station from the simultaneous call signal (possibly the cell station itself). In this case, S325 in FIG. 32A in changed so as to include the judging of whether a request from the station which requested the simultaneous call (possibly the cell station itself) for point-to-point communication with a specified personal station has been received.

In the seventh embodiment, when commencing point-to-point communication with a continuation of multicast communication, the cell station 101 is designed so as to switch the communication channel used for communication with the personal station which gave the point-to-point communication request from communication channel CH1 used for multicast communication to communication channel CH2, although it may do the opposite by sending a channel switching indication signal to all of the personal stations remaining in multicast communication, so that communication channel CH1 which was used for multicast communication is hereafter used for point-to-point communication.

In the eighth embodiment, the cell station 101 is described as setting the busy tone transmission information in the multicast communication signal and transmitting to all of the personal stations in multicast communication mode, but by also setting the busy tone transmission information in the communication signal and transmitting to the personal stations in point-to-point communication mode, the cell station may request the transmission of a busy tone signal from the personal stations in its radio cell, regardless of whether they are in multicast communication mode or point-to-point communication mode.

In the ninth embodiment, the personal station 113 is described as executing the multicast communication midway participation process when it is switched from OFF to ON and assumes a wait state, when a personal station assumes a wait station having been moved from outside the radio cell 110 to inside the cell, it may also execute the multicast communication midway participation process. In such as case, it is judged whether the personal station has moved into the radio cell in R430, R435, and R436 in FIG. 43B. Also, the cell station 101 was described as cyclically transmitting the notification signal, and it should be noted here that the number of transmissions and transmission interval may be set by the cell station or by the point-to-point communication.

In the ninth embodiment, the example operation of when the personal station 113 switches from point-to-point communication to participating midway in multicast communication was shown in FIG. 46. In this case, the station communicating with personal station 113 need not be the personal channel 115 and indeed can be a terminal (telephone) connected via the communications network 120. Also, the personal station 113 was described as transmitting the communication disconnection request (Q304 in FIG. 46), although the operation thereafter will be the same even it were the personal station 115 which transmitted the communication disconnection request. In this case, the personal station 113 on receiving the multicast communication information, if participation in multicast communication is not desired, may set "Multicast communication participation refused" instead of "Multicast communication participation request" in the control classification field before transmitting to the cell station 101.

In the seventh embodiment, in FIG. 38, the cell station 101 was described as receiving a request to terminate multicast communication for the personal station 111 from the station which requested the simultaneous call and transmitting the multicast communication disconnection indication to the personal station 111. However, in this case, the station which requested the simultaneous call may instead specify the personal stations for which multicast communication will continue.

In the seventh embodiment, as shown in FIG. 39, the personal station 113 which received the individual call signal was described as transmitting the reception response signal using the communication channel CH1 used for multicast communication, although it may transmit using the control channel CHa. Also, when the personal station 113 does not wish to respond after receiving a signal, then it may send a reception refusal signal instead of the reception response signal. Also, the personal station 115 in the radio cell 110 was described requesting the personal call, although it may be a station connected via the communications network 120 or the cell station itself which makes the individual call.

In each of the above embodiments, the set up is for executing communication between a cell station and a number of personal stations, although the present invention should not be construed as being limited to such, as can be more widely applied to use by a communication system with a main station (which can include both mobile type and fixed type) and a number of sub-stations (which can include both mobile type and fixed type).

In each of the above embodiments, communication is described as being for digital mobile radio communication using TDMA/TDD methods in which radio channels are indicated by carriers and time slots, but the present invention should not be construed as being limited to such, and may also be used for mobile radio communication using TDMA/FDD methods or any other access method or transmission method.

Although the present invention has been fully described by way of examples with reference to the accompanying drawings, it is to be noted that various changes and modification will be apparent to those skilled in the art. Therefore, unless such changes and modifications depart from the scope of the present invention, they should be construed as being included therein.

What is claimed is:

1. In a mobile communication system comprising a cell station and a plurality of personal stations, the cell station controlling the plurality of personal stations using a control channel and a plurality of communication channels, the plurality of personal stations performing digital radio communications via the cell station while monitoring the control channel and the plurality of communication channels, each of the plurality of personal stations being a caller personal station, which performs direct multicast communications with other personal stations, the caller personal station comprising:

- a channel search means for scanning the plurality of communication channels to search for an unoccupied channel and regarding the unoccupied channel as a multicast channel;
- a simultaneous call means for repeatedly transmitting a simultaneous call frame on the multicast channel for a first predetermined time period, the simultaneous call frame indicating a simultaneous call to the other personal stations;
- a multicast means for transmitting multicast frames on the multicast channel when a second predetermined time period has passed, said multicast frames containing data to be multicast; and
- on receiving the simultaneous call frame by sequentially sensing the plurality of communication channels, the other personal stations enter a receiving state of multicast frame on the multicast channel.

2. The caller personal station of claim 1, wherein said simultaneous call means comprises:

- a simultaneous call frame generation means for generating the simultaneous call frame;
- a transmission timer for counting the first predetermined time period and generating a time-out; and
- a simultaneous call frame transmission means for repeatedly transmitting the simultaneous call frame on the multicast channel from a start of counting the predetermined time period until the time-out is generated.

3. The caller personal station of claim 2 further comprising a table means for holding group numbers respectively assigned to groups into which the plurality of personal stations are predeterminately divided,

- wherein said simultaneous call means further comprises a call number setting means for setting one of the group numbers to the simultaneous call frame generated by said simultaneous call frame generating means;
- said simultaneous call frame transmission means transmits on the multicast channel the simultaneous call frame in which the group number is set; and
- on receiving the simultaneous call frame, any of the other personal stations which belong to a group indicated by the group number set in the simultaneous call frame enter a receiving state of multicast frames on the multicast channel.

4. The caller personal station of claim 3, wherein said table means further holds a global number commonly assigned to all of the plurality of personal stations;

- said call number setting means sets the global number and a group number selectively to the simultaneous call frame generated by said simultaneous call frame generation means;
- said simultaneous call frame transmission means transmits on the multicast channel the simultaneous call frame in which one of the global number and a group number is set; and
- on receiving the simultaneous call frame in which the global number is set, the other personal stations enter a receiving state of multicast frames on the multicast channel.

5. The caller personal station of claim 3 further comprising:

- a reception means for receiving from an operator an instruction which indicates a start of the multicast communications and an instruction which specifies a group to be applied the multicast communications, wherein on receiving both the instruction for starting the multicast communications and the instruction for specifying a group to be applied the multicast communications, said cell number setting means sets the group number to the simultaneous call frame, and
- on receiving the instruction for starting multicast communications only, said call number setting means sets the global number to the simultaneous call frame.

6. The caller personal station of claim 2, wherein said multicast means comprises:

- a stand-by timer for counting a stand-by time period required for the other personal stations to set the multicast channel into a communication state when the time-out is generated;
- a multicast frame generation means for generating multicast frames which carry data to be multicast to the other personal stations; and
- a multicast frame transmission means for transmitting generated multicast frames on the multicast channel when the stand-by time period has passed.

7. The caller personal station of claim 6 further comprising an invalid data information setting means for setting information which indicates that data are invalid to a multicast frame generated by said multicast frame generation means when there is no data to be transmitted, so that the cell station and the other personal stations distinguish the multicast channel from an unoccupied channel.

8. The caller personal station of claim 6, wherein said multicast means further comprises a point-to-point communications information setting means for setting point-to-point communications information to a multicast frame generated by said multicast frame generation means, together with a personal station number of a person station to be applied the point-to-point communications, said point-to-point communications information indicating that the caller personal station starts to communicate with one of the other personal stations;

- said multicast frame transmission means transmits the multicast frame which contains the point-to-point communication information;
- on receiving the multicast frame which contains the point-to-point communication information, a personal station which is assigned the personal station number set in the multicast frame enter a point-to-point communication state on the multicast channel, and the other personal stations which are not assigned the personal station number suspend the multicast communications on the multicast channel.

9. The caller personal station of claim 6 further comprising a table means for holding personal station numbers and group numbers, the personal station numbers being assigned to each of the plurality of personal stations and the group numbers being assigned to groups into which all of the plurality of personal stations are predeterminately divided, wherein said multicast means further comprises a group number setting means for setting a specified group number to a multicast frame generated by said multicast frame generation means, said multicast frame transmission means transmits the multicast frame in which the specified group number is set, and on receiving the multicast frame, any of the personal stations which do belong to a group indicated by the group number set in the multicast frame abandon the multicast frame.

10. The caller personal station of claim 9, wherein said multicast means further comprises:

a polling information setting means for setting polling information to a multicast frame generated by said multicast frame generation means, said polling information indicating that a personal station which receives the multicast frame is allowed to transmit data; and a polling number setting means for setting one of the personal station numbers of the personal stations belonging to a predetermined group held in said table means as a polling number to every generated multicast frame, wherein said multicast frame transmission means transmits a multicast frame in which polling information and a polling number are set; and on receiving the multicast frame in which the polling information and a group number are set, a personal station assigned the group number set in the multicast frame transmits a response frame which carries data to be transmitted on the multicast channel, information which indicates that the frame is a response frame, and the personal station number.

11. The caller personal station of claim 10 further comprising:

a radio frame reception means for receiving radio frames from the other personal stations on the multicast channel;

a response frame judging means for judging a received radio frame to be a response frame if the radio frame carries information which indicates that the information is a response to the polling and a personal station number equal to the personal station number set by said polling number setting means; and a data reception means for receiving data contained in the response frame.

12. The caller personal station of claim 11 further comprising:

a reception means for receiving from an operator an instruction which indicates a start of polling and an instruction which specifies a group to be applied the polling, wherein said polling information setting means set the polling setting information to the multicast frame after the instruction which indicates a start of polling is received by said reception means;

when the instruction which specifies the group to be applied and polling is received, said polling number setting means sequentially sets the personal station numbers of the personal stations in the group to the multicast frame, and when the instruction which specifies the group to be applied the polling is not received, said polling number setting means sequentially sets all personal station numbers held in said table means to the multicast frame.

13. The caller personal station of claim 6 further comprising a table means for holding all of the plurality of personal stations, wherein said multicast means further comprises:

a polling information setting means for setting polling information to a multicast frame generated by said multicast frame generation means, said polling information indicating that a personal station which receives the multicast frame is allowed to transmit data; and p1 a polling number setting means for setting one of the personal station numbers of the personal stations held in said table means as a polling number to every generated multicast frame, wherein said multicast frame transmission means transmits a multicast frame in which polling information and a polling number are set; and on receiving the multicast frame in which the polling information and a group number are set, a personal station assigned the group number set in the multicast frame transmits a response frame which carries data to be transmitted on the multicast channel, information which indicates that the frame is a response frame, and the personal station number.

14. The caller personal station of claim 13 further comprising:

a radio frame reception means for receiving radio frames from the other personal stations on the multicast channel;

a response frame judging means for judging a received radio frame to be a response frame if the radio frame carries information which indicates that the information is a response to the polling and a personal station number equal to the personal station number set by said polling number setting means; and a data reception means for receiving data contained in the response frame.

15. The caller personal station of claim 14 further comprising:

a press talk request judging means for judging a received radio frame to be a press talk request if the radio frame carries information which indicates a request for consecutive transmission of radio frames and a personal station number equal to the personal station number set by said polling number setting means; and a press talk reception setting means for setting to the multicast frame press talk reception information which indicates a permission of press talk and a personal station number of the personal station which has made the press talk request, when the radio frame is judged to be the press talk request, wherein said polling information setting means and said polling number setting means stop an operation when the radio frame is judged to be the press talk request, said multicast frame transmission means transmits the multicast frame in which the press talk reception information and the personal station number of the personal station which has made the press talk request are set, and on receiving the multicast frame, a personal station which is assigned the personal station number of the personal station which has made the press talk request set in the radio frame transmits on multicast channel a response frame which carries data to be transmitted.

16. The caller personal station of claim 15 further comprising a data relay means for setting data carried in the response frame received by said radio frame reception means to a multicast frame generated by said multicast frame generation means as relay data, wherein said multicast frame transmission means transmits the multicast frame in which the relay data are set, in order to allow the personal station that has made the press talk request to transmit multicast data to another personal station via the caller personal station.

17. The caller personal station of claim 16, wherein
said response frame judging means judges whether a response frame carries a group number in addition to a press talk request,
said data relay means sets the group number in addition to the relay data to a multicast frame when the group number is judged to be present, in order to allow a personal station that has made a press talk request to transmit multicast data to another personal station in a specified group via the caller personal station.

18. The caller personal station of claim 13 further comprising:
a reception means for receiving response frames transmitted from the other personal stations;
a received frame judging means for judging whether the received response frames carries a point-to-point communications request which requests for a start of point-to-point communication;
a point-to-point communications information setting means for setting point-to-point communications information to the multicast frame generated by said multicast frame generation means, together with the personal station number of a personal station which has requested the point-to-point communications, when the received response frame is judged to carry the point-to-point communications, said point-to-point communications information indicating that the caller personal station starts to communicate with one of the other personal stations;
said multicast frame transmission means transmits the multicast frame which contains the point-to-point communication information;
on receiving the multicast frame which contains the point-to-point communication information, a personal station which is assigned and personal station number set in the multicast frame enter a point-to-point communication state on the multicast channel, and the other personal stations which are not assigned the personal station number suspend the multicast communications on the multicast channel.

19. The caller personal station of claim 6, wherein
said digital radio communication is based on Time Division Multiple Access/Time Division Duplex in which a carrier is divided into a plurality of time slots, and a same number of time slots is assigned for transmission and for reception to alternate on the carrier in a predetermined period,
said multicast channel represents a pair of time slots for transmission and for reception, and
said simultaneous call frame transmission means and said multicast frame transmission means respectively transmit a simultaneous call frame and a multicast frame using the time slots assigned for transmission in the predetermined period.

20. The caller personal station of claim 19 further comprising a table means for holding personal station numbers and group numbers, the personal station numbers being assigned to each of the plurality of personal stations and the group numbers being assigned to groups into which all of the plurality of personal stations are predeterminately divided, wherein
said multicast means further comprises a group number setting means for setting a specified group number to a multicast frame generated by said multicast frame generation means,
said multicast frame transmission means transmits the multicast frame in which the specified group number is set, and
on receiving the multicast frame, any of the personal stations which do belong to a group indicated by the group number set in the multicast frame abandon the multicast frame.

21. The caller personal station of claim 20, wherein said multicast means further comprises:
a polling information setting means for setting polling information to a multicast frame generated by said multicast frame generation means, said polling information indicating that a personal station which receives the multicast frame is allowed to transmit data; and
a polling number setting means for setting one of the personal station numbers of the personal stations belonging to a predetermined group held in said table means as a polling number to every generated multicast frame, wherein
said multicast frame transmission means transmits a multicast frame in which polling information and a polling number are set; and
on receiving the multicast frame in which the polling information and a group number are set, a personal station assigned the group number set in the multicast frame transmits a response frame which carries data to be transmitted on the multicast channel, information which indicates that the frame is a response frame, and the personal station number.

22. The caller personal station of claim 21 further comprising:
a radio frame reception means for receiving radio frames from the other personal stations on the multicast channel;
a response frame judging means for judging a received radio frame to be a response frame if the radio frame carries information which indicates that the information is a response to the polling and a personal station number equal to the personal station number set by said polling number setting means; and
a data reception means for receiving data contained in the response frame.

23. The caller personal station of claim 22 further comprising:
a reception means for receiving from an operator an instruction which indicates a start of polling and an instruction which specifies a group to be applied the polling,
wherein said polling information setting means set the polling setting information to the multicast frame after the instruction which indicates a start of polling is received by said reception means;
when the instruction which specifies the group to be applied and polling is received, said polling number setting means sequentially sets the personal station numbers of the personal stations in the group to the multicast frame, and when the instruction which specifies the group to be applied the polling is not received, said polling number setting means sequentially sets all personal station numbers held in said table means to the multicast frame.

24. The caller personal station of claim 19 further comprising a table means for holding all of the plurality of personal stations, wherein said multicast means further comprises:

a polling information setting means for setting polling information to a multicast frame generated by said multicast frame generation means, said polling information indicating that a personal station which receives the multicast frame is allowed to transmit data; and a polling number setting means for setting one of the personal station numbers of the personal stations held in said table means as a polling number to every generated multicast frame, wherein said multicast frame transmission means transmits a multicast frame in which polling information and a polling number are set; and on receiving the multicast frame in which the polling information and a group number are set, a personal station assigned the group number set in the multicast frame transmits a response frame which carries data to be transmitted on the multicast channel, information which indicates that the frame is a response frame, and the personal station number.

25. The caller personal station of claim 24 further comprising:

a radio frame reception means for receiving radio frames from the other personal stations on the multicast channel;

a response frame judging means for judging a received radio frame to be a response frame if the radio frame carries information which indicates that the information is a response to the polling and a personal station number equal to the personal station number set by said polling number setting means; and a data reception means for receiving data contained in the response frame.

26. The caller personal station of claim 25 further comprising:

a press talk request judging means for judging a received radio frame to be a press talk request if the radio frame carries information which indicates a request for consecutive transmission of radio frames and a personal station number equal to the personal station number set by said polling number setting means; and a press talk reception setting means for setting to the multicast frame press talk reception information which indicates a permission of press talk and a personal station number of the personal station which has made the press talk request, when the radio frame is judged to be the press talk request, wherein said polling information setting means and said polling number setting means stop an operation when the radio frame is judged to be the press talk request, said multicast frame transmission means transmits the multicast frame in which the press talk reception information and the personal station number of the personal station which has made the press talk request are set, and on receiving the multicast frame, a personal station which is assigned the personal station number of the personal station which has made the press talk request set in the radio frame transmits on the multicast channel a response frame which carries data to be transmitted.

27. The caller personal station of claim 26 further comprising a data relay means for setting data carried in the response frame received by said radio frame reception means to a multicast frame generated by said multicast frame generation means as relay data, wherein said multicast frame transmission means transmits the multicast frame in which the relay data are set, in order to allow the personal station that has made the press talk request to transmit multicast data to another personal station via the caller personal station.

28. The caller personal station of claim 27, wherein said response frame judging means judges whether a response frame carries a group number in addition to a press talk request, said data relay means sets the group number in addition to the relay data to a multicast frame when the group number is judged to be present, in order to allow a personal station that has made a press talk request to transmit multicast data to another personal station in a specified group via the caller personal station.

29. The caller personal station of claim 24 further comprising:

a reception means for receiving response frames transmitted from the other personal stations;

a received frame judging means for judging whether the received response frames carries a point-to-point communications request which requests for a start of point-to-point communication;

a point-to-point communications information setting means for setting point-to-point communications information to the multicast frame generated by said multicast frame generation means, together with the personal station number of a personal station which has requested the point-to-point communications, when the received response frame is judged to carry the point-to-point communications, said point-to-point communications information indicating that the caller personal station starts to communicate with one of the other personal stations;

said multicast frame transmission means transmits the multicast frame which contains the point-to-point communication information;

on receiving the multicast frame which contains the point-to-point communication information, a personal station which is assigned and personal station number set in the multicast frame can enter a point-to-point communication state on the multicast channel, and the other personal stations which are not assigned the personal station number suspend the multicast communications on the multicast channel.

30. In a mobile communication system comprising a cell station and a plurality of personal stations, the cell station controlling the plurality of personal stations using a control channel and a plurality of communication channels, the plurality of personal stations performing digital radio communications via the cell station while monitoring the control channel and the plurality of communication channels, one of the plurality of personal stations being a caller personal station, which performs direct multicast communications with other personal stations, each of the other personal station being a receiver personal station, the receiver personal station comprising:

a reception means for receiving radio frames on the plurality of communication channels;

a channel scanning means for sequentially scanning the plurality of communication channels;

a simultaneous call frame judging means for judging whether a radio frame received by said reception means is a simultaneous call frame transmitted from the caller personal station;

a multicast channel setting means for setting a communication channel on which the simultaneous call frame is received by said reception means as a multicast channel when the radio frame is judged to be the simultaneous call frame and for suspending an operation of said channel scanning means; and said reception means receiving multicast frames transmitted from the caller personal station on the multicast channel.

31. The receiver personal station of claim 30 further comprising a call number holding means for holding one of group numbers assigned to the receiver personal station, the group numbers respectively assigned to groups into which the plurality of personal stations are predeterminately divided, wherein said simultaneous call frame judging means comprises:

a simultaneous call identification judging means for judging whether a radio frame received by said reception means carries an identification of simultaneous call;

a call number judging means for judging whether the radio frame carries the group number assigned to the receiver personal station;

a reception determination means for determining to receive the radio frame when the radio frame is judged to carry the identification of simultaneous call and the group number assigned to the receiver personal station; and said multicast channel setting means makes said reception means set a said communication channel on which the radio frame is received to a multicast channel and suspend the operation of said channel scanning means.

32. The receiver personal station of claim 31, wherein said call number holding means holds a global number commonly assigned to all of the plurality of personal stations;

said call number judging means judges whether a received radio frame carries the global number; and said reception determination means determines to receive the radio frame when the radio frame is judged to carry the identification of simultaneous call and the global number.

33. The receiver personal station of claim 32 further comprising:

a validity judging means for judging whether a multicast frame received by said reception means carries information which indicates that data in the multicast frame is invalid; and a data abandonment means for abandoning the data when the multicast frame is judged to carry the information which indicates invalidity of the data; wherein the caller personal station transmits on the multicast channel a multicast frame which carries information which indicates that data are invalid when there is no data to be transmitted, so that the cell station and the other personal stations distinguish the multicast channel from an unoccupied channel.

34. The receiver personal station of claim 33, wherein said digital radio communication is based on Time Division Multiple Access/Time Division Duplex in which a carrier is divided into a plurality of time slots, and a same number of time slots is assigned for transmission and for reception to alternate on the carrier in a predetermined period, said multicast channel represents a pair of time slots for transmission and for reception, and a simultaneous call frame transmission means and a multicast frame transmission means for respectively transmitting a simultaneous call frame and a multicast frame using the time slots assigned for transmission in the predetermined period.

35. The receiver personal station of claim 30 further comprising:

a call number holding means for holding one of group numbers assigned to the receiver personal station, the group numbers respectively assigned to groups into which the plurality of personal stations are predeterminately divided;

a multicast frame judging means for judging whether a multicast frame received by said reception means carries a group number assigned to the receiver personal station as a destination number; and a frame abandonment means for abandoning the multicast frame when the multicast frame is judged not to carry the group number assigned to the receiver personal station, and for receiving data in the multicast frame when the multicast frame is judged to carry the group number assigned to the receiver personal station, wherein when said caller personal station performs the multicast communications with a specific group, said caller personal station sets a group number to the multicast frame.

36. The receiver personal station of claim 30 further comprising:

a response frame generation means for generating a response frame which carries data to be transmitted to the caller personal station;

a polling judging mean for judging a multicast frame received by said reception means as a polling request if the multicast frame carries polling information which indicates that the caller personal station allows the receiver personal station to transmit data and a personal station number assigned to the receiver personal station;

a polling response setting means for setting information indicating that the response frame is a response to the polling, and the personal station number of the receiver personal station to the response frame when the multicast frame is judged to be the polling request; and a transmission means for transmitting on the multicast channel the response frame in which the information indicating that a response frame is a response to the polling and the personal station number of the receiver personal station are set.

37. The receiver personal station of claim 36 further comprising:

an instruction reception means for receiving from an operator an instruction which indicates a start of press talk for sequentially transmitting response frames to the caller personal station; and a press talk request setting means for suspending an operation of said polling response setting means and setting to a generated response frame information which indicate a press talk request and the personal station number of the receiver personal station when the multicast frame is judged to be the polling request and the instruction indicating the start of the press talk is received, wherein said transmission means transmits on the multicast channel the response frame in which the information indicating that the response frame is the press talk request and the personal station number of the receiver personal station are set.

38. The receiver personal station of claim 36 further comprising:

an instruction reception means for receiving from an operator an instruction which indicates a start of point-to-point communications with the caller personal station;

point-to-point communication request setting means for suspending the operation of said polling response setting means and setting to a generated response frame information indicated a point-to-point communications request and the personal station number of the receiver personal station when the multicast frame is judged to be the polling request and the instruction indicating the start of the point-to-point communications is received;

a point-to-point communications determination means for determining to start point-to-point communications if a multicast frame received by said reception means carries point-to-point communications information which indicates the start of the point-to-point communications and the personal station number of the receiver personal station; and a point-to-point communication start means for starting the point-to-point communications with the caller personal station on the multicast channel if the start of the point-to-point communications is determined.

39. In a mobile communication system comprising a cell station and a plurality of personal stations, the cell station controlling the plurality of personal stations using a control channel and a plurality of communication channels, the plurality of personal stations performing digital radio communications via the cell station while monitoring the control channel, the cell station performing direct multicast communications with the plurality of personal stations, the cell station comprising:

a channel search means for scanning the plurality of communication channels to search for an unoccupied channel and regarding the unoccupied channel as a multicast channel;

a simultaneous cell means for transmitting a simultaneous call frame which carries multicast channel information indicating the multicast channel on the control channel, the simultaneous call frame indicating a simultaneous call to the plurality of personal stations; and a multicast means for transmitting multicast frames on the multicast channel when a predetermined time period passes after the simultaneous call frame is transmitted, said multicast frames containing data to be multicast, wherein the plurality of personal stations set the multicast channel indicated by the multicast channel information to a receiving state, on receiving the simultaneous call frame on the control channel.

40. The cell station of claim 39, wherein said simultaneous call means comprises:

a simultaneous call frame generation means for generating the simultaneous call frame;

a multicast channel information setting means for setting the multicast channel information to a generated simultaneous call frame;

a simultaneous call direction setting means for setting a simultaneous call direction to the generated simultaneous call frame, the simultaneous call direction directing the plurality of personal stations to set the multicast channel indicated by the multicast channel information to a communication state; and a simultaneous call frame transmission means for transmitting the simultaneous call frame in which the simultaneous call direction is set on the control channel.

41. The cell station of claim 40 further comprising a table means for holding group numbers respectively assigned to groups into which the plurality of personal stations are predeterminately divided, wherein said simultaneous call means further comprises a call number setting means for setting one of the group numbers to the simultaneous call frame generated by said simultaneous call frame generation means;

said simultaneous call frame transmission means transmits the simultaneous call frame in which the group number is set on the control channel; and on receiving the simultaneous call frame, any of the plurality of personal stations which belong to a group indicated by the group number set in the simultaneous call frame set the multicast channel indicated by the multicast channel information to a receiving state.

42. The cell station of claim 41, wherein said table means further holds a global number commonly assigned to all of the plurality of personal stations;

said call number setting means sets the global number and a group number selectively to the simultaneous call frame generated by said simultaneous call frame generation means;

said simultaneous call frame transmission means transmits on the control channel the simultaneous call frame in which one of the global number and a group number is set; and on receiving the simultaneous call frame on the control channel in which the global number is set, the plurality of personal stations enter a receiving state of multicast frames on the multicast channel.

43. The cell station of claim 42 further comprising:

a reception means for receiving an instruction which indicates a start of the multicast communications and an instruction which specifies a group to be applied the multicast communications, the instructions being inputted from one of an operating unit of the cell station, the plurality of personal stations, and a communications unit connected with the cell station via a communication network, wherein on receiving both the instruction for starting the multicast communications and the instruction for specifying a group to be applied the multicast communications, said call number setting means sets the group number to the simultaneous call frame, and said multicast means transmits the multicast frame which carries data sent from one of the operating unit, the plurality of personal stations, and the communication unit on the multicast channel as data to be transmitted.

44. The cell station of claim 40, wherein said simultaneous call means further comprises:

a carrier sense request setting means for setting a carrier sense request to the simultaneous call frame in which the multicast channel information is set, the carrier sense request requesting that the multicast channel indicated by the multicast channel information is checked;

a control channel reception means for receiving radio frames sent from the plurality of personal stations on the control channel;

a frame judging means for judging whether each of the received radio frames carries a carrier sense result, which indicates whether each of the plurality of personal stations can use the multicast channel; and a carrier sense result judging means for judging whether a ratio of carrier sense results which indicate that the multicast channel can be used exceeds a predetermined value, wherein said simultaneous call frame transmission means transmits the simultaneous call frame in which the carrier sense request and the multicast channel information are set on the control channel, and transmits the simultaneous call frame in which the simultaneous call direction and the multicast channel information on the control channel when the ratio of carrier sense results which indicate that the multicast channel can be used is judged to exceed the predetermined value, on receiving the simultaneous call frame which carries the carrier sense request, the plurality of personal stations check whether the multicast channel indicated by the multicast channel information can be used, and transmits a checked result as the carrier sense result on the control channel, and on receiving the simultaneous call frame which carries the simultaneous call direction, the plurality of personal stations set the multicast channel indicated by the multicast channel information to the communication station.

45. The cell station of claim 44, wherein said channel search means searches for an unoccupied channel again when the ratio of carrier sense results which indicate that the multicast channel can be used is judged not to exceed the predetermined value, and makes another communication channel a new multicast channel, and said simultaneous call means retransmits a simultaneous call frame which carries a carrier sense request for the new multicast channel.

46. The cell station of claim 40, wherein said simultaneous call means further comprises:

a reception means for receiving radio frame sent from the plurality of personal stations on the control channel and the multicast channel;

a frame judging means for judging whether each of received radio frames carries a channel setting result which indicates whether each of the plurality of personal stations has set the multicast channel to the communication state;

a channel set judging means for judging whether a ratio of channel setting results which indicate that the multicast channel has been set to the communication state exceeds a predetermined value;

on receiving the simultaneous call frame, the plurality of personal stations set the multicast channel to the communication state if the multicast channel is not occupied, transmits a notice of a successful setting of the multicast channel on the multicast channel, and transmits a notice of an unsuccessful setting of the multicast channel on the control channel if the multicast channel is in use; and said multicast means transmits the multicast frame which carries data to be multicast on the multicast channel when the ratio of channel setting results which indicate that the multicast channel has been set to the communication state is judged to exceed the predetermined value.

47. The cell station of claim 46, wherein said channel search means searches for an unoccupied channel again when the ratio of channel setting results which indicate that the multicast channel has been set to the communication state is judged not to exceed the predetermined value, and makes another communication channel a new multicast channel, and said simultaneous call means retransmits a simultaneous call frame for the new multicast channel.

48. The cell station of claim 40, wherein said multicast means comprises:

a stand-by timer for counting a stand-by time period required for the plurality of personal stations to set the multicast channel into a communication state when the simultaneous call frame has been transmitted;

a multicast frame generation means for generating multicast frames which carry data to be multicast to the plurality of personal stations; and a multicast frame transmission means for transmitting generated multicast frames on the multicast channel when the stand-by time period has passed.

49. The cell station of claim 48 further comprising an invalid data information setting means for setting information which indicates that data are invalid to a multicast frame generated by said multicast frame generation means when there is not data to be transmitted, so that the cell station and the personal stations distinguish the multicast channel from an unoccupied channel.

50. The cell station of claim 48, wherein said multicast means further comprises a point-to-point communications information setting means for setting point-to-point communications information to a multicast frame generated by said multicast frame generation means, together with a personal station number of a personal station to be applied the point-to-point communications, said point-to-point communications information indicating that the caller personal station starts to communicate with one of the other personal stations;

said multicast frame transmission means transmits the multicast frame which contains the point-to-point communication information;

on receiving the multicast frame which contains the point-to-point communication information, a personal station which is assigned the personal station number set in the multicast frame enter a point-to-point communication state.

51. The cell station of claim 50, wherein said multicast means further comprises:

a point-to-point channel information setting means for setting point-to-point channel information which indicates a channel for point-to-point communications to the multicast frame in which the point-to-point communications information is set;

said multicast frame transmission means transmits a multicast frame which carries the point-to-point communications information and the point-to-point channel information, and on receiving the multicast frame which carries the point-to-point communications information and the point-to-point channel information, a personal station which is assigned a personal station number set in the multicast frame starts the point-to-point communications on the communication channel indicated by the point-to-point communications channel information.

52. The cell station of claim 51, wherein said multicast means further comprises:

a suspension/continuation information setting means for setting suspension/continuation information to the multicast frame in which the point-to-point channel information is set, said suspension/continuation information indicating one of suspension and continuation of the multicast communication;

said multicast frame transmission means transmits the multicast frame which carries the point-to-point communications information, the point-to-point channel information, and the suspension/continuation information; and on receiving the multicast frame which carries the point-to-point communications information, the point-to-point channel information, and the suspension/continuation information, a personal station which is assigned the personal station number set in the multicast frame starts the point-to-point communications on the communication channel indicated by the point-to-point communications channel information, and the other personal stations which are not assigned the personal station number set in the multicast frame suspend or continue to receive frames on the multicast channel in accordance with the suspension/continuation information.

53. The cell station of claim 52 further comprising:

a reception means for receiving an instruction which indicates a start of the point-to-point communications and an instruction which specifies personal stations to be applied the point-to-point communications, the instructions being inputted from one of an operating unit of the cell station, the plurality of personal stations, and a communications unit connected with the cell station via a communication network;

a target personal station judging means for judging whether the personal stations to be applied the point-to-point communications are in a multicast communication state; and a start means for starting said point-to-point communications information setting means when the personal stations to be applied the point-to-point communications are judged to be in the multicast communication state.

54. The cell station of claim 53, wherein said reception means further receives an instruction which indicates whether the multicast communications are suspended or continued when the point-to-point communications starts; and said suspension/continuation information setting means sets the suspension/continuation information to the multicast frame in accordance with the instruction received by said reception means.

55. The cell station of claim 48, wherein said multicast means further comprises a busy tone transmission direction setting means for setting a busy tone transmission direction to the multicast frame generated by said multicast frame generation means, said busy tone transmission direction indicating a transmission of a busy tone, which indicates a channel is busy;

a multicast frame transmission means transmits the multicast frame which carries the busy tone transmission direction; and on receiving the multicast frame which carries the busy tone transmission direction, the plurality of personal stations transmit a busy tone on the multicast channel, so that another cell station and the plurality of personal stations distinguish the multicast channel from an unoccupied channel in a wide range in which busy tone of the plurality of personal stations reach.

56. The cell station of claim 55, wherein said multicast means further comprises a timer for generating a time-out in every predetermined period, and said busy tone transmission direction setting means operates for every generated time-out.

57. The cell station of claim 48, wherein said multicast means further comprises a disconnection direction setting means for setting to the multicast frame generated by said multicast frame generation means a disconnection direction which indicates that the multicast communications are disconnected and a personal station number of personal station to be applied the disconnection direction;

said multicast frame transmission means transmits the multicast frame which carries the disconnection direction; and on receiving the multicast frame which carries the disconnection direction, a personal station which is assigned the personal station number set in the multicast frame suspends the multicast communications.

58. The cell station of claim 57 further comprising:

a reception means for receiving the disconnection direction for a specific personal station and an instruction which indicates the personal station number of the personal station to be applied the disconnection direction, the disconnection direction and the instruction being inputted from one of an operating unit of the cell station, the plurality of personal stations, and a communications unit connected with the call station via a communication network;

a target personal station judging means for judging whether the personal stations to be applied the disconnection direction are in a multicast communication state; and a start means for starting said disconnection direction setting means when the personal stations to be applied the disconnection direction are judged to be in the multicast communication state.

59. The cell station of claim 48 further comprising a table means for holding personal station numbers and group numbers, the personal station numbers being assigned to each of the plurality of personal stations and the group numbers being assigned to groups into which all of the plurality of personal stations are predeterminately divided, wherein said multicast means further comprises a group number setting means for setting a specified group number to a multicast frame generated by said multicast frame generation means, said multicast frame transmission means transmits the multicast frame in which the specified group number is set, and on receiving the multicast frame, any of the personal stations which do belong to a group indicated by the group number set in the multicast frame abandon the multicast frame.

60. The cell station of claim 59, wherein said multicast means further comprises:

a polling information setting means for setting polling information to a multicast frame generated by said multicast frame generation means, said polling information indicating that a personal station which receives the multicast frame is allowed to transmit data; and a polling number setting means for setting one of the personal station numbers of the personal stations belonging to a predetermined group held in said table means as a polling number to every generated multicast frame, wherein said multicast frame transmission means transmits a multicast frame in which polling information and a polling number are set; and on receiving the multicast frame in which the polling information and a group number are set, a personal station assigned the group number set in the multicast frame transmits a response frame which carries data to be transmitted on the multicast channel, information which indicates that the frame is a response frame, and the personal station number.

61. The cell station of claim 60 further comprising:

a radio frame reception means for receiving radio frames from the other personal stations on the multicast channel;

a response frame judging means for judging a received radio frame to be a response frame if the radio frame carries information which indicates that the information is a response to the polling and a personal station number equal to the personal station number set by said polling number setting means; and a data reception means for receiving data contained in the response frame.

62. The cell station of claim 61 further comprising:

a reception means for receiving an instruction which indicates a start of polling and an instruction which specifies a group to be applied the polling, the instructions being inputted from one of an operating unit of the cell station, the plurality of personal stations, and a communications unit connected with the cell station via a communication network, wherein said polling information setting means set the polling setting information to the multicast frame when the instruction which indicates a start of polling is received by said reception means;

when the instruction which specifies the group to be applied the polling is received, said polling number setting means sequentially sets the personal station numbers of the personal stations in the group to the multicast frame, and when the instruction which specifies the group to be applied the poling is not received, said polling number setting means sequentially sets all personal station numbers held in said table means to the multicast frame.

63. The cell station of claim 61 further comprising:

a no-entry personal station judging means for judging whether there is any personal station that is not taking part in the multicast communications;

an announcement frame generation means for generating announcement frames which carry multicast communications information which indicates that the multicast communication is in progress, a group number of the predetermined group, and channel information which indicates the multicast channel; and wherein said simultaneous call frame transmission means transmits the announcement frame on the control channel, and personal stations which are not in the multicast communications and which belong to the group indicated by the announcement frame can set the multicast channel indicated by the channel information to a communication state.

64. The cell station of claim 61 further comprising:

a non-entry personal station judging means for judging whether there is any personal station that is not taking part in the multicast communications;

an announcement frame generation means for generating announcement frames which indicate that the multicast communication is in progress;

a multicast information setting means for setting to a generated announcement frame multicast information which carries a group number of the predetermined group and the multicast channel;

a control channel reception means for receiving radio frames on the control channel;

a frame judging means for judging whether a received radio frame is an announcement response frame which carries entry information which indicates that a personal station joins in the multicast communication and the personal station which has transmitted the entry information;

an entry reception setting means for setting reception information which indicates an entry of the personal station is received to a newly generated announcement frame when a personal station number set in the announcement response frame belongs to the predetermined group, and for setting rejection information which indicates that the entry is rejected to a newly generated announcement frame when the personal station number does not belong to the specified group;

said simultaneous call frame transmission means transmits on the control channel the announcement frame which carries the multicast information and the announcement frame in which the reception information is set; and on receiving the announcement frame which carries the multicast information, personal stations which have not in the multicast communications and which belong to the group indicated by the group number set in the announcement frame transmit the announcement response frame on the control channel, and on receiving the announcement frame in which the reception information is set, personal stations which have not in the multicast communications set the multicast channel indicated by the multicast information to the communication state.

65. The cell station of claim 61 further comprising a disconnection request judging means for judging whether a response frame judged by said response frame judging means carries a disconnection request which requests a responded personal station to be disconnected from the multicast communications, wherein said multicast means further comprises:

a disconnection direction setting means for setting to a multicast frame generated by said multicast frame generation means a direction which indicates that the multicast communication is disconnected and a personal station number of a personal station which has transmitted the direction set in the response frame; p1 said multicast frame transmission means transmits the multicast frame which carries the disconnection direction;

personal stations which want to be removed from the multicast communications can transmit the response frame which carries the disconnection request; and on receiving the multicast frame which carries the disconnection direction, a personal station which is assigned a personal station number set in the multicast frame suspends the multicast communications.

66. The cell station of claim 65 further comprising:
- a reception means for receiving an instruction which indicates the disconnection direction for a specified personal station and an instruction which indicates the specified personal station from a source of a request for the multicast communications, the source being one of an operating unit of the cell station, the plurality of personal stations, and a communications unit connected with the cell station via a communication network;
- a target personal station judging means for judging whether the personal stations to be applied the disconnection direction are in a multicast communication state; and
- a start means for starting said disconnection direction setting means when the personal stations to be applied the disconnection direction are judged to be in the multicast communication state.

67. The cell station of claim 61, wherein said multicast means further comprises:
- a switch request judging means for judging whether the response frame judged by said response frame judging means carries a switch request which requests for a change of multicast channels;
- a search control means for directing said channel search means to search for an unused channel and making the unused channel a new multicast channel when the response frame has been judged to carry the switch request;
- a switch direction setting means for setting a switch direction to the multicast frame generated by said multicast frame generation means, the switch direction including channel information which indicates a new multicast channel and an instruction which indicates switching from the multicast channel to the new multicast channel;
- said multicast frame transmission means transmits the multicast frame which carries the switch direction;
- when a number of reception errors of multicast frames in the multicast channel has increased, the plurality of personal stations transmits a response frame which carries the switch request; and
- on receiving the multicast frame which carries the switch direction, the plurality of personal stations set the new multicast channel indicated by the channel information to the multicast communication state.

68. The cell station of claim 59 further comprising a reception means for receiving specified personal station numbers and a direction which indicates making a group of personal stations which are assigned the specified personal station numbers from one of an operating unit of the cell station, the plurality of personal stations, and a communications unit connected with the cell station via a communication network;
- a group number storage means for storing a new group number to said table mean when the direction to make a group of personal stations is received, and storing the personal station numbers which belong to the group;
- a number assignment information setting means for setting to the multicast frame generated by said multicast frame generation means assignment information which indicates assignment of group numbers, the new group number held in said table means, and personal station numbers of personal stations which belong to the group indicated by the new group number;
- said multicast frame transmission means transmits the multicast frame which carries the assignment information, the new group number, and the personal station numbers; and
- on receiving the multicast frame which carries the assignment information, a personal station which is assigned the personal station number set in the multicast frame holds the new group number as the group number assigned to the group to which the personal station belongs.

69. The cell station of claim 48 further comprising a table means for holding all of the plurality of personal stations, wherein said multicast means further comprises:
- a polling information setting means for setting polling information to a multicast frame generated by said multicast frame generation means, said polling information indicating that a personal station which receives the multicast frame is allowed to transmit data; and
- a polling number setting means for setting one of the personal station numbers of the personal stations held in said table means as a polling number to every generated multicast frame, wherein
- said multicast frame transmission means transmits a multicast frame in which polling information and a polling number are set; and
- on receiving the multicast frame in which the polling information and a group number are set, a personal station assigned the group number set in the multicast frame transmits a response frame which carries data to be transmitted on the multicast channel, information which indicates that the frame is a response frame, and the personal station number.

70. The cell station of claim 69 further comprising:
- a radio frame reception means for receiving radio frames from the other personal stations on the multicast channel;
- a response frame judging means for judging a received radio frame to be a response frame if the radio frame carries information which indicates that the information is a response to the polling and a personal station number equal to the personal station number set by said polling number setting means; and
- a data reception means for receiving data contained in the response frame.

71. The cell station of claim 70 further comprising:
- a press talk request judging means for judging a received radio frame to be a press talk request if the radio frame carries information which indicates a request for consecutive transmission of radio frames and a personal station number equal to the personal station number set by said polling number setting means; and
- a press talk reception setting means for setting to the multicast frame press talk reception information which indicates a permission of press talk and a personal station number of the personal station which has made the press talk request, when the radio frame is judged to be the press talk request, wherein
- said polling information setting means and said polling number setting means stop an operation when the radio frame is judged to be the press talk request,
- said multicast frame transmission means transmits the multicast frame in which the press talk reception information and the personal station number of the personal station which has made the press talk request are set, and
- on receiving the multicast frame, a personal station which is assigned the personal station number of the personal station which has made the press talk request set in the radio frame transmits on multicast channel a response frame which caries data to be transmitted.

72. The cell station of claim 71 further comprising a data relay means for setting data carried in a response frame received by said radio frame reception means to a multicast frame generated by said multicast frame generation means as relay data, wherein said multicast frame transmission means transmits the multicast frame in which the relay data are set, in order to allow the personal station that has made the press talk request to transmit multicast data to another personal station via the cell station.

73. The cell station of claim 72, wherein said response frame judging means judges whether a response frame carries a group number in addition to a press talk request, said data relay means sets the group number in addition to the relay data to a multicast frame when the group number is judged to be present, in order to allow a personal station that has made a press talk request to transmit multicast data to another personal station in a specific group via the cell station.

74. The cell station of claim 69 further comprising:

a reception means for receiving response frames transmitted from the other personal stations;

a received frame judging means for judging whether the received response frames carries a point-to-point communications request which requests for a start of point-to-point communications;

a point-to-point communications information setting means for setting point-to-point communications information to the multicast frame generated by said multicast frame generation means, together with the personal station number of a personal station which has requested the point-to-point communications, when the received response frame is judged to carry the point-to-point communications, said point-to-point communications information indicating that the caller personal station starts to communicate with one of the other personal stations;

said multicast frame transmission means transmits the multicast frame which contains the point-to-point communication information;

on receiving the multicast frame which contains the point-to-point communication information, a personal station which is assigned the personal station number set in the multicast frame enter a point-to-point communication state on the multicast channel, and the other personal stations which are not assigned the personal station number suspend the multicast communications on the multicast channel.

75. The cell station of claim 74, wherein said digital radio communication is based on Time Division Multiple Access/Time Division Duplex in which a carrier is divided into a plurality of time slots, and a same number of time slots is assigned for transmission and for reception to alternate on the carrier in a predetermined period, said multicast channel represents a pair of time slots for transmission and for reception, and said simultaneous call frame transmission means and said multicast frame transmission means respectively transmit a simultaneous call frame and a multicast frame using the time slots assigned for transmission in the predetermined period.

76. The cell station of claim 75 further comprising a table means for holding personal station numbers and group numbers, the personal station numbers being assigned to each of the plurality of personal stations and the group numbers being assigned to groups into which all of the plurality of personal stations are predeterminately divided, wherein said multicast means further comprises a group number setting means for setting a specified group number to a multicast frame generated by said multicast frame generation means, said multicast frame transmission means transmits the multicast frame in which the specified group number is set, and on receiving the multicast frame, any of the personal stations which do belong to a group indicated by the group number set in the multicast frame abandon the multicast frame.

77. The cell station of claim 76, wherein said multicast means further comprises:

a polling information setting means for setting polling information to a multicast frame generated by said multicast frame generation means, said polling information indicating that a personal station which receives the multicast frame is allowed to transmit data; and a polling number setting means for setting one of the personal station numbers of the personal stations belonging to a predetermined group held in said table means as a polling number to every generated multicast frame, wherein said multicast frame transmission means transmits a multicast frame in which polling information and a polling number are set; and on receiving the multicast frame in which the polling information and a group number are set, a personal station assigned the group number set in the multicast frame transmits a response frame which carries data to be transmitted on the multicast channel, information which indicates that the frame is a response frame, and the personal station number.

78. The cell station of claim 77 further comprising:

a radio frame reception means for receiving radio frames from the other personal stations on the multicast channel;

a response frame judging means for judging a received radio frame to be a response frame if the radio frame carries information which indicates that the information is a response to the polling and a personal station number equal to the personal station number set by said polling number setting means; and a data reception means for receiving data contained in the response frame.

79. The cell station of claim 78 further comprising:

a reception means for receiving an instruction which indicates a start of polling and an instruction which specifies a group to be applied the polling, the instructions being inputted from one of an operating unit of the cell station, the plurality of personal stations, and a communications unit connected with the cell station via a communication network, wherein said polling information setting means set the polling setting information to the multicast frame when the instruction which indicates a start of polling is received by said reception means;

when the instruction which specifies the group to be applied the polling is received, said polling number setting means sequentially sets the personal station numbers of the personal stations in the group to the multicast frame, and when the instruction which specifies the group to be applied the polling is not received, said polling number setting means sequentially sets all personal station numbers held in said table means to the multicast frame.

80. In a mobile communication system comprising a cell station and a plurality of personal stations, the cell station controlling the plurality of personal stations using a control channel, the plurality of personal stations performing digital radio communications via the cell station while monitoring the control channel, the plurality of personal stations being receiver personal stations which perform direct multicast communications with the cell station, each of the receiver personal stations comprising:

a reception means for receiving radio frames;

a simultaneous call frame judging means for judging whether a radio frame received on the control channel by said reception means is a simultaneous call frame transmitted from the cell station;

a multicast channel setting means for setting a multicast channel indicated by the multicast channel information to a receiving state when the radio frame is judged to be the simultaneous call frame which carries a simultaneous call direction; and said reception means receiving multicast frames transmitted from the cell station on the multicast channel after receiving the radio frame on the control channel.

81. The receiver personal station of claim 80 further comprising a call number holding means for holding one of group numbers assigned to the receiver personal station, the group numbers respectively assigned to groups into which the plurality of personal stations are predeterminately divided, wherein said simultaneous call frame judging means comprises:

a simultaneous call identification judging means for judging whether a radio frame received by said reception means carries an identification of simultaneous call;

a call number judging means for judging whether the radio frame carries the group number of the receiver personal station;

a reception determination means for determining to join the multicast communications when the radio frame is judged to carry the identification of simultaneous call and the group number assigned to the receiver personal station; and said multicast channel setting means sets the multicast channel indicated by the multicast channel information to the receiving state when said reception determination means determines to join the multicast communications.

82. The receiver personal station of claim 81 further comprising:

an announcement information judging means for judging whether a radio frame received on the control channel by said reception means is an announcement frame which carries multicast information including a group number and a multicast channel and which indicates that the multicast communications are in progress;

a group number judging means for judging whether the group number included in the announcement frame is assigned to the group to which the receiver personal station belongs;

an announcement response frame generation means for generating announcement response frames which carry entry information indicating to join the multicast communications and a personal station which has transmitted the entry information;

a transmission means for transmitting the announcement response frames on the control channel;

a reception information judging means for judging whether a radio frame received on the control channel by said reception means is an announcement frame which carries reception information which indicates that the entry to the multicast communications has been received; and on receiving an announcement frame that is judged to carry the reception information, said reception determination means determines to join the multicast communications.

83. The receiver personal station of claim 81, wherein said call number holding means holds a global number commonly assigned to all of the plurality of personal stations;

said call number judging means judges whether a received radio frame carries the global number; and said reception determination means determines to receive the radio frame when the radio frame is judged to carry the identification of simultaneous call and the global number.

84. The receiver personal station of claim 83 further comprising:

a validity judging means for judging whether the multicast frame received by said reception means carries information which indicates that data in the multicast frame is invalid; and a data abandonment means for abandoning the data when the multicast frame is judged to carry the information which indicates invalidity of the data; wherein the cell station transmits on the multicast channel the multicast frame which carries information which indicates that data are invalid when there is no data to be transmitted, so that the cell station and the plurality of personal stations distinguish the multicast channel from an unoccupied channel.

85. The receiver personal station of claim 80, wherein said digital radio communication is based on Time Division Multiple Access/Time Division Duplex in which a carrier is divided into a plurality of time slots, and a same number of time slots is assigned for transmission and for reception to alternate on the carrier in a predetermined period, said multicast channel represents a pair of time slots for transmission and for reception, and a simultaneous call frame transmission means and a multicast frame transmission means for respectively transmitting a simultaneous call frame and a multicast frame using the time slots assigned for transmission in the predetermined period.

86. The receiver personal station of claim 85 further comprising a call number holding means for holding one of group numbers assigned to the receiver personal station, the group numbers respectively assigned to groups into which the plurality of personal stations are predeterminately divided, wherein said simultaneous call frame judging means comprises:

a simultaneous call identification judging means for judging whether a radio frame received by said reception means carries an identification of simultaneous call;

a call number judging means for judging whether the radio frame carries the group number of the receiver personal station;

a reception determination means for determining to join the multicast communications when the radio frame is judged to carry the identification of simultaneous call and the group number assigned to the receiver personal station; and said multicast channel setting means sets the multicast channel indicated by the multicast channel information to the receiving state when said reception determination means determines to join the multicast communications.

87. The receiver personal station of claim 86 further comprising:

an announcement information judging means for judging whether a radio frame received on the control channel by said reception means is an announcement frame which carries multicast information including a group number and a multicast channel and which indicates that the multicast communications are in progress;

a group number judging means for judging whether the group number included in the announcement frame is assigned to the group to which the receiver personal station belongs;

an announcement response frame generation means for generating announcement response frames which carry entry information indicating to join the multicast communications and a personal station which has transmitted the entry information;

a transmission means for transmitting the announcement response frames on the control channel;

a reception information judging means for judging whether a radio frame received on the control channel by said reception means is an announcement frame which carries reception information which indicates that the entry to the multicast communications has been received; and on receiving an announcement frame that is judged to carry the reception information, said reception determination means determines to join the multicast communications.

88. The receiver personal station of claim 85, wherein a call number holding means holds a global number commonly assigned to all of the plurality of personal stations;

a call number judging means judges whether a received radio frame carries the global number; and a reception determination means determines to receive the radio frame when the radio frame is judged to carry the identification of a simultaneous call and the global number.

89. The receiver personal station of claim 88 further comprising:

a validity judging means for judging whether the multicast frame received by said reception means carries information which indicates that data in the multicast frame is invalid; and a data abandonment means for abandoning the data when the multicast frame is judged to carry the information which indicates invalidity of the data; wherein the cell station transmits on the multicast channel the multicast frame which carries information which indicates that data are invalid when there is no data to be transmitted, so that the cell station and the plurality of personal stations distinguish the multicast channel from an unoccupied channel.

90. The receiver personal station of claim 85, wherein said simultaneous call frame judging means judges whether a received radio frame is a simultaneous call frame which carries the multicast channel information and a carrier sense request requesting that the multicast channel indicated by one multicast channel information is checked;

the receiver personal station further comprising;

a channel check means for sensing the indicated multicast channel to check whether the multicast channel is being used by other personal stations and the cell station, when the radio frame is judged to be the simultaneous call frame;

a radio frame generation means for generating radio frames which carries channel sense results; and a transmission means for transmitting generated radio frames on the control channel.

91. The receiver personal station of claim 85 further comprising:

a radio frame generation means for generating radio frames;

a channel setting result setting means for setting to a radio frame a channel setting result which indicates whether the multicast channel has been set to the communication state by multicast channel setting means;

a transmission means for transmitting generated radio frames on the control channel when the multicast channel has not been set, and transmitting the generated radio frames on the multicast channel when the multicast channel has been set; and said multicast channel setting means sense the multicast channel indicated by the channel information, and sets the multicast channel to the communication state if the multicast channel is not being used by the cell station and other personal stations.

92. The receiver personal station of claim 80, wherein said simultaneous call frame judging means judges whether a received radio frame is a simultaneous call frame which carries the multicast channel information and a carrier sense request requesting that the multicast channel indicated by one multicast channel information is checked;

the receiver personal station further comprising;

a channel check means for sensing the indicated multicast channel to check whether the multicast channel is being used by other personal stations and the cell station, when the radio frame is judged to be the simultaneous call frame;

a radio frame generation means for generating radio frames which carries channel sense results; and a transmission means for transmitting generated radio frames on the control channel.

93. The receiver personal station of claim 80 further comprising:

a radio frame generation means for generating radio frames;

a channel setting result setting means for setting to a radio frame a channel setting result which indicates whether the multicast channel has been set to the communication state by multicast channel setting means;

a transmission means for transmitting generated radio frames on the control channel when the multicast channel has not been set, and transmitting the generated radio frames on the multicast channel when the multicast channel has been set; and said multicast channel setting means sense the multicast channel indicated by the channel information, and sets the multicast channel to the communication state if the multicast channel is not being used by the cell station and other personal stations.

94. The receiver personal station of claim 80 further comprising:

a call number holding means for holding one of group numbers assigned to the receiver personal station, the group numbers respectively assigned to groups into which the plurality of personal stations are predeterminately divided;

a multicast frame judging means for judging whether a multicast frame received by said reception means carries a group number assigned to the receiver personal station as a destination number; and a frame abandonment means for abandoning the multicast frame when the multicast frame is judged not to carry the group number assigned to the receiver personal station, and for receiving data in the multicast frame when the multicast frame is judged to carry the group number assigned to the receiver personal station, wherein when the cell station performs the multicast communications with a specific group, the cell station sets a group number to a multicast frame.

95. The receiver personal station of claim 94, wherein said multicast frame judging means judges whether the multicast frame received by said reception means carries assignment information which indicates assignment of group numbers, a new group number, and personal station numbers of personal stations which belong to the group indicated by the new group number;

the receiver personal station further comprising:

a personal station number judging means for judging whether the personal station number assigned to the receiver personal station is set in the multicast frame which carries the assignment information; and a storage means for storing a new group number to said call number holding means as a group number assigned to a group to which the personal station belongs when the personal station number assigned to the receiver personal station is judged to be set in the multicast frame.

96. The receiver personal station of claim 80 further comprising:

a response frame generation means for generating a response frame which carries data to be transmitted to the cell station;

a polling judging means for judging a multicast frame received by said reception means as a polling request if the multicast frame carries polling information which indicates that the cell station allows the receiver personal station to transmit data and a personal station number assigned to the receiver personal station;

a polling response setting means for setting information indicating that the response frame is a response to the polling, and the personal station number of the receiver personal station to the response frame when the multicast frame is judged to be the polling request; and a transmission means for transmitting to the multicast channel the response frame in which the information indicating that a response frame is a response to the polling and the personal station number of the receiver personal station are set.

97. The receiver personal station of claim 96 further comprising:

an instruction reception means for receiving from an operator an instruction which indicates a start of point-to-point communications via the cell station;

a point-to-point communication request setting means for suspending the operation of said polling response setting means and setting to a generated response frame information indicating a point-to-point communications request and the personal station number of the receiver personal station when the multicast frame is judged to be the polling request and the instruction indicating the start of the point-to-point communications is received;

a point-to-point communications determination means for determining to start point-to-point communications if the multicast frame received by said reception means carries point-to-point communications information which indicates the start of the point-to-point communications and the personal station number of the receiver personal station;

a point-to-point communication start means for starting the point-to-point communications via the cell station on the multicast channel if the start of the point-to-point communications is determined; and said transmission means transmits the multicast frame which carries the point-to-point communications request.

98. The receiver personal station of claim 96 further comprising:

an input means for receiving from an operator a removal request which indicates a request to be removed from the multicast communications;

a removal request setting means for setting to a generated response frame information which indicates the removal request and a personal station number of the receiver personal station when the multicast frame is judged to be the polling request and said input means has received the removal request;

a frame judging means for judging whether the multicast frame received by said reception means carries disconnection direction which indicates that the multicast communications to the receiver personal station are disconnected, and the personal station number of the receiver personal station; and a suspension control means for controlling said reception means to suspend a reception on the multicast channel if the multicast frame is judged to carry the disconnection direction.

99. The receiver personal station of claim 96 further comprising:

a frame judging means for judging whether the multicast frame received by said reception means carries an instruction which indicates switching multicast channels and channel information which indicates a new multicast channel; and said multicast channel setting means sets the new multicast channel to the receiving state when the multicast frame is judged to carry the instruction which indicates switching multicast channels.

100. The receiver personal station of claim 99 further comprising:

a channel check means for sensing the multicast channel to check whether the multicast channel is being used by other cell stations and other personal stations;

a switch request setting means for setting a switch request which requests for switching multicast channels to the response frame generated by said response frame generation means; and said transmission means transmits the response frame which carries the switch request to the multicast channel.

101. The receiver personal station of claim 100, wherein said frame judging means further judges whether the multicast frame received by said reception means carries a direction which indicates to transmit a busy tone which indicates that a channel is being used;

the receiver personal station further comprising:

a busy tone setting means for setting information indicating a busy tone to the response frame generated by said response frame generation means; and said transmission means transmits the response frame which carries the busy tone on the multicast frame.

* * * * *